US012707297B2

(12) United States Patent
Kim

(10) Patent No.: US 12,707,297 B2
(45) Date of Patent: Aug. 11, 2026

(54) METHOD AND APPARATUS FOR MANAGING PARTIAL BANDWIDTH FOR CELL GROUP ACTIVATION OR INACTIVATION IN NEXT-GENERATION MOBILE COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 18/698,610

(22) PCT Filed: Oct. 19, 2022

(86) PCT No.: PCT/KR2022/015919

§ 371 (c)(1),
(2) Date: Apr. 4, 2024

(87) PCT Pub. No.: WO2023/068788

PCT Pub. Date: Apr. 27, 2023

(65) Prior Publication Data

US 2024/0422590 A1 Dec. 19, 2024

(30) Foreign Application Priority Data

Oct. 19, 2021 (KR) ........................ 10-2021-0139429

(51) Int. Cl.
*H04W 24/04* (2009.01)
*H04B 7/06* (2006.01)
(Continued)

(52) U.S. Cl.
CPC ........ *H04W 24/04* (2013.01); *H04B 7/06964* (2023.05); *H04L 5/0032* (2013.01);
(Continued)

(58) Field of Classification Search
CPC . H04W 24/04; H04W 24/02; H04W 52/0229; H04W 76/15; H04W 76/27;
(Continued)

(56) References Cited

U.S. PATENT DOCUMENTS

2021/0226684 A1* 7/2021 Koskela ................ H04W 72/53
2021/0250156 A1 8/2021 Kim et al.
2023/0041310 A1* 2/2023 Kim ........................ H04L 5/001

FOREIGN PATENT DOCUMENTS

KR 10-2021-0101985 A 8/2021
KR 10-2022-0008697 A 1/2022
(Continued)

OTHER PUBLICATIONS

InterDigital Inc., Measurements and maintenance of UL synch with a deactivated SCG, R2-2108489, 3GPP RAN WG2 Meeting #115-e, Electronic, Aug. 16-27, 2021.
(Continued)

*Primary Examiner* — Mohamed A Kamara
(74) *Attorney, Agent, or Firm* — Jefferson IP Law, LLP

(57) ABSTRACT

The present disclosure relates to a 5G or 6G communication system for supporting a higher data transmission rate. According to an embodiment of the present disclosure, provided are a method and an apparatus for enabling a cell to be quickly activated in a next-generation mobile communication system.

14 Claims, 17 Drawing Sheets

(51) Int. Cl.
*H04L 5/00* (2006.01)
*H04W 24/02* (2009.01)
*H04W 52/02* (2009.01)
*H04W 76/15* (2018.01)

(52) U.S. Cl.
CPC ....... *H04W 24/02* (2013.01); *H04W 52/0229* (2013.01); *H04W 76/15* (2018.02)

(58) Field of Classification Search
CPC ........... H04W 72/0453; H04B 7/06964; H04L 5/0032; H04L 5/001; H04L 5/0098; H04L 5/0023; H04L 5/0048; Y02D 30/70
See application file for complete search history.

(56) References Cited

FOREIGN PATENT DOCUMENTS

| | | | |
|---|---|---|---|
| WO | 2020/085808 | A1 | 4/2020 |
| WO | 2020/152530 | A1 | 7/2020 |
| WO | 2021/162233 | A1 | 8/2021 |
| WO | 2021/207391 | A1 | 10/2021 |

OTHER PUBLICATIONS

Vivo, Efficient activation/deactivation mechanism for SCG and SCells, R2-2007215, 3GPP TSG-RAN WG2 Meeting #111 electronic, E-meeting, Aug. 17-28, 2020.
Vivo, Discussion on activation of a deactivated SCG, R2-2108668, 3GPP TSG-RAN WG2 Meeting #115, E-meeting, Aug. 16-27, 2021.
Huawei, [AT115-e][223][R17 DCCA] Network-triggered SCG activation (Huawei), R2-2108865, 3GPP TSG-RAN WG2 #115-e, Online, Aug. 9-27, 2021.
Extended European Search Report dated Nov. 20, 2024, issued in European Application No. 22884010.4-1206.
Samsung, Multi TRP Beam Failure Detection and Recovery, R2-2107007, 3GPP TSG-RAN2 Meeting #115 Electronic, Aug. 9-27, 2021.
International Search Report and Written Opinion dated Jan. 31, 2023, issued in International Patent Application No. PCT/KR2022/015919.
Indian Office Action dated May 4, 2026, issued in Indian Application No. 202417030556.

* cited by examiner

FIG. 1EB
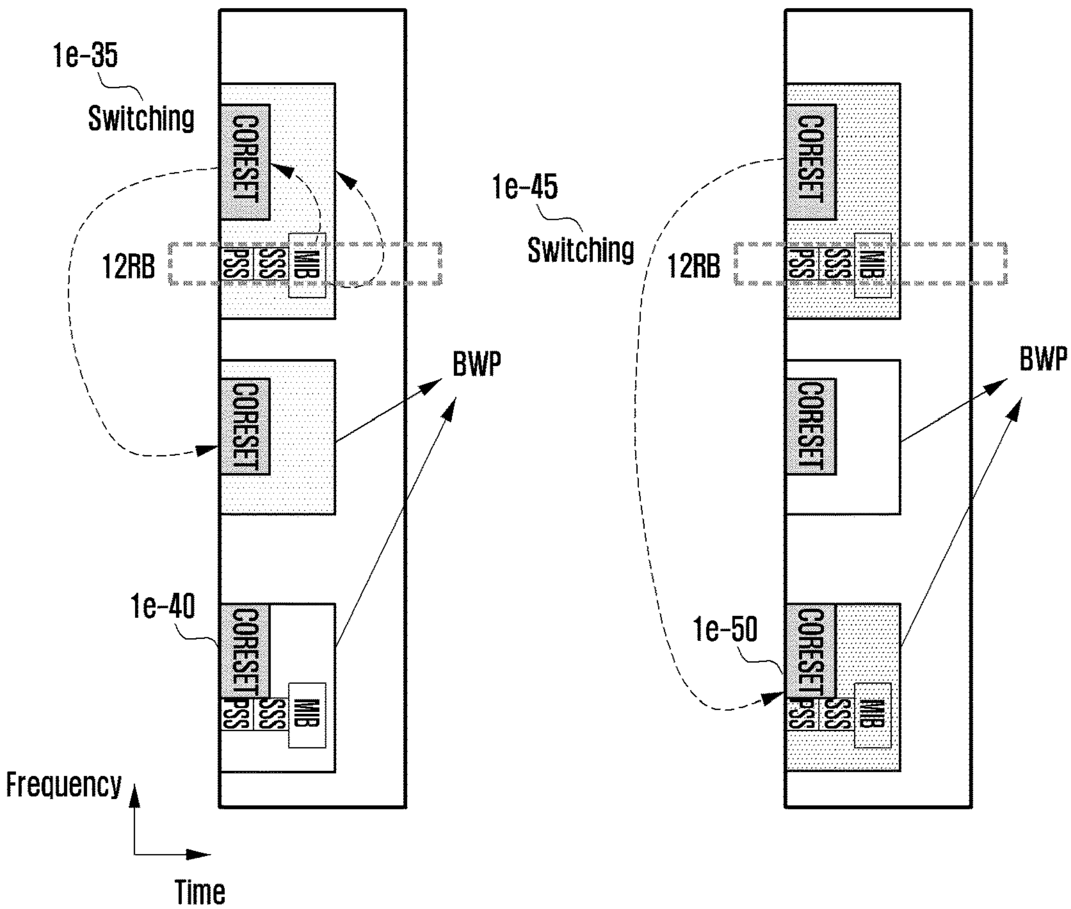
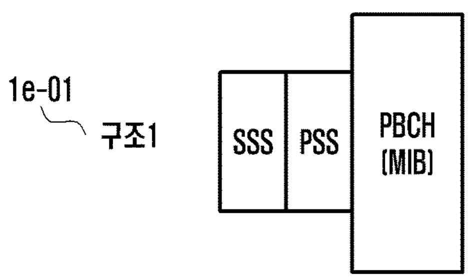
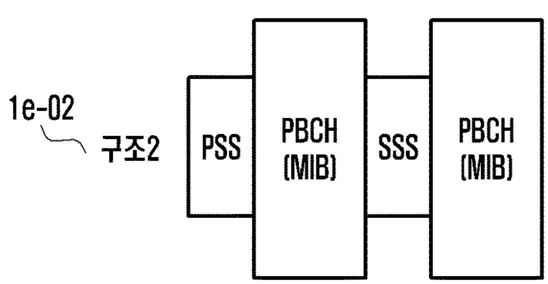

METHOD AND APPARATUS FOR MANAGING PARTIAL BANDWIDTH FOR CELL GROUP ACTIVATION OR INACTIVATION IN NEXT-GENERATION MOBILE COMMUNICATION SYSTEM

TECHNICAL FIELD

The disclosure relates to a method and a device by which a cell is quickly activatable in a next-generation mobile communication system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR), and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

In a next-generation mobile communication system, carrier aggregation (CA) or dual connectivity (DC) may be used to provide terminals with services having a high data transfer rate and a low transmission delay. However, a method for preventing processing delay which may occur when CA or DC is configured and activated for a terminal connected to a network or when CA or DC is deactivated after being used is required. In particular, if a terminal maintains multiple cells in an activated state to use CA or DC, the terminal is required to perform PDCCH monitoring for each cell and thus may experience severe battery consumption. On the contrary, if the terminal maintains the multiple cells in a deactivated state to reduce battery consumption thereof, delays in data transmission or reception may occur due to a delay incurred when activating the multiple cells to use CA or DC.

Accordingly, an aspect of an embodiment of the disclosure is to provide a new dormant mode or suspension mode or a new deactivated mode so as to enable a radio resource control (RRC) connection mode terminal, which is connected to a network, to quickly activate or deactivate CA or DC in a next-generation mobile communication system.

In addition, an aspect of an embodiment of the disclosure is to propose a method enabling operation of a new dormant (hibernation, dormancy, or suspension) mode in a unit of a bandwidth part (in a bandwidth part level), a unit of a cell, or a unit of a cell group (e.g., a secondary cell group), so as to quickly activate CA or DC and conserve a terminal battery.

In addition, an aspect of an embodiment of the disclosure is to, when a base station indicates a terminal to activate a cell (PCell, PSCell, or SCell), enable the base station to configure, allocate, or transmit temporarily many transmission resources on which the terminal is able to perform channel measurement, and enable the terminal to quickly activate the cell, based on the channel measurement or by quickly reporting a result of the channel measurement to the base station.

The technical subjects pursued in the disclosure may not be limited to the above-mentioned technical subjects, and other technical subjects which are not mentioned may be clearly understood, through the following descriptions, by those skilled in the art to which the disclosure pertains.

Solution to Problem

In order to solve the problem described above, a method performed by a terminal of a wireless communication system according to an embodiment of the disclosure may include receiving a message including configuration information of a cell from a base station, in case that the message includes information indicating deactivation of a cell group including the cell, identifying whether information on a bandwidth part (BWP) to be measured is included in the configuration information of the cell, and in case that the information on the BWP to be measured is included in the configuration information of the cell, performing measurement in the BWP.

In addition, the method may further include, in case that the information on the BWP to be measured is not included in the configuration information of the cell, performing measurement in a BWP previously activated before the cell is deactivated.

In addition, the information on the BWP to be measured may include information indicating a first active downlink bandwidth part.

In addition, the measurement may include at least one of radio link monitoring (RLM) or beam failure detection (BFD).

In addition, the method may further include, in case that the message includes information indicating activation of the cell group including the cell and the information on the BWP to be measured is not included in the configuration information of the cell, performing measurement in a BWP previously activated before the cell is deactivated.

In addition, the measurement may be performed based on information indicating a transmission configuration indication (TCI) state, included in the configuration information of the cell.

In addition, the cell may include at least one of a special cell (SpCell) or a primary secondary cell (PSCell).

In addition, in order to solve the problem described above, a terminal in a wireless communication system according to an embodiment of the disclosure may include a transceiver and a controller coupled with the transceiver and configured to receive a message including configuration information of a cell from a base station, in case that the message includes information indicating deactivation of a cell group including the cell, identify whether information on a bandwidth part (BWP) to be measured is included in the configuration information of the cell, and in case that the information on the BWP to be measured is included in the configuration information of the cell, perform measurement in the BWP.

Advantageous Effects of Invention

An embodiment of the disclosure proposes a new dormant mode or suspension mode or a new deactivated mode so as to enable an RRC connection mode terminal, which is connected to a network, to quickly activate or deactivate CA or DC in a next-generation mobile communication system.

An embodiment of the disclosure proposes a method enabling operation of a new dormant (hibernation, dormancy, or suspension) mode in a unit of a bandwidth part (in a bandwidth part level), a unit of a cell, or a unit of a cell group (e.g., a secondary cell group), so as to quickly activate CA or DC and conserve a terminal battery.

In addition, according to an embodiment of the disclosure, when a base station indicates a terminal to activate a cell (PCell, PSCell, or SCell), the base station may configure, allocate, or transmit temporarily many transmission resources on which the terminal is able to perform channel measurement, and the terminal may quickly activate the cell, based on the channel measurement or by quickly reporting a result of the channel measurement to the base station.

Advantageous effects obtainable from the disclosure may not be limited to the above-mentioned effects, and other effects which are not mentioned may be clearly understood, through the following descriptions, by those skilled in the art to which the disclosure pertains.

BRIEF DESCRIPTION OF DRAWINGS

FIG. 1EB is a diagram illustrating a procedure of providing a service to a terminal by efficiently using an extremely wide frequency bandwidth in a next-generation mobile communication system according to an embodiment of the disclosure;

FIG. 1O is a diagram illustrating a structure of a terminal according to an embodiment of the disclosure.

MODE FOR THE INVENTION

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of known functions or configurations incorporated herein will be omitted when it is determined that the description may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the sake of descriptive convenience. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

Furthermore, in the above description or in the disclosure, a cell may indicate a primary cell (PCell) or a secondary cell (SCell) (for example, configured for a master cell group (MCG)), a primary SCG cell or primary secondary cell (PSCell) (for example, a PCell of a secondary cell group (SCG)) or an SCell (for example, an SCell configured for a secondary cell group (SCG)), or a special cell (SpCell).

Figure 1A:
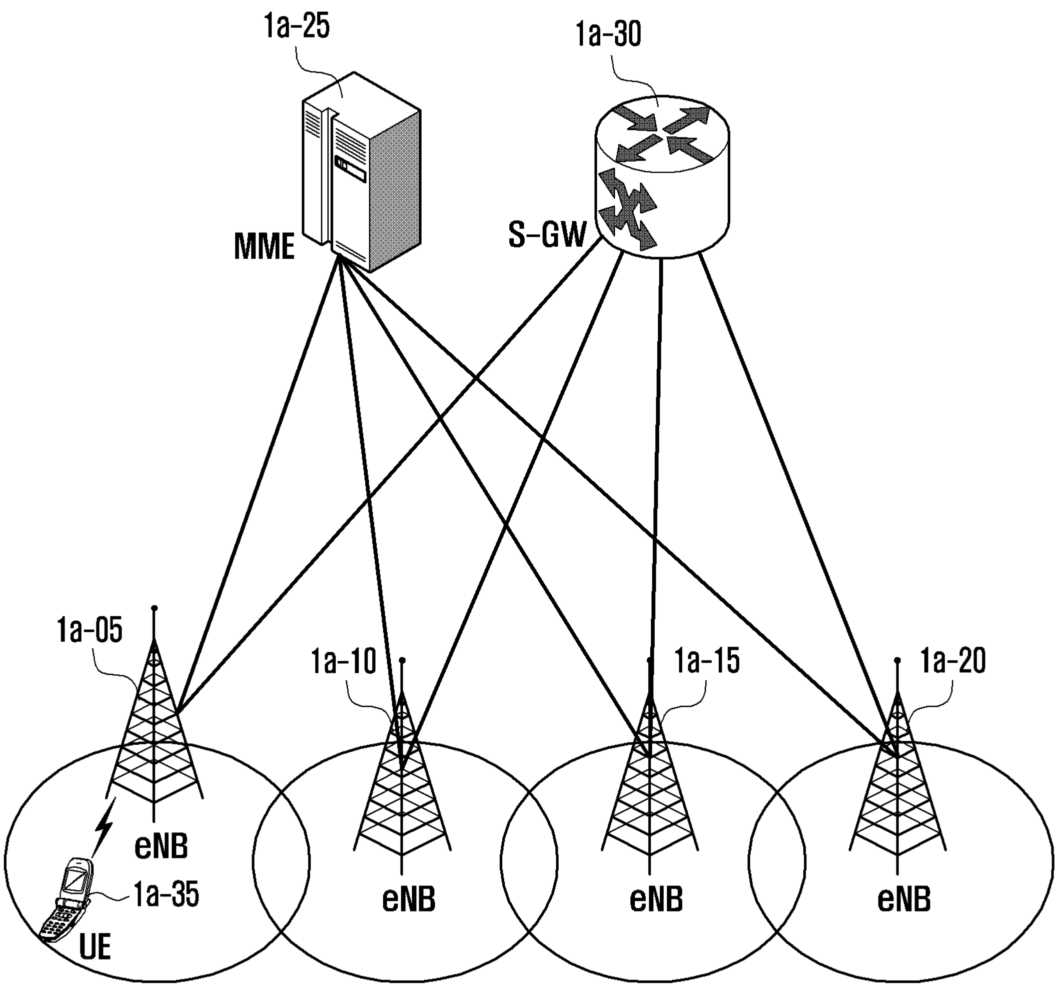
FIG. 1A is a diagram illustrating a structure of an LTE system according to an embodiment of the disclosure.

FIG. 1A is a diagram illustrating a structure of an LTE system according to an embodiment of the disclosure.

Referring to FIG. 1A, as illustrated, a wireless access network of an LTE system may include next generation base stations (evolved node Bs, hereinafter, ENBs, Node Bs, or base stations) 1*a*-05, 1*a*-10, 1*a*-15, and 1*a*-20, a mobility management entity (MME) 1*a*-25, and a serving gateway (S-GW) 1*a*-30. A user equipment (hereinafter, a UE or a terminal) 1*a*-35 accesses an external network via the ENBs 1*a*-05 to 1*a*-20 and the S-GW 1*a*-30.

In FIG. 1A, the ENBs 1*a*-05 to 1*a*-20 may correspond to conventional node Bs of a UMTS system. The ENBs 1*a*-05 to 1*a*-20 may be connected to the UE 1*a*-35 through a wireless channel and may perform more complex roles compared to a conventional node B. In the LTE system, all the user traffic including real-time services, such as a voice over IP (VoIP) through the Internet protocol, is serviced through shared channels. Therefore, the LTE system requires a device that collects state information including a buffer status, an available transmission power state, and a channel state of UEs 1*a*-35 and performs scheduling, and the ENBs 1*a*-05 to 1*a*-20 serve as the device. One ENB generally controls a plurality of cells. For example, the LTE system may use, as a wireless access technology, for example, orthogonal frequency division multiplexing (hereinafter, referred to as OFDM) in a bandwidth of 20 MHz in order to implement a transmission speed of 100 Mbps. Furthermore, the LTE system may employ an adaptive modulation & coding (hereinafter, referred to as AMC) scheme of determining a modulation scheme and a channel coding rate according to a channel state of a terminal. The S-GW 1*a*-30 is a device that provides a data bearer, and generates or removes a data bearer according to a control of the MME 1*a*-25. The MME 1*a*-25 is a device responsible for various control functions as well as a mobility management function for the terminal 1*a*-35, and is connected to the plurality of base stations 1*a*-05 to 1*a*-20.

Figure 1B:
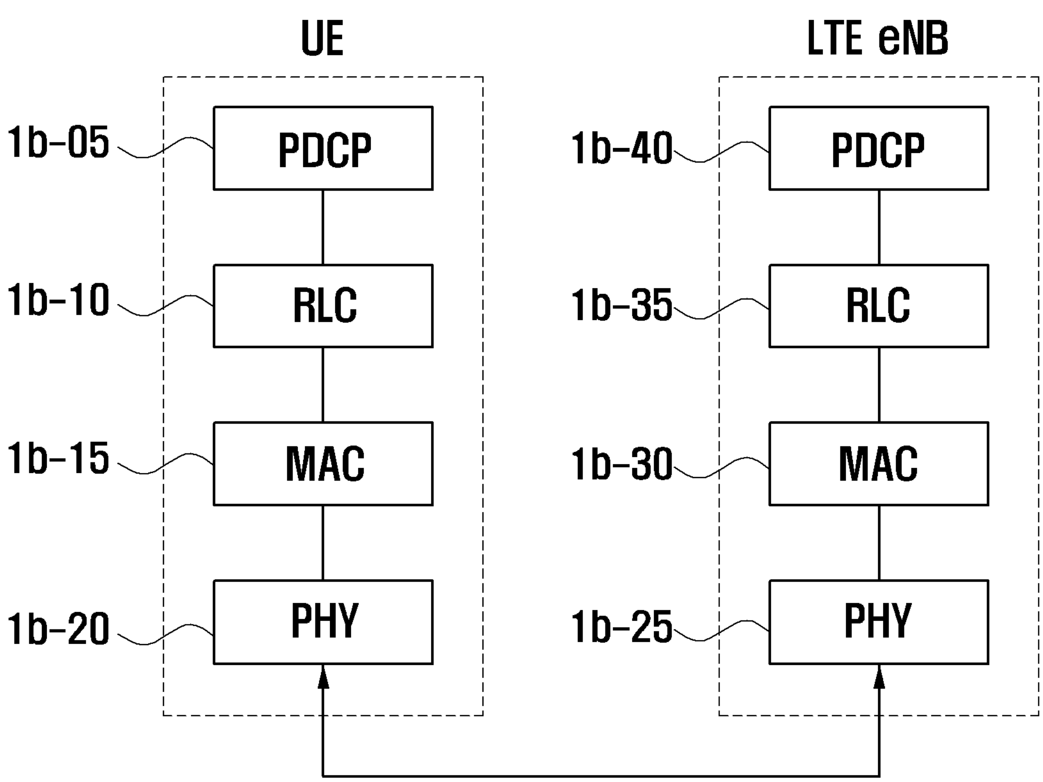
FIG. 1B is a diagram illustrating a wireless protocol structure of an LTE system according to an embodiment of the disclosure.

FIG. 1B is a diagram illustrating a wireless protocol structure of an LTE system according to an embodiment of the disclosure.

Referring to FIG. 1B, a wireless protocol of an LTE system includes a packet data convergence protocol (PDCP) 1*b*-05 or 1*b*-40, a radio link control (RLC) 1*b*-10 or 1*b*-35, and a medium access control (MAC) 1*b*-15 or 1*b*-30 in each of a terminal and an ENB. The packet data convergence protocol (PDCP) 1*b*-05 or 1*b*-40 is responsible for an operation, such as IP header compression/reconstruction. Main functions of the PDCP 1*b*-05 or 1*b*-40 may be summarized as follows.

Header compression and decompression (ROHC only)

Transfer of user data

In-sequence delivery (In-sequence delivery of upper layer PDUs at PDCP re-establishment procedure for RLC AM)

- Reordering (For split bearers in DC (only support for RLC AM): PDCP PDU routing for transmission and PDCP PDU reordering for reception)
- Duplicate detection (Duplicate detection of lower layer SDUs at PDCP re-establishment procedure for RLC AM)
- Retransmission (Retransmission of PDCP SDUs at handover and, for split bearers in DC, of PDCP PDUs at PDCP data-recovery procedure, for RLC AM)
- Ciphering and deciphering
- Timer-based SDU discard (Timer-based SDU discard in uplink)

The radio link control (hereinafter, referred to as RLC) 1*b*-10 or 1*b*-35 reconfigures a PDCP protocol data unit (PDU) or an RLC service data unit (SDU) to have a proper size to perform an ARQ operation. Main functions of the RLC 1*b*-10 or 1*b*-35 may be summarized as follows.

- Data transfer (Transfer of upper layer PDUs)
- ARQ (Error Correction through ARQ (only for AM data transfer))
- Concatenation, segmentation and reassembly (Concatenation, segmentation and reassembly of RLC SDUs (only for UM and AM data transfer))
- Re-segmentation (Re-segmentation of RLC data PDUs (only for AM data transfer))
- Reordering (Reordering of RLC data PDUs (only for UM and AM data transfer))
- Duplicate detection (only for UM and AM data transfer)
- Error detection (Protocol error detection (only for AM data transfer))
- RLC SDU discard (only for UM and AM data transfer)
- RLC re-establishment The MAC 1*b*-15 or 1*b*-30 is connected to several RLC layer devices configured in a single terminal, and multiplexes RLC PDUs to a MAC PDU and demultiplexes a MAC PDU to RLC PDUs. Main functions of the MAC 1*b*-15 or 1*b*-30 are summarized as follows.

- Mapping (Mapping between logical channels and transport channels)
- Multiplexing and demultiplexing (Multiplexing/demultiplexing of MAC SDUs belonging to one or different logical channels into/from transport blocks (TB) delivered to/from the physical layer on transport channels)
- Scheduling information reporting
- HARQ (Error correction through HARQ)
- Priority handling between logical channels (Priority handling between logical channels of one UE)
- Priority handling between UEs (Priority handling between UEs by means of dynamic scheduling)
- MBMS service identification
- Transport format selection
- Padding A physical layer 1*b*-20 or 1*b*-25 performs channel coding and modulation of higher layer data, makes the data into OFDM symbols, and transmits the OFDM symbols through a wireless channel, or performs demodulation and channel decoding of OFDM symbols received through a wireless channel and then transfers the OFDM symbols to a higher layer.

Figure 1C:
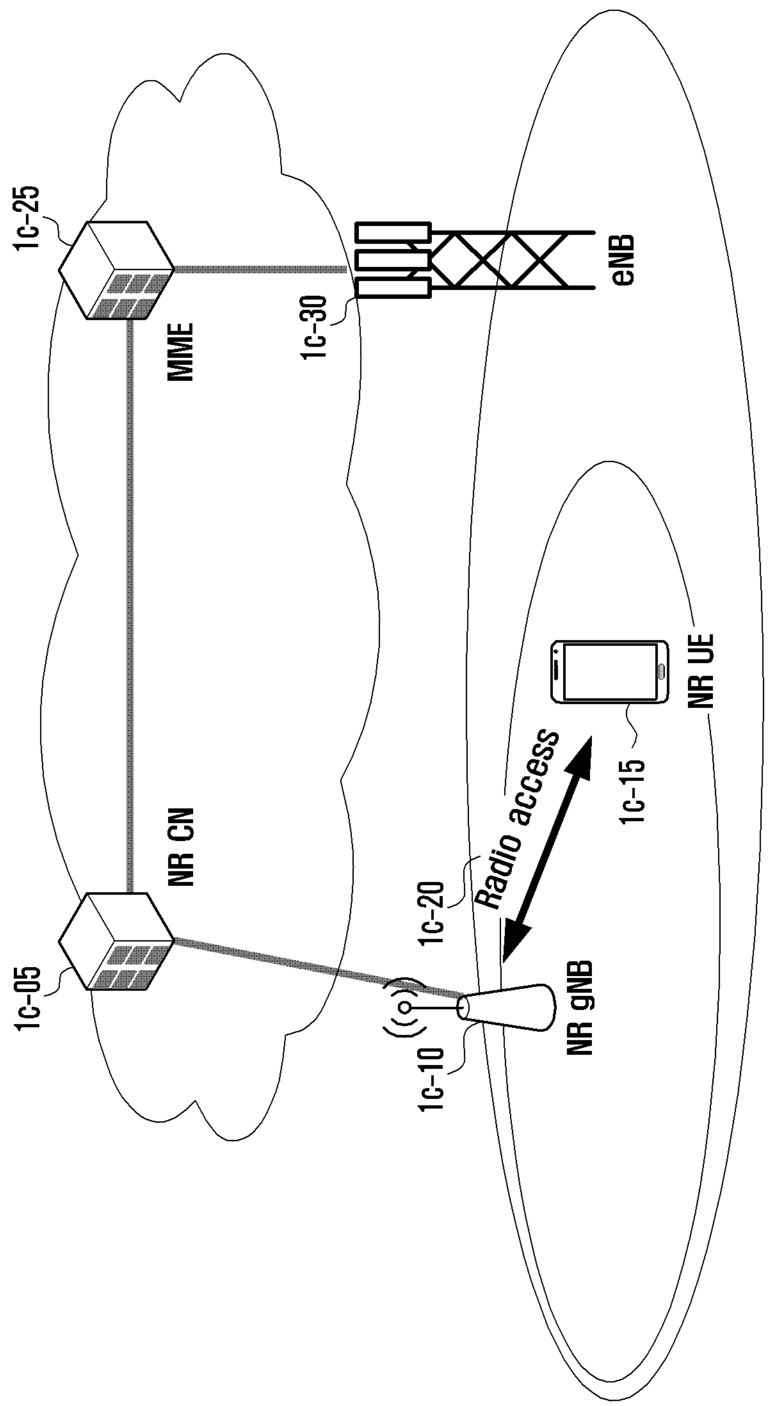
FIG. 1C is a diagram illustrating a structure of a next-generation mobile communication system according to an embodiment of the disclosure.

FIG. 1C is a diagram illustrating a structure of a next-generation mobile communication system according to an embodiment of the disclosure.

Referring to FIG. 1C, as illustrated, a wireless access network of a next-generation mobile communication system (hereinafter, NR or 5G) includes a next-generation base station (a new radio node B, hereinafter, an NR gNB or an NR base station) 1*c*-10, and a new radio core network (NR CN) 1*c*-05. A user terminal (new radio user equipment, hereinafter, NR UE or terminal) 1*c*-15 accesses an external network via the NR gNB 1*c*-10 and the NR CN 1*c*-05.

In FIG. 1C, the NR gNB 1*c*-10 corresponds to an evolved node B (eNB) of a conventional LTE system. The NR gNB 1*c*-10 is connected to the NR UE 1*c*-15 through a wireless channel and may provide an outstanding service compared to a conventional node B. In the next-generation mobile communication system, all user traffic is serviced thorough shared channels. Therefore, the system requires a device which performs scheduling by collecting pieces of state information including a buffer status, an available transmission power state, and a channel state of UEs 1*c*-15, and the NR NB 1*c*-10 may serve as the device. A single NR gNB 1*c*-10 generally controls multiple cells. In order to implement data transmission with a ultra-high speed compared to the current LTE, the next-generation mobile communication system may provide a bandwidth wider than the existing maximum bandwidth, may employ an orthogonal frequency division multiplexing (hereinafter, referred to as OFDM) as a wireless access technology, and may additionally integrate a beamforming technology therewith. Furthermore, the next-generation mobile communication system adopts an adaptive modulation & coding (hereinafter, referred to as AMC) scheme of determining a modulation scheme and a channel coding rate according to a channel state of the terminal 1*c*-15. The NR CN 1*c*-05 performs functions such as mobility support, bearer configuration, and QoS configuration. The NR CN 1*c*-05 is a device responsible for various control functions as well as a mobility management function for the terminal 1*c*-15, and is connected to a plurality of base stations 1*c*-10. In addition, the next-generation mobile communication system may be linked to an existing LTE system, and the NR CN 1*c*-05 is connected to an MME 1*c*-25 via a network interface. The MME 1*c*-25 is connected to an eNB 1*c*-30 that is an existing base station.

Figure 1D:
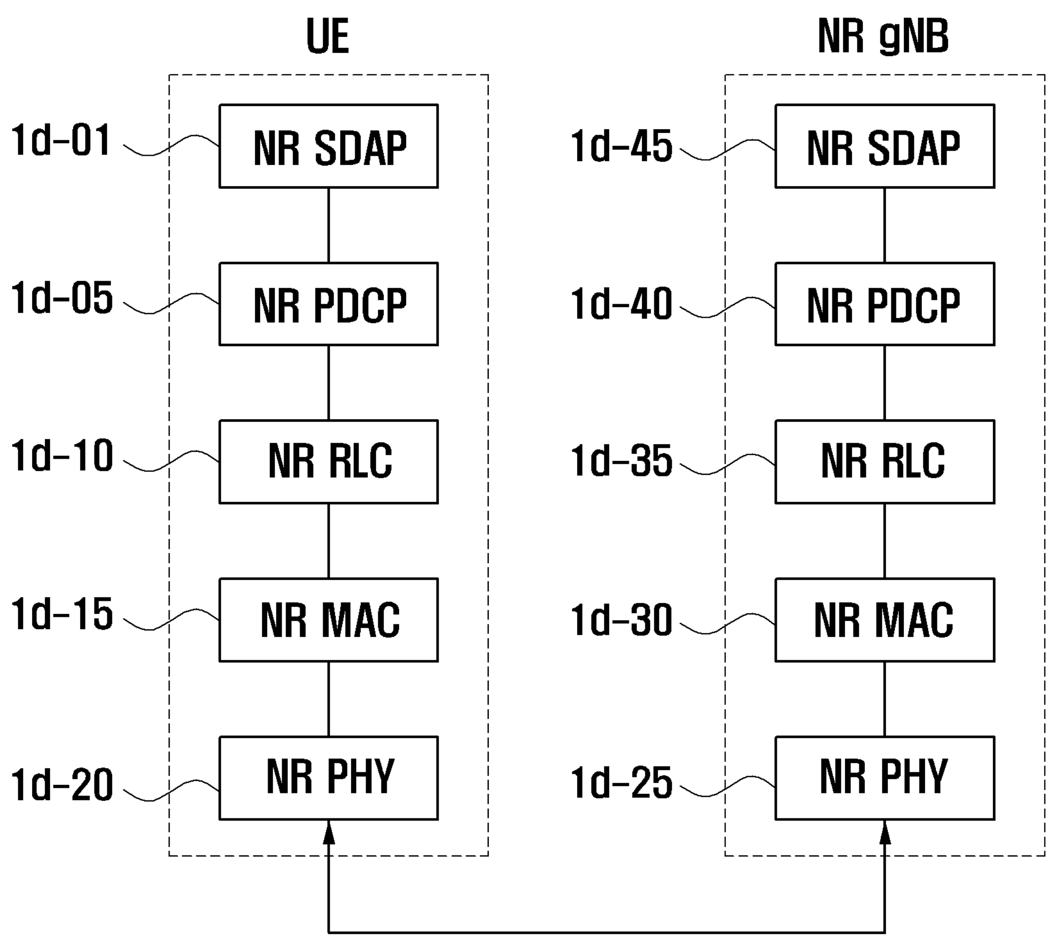
FIG. 1D is a diagram illustrating a wireless protocol structure of a next-generation mobile communication system according to an embodiment of the disclosure.

FIG. 1D is a diagram illustrating a wireless protocol structure of a next-generation mobile communication system according to an embodiment of the disclosure.

Referring to FIG. 1D, a wireless protocol of a next-generation mobile communication system includes an NR SDAP 1*d*-01 or 1*d*-45, an NR PDCP 1*d*-05 or 1*d*-40, an NR RLC 1*d*-10 or 1*d*-35, and an NR MAC 1*d*-15 or 1*d*-30 in each of a terminal and an NR base station.

Main functions of the NR SDAP 1*d*-01 or 1*d*-45 may include a part of functions below.

- Transfer of user data (transfer of user plane data)
- Mapping between a QoS flow and a data bearer for uplink and downlink (mapping between a QoS flow and a DRB for both DL and UL)
- Marking a QoS flow ID in uplink and downlink (marking QoS flow ID in both DL and UL packets)
- Mapping a reflective QoS flow to a data bearer with respect to UL SDAP PDUs (reflective QoS flow to DRB mapping for the UL SDAP PDUs)

Whether to use a header of the SDAP layer device, or whether to use a function of the SDAP layer device may be configured for the terminal with respect to the SDAP layer device through an RRC message for each PDCP layer device, each bearer, or each logical channel. Furthermore, in a case where an SDAP header is configured, an NAS QoS reflective configuration one-bit indicator (NAS reflective QoS) and an As QoS reflective configuration one-bit indicator (As reflective QoS) of the SDAP header may indicate the terminal to update or reconfigure mapping information relating to a QoS flow and a data bearer for uplink and downlink. The SDAP header may include QoS flow ID information indicating a QoS. The QoS information may be used as data processing priority, scheduling information, etc. For smoothly supporting a service.

Main functions of the NR PDCPs **1*d*-05 and 1*d*-40** may include a part of functions below.

Header compression and decompression (ROHC only)
Transfer of user data
In-order delivery (In-order delivery of upper layer PDUs)
Out-of-order delivery (Out-of-order delivery of upper layer PDUs)
Reordering (PDCP PDU reordering for reception)
Duplicate detection (Duplicate detection of lower layer SDUs)
Retransmission (Retransmission of PDCP SDUs)
Ciphering and deciphering
Integrity protection and/or verification
Timer-based SDU discard (Timer-based SDU discard in uplink)

The reordering of the NR PDCP device denotes a function of reordering PDCP PDU received from a lower layer in an order based on PDCP sequence numbers (SNs), and may include a function of transferring data to a higher layer according to a rearranged order, may include a function of directly transferring data without considering order, may include a function of rearranging order to record lost PDCP PDUs, may include a function of reporting the state of lost PDCP PDUs to a transmission side, or may include a function of requesting retransmission of lost PDCP PDUs.

Main functions of the NR RLC **1*d*-10 or 1*d*-35** may include a part of functions below.

Data transfer (Transfer of upper layer PDUs)
In-order delivery (In-order delivery of upper layer PDUs)
Out-of-order delivery (Out-of-order delivery of upper layer PDUs)
ARQ (Error correction through ARQ)
Concatenation, segmentation and reassembly (Concatenation, segmentation and reassembly of RLC SDUs)
Re-segmentation (Re-segmentation of RLC data PDUs)
Reordering (Reordering of RLC data PDUs)
Duplicate detection
Error detection (Protocol error detection)
RLC SDU discard
RLC re-establishment The in-order delivery of the NR RLC device may indicate a function of transferring RLC SDUs received from a lower layer to a higher layer in sequence. Furthermore, the in-order delivery may include a function of, if one original RLC SDU is divided into several RLC SDUs and then the RLC SDUs are received, reassembling the several RLC SDUs and transferring the reassembled RLC SDUs, may include a function of rearranging received RLC PDUs with reference to RLC sequence numbers (SNs) or PDCP sequence numbers (SNs), may include a function of rearranging order to record lost RLC PDUs, may include a function of reporting the state of lost RLC PDUs to a transmission side, may include a function of requesting retransmission of lost RLC PDUs, may include a function of, if there is a lost RLC SDU, sequentially transferring only RLC SDUs before the lost RLC SDU to a higher layer, may include a function of, although there is a lost RLC SDU, if a predetermined timer has expired, sequentially transferring, to a higher layer, all the RLC SDUs received before the timer is started, or may include a function of, although there is a lost RLC SDU, if a predetermined timer has expired, sequentially transferring all the RLC SDUs received up to the current, to a higher layer. In addition, the NR RLC device may process RLC PDUs in a reception order (an order in which the RLC PDUs have arrived, regardless of an order based on sequence numbers) and then transfer the processed RLC PDUs to a PDCP device regardless of order (out-of-order delivery). In a case of segments, the NR RLC device may receive segments stored in a buffer or to be received in the future, reconfigure the segments to be one whole RLC PDU, then process the RLC PDU, and transfer the processed RLC PDU to a PDCP device. The NR RLC layer may not include a concatenation function, and the concatenation function may be performed in an NR MAC layer or replaced with a multiplexing function of an NR MAC layer. Whether to perform in-order delivery or out-of-order delivery may be configured by an RRC message.

The out-of-sequence delivery function of the NR RLC device may indicate a function of immediately transferring RLC SDUs received from a lower layer, to an upper layer regardless of the order thereof. Furthermore, the out-of-sequence delivery function may include a function of, if one original RLC SDU is divided into several RLC SDUs and then the RLC SDUs are received, reassembling the several RLC SDUs and transferring the reassembled RLC SDUs, and may include a function of storing an RLC sequence number (SN) or a PDCP sequence number (SN) of received RLC PDUs and arranging order to record lost RLC PDUs.

The NR MAC **1*d*-15 or 1*d*-30** may be connected to several NR RLC layer devices configured in a single terminal, and main functions of the NR MACs may include a part of functions below.

Mapping (Mapping between logical channels and transport channels)
Multiplexing and demultiplexing (Multiplexing/demultiplexing of MAC SDUs)
Scheduling information reporting
HARQ (Error correction through HARQ)
Priority handling between logical channels (Priority handling between logical channels of one UE)
Priority handling between UEs (Priority handling between UEs by means of dynamic scheduling)
MBMS service identification
Transport format selection
Padding An NR physical layer **1*d*-20 or 1*d*-25** may perform channel coding and modulation of higher layer data to make the data into OFDM symbols and transmit the OFDM symbols through a wireless channel, or may perform demodulation and channel decoding of OFDM symbols received through a wireless channel, and then transfer the OFDM symbols to a higher layer.

In a next-generation mobile communication system, frequency in an extremely high band is available, and thus frequency bandwidths may also be very large. However, supporting the entirety of an extremely high band requires a high implementation complexity in terms of terminal implementation and incurs significant costs. Therefore, a next-generation mobile communication system may introduce the concept of bandwidth part (BWP), and multiple bandwidth parts (BWPs) may be configured for one cell (special cell (SpCell) or secondary cell (SCell)) and data may be transmitted or received in one or multiple bandwidth parts according to an indication of a base station.

The disclosure proposes a state transition method or a bandwidth part switching method and a specific operation considering the state of an SCell and multiple bandwidth parts configured for the SCell when a dormant bandwidth part is introduced as proposed in the disclosure. In addition, the disclosure proposes a method of managing a dormant mode in a unit of a bandwidth part (in a BWP level) and performing state transition, or a bandwidth part switching method, and proposes a specific operation of a bandwidth part according to the state of each SCell or the state or mode (active, deactivated, or dormant) of each bandwidth part. In addition, in the disclosure, in order to quickly activate a cell (SCell) or a bandwidth part, first channel measurement configuration information may be configured for the cell or bandwidth part by a radio resource control (RRC) message or a medium access control (MAC) control element (CE), and the RRC message or the MAC CE may be used to indicate a terminal to apply and use (activate) the first channel measurement configuration information, so that the terminal quickly measures a channel signal (e.g., reference signal) for the cell or bandwidth part and quickly reports a result of the measurement to a base station, and thus the cell or bandwidth part may be quickly activated. The activating of a cell or bandwidth part means procedures in which, in the cell or bandwidth part, a terminal monitors a physical downlink control channel (PDCCH), a base station transmits a PDCCH to the terminal, the base station transmits downlink data (a physical downlink shared channel, PDSCH) to the terminal, the terminal transmits uplink data (physical uplink shared channel, PUSCH), the terminal transmits a measurement result or a hybrid automatic repeat request (HARQ) acknowledgment (ACK) or negative acknowledgment (NACK) on a physical uplink control channel (PUCCH), the terminal transmits a sounding reference signal (SRS), the terminal measures a signal (synchronization signal block (SSB), channel state information reference signal (CSI-RS), or reference signal (RS)) for channel measurement transmitted by the base station, or the terminal measures a signal for channel measurement transmitted by the base station and reports a result. The first channel measurement configuration information may include configuration information on a signal for channel measurement for a particular terminal (or terminals), the signal being transmitted by a base station in the cell or bandwidth part. For example, the first channel measurement configuration information may include a period of the signal for channel measurement, a count of the transmitted signal, a duration for which the signal is transmitted, an offset for a time at which the signal is transmitted, a time interval between transmitted signals, a list of multiple transmittable signals for channel measurement, a time transmission resource (or frequency transmission resource) indicating the location of the transmitted signal, a transmission resource (time transmission resource or frequency transmission resource) on which a measurement result is to be reported, or a period according to which a measurement result is to be reported. In addition, the first channel measurement configuration information configured by an RRC message may include multiple pieces of channel measurement signal information, and an RRC message, a MAC CE, or downlink control information (DCI) may be used to indicate beam configuration information or one piece of channel measurement signal information among the configured multiple pieces of channel measurement signal information, to cause a terminal to apply or use the indicated piece of channel measurement signal information or the indicated beam configuration information to perform channel measurement or perform channel measurement reporting. As another method, the RRC message or the MAC CE may be used to configure or indicate channel measurement signal information to cause a terminal to apply or use the configured (or indicated) channel measurement signal information to perform channel measurement or perform channel measurement reporting. In addition, the first channel measurement configuration information may be differently configured for each cell or bandwidth part with respect to multiple cells or bandwidth parts configured by the RRC message, and may configure, together, beam-related configuration information (transmission configuration indication (TCI) state or quasi co-location (QCL)), such as beam direction, beam number, or beam location, to support the terminal to easily measure a transmission resource for channel measurement. In addition, a timing advance (TA) value (or offset value), a timer (time alignment timer (TAT)) indicating the validity of the TA value, or a timer value (TAT value) for synchronization of a downlink signal of a base station or an uplink signal of the base station may be configured in the first channel measurement configuration information to enable a terminal to correctly perform channel measurement or channel measurement reporting.

Configuration of first channel measurement configuration information proposed in the disclosure is possible only for downlink bandwidth part configuration information of each cell. That is, first channel measurement configuration information proposed in the disclosure may not be allowed to be configured for uplink bandwidth part configuration information of each cell. This is because that only when a terminal measures a channel for downlink first, the terminal is able to report a measurement result for the channel or a cell, then correctly receive a PDCCH, and follow an indication of a base station.

First channel measurement configuration information proposed in the disclosure is initially deactivated when being configured by an RRC message or after being handed over and, later, may be activated by MAC control information, DCI information of a PDCCH, or an RRC message proposed in the disclosure. As described above, in a case of configuration by an RRC message, an initial state is required to be a deactivated state to enable a base station to easily manage a cell state of a terminal or a procedure of performing channel measurement, and to enable the terminal to perform channel measurement at a precise timing relating to when or where to perform the channel measurement, without a problem of a processing delay of an RRC message.

In addition, in the disclosure, multiple bandwidth parts may be configured for one cell (SpCell, PCell, PSCell, or SCell) with respect to downlink or uplink, and an active bandwidth part (active DL or UL BWP), a dormant bandwidth part (dormant BWP or dormant DL BWP), or a deactivated bandwidth part (inactive or deactivated DL/UP BWP) may be configured and operated through bandwidth part switching. That is, a downlink or uplink bandwidth part may be transitioned to an activated state for the one cell so as to increase a data transfer rate in a method similar to CA, a downlink bandwidth part may also be transitioned or switched to a dormant bandwidth part so as to enable a terminal not to perform PDCCH monitoring for the cell to conserve the battery thereof, and a terminal may be allowed to perform channel measurement and report a channel measurement result for a downlink bandwidth part to support quick activation of the cell or bandwidth part later. In addition, a downlink (or uplink) bandwidth part may be transitioned to a deactivated state in the one cell, so as to reduce battery consumption of a terminal. A bandwidth part-specific state transition indication or a bandwidth part switching indication for each cell described above may be configured or indicated by an RRC message, a MAC CE, or DCI of a PDCCH.

The dormant bandwidth part may expand to and be applied to DC, for example, may be applied to a PSCell in a secondary cell group. As another method, cell group suspension or deactivation may be indicated to one cell group (e.g., secondary cell group) of a terminal, for which DC expanded to the concept of cell group suspension or cell group deactivation is configured, so that, in the indicated cell group, the terminal suspends data transmission or reception, suspends PDCCH monitoring, or intermittently performs PDCCH monitoring, based on a very long period and thus may consume reduced power. In addition, if the cell group suspension or deactivation is indicated, the terminal may perform a channel measurement procedure in a cell group for which the cell group suspension or deactivation is indicated, and report a channel measurement result to a network (e.g., a master cell group or secondary cell group) so as to support quick activation of DC. The terminal may perform the procedure for the cell group for which the cell group suspension or deactivation is indicated, may maintain and store cell group configuration information without discarding or releasing same, or may recover the cell group configuration information according to a cell group activation or resumption indication by a network. For example, the terminal may store or maintain, without change, configuration information (e.g., configuration information of each PDCP, RLC, or MAC layer device) of the cell group, bearer configuration information, or pieces of cell-specific configuration information, which are configured for the terminal. However, if a cell group is suspended or deactivated, the terminal may suspend bearers or RLC bearers of the bearers, or suspend transmission (or data transmission, e.g., SCG transmission) in the cell group. If a cell group resumption or activation indication is received for the cell group for which cell group suspension or deactivation is indicated, the terminal may resume, recover, or re-apply configuration information of the cell group and may resume transmission (e.g., SCG transmission) for a bearer, an RLC bearer, or the cell group, restart data transmission or reception, restart PDCCH monitoring, or perform channel measurement reporting, or may re-activate a periodically configured transmission resource.

If the cell group is suspended or deactivated, suspending a bearer (a bearer using RLC unacknowledged mode (UM) or a bearer using RLC acknowledged mode (AM)) may mean suspending a PDCP layer device or an RLC layer device (or suspending data transmission or reception or data processing), and a MAC layer device not transmitting (or receiving) data for the bearer (or data corresponding to a logical channel identifier corresponding to the bearer) (or not selecting the logical channel identifier as a subject in a logical channel prioritization (LCP) procedure). Embodiments specifically proposed below in the disclosure may be applied to a procedure of suspending the PDCP layer device.

If the cell group is suspended or deactivated, suspending an RLC bearer (an RLC bearer using RLC UM or an RLC bearer using RLC AM) may mean suspending an RLC layer device (or suspending data transmission or reception or data processing), and a MAC layer device not transmitting (or receiving) data for the bearer (or data corresponding to a logical channel identifier corresponding to the bearer) (or not selecting the logical channel identifier as a subject in an LCP procedure). The suspending of the RLC bearer may mean that a PDCP layer device connected to the RLC layer device is continuously able to perform data processing. For example, a PDCP layer device connected to the suspended RLC bearer may process and transmit or receive and process data through a different RLC bearer (e.g., an RLC bearer belonging to a cell group (e.g., MCG) different from the cell group (e.g., SCG)).

If the cell group is suspended or deactivated, suspending transmission (e.g., SCG transmission) for the cell group may mean a MAC layer device not transmitting (or receiving) data for a bearer (a bearer using RLC UM or a bearer using RLC AM) belonging to the cell group (or data corresponding to a logical channel identifier corresponding to the bearer) (or not selecting the logical channel identifier as a subject in an LCP procedure). However, the suspending of transmission (e.g., SCG transmission) for the cell group may mean that a PDCP layer device or an RLC layer device is able to perform data processing or data pre-processing. For example, the cell group does not transmit data (or uplink data) of a higher layer device, but a PDCP layer device, an RLC layer device, or a MAC layer device may be allowed to perform data processing in advance for transmission.

If the cell group is resumed or activated, resuming a bearer (a bearer using RLC UM or a bearer using RLC AM) may mean resuming a PDCP layer device or an RLC layer device (or resuming data transmission or reception or data processing), and a MAC layer device transmitting (or receiving) data for the bearer (or data corresponding to a logical channel identifier corresponding to the bearer) (or selecting the logical channel identifier as a subject in an LCP procedure).

If the cell group is resumed or activated, resuming an RLC bearer (an RLC bearer using RLC UM or an RLC bearer using RLC AM) may mean resuming an RLC layer device (or resuming data transmission or reception or data processing), and a MAC layer device transmitting (or receiving) data for the bearer (or data corresponding to a logical channel identifier corresponding to the bearer) (or selecting the logical channel identifier as a subject in an LCP procedure). The resuming of the RLC bearer may mean transferring data to a PDCP layer device connected to the RLC layer device or receiving data from the PDCP layer device.

If the cell group is resumed or activated, resuming transmission (e.g., SCG transmission) for the cell group may mean a MAC layer device transmitting (or receiving) data for a bearer (a bearer using RLC UM or a bearer using RLC AM) belonging to the cell group (or data corresponding to a logical channel identifier corresponding to the bearer) (or selecting the logical channel identifier as a subject in an LCP procedure). However, the resuming of transmission (e.g., SCG transmission) for the cell group may mean that a PDCP layer device or an RLC layer device is able to perform data processing or data pre-processing. For example, the cell group may transmit data (or uplink data) of a higher layer device, and a PDCP layer device, an RLC layer device, or a MAC layer device may be allowed to perform data processing in advance for transmission.

As another method, if the cell group is suspended or deactivated, a bearer (or RLC bearer) using RLC UM may be suspended to suspend a PDCP layer device or an RLC layer device to suspend data transmission or reception or suspend data processing, or to allow a MAC layer device to suspend data transmission or reception. However, transmission for the cell group may be suspended with respect to a bearer (or RLC bearer) using RLC AM to allow a PDCP layer device or an RLC layer device to be continuously able to perform data processing, or to allow a MAC layer device to suspend data transmission or reception. This is because, in a case where a security key is changed, since a PDCP re-establishment procedure includes a retransmission (or regeneration) procedure for RLC AM bearers (Therefore, if the security key is not changed, data processing may take a reduced time. Furthermore, if the security key is changed, data loss is not incurred due to the retransmission (or regeneration) procedure) but does not include a retransmission (or regeneration) procedure for RLC UM bearers, if a data processing procedure is performed in advance for an RLC UM bearer, data loss may occur in the terminal (if the security key is not changed, data processing may take a reduced time. However, if the security key is changed, there is no retransmission (or regeneration) procedure and all pieces of data are discarded in a re-establishment procedure for a PDCP layer device and an RLC layer device, and thus data loss occurs.) Therefore, different procedures may be applied to a bearer (or RLC bearer) using RLC AM mode and a bearer (or RLC bearer) using RLC UM mode. Embodiments specifically proposed below in the disclosure may be applied to a procedure of suspending the PDCP layer device.

The cell group configuration information or cell (SpCell (PCell or PSCell) or SCell) configuration information, previously configured cell group configuration information or cell (SpCell (PCell or PSCell) or SCell) configuration information, or a message (e.g., an RRC message, RRCReconfiguration, MAC control information, or DCI of a PDCCH) indicating activation or resumption of a cell group or cell (SpCell (PCell or PSCell) or SCell) may configure and include first channel measurement configuration information for fast activation of a cell group or cell (SpCell (PCell or PSCell) or SCell). The first channel measurement configuration information may include configuration information, such as a period of a frequent channel measurement signal (e.g., a radio resource, a temporary reference signal (TRS), a synchronization signal block (SSB), a channel state information reference signal (CSI-RS), or a reference signal (RS)), transmission resource information (a frequency or time transmission resource on which the frequent channel measurement signal is transmitted) on a transmission resource on which the signal is transmitted, an interval, a count (the count of the frequent channel measurement signal being transmitted), a timer value (a time at which the frequent channel measurement signal is transmitted), a time interval (an interval for which the frequent channel measurement signal is transmitted (e.g., an offset in a time unit (slot, subframe, or symbol)), or a transmission resource, a period, an interval, a timing, or an offset required when a terminal reports a measurement result, so as to enable a base station to temporarily transmit a large or frequent number of the channel measurement signals so that fast channel measurement is possible in a cell in configuration information of the cell (PCell, PSCell, or SCell) in the cell group to quickly activate the cell group. The first channel measurement configuration information may configure a short reporting period (or transmission resource) according to which the terminal may report a channel measurement result, or may configure a transmission resource for channel measurement so as to enable the base station to transmit a large or frequent number of many channel measurement signals (or a transmission resource (e.g., a radios resource or a temporary reference signal (TRS))) to support fast channel measurements or many signal measurements by the terminal. The first channel measurement configuration information may include configuration information on a signal for channel measurement for a particular terminal (or terminals), the signal being transmitted by a base station in the cell or bandwidth part. For example, the first channel measurement configuration information may include a period of the signal for channel measurement, a count of the transmitted signal, a duration for which the signal is transmitted, an offset for a time at which the signal is transmitted, a time interval between transmitted signals, a list of multiple transmittable signals for channel measurement, a time transmission resource (or frequency transmission resource) indicating the location of the transmitted signal, a transmission resource (time transmission resource or frequency transmission resource) on which a measurement result is to be reported, or a period according to which a measurement result is to be reported. In addition, the first channel measurement configuration information may be differently configured for each cell or bandwidth part with respect to multiple cells or bandwidth parts configured by the RRC message, and may configure, together, beam-related configuration information (transmission configuration indication (TCI) state or quasi co-location (QCL)), such as beam direction, beam number, or beam location, to support the terminal to easily measure a transmission resource for channel measurement. In addition, a timing advance (TA) value (or offset value), a timer (time alignment timer (TAT)) indicating the validity of the TA value, or a timer value (TAT value) for synchronization of a downlink signal of a base station or an uplink signal of the base station may be configured in the first channel measurement configuration information so that channel measurement or channel measurement reporting is performed correctly. In addition, the first channel measurement configuration information configured by an RRC message may include multiple pieces of channel measurement signal information, and an RRC message, a MAC CE, or DCI may be used to indicate beam configuration information or one piece of channel measurement signal information among the configured multiple pieces of channel measurement signal information, to cause a terminal to apply or use the indicated piece of channel measurement signal information or the indicated beam configuration information to perform channel measurement or perform channel measurement reporting. In the indicating method, mapping between each piece of channel measurement signal information configured above and a bitmap, an index, or an identifier may be defined and an indication may be performed based thereon. As another method, the RRC message or the MAC CE may be used to configure or indicate channel measurement signal information to cause a terminal to apply or use the configured (or indicated) channel measurement signal information to perform channel measurement or perform channel measurement reporting.

First channel measurement configuration information proposed in the disclosure is initially deactivated when being configured by an RRC message or after being handed over and, later, may be activated by MAC control information, DCI information of a PDCCH, or an RRC message proposed in the disclosure. As described above, in a case of configuration by an RRC message, an initial state is required to be a deactivated state to enable a base station to easily manage a cell state of a terminal or a procedure of performing channel measurement, and to enable the terminal to perform channel measurement at a precise timing relating to when or where to perform the channel measurement, without a problem of a processing delay of an RRC message.

Configuration of first channel measurement configuration information proposed in the disclosure is possible only for downlink bandwidth part configuration information of each cell. That is, first channel measurement configuration information proposed in the disclosure may not be allowed to be configured for uplink bandwidth part configuration information of each cell. This is because that only when a terminal measures a channel for downlink first, the terminal is able to report a measurement result for the channel or a cell, then correctly receive a PDCCH, and follow an indication of a base station.

In addition, the message (e.g., an RRC message, RRCReconfiguration, MAC control information, or DCI of a PDCCH) indicating activation or resumption of the cell group or cell (e.g., SpCell (PCell or PSCell) or SCell) may include second channel measurement configuration information for measuring a signal of a cell (PSCell, PCell, or SCell) of the cell group. The second channel measurement configuration information may include general channel measurement configuration information, such as a transmission resource, a period, a time interval, or a count of a channel measurement signal, or a transmission resource, a period, or a time interval for channel measurement reporting.

In the disclosure, channel measurement may be performed and a measurement result may be reported to a base station by applying first channel measurement configuration information or second channel measurement configuration information of a terminal according to the following conditions.

1> If the terminal receives a message (e.g., an indicator of a PDCCH, MAC control information, or an RRC message) indicating to activate (or resume) a cell (PCell, PSCell, or SCell) or a cell group, 2> If first channel measurement configuration information is configured for the terminal, 3> The terminal may identify that the base station is to frequently transmit many channel measurement signals, according to the first channel measurement configuration information of the terminal, and may measure, according to the first channel measurement configuration information, many or frequent channel measurement signals until a first condition is satisfied, or temporarily (e.g., up to a time interval (e.g., a subframe, a slot, or a symbol) configured in the first channel measurement configuration information, for a promised (or predetermined) time interval by considering an offset, or for a time (e.g., while a timer is operated)). In addition, the terminal may report a channel measurement result obtained by measurement, up to a time interval (e.g., a subframe, a slot, or a symbol) configured in the first channel measurement configuration information, for a promised (or predetermined) time interval by considering an offset, for a time (e.g., while a timer is operated), or until the first condition is satisfied, according to a period or a transmission resource configured in the first channel measurement configuration information. Therefore, the terminal may quickly measure and quickly report frequent channel measurement signals so as to quickly activate (or resume) a cell (PCell, SCell, or PSCell) or a cell group or quickly receive scheduling information. If second channel measurement configuration information is configured for the terminal after the time interval (e.g., a subframe, a slot, or a symbol) configured in the first channel measurement configuration information, after the promised (or predetermined) time interval, after the time (e.g., when a timer has expired), or after the first condition is satisfied, the terminal may stop applying or release the first channel measurement configuration information and measure a channel measurement signal according to the second channel measurement configuration information. For example, the terminal may fall back from the first channel measurement configuration information to the second channel measurement information, or may apply the second channel information instead of the first channel measurement configuration information. In addition, the terminal may report a channel measurement result obtained by measurement according to a period or a transmission resource configured in the second channel measurement configuration information. If the second channel measurement configuration information is not configured, the terminal may not perform channel measurement.

2> Otherwise (if the first channel measurement configuration information is not configured for the terminal), 3> If the second channel measurement configuration information is configured for the terminal, the terminal may measure a channel measurement signal according to the second channel measurement configuration information. In addition, the terminal may report a channel measurement result obtained by measurement according to a period or a transmission resource configured in the second channel measurement configuration information. If the second channel measurement configuration information is not configured, the terminal may not perform channel measurement.

The first condition of the disclosure may be one of the following conditions. Hereinafter, the disclosure proposes effective conditions for preventing the base station from transmitting unnecessarily large transmission resources or frequent transmission resources when a cell is activated according to the first condition, when a cell group is activated or resumed, or when an RRC inactive mode terminal resumes a connection in an RRC reconnection procedure. For example, the terminal may apply the first channel measurement configuration information and perform a channel measurement procedure or a channel measurement reporting procedure until one condition among the following conditions is satisfied.

The terminal may determine that the first condition is satisfied, when the terminal successfully completes a random access procedure (a 4-step random access procedure or a 2-step random access procedure) in the cell (e.g., PCell, SCell, or PSCell) or a cell (e.g., PSCell or SCell) in the cell group, when the terminal successfully completes the random access procedure and is allocated a first uplink transmission resource, or when an uplink transmission resource is firstly indicated to the terminal.

For example, more specifically, if the terminal performs a contention-free random access procedure (contention-free random access, CRFA) (e.g., a pre-designated preamble or a terminal cell identifier (e.g., C-RNTI) is allocated), When the terminal transmits a pre-designated preamble to the cell, and then receives a random access response (RAR) message or receives an indication of a PDCCH for the random access response, the terminal may consider that the random access procedure has been successfully completed, and thus may determine that the first condition is satisfied. As another method, when an uplink transmission resource is received firstly after RAR reception, the terminal may determine that the first condition is satisfied.

If the terminal performs a contention-based random access procedure (contention-based random access, CBRA) (e.g., a pre-designated preamble or a terminal cell identifier (e.g., C-RNTI) has not been allocated), When the terminal transmits a preamble (e.g., random preamble) to the cell, receives a random access response (RAR) message, transmits message 3 (e.g., a handover completion message) by using an uplink transmission resource allocated by, included in, indicated by the random access response message, and receives a MAC CE (contention resolution MAC CE)

indicating that contention has been resolved, through message 4 from a target base station, or when the terminal receives an uplink transmission resource through a PDCCH corresponding to the C-RNTI of the terminal, the terminal may consider that the random access procedure for the target base station has been successfully completed, and thus may determine that the first condition is satisfied. As another method, when the size of the uplink transmission resource allocated by the random access response message is enough and thus the terminal is able to additionally transmits uplink data after transmitting message 3, the terminal may determine that an uplink transmission response has been received firstly, and determine that the first condition is satisfied. That is, when the RAR is received, the terminal may determine that an uplink transmission response has been received firstly, and determine that the first condition is satisfied.

1> If a 2-step random access procedure (2-step random access) is configured for or indicated to the terminal, and the terminal performs same, 1> Alternatively, even though the 2-step random access procedure (2-step random access) is not configured or indicated by the message, in a case where the terminal supports the 2-step random access procedure in a terminal capability, and if system information of the cell supports the 2-step random access procedure and the system information broadcasts information for the 2-step random access procedure (e.g., information such as a random access resource or a threshold for determining whether to perform or not to perform 2-step random access), or if the terminal receives the system information and a signal strength is better or greater than the threshold broadcast by the system information and thus the terminal performs the 2-step random access procedure for the cell, 2> When the terminal has successfully completed the 2-step random access procedure, the terminal may determine that the first condition is satisfied.

2> The 2-step random access procedure may be performed in one method among a contention-based random access (CBRA) method or a contention-free random access (CFRA) method.

3> If the terminal performs a CBRA-based 2-step random access procedure,

4> The terminal may transmit a preamble on a transmission resource for 2-step random access (e.g., a PRACH occasion, a transmission resource configured through an RRC message by the base station, or a transmission resource broadcast by system information), and transmit data (e.g., an MsgA MAC PDU) on a transmission resource for data transmission (e.g., a PUSCH occasion). The data may include MAC control information (C-RNTI MAC CE) including a terminal identifier (C-RNTI) or an RRC message (RRCReconfigurationComplete message or handover completion message).

4> The terminal may monitor a PDCCH scrambled by the terminal identifier (C-RNTI) or a first identifier (MsgB-RNTI) derived by a time or frequency at which the preamble is transmitted.

4> If the terminal receives a PDCCH scrambled by the terminal identifier, if a downlink transmission resource is allocated by the PDCCH, or if the terminal receives MAC control information (timing advance command MAC CE) for timing adjustment on the downlink transmission resource, 5> The terminal may determine that the terminal has successfully completed the 2-step random access procedure, and may determine that the first condition is satisfied.

4> If the terminal receives a PDCCH scrambled by the first identifier (MsgB-RNTI), if a downlink transmission resource is allocated by the PDCCH, or if the terminal receives, on the downlink transmission resource, a random access response (fallback random access response) for a fallback for the preamble transmitted by the terminal (i.e., in a case where the base station has received the preamble but has failed to receive MsgA, a fallback RAR indicating to transmit MsgA on a different transmission resource), 5> The terminal may transmit data (MsgA MAC PDU) on a transmission resource indicated in the random access response for the fallback.

5> The terminal may monitor a PDCCH scrambled by the terminal identifier (C-RNTI).

5> If the terminal receives a PDCCH scrambled by the terminal identifier or if an uplink transmission resource is allocated by the PDCCH, the terminal may determine that the terminal has successfully completed the 2-step random access procedure, and may determine that the first condition is satisfied.

3> If the terminal performs a CFRA-based 2-step random access procedure,

4> The terminal may transmit a preamble on a transmission resource for 2-step random access (e.g., a PRACH occasion or a transmission resource designated through an RRC message by the base station), and transmit data (e.g., an MsgA MAC PDU) on a transmission resource for data transmission (e.g., a PUSCH occasion). The data may include MAC control information (C-RNTI MAC CE) including a terminal identifier (C-RNTI) or an RRC message (RRCReconfigurationComplete message or handover completion message).

4> The terminal may monitor a PDCCH scrambled by the terminal identifier (C-RNTI) or a first identifier (MsgB-RNTI) derived by a time or frequency at which the preamble is transmitted.

4> If the terminal receives a PDCCH scrambled by the terminal identifier, if a downlink transmission resource is allocated by the PDCCH, or if the terminal receives MAC control information (timing advance command MAC CE) for timing adjustment on the downlink transmission resource, 5> The terminal may determine that the terminal has successfully completed the 2-step random access procedure, and may determine that the first condition is satisfied.

4> If the terminal receives a PDCCH scrambled by the first identifier (MsgB-RNTI), if a downlink transmission resource is allocated by the PDCCH, or if the terminal receives, on the downlink transmission resource, a random access response (fallback random access response) for a fallback for the preamble transmitted by the terminal (i.e., in a case where the base station has received the preamble but has failed to receive MsgA, a fallback RAR indicating to transmit MsgA on a different transmission resource), 5> The terminal may determine that the terminal has successfully completed the 2-step random access procedure, and may determine that the first condition is satisfied.

5> The terminal may transmit data (MsgA MAC PDU) on a transmission resource indicated in the random access response for the fallback.

1> When the random access procedure is started or when a preamble for the random access procedure is transmitted, the terminal may determine that the first condition is satisfied.

1> As another method, if the 2-step random access procedure (2-step random access) is configured or indicated for the terminal by the message, the terminal may determine that the first condition is satisfied. For example, in this case, before starting the 2-step random access procedure, the terminal may determine that the first condition is satisfied.

1> As another method, if the 2-step random access procedure (2-step random access) is configured or indicated for the terminal by the message and a transmission resource (PUSCH) configured for data transmission in the 2-step random access procedure is greater than a first threshold, or if a configuration value (timing advance value) for timing adjustment is included in the RRC message, the terminal may determine that the first condition is satisfied. The first threshold may be configured by the base station through an RRC message (e.g., RRCReconfiguration), may be broadcast by system information, or may be configured to have the volume of data that the terminal has to transmit. For example, in this case, before starting the 2-step random access procedure, the terminal may determine that the first condition is satisfied. As another method, if a configuration value (timing advance value) for timing adjustment is included in the RRC message, or if the 2-step random access procedure is configured thereby, the terminal may not transmit a preamble and directly transmit data on a configured transmission resource (e.g., a transmission resource configured by an RRC message or a transmission resource indicated by a PDCCH of a target base station, monitored by the terminal). Therefore, in this case, before starting the 2-step random access procedure, when the data is transmitted, or before the data is transmitted, the terminal may determine that the first condition is satisfied. As another method, if a configuration value (timing advance value) for timing adjustment is included in the RRC message, or if the 2-step random access procedure is configured thereby, the terminal may not transmit a preamble and directly transmit data on a configured transmission resource (PUSCH) (e.g., a transmission resource configured by an RRC message or a transmission resource indicated by a PDCCH of a target base station, monitored by the terminal). In this case, if the configured transmission resource (PUSCH) (e.g., a transmission resource configured by an RRC message or a transmission resource indicated by a PDCCH of a target base station, monitored by the terminal) is greater than the first threshold, or if a configuration value (timing advance value) for timing adjustment is included in the RRC message, the terminal may determine that the first condition is satisfied, before starting the 2-step random access procedure, when the data is transmitted, or before the data is transmitted.

1> If an RRC INACTIVE mode terminal transmits an RRCResumeRequest message and then receives an RRCResume message (or RRCSetup message) as a response therefor, the terminal may consider that the first condition is satisfied.

1> When the terminal performs channel measurement, based on first channel measurement configuration information configured by the RRC message, if a timer indicating a duration for channel measurement has expired, 1> When the terminal performs channel measurement, based on first channel measurement configuration information configured by the RRC message, if a time interval indicating a duration for channel measurement has passed (or has expired) or if the time interval is fully used (or applied), 1> When the terminal performs channel measurement, based on first channel measurement configuration information configured by the RRC message, if signals for channel measurement are all measured by a configured count (or measurement of the signals is completed) or if the signals are received by the configured count, 1> When the terminal performs channel measurement, based on first channel measurement configuration information configured by the RRC message, if the channel measurement is completed based on the configuration information (the channel measurement has expired), or if channel measurement reporting is completed (or channel measurement reporting has expired), the terminal may consider that the first condition is satisfied.

If the first condition is satisfied, a higher layer device (e.g., RRC layer device) may provide an indication to a lower layer device (e.g., PDCP layer device, RLC layer device, MAC layer device, or PHY layer device) by using an indicator, or a lower layer device (e.g., PDCP layer device, RLC layer device, MAC layer device, or PHY layer device) may provide an indication to a higher layer device (e.g., RRC layer device).

The above methods of configuring or applying first channel measurement configuration information proposed in the disclosure may be expanded to and configured and used for a case of activating or resuming a cell group (e.g., PSCell), activating an SCell, resuming RRC connection in an RRC inactive mode (e.g., using an RRCResume message), or performing a handover procedure (e.g., using an RRCReconfiguration message).

In the disclosure, a bandwidth part (BWP) may be used without distinguishing between uplink and downlink, and the meaning thereof may indicate an uplink bandwidth part or a downlink bandwidth part according to the context.

In the disclosure, a link may be used without distinguishing between uplink and downlink, and the meaning thereof may indicate an uplink or a downlink according to the context.

In the disclosure, a cell may indicate a PCell, an SCell (e.g., SCell configured in a master cell group (MCG)), a PSCell (e.g., a PCell of a secondary cell group (SCG)), or an SCell (e.g., SCell configured in a secondary cell group (SCG)). The disclosure establishes or introduces a dormant bandwidth part (BWP) for a SCell or PSCell of a terminal performing CA or DC, prevent PDCCH monitoring in the dormant bandwidth part to reduce battery consumption of the terminal, and enable, in the dormant bandwidth part, performing and reporting channel measurement (e.g., measuring or reporting channel state information (CSI) or channel quality information (CQI)) or performing beam measurement, beam tracking, or beam management so that when data transmission is required, the terminal is able to quickly start data transmission in a normal bandwidth part (BWP) by switching to or activating the normal bandwidth part. The dormant bandwidth part may be not configured or not applied for an SpCell (PCell in MCG or PCell (or PSCell) in SCG) which needs continuous monitoring of a signal, feedback transmission or reception, or identification and maintenance of synchronization, or an SCell in which a PUCCH is configured.

If the terminal is indicated via a PCell to switch to or activate a dormant bandwidth part of an SCell of a master cell group, the terminal may perform a channel measurement procedure for the dormant bandwidth part of the SCell, and report a channel measurement result obtained by the measurement on a transmission resource of the PCell of the master cell group (MCG) (e.g., through a physical uplink control channel (PUCCH) transmission resource of the PCell) or on a transmission resource of an SCell in which a PUCCH of the master cell group is configured (e.g., through a physical uplink control channel (PUCCH) transmission resource). Which transmission resource (e.g., PUCCH or PUSCH) of which cell on which a channel measurement result for which cell or a bandwidth part of which cell is to be reported may be configured to the terminal for each cell or each bandwidth part through an RRC message.

If the terminal is indicated via a PSCell to switch to or activate a dormant bandwidth part of an SCell of a secondary cell group, the terminal may perform a channel measurement procedure for the dormant bandwidth part of the SCell, and report a channel measurement result obtained by the measurement on a transmission resource of the PSCell of the secondary cell group (SCG) (e.g., through a physical uplink control channel (PUCCH) transmission resource of the PSCell) or on a transmission resource of an SCell in which a PUCCH of the secondary cell group is configured (e.g., through a physical uplink control channel (PUCCH) transmission resource). Which transmission resource (e.g., PUCCH or PUSCH) of which cell on which a channel measurement result for which cell or a bandwidth part of which cell is to be reported may be configured to the terminal for each cell or each bandwidth part through an RRC message.

If the terminal is indicated via a PCell to switch to or activate a dormant bandwidth part for a PSCell or SCell of a secondary cell group, or if the terminal receives a cell group suspension (SCG suspension) indication for the secondary cell group (SCG or PSCell), the terminal may perform a channel measurement procedure on the dormant bandwidth part or a bandwidth part (a bandwidth part configured by an RRC message or a last activated bandwidth part) of the PSCell or SCell, and report a channel measurement result obtained by the measurement on a transmission resource of a PCell of a master cell group (MCG) (e.g., through a physical uplink control channel (PUCCH) transmission resource of the PCell), on a transmission resource of an SCell in which a PUCCH of the master cell group is configured (e.g., through a physical uplink control channel (PUCCH) transmission resource), or on a transmission resource of the PSCell of the secondary cell group (SCG) (e.g., through a physical uplink control channel (PUCCH) transmission resource of the PSCell). Which transmission resource (e.g., PUCCH or PUSCH) of which cell on which a channel measurement result for which cell or a bandwidth part of which cell is to be reported may be configured to the terminal for each cell or each bandwidth part through an RRC message.

The disclosure proposes various embodiments operated based on DCI of a PDCCH, a MAC CE, or an RRC message to operate a dormant bandwidth part or a cell group suspension state, proposed above, for an SCell (when CA is configured, an SCell of a master cell group or when DC is configured, an SCell of a secondary cell group) or a PSCell (when DC is configured, a PCell of a secondary cell group) of a terminal.

A network or a base station may configure an SpCell (PCell and PSCell) and multiple SCells for a terminal. The SpCell may indicate a PCell when the terminal communicates with one base station, and indicate a PCell of a master base station or a PSCell of a secondary base station when the terminal communicates two base stations (the master base station and the secondary base station). The PCell or the PSCell refers to a main cell used by the terminal and the base station to communicate in each MAC layer device, and indicates a cell that matches timing for synchronization, performs random access, transmits a HARQ ACK/NACK feedback through a PUCCH transmission resource, and exchanges most control signals. A technology in which the base station operates the multiple SCells together with the SpCell, as described above, to increase transmission resources and increase uplink or downlink data transmission resources is called carrier aggregation (CA) or dual connectivity (DC).

In the disclosure, a PCell may refer to mater cell group (MCG), and a PSCell may indicate a secondary cell group (SCG). In addition, an MCG may have the meaning of including a PCell and an SCells configured in the MCG, and an SCG may have the meaning of including a PSCell and SCells configured in the SCG. In addition, a cell may indicate a cell group, or a cell group may indicate a cell.

When an SpCell and multiple SCells are configured for the terminal by an RRC message, a state or a mode for each cell (PCell, PSCell, or SCell), each SCell, a bandwidth part of each SCell, or a cell group may be configured for the terminal by the RRC message, a MAC CE, or DCI of a PDCCH. The state or mode of a cell may be configured as an active mode or activated state and a deactivated mode or deactivated state. A cell being in an active mode or activated state may mean that the terminal is capable of, in the active mode or activated cell, on an activated bandwidth part of the cell, an activated normal bandwidth part, or a bandwidth part that is not an activated dormant bandwidth part, exchanging uplink or downlink data with the base station, monitoring a PDCCH to identify an indication of the base station, performing channel measurement on downlink of the cell in the active mode or activated state (or the activated bandwidth part of the cell, the activated normal bandwidth part, or the bandwidth part that is not the activated dormant bandwidth part) and periodically reporting measurement information to the base station, and periodically transmitting a pilot signal (e.g., SRS) to the base station to enable the base station to perform uplink channel measurement. Alternatively, the terminal may activate or switch a bandwidth part to a dormant bandwidth part for the activated cell according to an indication (e.g., PDCCH, MAC CE, or RRC message) of the base station, and if a dormant bandwidth part is activated in the activated cell, the terminal does not perform PDCCH monitoring in the cell, and may perform a procedure of performing channel measurement reporting and reporting a channel measurement result.

In another method, if a cell, in a dormant bandwidth part is activated, is an SCell, the terminal may not monitor a PDCCH, not receive downlink data, perform channel measurement or measurement result reporting, suspend a configured periodic transmission resource (e.g., type 1 periodic transmission resource (configured uplink grant type 1)), release (clear) or initialize a configured periodic transmission resource (e.g., type 2 periodic transmission resource (configured uplink grant type 2)), not transmit an SRS, not transmit uplink data, or not transmit a PUCCH (e.g., a preamble for an SR or random access). However, if a cell, in which a dormant bandwidth part is activated, or for which cell group suspension is indicated, is a PSCell, the terminal may not monitor a PDCCH, perform PDCCH monitoring according to a very long period, not receive downlink data, perform channel measurement or measurement result reporting, suspend a configured periodic transmission resource (e.g., type 1 periodic transmission resource (configured uplink grant type 1)), release (clear) or initialize a configured periodic transmission resource (e.g., type 2 periodic transmission resource (configured uplink grant type 2)), transmit a sounding reference signal (SRS), not transmit uplink data, transmit a PUCCH (e.g., a preamble for an SR or random access), or perform a random access procedure.

If a cell, in which a bandwidth part other than a dormant bandwidth part is activated, is an SCell, the terminal may monitor a PDCCH, receive downlink data, perform channel measurement or measurement result reporting, resume a configured periodic transmission resource (e.g., type 1 periodic transmission resource (configured uplink grant type 1)), configure or activate a configured periodic transmission resource (e.g., type 2 periodic transmission resource (configured uplink grant type 2)), transmit an SRS, transmit uplink data, transmit a PUCCH (e.g., a preamble for an SR or random access), or perform a random access procedure.

If a cell, in which a bandwidth part other than a dormant bandwidth part is activated, or for which cell group resumption (SCG resumption) is indicated, is a PSCell, the terminal may perform PDCCH monitoring, receive downlink data, perform channel measurement or measurement result reporting, resume a configured periodic transmission resource (e.g., type 1 periodic transmission resource (configured uplink grant type 1)), configure or activate a configured periodic transmission resource (e.g., type 2 periodic transmission resource (configured uplink grant type 2)), transmit an SRS, transmit uplink data, transmit a PUCCH (e.g., a preamble for an SR or random access), or perform a random access procedure.

However, the deactivated mode or deactivated state of a cell may mean that bandwidth parts configured in the cell are in a deactivated state, the configured bandwidth parts are not activated, or there is no activated bandwidth among the configured bandwidth parts, and thus the terminal is incapable of exchanging data with the base station, does not monitor a PDCCH for identification of an indication from the base station, performs neither channel measurement nor measurement reporting, and does not transmit a pilot signal.

Therefore, the base station first configures frequency measurement configuration information for the terminal through an RRC message in order to activate cells in a deactivated mode, and the terminal performs cell or frequency measurement, based on the frequency measurement configuration information. Thereafter, the base station may receive a cell or frequency measurement report of the terminal and then activate the deactivated cells, based on frequency/channel measurement information. Therefore, there occur significant delays when the base station activates CA or DC for the terminal and data transmission and reception is started.

The disclosure proposes a dormant bandwidth part or dormant state for a bandwidth part of each activated cell (e.g., activated SCell or activated PSCell) to conserve the battery of a terminal and enable quick start of data transmission or reception, or proposes to configure or introduce a dormant bandwidth part (BWP) for each activated cell. Alternatively, the disclosure proposes to, when DC is configured for a terminal, configure or introduce a state of each cell group as an activated state, a dormant state, a suspended state, a deactivated state, or a resumed state, and proposes a method of performing a cell group suspension (SCG suspension) or cell group resumption (SCG resumption) indication that indicates transition of the cell group state, and a terminal operation corresponding to the method.

In a dormant mode bandwidth part or a dormant bandwidth part (BWP) (in the activated SCell) of the activated cell or when the dormant bandwidth part is activated, a terminal is unable to exchange data with a base station, does not monitor a PDCCH for identification of an indication from the base station, or does not transmit a pilot signal, but performs channel measurement and reports a measurement result of a measured frequency/cell/channel periodically according to a base station configuration or when an event occurs. Therefore, since the terminal does not monitor a PDCCH and does not transmit a pilot signal in the dormant bandwidth part (BWP) of the activated cell, the terminal may conserve the battery compared to a normal bandwidth part (or a bandwidth part other than the dormant bandwidth part) of the activated cell or compared to when a normal bandwidth part (or a bandwidth part other than the dormant bandwidth part) of the activated cell is activated, and since the terminal performs channel measurement reporting unlike when the cell is deactivated, a base station may quickly activate the normal bandwidth part of the activated cell, based on a measurement report or based on a measurement report of the dormant bandwidth part of the activated cell, so as to enable the terminal to quickly use CA and reduce transmission delays.

Therefore, in the disclosure, a cell being in an active mode or activated state may mean that a terminal is capable of, in the active mode or activated cell, on an activated bandwidth part of the cell, an activated normal bandwidth part, or a bandwidth part that is not an activated dormant bandwidth part, exchanging uplink or downlink data with a base station, monitoring a PDCCH to identify an indication of the base station, performing channel measurement on downlink of the cell in the active mode or activated state (or the activated bandwidth part of the cell, the activated normal bandwidth part, or the bandwidth part that is not the activated dormant bandwidth part) and periodically reporting measurement information to the base station, and periodically transmitting a pilot signal (SRS) to the base station to enable the base station to perform uplink channel measurement. In addition, in the disclosure, a cell being in an active mode or activated state may mean that, in the active mode or activated cell, on an activated dormant bandwidth part of the cell, a terminal is incapable of exchanging uplink or downlink data with a base station or does not monitor a PDCCH to identify an indication of the base station, but is capable of performing channel measurement on downlink in the activated dormant bandwidth part of the cell in the active mode or activated state and periodically reporting measurement information to the base station.

If a cell, in which a dormant bandwidth part is activated, or for which cell group suspension is indicated, is a PSCell, a terminal may not monitor a PDCCH, perform PDCCH monitoring according to a very long period, not receive downlink data, perform channel measurement or measurement result reporting, suspend a configured periodic transmission resource (e.g., type 1 periodic transmission resource (configured uplink grant type 1)), release (clear) or initialize a configured periodic transmission resource (e.g., type 2 periodic transmission resource (configured uplink grant type 2)), transmit an SRS, not transmit uplink data, transmit a PUCCH (e.g., a preamble for an SR or random access), or perform a random access procedure.

As another method, if a cell, for which cell group deactivation (or suspension) is indicated, is a PSCell (or SCG), a terminal may not monitor a PDCCH, perform PDCCH monitoring according to a very long period, not receive downlink data, not perform channel measurement or measurement result reporting, suspend a configured periodic transmission resource (e.g., type 1 periodic transmission resource (configured uplink grant type 1)), release (clear) or initialize a configured periodic transmission resource (e.g., type 2 periodic transmission resource (configured uplink grant type 2)), not transmit an SRS, not transmit uplink data, or not transmit a PUCCH (e.g., a preamble for an SR or random access). However, when cell group deactivation (or suspension) is indicated, the terminal may perform a frequency measurement procedure (radio resource management) by using frequency measurement configuration information configured by the base station through an RRC message indicating the cell group deactivation (or suspension), or in a case where radio link monitoring (RLM) configuration information is configured, the terminal may perform an RLM procedure, based on a timer (T310) (the RLM procedure in which, when an indication indicating that a signal is not synchronized is received from a lower layer device (PHY layer device), the terminal drives the timer (T310), and when the timer (T310) expires, declares radio link (wireless connection) failure. If an indication indicating that a signal is synchronized is received, the terminal may stop the timer (T310) in operation). In addition, when cell group deactivation (or suspension) is indicated, in case where beam-related configuration information is configured through an RRC message indicating the cell group deactivation (or suspension) to allow a beam failure detection procedure to be performed, the terminal may perform the beam failure detection procedure.

In addition, in the disclosure, a dormant bandwidth part may imply a state of a bandwidth part, or a dormant bandwidth part may be used as a name having a logical concept indicating a particular bandwidth part. Therefore, a dormant bandwidth part may be activated, deactivated, or switched. For example, an indication that switches a second bandwidth part activated in a first cell to a dormant bandwidth part, an indication that dormantize the first cell or transitions same to a dormant mode, or an indication that activates a dormant bandwidth part of the first cell may be interpreted as having the same meaning.

Furthermore, in the disclosure, a normal bandwidth part may refer to bandwidth parts other than a dormant bandwidth part among bandwidth parts configured in each cell of a terminal by an RRC message, and in the normal bandwidth part, the terminal may exchange uplink or downlink data with a base station, monitor a PDCCH to identify an indication of the base station, perform channel measurement for downlink and periodically report measurement information to the base station, and periodically transmit a pilot signal (SRS) to the base station to enable the base station to perform uplink channel measurement. In addition, the normal bandwidth part may refer to a first active bandwidth part, a default bandwidth part, a first active bandwidth part activated from dormant, or an initial bandwidth part.

In addition, only one dormant bandwidth part among bandwidth parts configured in each cell of a terminal may be configured, and may be configured for downlink. As another method, one dormant bandwidth part among bandwidth parts configured in each cell of a terminal may be configured for uplink or downlink.

In addition, in the disclosure, a state of a cell group may be configured to be an activated state, a suspended state, or a deactivated state. The state of a cell group may be indicated by an indicator or a bitmap of DCI of a PDCCH, may be indicated by MAC control information, or may be indicated by an indicator of an RRC message. In a case where the state of a cell group is indicated as an activated state, a terminal may store configuration information of the cell group configured or indicated by an RRC message (e.g., RRCReconfiguration message, RRCSetup message, or RRCResume message) and may apply, recover, or resume same, and may, in a PCell, a PSCell, or a configured SCell of the cell group and according to a configuration of an RRC message, may monitor a PDCCH, receive downlink data, perform channel measurement or measurement result reporting, resume a configured periodic transmission resource (e.g., type 1 periodic transmission resource (configured uplink grant type 1)), configure or activate a configured periodic transmission resource (e.g., type 2 periodic transmission resource (configured uplink grant type 2)), transmit a sounding reference signal (SRS), transmit uplink data, transmit a PUCCH (e.g., a preamble for scheduling request (SR) or random access), or perform a random access procedure.

In addition, in a case where the state of a cell group is indicated as a suspended state or a deactivated state, a terminal may store or not discard configuration information of the cell group configured or indicated by an RRC message (e.g., RRCReconfiguration message, RRCSetup message, or RRCResume message) but stop applying same, and may, in a PCell, a PSCell, or a configured SCell of the cell group and according to a configuration of an RRC message, may not monitor a PDCCH, perform PDCCH monitoring according to a very long period, not receive downlink data, perform channel measurement or measurement result reporting, suspend a configured periodic transmission resource (e.g., type 1 periodic transmission resource (configured uplink grant type 1)), release (clear) or initialize a configured periodic transmission resource (e.g., type 2 periodic transmission resource (configured uplink grant type 2)), transmit an SRS, not transmit uplink data, transmit a PUCCH (e.g., a preamble for an SR or random access), or perform a random access procedure.

In addition, in a case where the state of a cell group is indicated as a deactivated state or release of cell group configuration information is indicated, a terminal may release or discard configuration information of the cell group configured or indicated by an RRC message (e.g., RRCReconfiguration message, RRCSetup message, or RRCResume message).

Figure 1E:
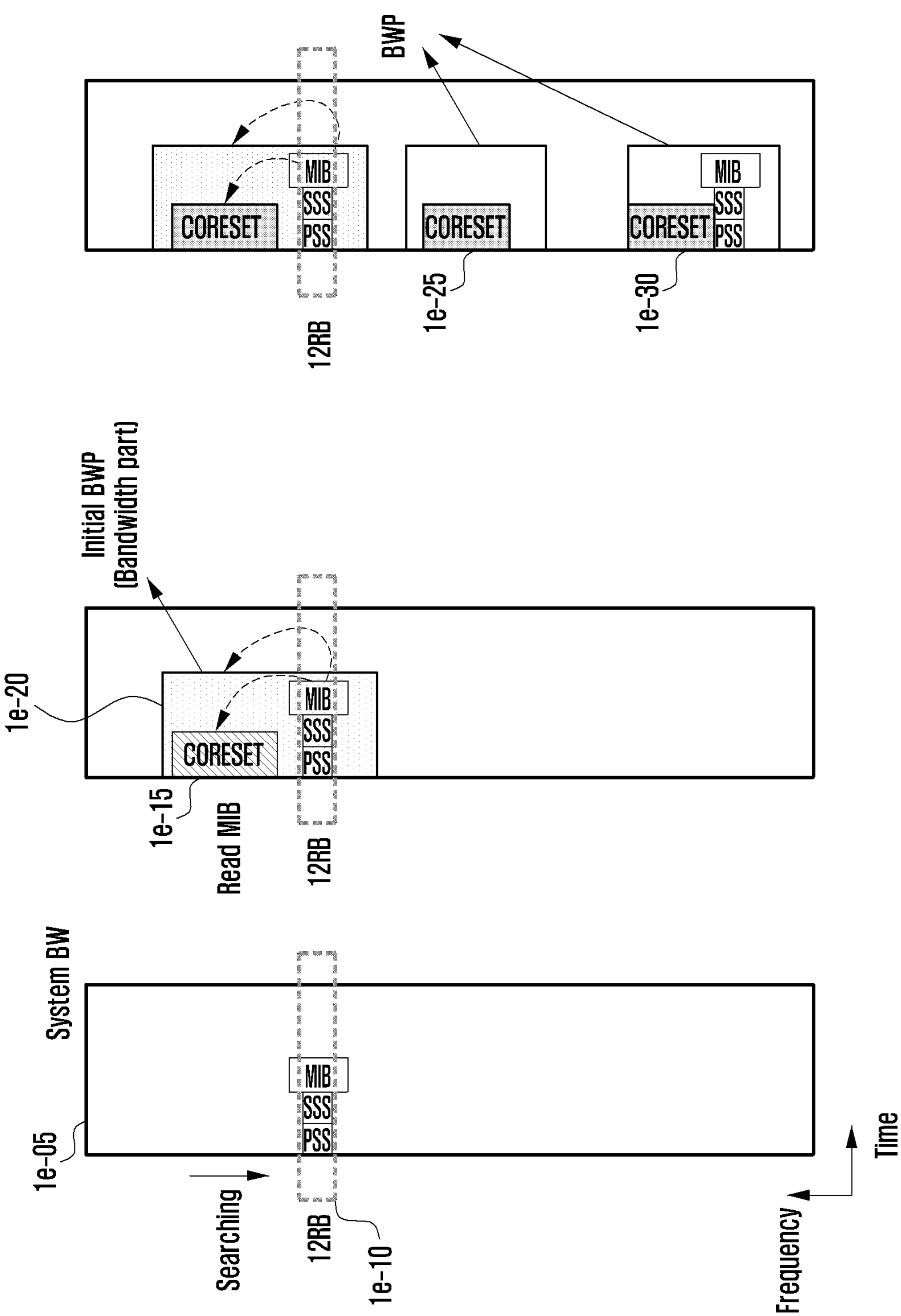
FIG. 1EA is a diagram illustrating a procedure of providing a service to a terminal by efficiently using an extremely wide frequency bandwidth in a next-generation mobile communication system according to an embodiment of the disclosure.

FIG. 1EA and FIG. 1EB are diagrams illustrating a procedure of providing a service to a terminal by efficiently using an extremely wide frequency bandwidth in a next-generation mobile communication system according to an embodiment of the disclosure.

With reference to FIG. 1EA and FIG. 1EB, how a next-generation mobile communication system efficiently uses an extremely wide frequency bandwidth to provide a service to terminals having different various capabilities (or categories) and conserve batteries will be described.

A cell to which a base station provides a service may provide an extremely wide frequency band as indicated by reference numeral 1*e*-05. However, in order to provide a service to terminals having different capabilities, the wide frequency band may be partitioned into multiple bandwidth parts and managed as one cell.

First, a terminal having been initially turned on may search the entire frequency band provided by a service provider (PLMN) in a predetermined unit of resource blocks (e.g., a unit of 12 resource blocks (RBs)). That is, the terminal may start to search the entire system bandwidth for a primary synchronization sequence (PSS)/secondary synchronization sequence (SSS) in the unit of resource blocks (1*e*-10). If the terminal searches for a PSS/SSS 1*e*-01 or 1*e*-02 in the unit of resource blocks and detects the signals, the terminal may read and interpret (decode) the signals to identify the boundary between a subframe and a wireless transmission resource frame (radio frame). Therefore, the terminal may distinguish a subframe in a 1js unit, and synchronize a downlink signal with the base station. The resource block (RB) has a size of a predetermined frequency resource and a predetermined time resource, and may be defined as a two-dimensional unit. For example, the time resource may be defined as a 1js unit, and the frequency resource may be defined as 12 subcarriers (1 carrier×15 kHz=180 kHz). When synchronization is completed, the terminal may identify a master system information block (MIB) or a minimum system information (MSI) to identify information of a control resource set (CORESET) and identify initial access bandwidth part (BWP) information (1*e*-15 and 1*e*-20). The CORESET information denotes a position of a time/frequency transmission resource on which a control signal is transmitted from a base station, for example, a position of a resource on which a PDCCH channel is transmitted (1*e*-15). That is, the CORESET information is information indicating where first system information (system information block 1, SIB1) is transmitted, and indicates which frequency/time resource on which a PDCCH is transmitted. When the terminal reads the first system information, the terminal may identify information on an initial bandwidth part (BWP) (1*e*-20). As described above, when the terminal completes synchronization of a downlink signal with the base station and becomes able to receive a control signal, the terminal may perform a random access procedure in the initial bandwidth part (BWP) 1*e*-15 of a cell that the terminal has camped on, request RRC connection setup, and receive an RRC message to perform the RRC connection setup.

In the RRC connection setup, multiple bandwidth parts may be configured for each cell (PCell, PSCell, SpCell, or SCell) (1*e*-20, 1*e*-25, and 1*e*-30). Multiple bandwidth parts for downlink may be configured in the one cell, and additionally, multiple bandwidth parts for uplink may be configured.

The multiple bandwidth parts may be indicated or configured by a bandwidth part (BWP) identifier to be used as an initial bandwidth part (BWP), a default bandwidth part (BWP), a first active bandwidth part (BWP), a dormant bandwidth part (BWP), or a first active bandwidth part activated from dormant (first active BWP from dormant).

The initial bandwidth part (BWP) 1*e*-20 may be used as a bandwidth part that is cell-specifically determined wherein one bandwidth part exists per cell, and may be used as a bandwidth part on which a terminal accessing the cell for the first time establishes a connection to the cell through a random access procedure or a terminal having established the connection is able to perform synchronization. In addition, the base station may configure, for each cell, an initial downlink bandwidth part (BWP) to use in downlink and an initial uplink bandwidth part (BWP) to use in uplink. In addition, configuration information on the initial bandwidth part may be broadcast by the first system information (system information 1, SIB1) indicated by the CORESET 1*e*-15, and may be configured again for a terminal having established a connection, by the base station through an RRC message. In addition, the initial bandwidth part 1*e*-20 may be designated and used by number 0 of a bandwidth part identifier in each of uplink and downlink. That is, all terminals having accessed the same cell may identically designate and use the same initial bandwidth part by using bandwidth part identifier #0. This is because, when a random access procedure is performed, the base station is allowed to transmit a random access response (RAR) message on an initial bandwidth part on which all terminal are capable of reading the message, so as to make a contention-based random access procedure easy.

The first active bandwidth part (BWP) may be differently configured for each terminal (UE-specifically configured), and may be designated and indicated by a bandwidth part identifier among multiple bandwidth parts. The first active bandwidth part may be configured for each of downlink and uplink, and may be configured as a first active downlink bandwidth part (BWP) and a first active uplink bandwidth part (BWP) by each bandwidth part identifier. The first active bandwidth part may be used to indicate, when multiple bandwidth parts are configured for one cell, which bandwidth part to be activated first and used. For example, when a PCell or a PSCell and multiple SCells are configured for the terminal and multiple bandwidth parts are configured for each PCell, PSCell, or SCell, if the PCell, PSCell, or SCell is activated, the terminal may activate and use a first active bandwidth part (BWP) among the multiple bandwidth parts configured for the PCell, PSCell, or SCell. That is, the terminal may activate and use a first active downlink bandwidth part (BWP) for downlink, and may activate and use a first active uplink bandwidth part (BWP) for uplink.

An operation in which the terminal switches and activates, for a cell, a current or activated downlink bandwidth part to a first active downlink bandwidth part (or a bandwidth part configured or indicated by an RRC message) or switches and activates a current or activated uplink bandwidth part to a first active uplink bandwidth part (or a bandwidth part configured or indicated by an RRC message) may be performed when an indication that activates the cell or the bandwidth part in a deactivated state is received by an RRC message, MAC control information, or DCI. In addition, the operation may also be performed when an indication that transitions the cell or the bandwidth part to a dormant state or an indication that activates same to a dormant bandwidth part is received by an RRC message, MAC control information, or DCI. This is because, when the cell or bandwidth part is activated, in any case, the terminal is to switch and activate a current or activated downlink bandwidth part to a first active downlink bandwidth part (or a bandwidth part configured or indicated by an RRC message) or to switch and activate an uplink bandwidth part to a first active uplink bandwidth part (or a bandwidth part configured or indicated by an RRC message), and thus even when channel measurement reporting is performed in a dormant state, the terminal is required to measure and report a frequency/channel for a first active downlink/uplink bandwidth part so that the base station may effectively use CA. The default bandwidth part (BWP) may be differently configured for each terminal (UE-specifically configured), and may be designated and indicated by a bandwidth part identifier among multiple bandwidth parts. The default bandwidth part may be configured only for downlink. The default bandwidth part may be used as a bandwidth part, among multiple downlink bandwidth parts, to which an activated bandwidth part is to fall back after a predetermined time. For example, a bandwidth part (BWP) inactivity timer may be configured for each cell or bandwidth part by an RRC message, and the timer may be started or restarted when data transmission or reception occurs in an activated bandwidth part rather than the default bandwidth part, or may be started or restarted when an activated bandwidth part is switched to a different bandwidth part. When the timer expires, the terminal may fall back from or switch an activated downlink bandwidth part in the cell to the default bandwidth part. The switching may indicate a procedure of deactivating a currently activated bandwidth part and activating a bandwidth part to which switching is indicated, and the switching may be triggered by an RRC message, MAC control information (MAC control element), or L1 signaling (DCI of PDCCH). The switching may be triggered by indicating a bandwidth part resulting from the switching or to be activated, and the bandwidth part may be indicated by a bandwidth part identifier (e.g., 0, 1, 2, 3, or 4) (1*e*-35, 1*e*-40, 1*e*-45, and 1*e*-5).

The reason why the default bandwidth part is applied and used only for downlink is that the base station enables the terminal to fall back to the default bandwidth part after passage of a predetermined time for each cell and receive an indication (DCI of PDCCH) of the base station so as to facilitate scheduling by the base station. For example, when the base station configures an initial bandwidth part as a default bandwidth part of terminals having accessed one cell, the base station may continuously perform a scheduling indication only on the initial bandwidth part after a predetermined time. If the default bandwidth part is not configured by an RRC message, an initial bandwidth part may be considered as the default bandwidth part and when the bandwidth part inactivity timer expires, a fallback to the initial bandwidth part may occur.

As another method, in order to increase the implementation flexibility of a base station, a default bandwidth part may be defined and configured also for uplink and may be used like a default bandwidth part of downlink.

The dormant bandwidth part (BWP) may mean a dormant mode bandwidth part or a dormant bandwidth part (BWP) (in an activated SCell) of an activated cell, or when the dormant bandwidth part is activated, a terminal is unable to exchange data with a base station, does not monitor a PDCCH for identification of an indication from the base station, or does not transmit a pilot signal, but performs channel measurement and reports a measurement result of a measured frequency/cell/channel periodically according to a base station configuration or when an event occurs. Therefore, since the terminal does not monitor a PDCCH and does not transmit a pilot signal in the dormant bandwidth part (BWP) of the activated cell, the terminal may conserve the battery compared to a normal bandwidth part (or a bandwidth part other than the dormant bandwidth part) of the activated cell or compared to when a normal bandwidth part (or a bandwidth part other than the dormant bandwidth part) of the activated cell is activated, and since the terminal performs channel measurement reporting unlike when the cell is deactivated, a base station may quickly activate the normal bandwidth part of the activated cell, based on a measurement report or based on a measurement report of the dormant bandwidth part of the activated cell, so as to enable the terminal to quickly use CA and reduce transmission delays.

A first active bandwidth part (or a first active non-dormant bandwidth part or a bandwidth part configured or indicated by an RRC message) switched and activated from a dormant state or a dormant bandwidth part may be a bandwidth part, wherein, when the terminal is operating a bandwidth part of one activated cell as a dormant bandwidth part, when an activated bandwidth part in an activated cell is a dormant bandwidth part, or when switching to a dormant bandwidth part is performed in a cell, in a case where the terminal is indicated to switch the bandwidth part of the activated cell from a dormant bandwidth part to a normal bandwidth part (or a bandwidth part other than a dormant bandwidth part) by the base station through DCI of a PDCCH, a MAC CE, or an RRC message, in a case where the terminal is indicated to switch or convert an active bandwidth part from a dormant bandwidth part to a normal bandwidth part, or in a case where the terminal is indicated to switch, convert, or activate an active bandwidth part from a dormant bandwidth part to a normal bandwidth part (e.g., a first active bandwidth part activated from dormant), the bandwidth part is required to be switched and activated by the terminal from a current or activated bandwidth part of the activated cell according to a corresponding indication, or the bandwidth part is configured by an RRC message and required to be activated from a dormant state.

Figure 1F:
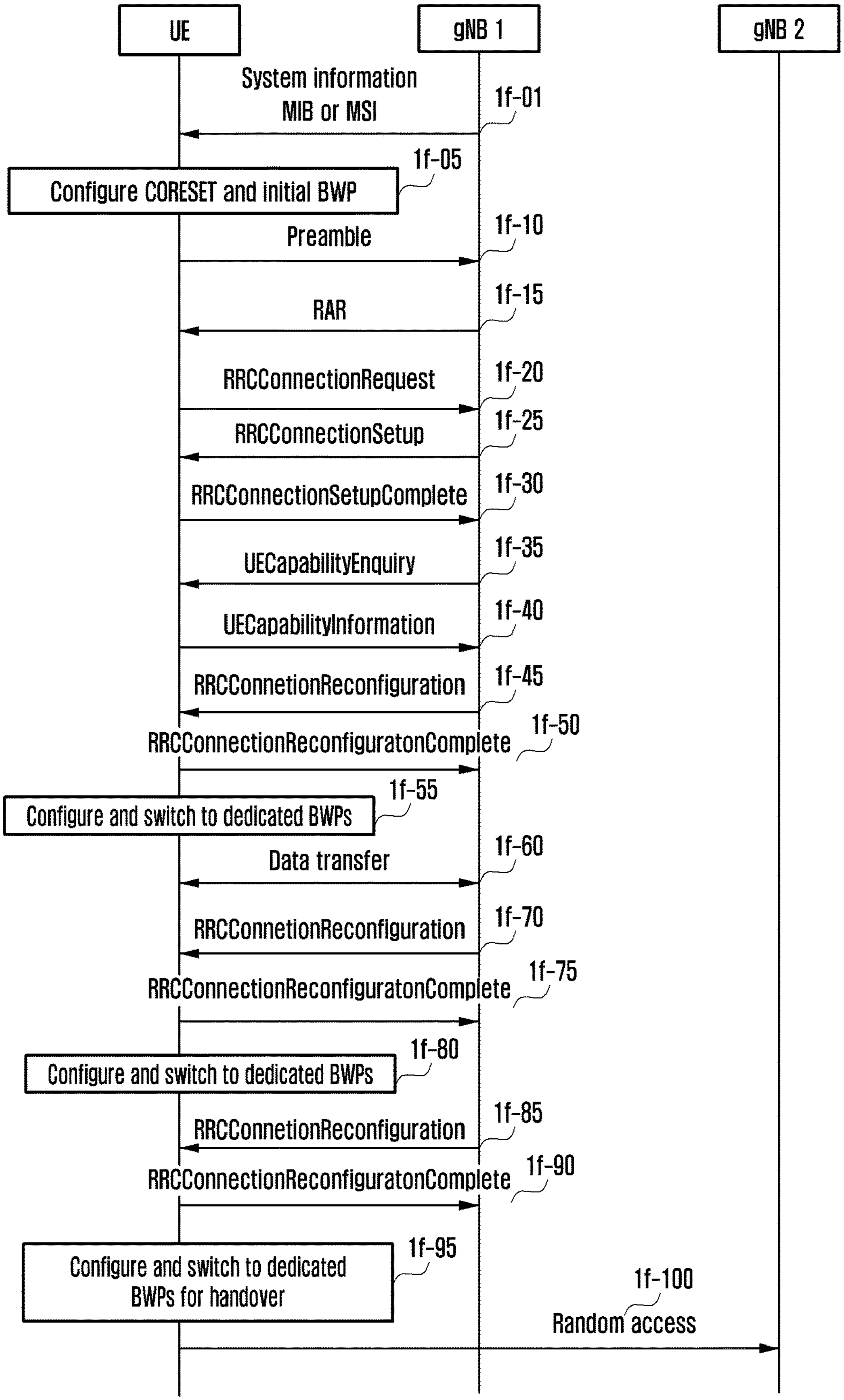
FIG. 1F is a diagram illustrating a procedure in which a terminal switches from an RRC idle mode to an RRC connected mode in a next-generation mobile communication system according to an embodiment of the disclosure, and illustrating a procedure of configuring, for a terminal, bearer configuration information, cell group or cell configuration information, or channel measurement configuration information for connection.

FIG. 1F is a diagram illustrating a procedure in which a terminal switches from an RRC idle mode to an RRC connected mode in a next-generation mobile communication system according to an embodiment of the disclosure, and illustrating a procedure of configuring, for a terminal, bearer configuration information, cell group or cell configuration information, or channel measurement configuration information for connection.

Referring to FIG. 1F, one cell in which a base station provides a service may provide an extremely wide frequency band. First, a terminal may search the entire frequency band provided by a service provider (PLMN) in a predetermined unit of resource blocks (e.g., a unit of 12 RBs). That is, the terminal may start to search the entire system bandwidth for a primary synchronization sequence (PSS)/secondary synchronization sequence (SSS) in the unit of resource blocks. If the terminal searches for a PSS/SSS in the unit of resource blocks and detects the signals, the terminal may read and interpret (decode) the signals to identify the boundary between a subframe and a wireless transmission resource frame (radio frame). When synchronization is completed, the terminal may read system information of a cell on which the terminal is currently camping. That is, the terminal may identify a master system information block (MIB) or a minimum system information (MSI) to identify information of a control resource set (CORESET) and read system information to identify initial bandwidth part (BWP) information (1*f*-01 and 1*f*-05). The CORESET information denotes a position of a time/frequency transmission resource in which a control signal is transmitted from a base station, for example, a position of a resource in which a PDCCH channel is transmitted.

As described above, when the terminal completes synchronization of a downlink signal with the base station and becomes able to receive a control signal, the terminal may perform a random access procedure in the initial bandwidth part, receive a random access response, request RRC connection setup, receive an RRC message, and perform RRC connection setup (1*f*-10, 1*f*-15, 1*f*-20, 1*f*-25, and 1*f*-30).

When basic RRC connection setup is completed, the base station may transmit, to the terminal, an RRC message inquiring performance of the terminal in order to identify the performance (UE capability) of the terminal (UECapabilityEnquiry, 1*f*-35). As another method, the base station may inquire capability of the terminal of an MME or an AMF in order to identify the capability of the terminal. This is because, even if the terminal has previously performed access, the MME or AMF may have stored capability information of the terminal. If there is no terminal capability information desired by the base station, the base station may request terminal capability from the terminal. When reporting the terminal capability, the terminal may report, to the base station as the terminal capability, whether the terminal supports a dormant bandwidth part for an SCell of each cell group (master cell group or secondary cell group), whether the terminal supports a first embodiment, a second embodiment, a third embodiment, or a fourth embodiment of the disclosure, whether the terminal supports a dormant bandwidth part for a PSCell in each cell group, whether the terminal supports a cell group suspension or resumption procedure for a PSCell in each cell group, or the number of cell groups. In addition, the terminal may also report, to the base station as the terminal capability, whether the terminal is able to store and recover, discard, partially re-configure, or activate configuration information of an SCell of a master cell group, an SCell of a secondary cell group, a PSCell of a secondary cell group by using an RRCResume message in an RRC connection resumption procedure.

The reason why the base station transmits an RRC message to the terminal to identify the performance of the terminal is that the base station identifies the performance of the terminal, for example, identifies how wide a frequency band the terminal is able to read, or a region of a frequency band the terminal is able to read. After identifying the performance of the terminal, the base station may configure a proper bandwidth part (BWP) for the terminal. When the terminal receives an RRC message inquiring performance of the terminal, the terminal may indicate, to the base station in response to the message, the range of a bandwidth supported by the terminal or a bandwidth range which the terminal supports in the current system bandwidth by using an offset from a reference center frequency, by directly indicating a start point and an end point of a supported frequency bandwidth, or by using a center frequency and a bandwidth (1*f*-40).

The bandwidth part may be configured through an RRCSetup message or an RRCResume message 1*f*-25 or an RRCReconfiguration message 1*f*-45 or 1*f*-70 of RRC connection setup, and the RRC message may include configuration information on a PCell, a PSCell, or multiple cells, and configure multiple bandwidth parts for each cell (PCell, PSCell, or SCell). When multiple bandwidth parts are configured for each cell, multiple bandwidth parts to be used in downlink of each cell may be configured, and in a case of an FDD system, multiple bandwidth parts to be used in uplink of each cell may be configured separately from the downlink bandwidth parts. In a case of a TDD system, multiple bandwidth parts to be used commonly in downlink and uplink of each cell may be configured.

Cell configuration information or information for bandwidth part configuration of each cell (PCell, PSCell, or SCell) may include some of the following pieces of information.

- Cell identifier (SCell index)
- Cell configuration information
- First channel measurement configuration information for each cell or bandwidth part
- Second channel measurement configuration information for each cell or bandwidth part
- Downlink bandwidth part configuration information of the cell
- Initial downlink bandwidth part (BWP) configuration information
- Configuration information on multiple bandwidth parts and bandwidth part identifier (BWP ID) corresponding to each bandwidth part
- Initial state configuration information of the cell or downlink bandwidth part (e.g., activated state, dormant state, or deactivated state)
- Bandwidth part identifier indicating first active downlink bandwidth part (BWP)
- Bandwidth part identifier indicating default bandwidth part (BWP)
- Configuration information for PDCCU monitoring in each bandwidth part. For example, CORESET information, search space resource information, PDCCH transmission resource, period, subframe number information, etc.
- Bandwidth part identifier indicating dormant bandwidth part
- Bandwidth part identifier indicating first active bandwidth part activated from dormant
- Bandwidth part inactivity timer setup and timer value
- First channel measurement configuration information for each cell or bandwidth part
- Second channel measurement configuration information for each cell or bandwidth part
- Uplink bandwidth part configuration information of the cell
- Initial uplink bandwidth part (BWP) configuration information
- Configuration information on multiple bandwidth parts and bandwidth part identifier (BWP ID) corresponding to each bandwidth part
- Initial state configuration information of the cell or downlink bandwidth part (e.g., activated state, dormant state, or deactivated state)
- Bandwidth part identifier indicating first active uplink bandwidth part (BWP)
- Configuration information (e.g., PUCCH transmission resource information of a PCell, a PUCCH SCell, or a PSCell) relating to a transmission resource on which a measurement result is to be reported after channel measurement is performed in a dormant bandwidth part or a bandwidth part other than a dormant bandwidth part First channel measurement configuration information, which may be included in and configured by the RRC message (RRCReconfiguration or RRCResume), may include configuration information, such as a period of a frequent channel measurement signal (e.g., a radio resource, a temporary reference signal (TRS), a synchronization signal block (SSB), a channel state information reference signal (CSI-RS), or a reference signal (RS)), transmission resource information (a frequency or time transmission resource on which the frequent channel measurement signal is transmitted) on a transmission resource on which the signal is transmitted, an interval, a count (the count of the frequent channel measurement signal being transmitted), a timer value (a time at which the frequent channel measurement signal is transmitted), a time interval (an interval for which the frequent channel measurement signal is transmitted (e.g., an offset in a time unit (slot, subframe, or symbol)), or a transmission resource, a period, an interval, a timing, or an offset required when a terminal reports a measurement result, so as to enable a base station to temporarily transmit a large or frequent number of the channel measurement signals so that fast channel measurement is possible in a cell in configuration information of the cell (PCell, PSCell, or SCell) in the cell group to quickly activate the cell group. The first channel measurement configuration information may configure a short reporting period (or transmission resource) according to which the terminal may report a channel measurement result, or may configure a transmission resource for channel measurement so as to enable the base station to transmit a large or frequent number of many channel measurement signals (or a transmission resource (e.g., a radios resource or a temporary reference signal (TRS))) to support fast channel measurements or many signal measurements by the terminal. The first channel measurement configuration information may include configuration information on a signal for channel measurement for a particular terminal (or terminals), the signal being transmitted by a base station in the cell or bandwidth part. For example, the first channel measurement configuration information may include a period of the signal for channel measurement, a count of the transmitted signal, a duration for which the signal is transmitted, an offset for a time at which the signal is transmitted, a time interval between transmitted signals, a list of multiple transmittable signals for channel measurement, a time transmission resource (or frequency transmission resource) indicating the location of the transmitted signal, a transmission resource (time transmission resource or frequency transmission resource) on which a measurement result is to be reported, or a period according to which a measurement result is to be reported. In addition, the first channel measurement configuration information may be differently configured for each cell or bandwidth part with respect to multiple cells or bandwidth parts configured by the RRC message, and may configure, together, beam-related configuration information (transmission configuration indication (TCI) state or quasi co-location (QCL)), such as beam direction, beam number, or beam location, to support the terminal to easily measure a transmission resource for channel measurement. In addition, a timing advance (TA) value (or offset value), a timer (time alignment timer (TAT)) indicating the validity of the TA value, or a timer value (TAT value) for synchronization of a downlink signal of a base station or an uplink signal of the base station may be configured in the first channel measurement configuration information so that channel measurement or channel measurement reporting is performed correctly. In addition, the first channel measurement configuration information configured by an RRC message may include multiple pieces of channel measurement signal information, and an RRC message, a MAC CE, or DCI may be used to indicate beam configuration information or one piece of channel measurement signal information among the configured multiple pieces of channel measurement signal information, to cause a terminal to apply or use the indicated piece of channel measurement signal information or the indicated beam configuration information to perform channel measurement or perform channel measurement reporting. In the indicating method, mapping between each piece of channel measurement signal information configured above and a bitmap, an index, or an identifier may be defined and an indication may be performed based thereon. As another method, the RRC message or the MAC CE may be used to configure or indicate channel measurement signal information to cause a terminal to apply or use the configured (or indicated) channel measurement signal information to perform channel measurement or perform channel measurement reporting.

First channel measurement configuration information proposed in the disclosure is initially deactivated when being configured by an RRC message or after being handed over and, later, may be activated by MAC control information, DCI information of a PDCCH, or an RRC message proposed in the disclosure. As described above, in a case of configuration by an RRC message, an initial state is required to be a deactivated state to enable a base station to easily manage a cell state of a terminal or a procedure of performing channel measurement, and to enable the terminal to perform channel measurement at a precise timing relating to when or where to perform the channel measurement, without a problem of a processing delay of an RRC message.

In addition, the RRC message (RRCReconfiguration or RRCResume) may include second channel measurement configuration information, or the same information may be configured by the RRC message. The second channel measurement configuration information may include general channel measurement configuration information, such as a transmission resource, a period, a time interval, or a count of a channel measurement signal, or a transmission resource, a period, or a time interval for channel measurement reporting.

An initial bandwidth part (BWP), a default bandwidth part (BWP), or a first active bandwidth part (BWP) configured above may be used for the following purposes, and may operate as follows according to the purposes.

The initial bandwidth part (BWP) may be used as a bandwidth part that is cell-specifically determined wherein one bandwidth part exists per cell, and may be used as a bandwidth part on which a terminal accessing the cell for the first time establishes a connection to the cell through a random access procedure or a terminal having established the connection is able to perform synchronization. In addition, a base station may configure, for each cell, an initial downlink bandwidth part (BWP) to use in downlink and an initial uplink bandwidth part (BWP) to use in uplink. In addition, configuration information on the initial bandwidth part may be broadcast by the first system information (system information 1, SIB1) indicated by a CORESET, and may be configured again for a terminal having established a connection, by the base station through an RRC message. In addition, the initial bandwidth part may be designated and used by number 0 of a bandwidth part identifier in each of uplink and downlink. That is, all terminals having accessed the same cell may identically designate and use the same initial bandwidth part by using bandwidth part identifier #0. This is because, when a random access procedure is performed, the base station is allowed to transmit a random access response (RAR) message on an initial bandwidth part on which all terminal are capable of reading the message, so as to make a contention-based random access procedure easy.

The first active bandwidth part (BWP) may be differently configured for each terminal (UE-specifically configured), and may be designated and indicated by a bandwidth part identifier among multiple bandwidth parts. The first active bandwidth part may be configured for each of downlink and uplink, and may be configured as a first active downlink bandwidth part (BWP) and a first active uplink bandwidth part (BWP) by each bandwidth part identifier. The first active bandwidth part may be used to indicate, when multiple bandwidth parts are configured for one cell, which bandwidth part to be activated first and used. For example, when a PCell or a PSCell and multiple SCells are configured for the terminal and multiple bandwidth parts are configured for each PCell, PSCell, or SCell, if the PCell, PSCell, or SCell is activated, the terminal may activate and use a first active bandwidth part (BWP) among the multiple bandwidth parts configured for the PCell, PSCell, or SCell. That is, the terminal may activate and use a first active downlink bandwidth part (BWP) for downlink, and may activate and use a first active uplink bandwidth part (BWP) for uplink.

An operation in which the terminal switches and activates, for a cell, a current or activated downlink bandwidth part to a first active downlink bandwidth part (or a bandwidth part configured or indicated by an RRC message) or switches a current or activated uplink bandwidth part to activate a first active uplink bandwidth part (or a bandwidth part configured or indicated by an RRC message) may be performed when an indication that activates a cell or a bandwidth part of an activated cell in a deactivated state or a dormant state is received, or when an indication that switches or activates a deactivated or dormant bandwidth part to a normal bandwidth part is received by an RRC message, MAC control information, or DCI of a PDCCH. In addition, when the terminal is indicated to transition an activated cell or bandwidth part to a dormant state or switch or activate same to a dormant bandwidth part, by an RRC message, MAC control information, or DCI of a PDCCH, the terminal may switch or activate the bandwidth part to a dormant bandwidth part or dormantize the bandwidth part.

The dormantization, the switching to a dormant bandwidth part, or the activating of a dormant bandwidth part may mean performing an operation proposed in a dormant state in the disclosure. That is, the terminal does not perform PDCCH monitoring, and may perform an operation of measuring a channel for a downlink bandwidth part (or dormant bandwidth part) and reporting to the base station. As another method, when the activated cell or bandwidth part is activated or switched to a normal bandwidth part, in any case, the terminal is to switch and activate a downlink bandwidth part to a first active downlink bandwidth part and switch and activate an uplink bandwidth part to a first active uplink bandwidth part, and thus the dormant bandwidth part may be configured as the first active downlink or uplink bandwidth part or a default bandwidth part. The default bandwidth part (BWP) may be differently configured for each terminal (UE-specifically configured), and may be designated and indicated by a bandwidth part identifier among multiple bandwidth parts. The default bandwidth part may be configured only for downlink. The default bandwidth part may be used as a bandwidth part, among multiple downlink bandwidth parts, to which an activated bandwidth part is to fall back after a predetermined time. For example, a bandwidth part (BWP) inactivity timer may be configured for each cell or bandwidth part by an RRC message, and the timer may be started or restarted when data transmission or reception occurs in an activated bandwidth part rather than the default bandwidth part, or may be started or restarted when an activated bandwidth part is switched to a different bandwidth part. When the timer expires, the terminal may fall back from or switch an activated downlink bandwidth part in the cell to the default bandwidth part. The switching may indicate a procedure of deactivating a currently activated bandwidth part and activating a bandwidth part to which switching is indicated, and the switching may be triggered by an RRC message, MAC control information (MAC control element), or L1 signaling (DCI of PDCCH). The switching may be triggered by indicating a bandwidth part resulting from the switching or to be activated, and the bandwidth part may be indicated by a bandwidth part identifier (e.g., 0, 1, 2, 3, or 4).

The reason why the default bandwidth part is applied and used only for downlink is that the base station enables the terminal to fall back to the default bandwidth part after passage of a predetermined time for each cell and receive an indication (DCI of PDCCH) of the base station so as to facilitate scheduling by the base station. For example, when the base station configures an initial bandwidth part as a default bandwidth part of terminals having accessed one cell, the base station may continuously perform a scheduling indication only on the initial bandwidth part after a predetermined time. If the default bandwidth part is not configured by an RRC message, an initial bandwidth part may be considered as the default bandwidth part and when the bandwidth part inactivity timer expires, a fallback to the initial bandwidth part may occur.

As another method, in order to increase the implementation flexibility of a base station, a default bandwidth part may be defined and configured also for uplink and may be used like a default bandwidth part of downlink.

The dormant bandwidth part (BWP) may mean a dormant mode bandwidth part or a dormant bandwidth part (BWP) (in an activated SCell) of an activated cell, or when the dormant bandwidth part is activated, a terminal is unable to exchange data with a base station, does not monitor a PDCCH for identification of an indication from the base station, or does not transmit a pilot signal, but performs channel measurement and reports a measurement result of a measured frequency/cell/channel periodically according to a base station configuration or when an event occurs. Therefore, since the terminal does not monitor a PDCCH and does not transmit a pilot signal in the dormant bandwidth part (BWP) of the activated cell, the terminal may conserve the battery compared to a normal bandwidth part (or a bandwidth part other than the dormant bandwidth part) of the activated cell or compared to when a normal bandwidth part (or a bandwidth part other than the dormant bandwidth part) of the activated cell is activated, and since the terminal performs channel measurement reporting unlike when the cell is deactivated, a base station may quickly activate the normal bandwidth part of the activated cell, based on a measurement report or based on a measurement report of the dormant bandwidth part of the activated cell, so as to enable the terminal to quickly use CA and reduce transmission delays.

In relation to the first active bandwidth part (or a first active non-dormant bandwidth part) activated from dormant, when a bandwidth part of one activated cell of the terminal is operated as a dormant bandwidth part, when an activated bandwidth part in an activated cell is a dormant bandwidth part, or when switching to a dormant bandwidth part is performed in a cell, in a case where the terminal is indicated to switch the bandwidth part of the activated cell from a dormant bandwidth part to a normal bandwidth part (or a bandwidth part other than a dormant bandwidth part) by the base station through DCI of a PDCCH, a MAC CE, or an RRC message, in a case where the terminal is indicated to switch or convert an active bandwidth part from a dormant bandwidth part to a normal bandwidth part, or in a case where the terminal is indicated to switch, convert, or activate an active bandwidth part from a dormant bandwidth part to a normal bandwidth part (e.g., a first active bandwidth part activated from dormant), a bandwidth part required to be switched and activated by the terminal from the bandwidth part of the activated cell according to the indication may be the first active bandwidth part that is configured by an RRC message and activated from dormant.

In the disclosure, switching a first bandwidth part to a second bandwidth part may be interpreted as activating the second bandwidth part, or deactivating the first bandwidth part that was activated and activating the second bandwidth part.

In addition, the RRCSetup message or the RRCResume message **1*f*-25 or the RRCReconfiguration message 1*f*-45** of RRC connection setup may configure a state transition timer to enable the terminal to autonomously transition its state without receiving an indication using an RRC message, MAC control information, or DCI of a PDCCH from the base station. For example, a cell inactivity timer (e.g., ScellDeactivationTimer) may be configured for each cell, and if the cell inactivity timer expires, the cell may be transitioned to a deactivated state.

In addition, the RRCSetup message or the RRCResume message **1*f*-25 or the RRCReconfiguration message 1*f*-45 of RRC connection setup may configure frequency measurement configuration information (measurement configuration) and frequency measurement gap configuration information (measurement gap information), and may include a frequency measurement object information (measurement object information). In addition, the RRCSetup message or the RRCResume message 1*f*-25 or the RRCReconfiguration message 1*f*-45** of RRC connection setup may configure a function (power saving mode) for reducing power consumption of the terminal, and, together with the function for reducing power consumption, configure configuration information, such as a discontinuous reception (DRX) cycle, an offset, an on-duration interval (an interval for which the terminal is required to monitor a PDCCH), or time information, or time information or short time period information relating to when the terminal is required to monitor or detect a PDCCH from the base station before the on-duration interval in the DRX cycle. If the function for reducing power consumption of the terminal is configured, the terminal may configure a DRX cycle and detect a wake-up signal (WUS) for an interval configured to monitor a PDCCH of the base station before the on-duration interval, and the base station may indicate, to the terminal by using DCI of a PDCCH of the WUS, whether to skip (or not perform) or perform PDCCH monitoring in the immediately following on-duration interval. A terminal is always required to monitor a PDCCH in an on-duration interval. However, the base station may indicate, by using a WUS described above, the terminal not to perform PDCCH monitoring in the on-duration interval, thereby saving battery consumption of the terminal.

As described above, if the RRC connection setup is completed, the terminal may configure multiple bandwidth parts according to an indication configured by an RRC message. Thereafter, in order to conserve the battery, the terminal may activate one or a small number of bandwidth parts among the configured multiple bandwidth parts. For example, one bandwidth part to be activated may be indicated. The base station may use an RRC message, MAC control information (MAC CE), or L1 signaling (PHY layer control signal such as DCI of a PDCCH) to indicate activation of a bandwidth part, thereby indicating switching an initial access bandwidth part to a new bandwidth part. As another method, the base station may define new bitmap information in DCI of a PDCCH to indicate whether to activate a normal bandwidth part (or a bandwidth part other than a dormant bandwidth part), activate a dormant bandwidth part, or deactivate a bandwidth part. As another method, the base station may use the bitmap to indicate whether to activate a normal bandwidth part (e.g., a first active bandwidth part to be activated from dormant), whether to activate a dormant bandwidth part, whether to switch to a dormant bandwidth part, or whether to perform bandwidth part switching. There may be newly accessing many users in the initial access bandwidth part, and thus it may be more beneficial, in view of scheduling, to allocate a new bandwidth part and manage connected users separately. This is because an initial access bandwidth part is not configured for each terminal and may be commonly shared for and used by all terminals. In addition, in order to reduce signaling overhead, the base station may also use the MAC control information, L1 signaling, or system information to dynamically indicate a default bandwidth part.

In addition, the RRC message (the RRCSetup message, the RRCResume message **1*f*-25, or the RRCReconfiguration message 1*f*-70**) may include configuration information for a cell group. The configuration information for the cell group may include some or multiple pieces of information among the following pieces of information, or may indicate a state, a procedure, or application or release of the configuration information for each cell group.

- Cell group identifier (e.g., index) indicating a cell group
- Indicator (e.g., activated state, suspended state, or deactivated state) indicating the state of a cell group
- Indicator indicating the state of a cell group (e.g., an indicator (e.g., cell group (SCG) suspension indicator) that suspends (or deactivates) the cell group or an indicator (e.g., cell group (SCG) resumption indicator) that resumes (or activates) the cell group)
- Indicator (e.g., a PDCP reestablishment indicator, a PDCP data recovery indicator, an indicator that triggers a new procedure, an RLC reestablishment indicator, a MAC layer device initialization indicator, or a MAC layer device partial initialization indicator) that triggers a procedure of a protocol layer device (e.g., SDAP layer device, PDCP layer device, RLC layer device, or MAC layer device) corresponding to the indicator indicating the state of the cell group
- In a case where an indicator that suspends (or deactivates) the state of a cell group is included, second DRX configuration information (e.g., a monitoring interval or an activation interval (on duration) length, period, or offset) enabling PDCCH monitoring having a very long period in a PSCell of the cell group may be configured. For example, when the indicator that suspends a cell group is received, the terminal may apply the second DRX configuration information to perform PDCCH monitoring, based on a very long period so as to save terminal power. As another method, when the indicator that suspends a cell group is received, the terminal may apply bandwidth part configuration information for a PSCell of the cell group to activate or switch a downlink bandwidth part of the PSCell of the cell group to a dormant bandwidth part, and perform a terminal operation in a cell in which a dormant bandwidth part is activated, as proposed above in the disclosure. In addition, when the indicator that suspends a cell group is received, the terminal may deactivate all SCells configured in the cell group. As another method, when the indicator that suspends a cell group is received, the terminal may, for an SCell, among SCells configured in the cell group, in which a dormant bandwidth part is configured, activate or switch a downlink bandwidth part to the dormant bandwidth part, perform a terminal operation in a cell in which a dormant bandwidth part is activated, as proposed above in the disclosure, or deactivate an SCell in which a dormant bandwidth part is not configured. As another method, when an indicator that suspends a cell group is received through the RRC message, the terminal may activate each SCell, deactivate same, dormantize same, or perform activation of a dormant bandwidth part thereof according to configuration information or an indicator for each SCell of the cell group, included in the RRC message, or before or after the indicator that suspends the cell group is received, the terminal may activate each SCell of the cell group, deactivate same, dormantize same, or perform activation of a dormant bandwidth part thereof according to an indicator (e.g., bitmap) of a PDCCH, MAC control information, or an RRC message.

Configuration information (e.g., PUCCH transmission resource information of a PCell, a PUCCH SCell, or a PSCell) relating to a transmission resource on which a measurement result is to be reported after channel measurement is performed in a dormant bandwidth part or a bandwidth part other than a dormant bandwidth part In a case where an indicator that resumes (or activates) the state of a cell group is included, first DRX configuration information (e.g., a monitoring interval or an activation interval (on duration) length, period, or offset) enabling PDCCH monitoring to be performed again in a PSCell of the cell group may be configured. Alternatively, first DRX configuration information that has been stored for the cell group may be recovered and applied. For example, when the indicator that resumes a cell group is received, the terminal may resume data transmission or reception by performing PDCCH monitoring through application of the first DRX configuration information that is stored or is received from the RRC message. As another method, when the indicator that resumes a cell group is received, the terminal may apply bandwidth part configuration information for a PSCell of the cell group to activate or switch a downlink bandwidth part of the PSCell of the cell group to a bandwidth part (e.g., a bandwidth part configured by an RRC message) other than a dormant bandwidth part, and perform a terminal operation in a cell in which a normal bandwidth part (a bandwidth part other than a dormant bandwidth par) is activated, as proposed above in the disclosure. Alternatively, when the indicator that resumes a cell group is received, the terminal may apply random access configuration information (random access transmission resource information (time or frequency transmission resource) or designated preamble information for preamble transmission) that is stored or is received from the RRC message, to trigger a random access procedure in a PSCell of the cell group. As another method, when the indicator that resumes a cell group is received, if the RRC message includes random access configuration information (random access transmission resource information (time or frequency transmission resource) or designated preamble information for preamble transmission), the terminal may apply the random access configuration information to trigger a random access procedure (e.g., a contention-free random access procedure (contention-free random access)) in a PSCell of the cell group. If an RRC message indicating resumption or activation of the cell group does not include random access configuration information (random access transmission resource information (time or frequency transmission resource) or designated preamble information for preamble transmission), the terminal may trigger a random access procedure (e.g., a contention-based random access procedure (contention-based random access)) in a PSCell of the cell group, or may trigger a random access procedure (contention-based random access or 2-step random access), based on system information. If there is random access configuration information (random access transmission resource information (time or frequency transmission resource) or designated preamble information for preamble transmission) that has been stored in the terminal before the indicator that resumes a cell group is received, the terminal may release or discard the same information. As another example, the terminal may perform PDCCH monitoring in a cell group or a cell indicated or configured above, and trigger and perform a random access procedure according to an indication indicated by a PDCCH.

In a case where the indicator that resumes (or activates) the state of a cell group is included, or when the indicator that resumes a cell group is received, the terminal may activate all SCells configured in the cell group. As another method, when the indicator that resumes a cell group is received, the terminal may, for an SCell, among SCells configured in the cell group, in which a dormant bandwidth part is configured, activate or switch a downlink bandwidth part to a bandwidth part (e.g., a bandwidth part configured by an RRC message or a first active bandwidth part) other than the dormant bandwidth part, perform a terminal operation in a cell in which a bandwidth part other than a dormant bandwidth part is activated, as proposed above in the disclosure, or activate an SCell in which a dormant bandwidth part is not configured. As another method, when an indicator that resumes a cell group is received through the RRC message, the terminal may activate each SCell, deactivate same, dormantize same, or perform activation of a dormant bandwidth part thereof according to configuration information or an indicator for each SCell of the cell group, included in the RRC message, or before or after the indicator that resumes the cell group is received, the terminal may activate each SCell of the cell group, deactivate same, dormantize same, or perform activation of a dormant bandwidth part thereof according to an indicator (e.g., bitmap) of a PDCCH, MAC control information, or an RRC message.

Indicator that adds a cell group configuration

Indicator that releases a cell group configuration

Security configuration information (security key information, security key information for cell group, or additional information (e.g., sk-counter))

Indicator indicating handover, cell group addition, or cell group change (e.g., ReconfigurationWithSync indicator or mobilitycontrolInfo indicator)

First channel measurement configuration information for each cell or each bandwidth part Second channel measurement configuration information for each cell or each bandwidth part Indicator that adds a cell group configuration, indicator (ReconfigurationWithSync) indicating a cell group change, or indicator (ReconfigurationWithSync or newly defined indicator) indicating a random access procedure Indicator (ReconfigurationWithSync or newly defined indicator) indicating whether to activate a cell group by performing a random access procedure or activate the cell group without the random access procedure when the cell group is activated Radio resource management (RRM) configuration information or frequency measurement configuration information, or separate radio resource management (RRM) configuration information or frequency measurement configuration information (e.g., frequency measurement configuration information (reduced or relaxed RRM configuration information) simplified for battery conservation) which is to be applied or is required to be performed when a cell group is deactivated)

Configuration information for radio link monitoring (RLM) or configuration information for RLM which is to be applied or is required to be performed when a cell group is deactivated. For example, the configuration information is configuration information of a beam for each cell or configuration information of a beam for each bandwidth part, which is required to be measured by the terminal when a cell group is deactivated, may include beam-related configuration information (transmission configuration indication (TCI) state or quasi co-location (QCL)), may include a timing advance (TA) value (or offset value), a timer (time alignment timer (TAT)) indicating the validity of the TA value, or a timer value (TAT value) for synchronization of a downlink signal of the base station or an uplink signal of the base station, or may include synchronization signal block (SSB) configuration information, channel state information reference signal (CSI-RS) configuration information, or reference signal (RS) configuration information indicating a subject required to be measured, or transmission resource information (e.g., PUCCH configuration information (e.g., scheduling request (SR) information or particular transmission resource), frequency transmission resource, or time transmission resource) for reporting a result when beam failure occurs. In addition, the configuration information may include bandwidth part configuration information (e.g., this may be indicated by a bandwidth part identifier) indicating which bandwidth part in which an RLM procedure is to be performed. As another method, when the state of a cell group is a deactivated state, the terminal may perform an RLM procedure in a first active bandwidth part (or a first active downlink bandwidth part, firstActiveDownlinkBWP-ID) configured by the RRC message, to early monitor the first active bandwidth part required to be activated when the cell group is activated, so as to minimize delays in cell group activation. As another method, in a case where the state of a cell group is configured as a deactivated state (or activated state), the terminal may perform an RLM procedure in a bandwidth part lastly (or previously) activated before the cell group state becomes deactivated, to continuously maintain a connection with the cell group (e.g., in a case where bandwidth part configuration information indicating which bandwidth part in which the RLM procedure is to be performed is not configured), or when the cell group is activated, the terminal may perform an activation procedure in a first active bandwidth part (or a first active downlink bandwidth part, firstActiveDownlinkBWP-ID) configured by an RRC message. When a cell group is activated, if bandwidth part related configuration information indicating which bandwidth part in which an RLM procedure is to be performed is not configured, the terminal may also perform the RLM procedure in the lastly (or previously) activated bandwidth part. In addition, the configuration information may include beam-related configuration information (e.g., this may be indicated by a bandwidth part identifier, a TCI state, or QCL configuration information) indicating which beam in which an RLM procedure is to be performed. As another method, when the state of a cell group is a deactivated state, the terminal may perform an RLM procedure in a beam (e.g., TCI state or QCL configuration information) configured by the RRC message, or may activate the beam, perform the RLM procedure, and early monitor the beam required to be activated when the cell group is activated, so as to minimize delays in cell group activation. As another method, in a case where the state of a cell group is configured as a deactivated state (or activated state), the terminal may perform an RLM procedure in a beam lastly (or previously) activated before the cell group state becomes deactivated, to continuously maintain a connection with the cell group (e.g., in a case where beam-related configuration information indicating which beam in which the RLM procedure is to be performed is not configured), or when the cell group is activated, the terminal may perform an activation procedure in a beam configured by an RRC message. When a cell group is activated, if beam-related configuration information indicating which beam in which an RLM procedure is to be performed is not configured, the terminal may also perform the RLM procedure in the lastly (or previously) activated beam.

Configuration information for a beam failure detection procedure or beam failure detection (BFD) or configuration information for BFD which is to be applied or is required to be performed when a cell group is deactivated. For example, the configuration information is configuration information of a beam for each cell or configuration information of a beam for each bandwidth part, which is required to be measured by the terminal when a cell group is deactivated, may include beam-related configuration information (transmission configuration indication (TCI) state or quasi co-location (QCL)), may include a timing advance (TA) value (or offset value), a timer (time alignment timer (TAT)) indicating the validity of the TA value, or a timer value (TAT value) for synchronization of a downlink signal of the base station or an uplink signal of the base station, or may include synchronization signal block (SSB) configuration information, channel state information reference signal (CSI-RS) configuration information, or reference signal (RS) configuration information indicating a subject required to be measured, or transmission resource information (e.g., PUCCH configuration information (e.g., scheduling request (SR) information or particular transmission resource), frequency transmission resource, or time transmission resource) for reporting a result when beam failure occurs. In addition, the configuration information may include bandwidth part configuration information (e.g., this may be indicated by a bandwidth part identifier) indicating which bandwidth part in which a beam failure detection procedure is to be performed. As another method, when the state of a cell group is a deactivated state, the terminal may perform a beam failure detection procedure in a first active bandwidth part (or a first active downlink bandwidth part, firstActiveDownlinkBWP-ID) configured by the RRC message, to early monitor the first active bandwidth part required to be activated when the cell group is activated, so as to minimize delays in cell group activation. As another method, in a case where the state of a cell group is configured as a deactivated state (or activated state), the terminal may perform a beam failure detection procedure in a bandwidth part lastly (or previously) activated before the cell group state becomes deactivated, to continuously maintain a connection with the cell group (e.g., in a case where bandwidth part configuration information indicating which bandwidth part in which the beam failure detection procedure is to be performed is not configured), or when the cell group is activated, the terminal may perform an activation procedure in a first active bandwidth part (or a first active downlink bandwidth part, firstActiveDownlinkBWP-ID) configured by an RRC message. When a cell group is activated, if bandwidth part-related configuration information indicating which bandwidth part in which a beam failure detection procedure is to be performed is not configured, the terminal may also perform the beam failure detection procedure in the lastly (or previously) activated bandwidth part. In addition, the configuration information may include beam-related configuration information (e.g., this may be indicated by a bandwidth part identifier, a TCI state, or QCL configuration information) indicating which beam in which a beam failure detection procedure is to be performed. As another method, when the state of a cell group is a deactivated state, the terminal may perform a beam failure detection procedure in a beam (e.g., TCI state or QCL configuration information) configured by the RRC message, to early monitor the beam required to be activated when the cell group is activated, so as to minimize delays in cell group activation. As another method, in a case where the state of a cell group is configured as a deactivated state (or activated state), the terminal may perform a beam failure detection procedure in a beam lastly (or previously) activated before the cell group state becomes deactivated, to continuously maintain a connection with the cell group (e.g., in a case where beam-related configuration information indicating which beam in which the beam failure detection procedure is to be performed is not configured), or when the cell group is activated, the terminal may perform an activation procedure in a beam configured by an RRC message. When a cell group is activated, if beam-related configuration information indicating which beam in which a beam failure detection procedure is to be performed is not configured, the terminal may also perform the beam failure detection procedure in the lastly (or previously) activated beam.

The message introduces a first timer (e.g., T304), a second timer (e.g., T310), a third timer (e.g., T312), or a fourth timer (e.g., a timer for fallback) to efficiently perform a DC configuration procedure (or SCG configuration procedure) or a handover procedure, and the timer may be configured by the message. The disclosure proposes driving and applying the timers in a DC configuration procedure or a handover procedure. The first timer (e.g., T304) is a timer for determining whether a DC configuration procedure or a handover procedure has been successfully performed, the second timer (e.g., T310) is a timer for determining whether a radio link is valid, and the third timer (e.g., T312) is an auxiliary timer for determining whether a radio link is valid and a timer for triggering a frequency measurement procedure and reporting a frequency measurement result. The fourth timer (e.g., a timer for fallback) is a timer introduced to, when activating a cell group (or SCG or PSCell) without a random access procedure proposed in the disclosure fails (i.e., when the timer has expired), perform a procedure of fallback to a random access procedure (e.g., a normal random access procedure (4-step random access procedure or 2-step random access procedure)) to attempt to activate the cell group. The fourth timer may be the first timer, and the first timer may be used as a timer for fallback.

The disclosure proposes that, if the RRC message (e.g., RRCReconfiguration) includes an indicator that suspends (or deactivates) a cell group, the RRC message does not include an indicator indicating handover, cell group addition, or cell group change (e.g., ReconfigurationWithSync indicator or mobilitycontrolInfo indicator), and if the RRC message includes an indicator that resumes a cell group or configuration information that configures same, the RRC message includes an indicator indicating handover, cell group addition, or cell group change (e.g., ReconfigurationWithSync indicator or mobilitycontrolInfo indicator). This is because, when a cell group is resumed, a connection with the cell group is required to be performed again, and thus synchronization, reception of system information, or a random access procedure if necessary is required. For example, in a case where a cell group of the terminal is configured through an RRC message by the base station as being in a deactivated state, the base station may restrict configuration of the cell group addition indicator, the cell group change indicator, the indicator indicating a random access procedure, or the ReconfigurationWithSync indicator so as to prevent the terminal from performing an unnecessary synchronization procedure, connection procedure, or random access procedure.

The following description of the disclosure specifically proposes a dormant bandwidth part in a next-generation mobile communication system is newly proposed, and a terminal operation in each bandwidth part when the bandwidth part is transitioned or switched.

Figure 1G:
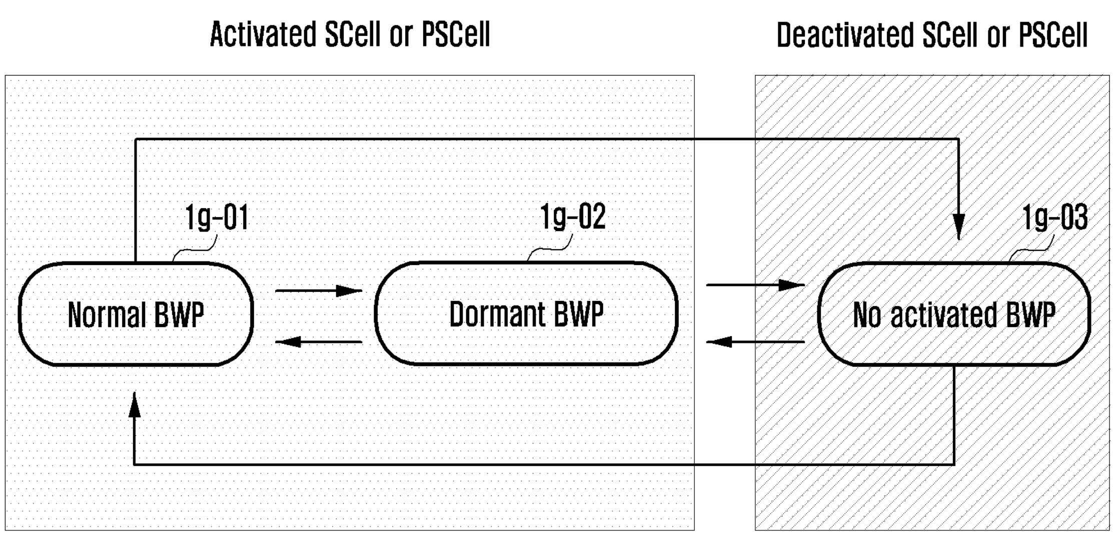
FIG. 1G is a diagram illustrating a procedure of bandwidth part-specific state transition or bandwidth part switching according to an embodiment of the disclosure.

FIG. 1G is a diagram illustrating a procedure of bandwidth part-specific state transition or bandwidth part switching according to an embodiment of the disclosure.

As illustrated in FIG. 1G, a bandwidth part of each cell (e.g., SCell or PSCell) of each cell group of a terminal may be activated to a normal bandwidth part (1*g*-01), activated to a dormant bandwidth part (1*g*-02), or deactivated (1*g*-03). A normal bandwidth part or a dormant bandwidth part may be activated or deactivated according to an indication using configuration information of an RRC message, MAC control information, or DCI of a PDCCH.

An operation (activation, deactivation, or dormantization) of state transition for each bandwidth part of a cell, or an operation of activating a normal bandwidth part, activating a dormant bandwidth part, activating a first active bandwidth part activated from dormant, or deactivating a normal bandwidth part or a dormant bandwidth part, proposed in the disclosure, may be performed by an indication or configuration in the following cases.

When the state of a bandwidth part of a cell is configured by an RRC message, when a bandwidth part of each cell is configured by an RRC message and a dormant bandwidth part is configured in the cell, or when a first active bandwidth part is configured as a dormant bandwidth part, switching or activating to the dormant bandwidth part may be performed to start the cell and an operation in the dormant bandwidth part may be performed.

When a cell activation, deactivation, or dormantization MAC CE is received

- When a MAC CE which activates or deactivates a normal bandwidth part, a first active bandwidth part activated from dormant, or a dormant bandwidth part is received
- When DCI of a PDCCH which activates, deactivates, or switches a normal bandwidth part, a first active bandwidth part activated from dormant, or a dormant bandwidth part is received
- When a cell dormantization timer is not configured for an activated state cell, and a configured cell inactivity timer has expired
- When a bandwidth part dormantization timer is not configured for an activated state bandwidth part, and a configured bandwidth part state inactivity timer (e.g., bwpInactivityTimer) has expired In addition, a state transition operation or a dormant bandwidth part operation method proposed in the disclosure may have the following features.

- In an SpCell (PCell or PSCell) (or a downlink bandwidth part or an uplink bandwidth part of the cell), a dormant bandwidth part is unable to be configured and only a normal bandwidth part is configured and is always activated. Since, in an SpCell, synchronization is performed and main control signals are transmitted and received, if a bandwidth part of an SpCell becomes dormant or deactivated or is operated as a dormant bandwidth part, a connection with a base station is disrupted, and thus an SpCell is required to be always maintained at an activated state.
- Even for an SCell or a bandwidth part of an SCell, if a PUCCH is configured, a dormant state or a dormant bandwidth part are unable to be configured. There may be another cell in which a feedback, such as HARQ ACK/NACK, is required to be transmitted through a PUCCH, and thus an activated state or a normal bandwidth part is required to be activated and used.
- Due to the above features, a cell inactivity timer (ScellDeactivationTimer) or a bandwidth part dormantization timer is not applied to an SpCell or a bandwidth part of an SpCell or an SCell, in which a PUCCH is configured, or a bandwidth part of the SCell and may be driven only for other SCells.
- A cell or bandwidth part dormantization timer (ScellHibernationTimer) takes precedence over a cell or bandwidth part state inactivity timer (ScellDeactivationTimer). If one value is configured as a timer value by an RRC message, the same value may be applied to all cells. As another method, a different timer value may be configured for each SCell or each BWP by a base station by considering a characteristic of each SCell or each BWP.
- If a cell or bandwidth part is not indicated to be activated or dormantized by an RRC message, the cell or bandwidth part may initially operate in a deactivated state in default.

In the disclosure, uplink may indicate an uplink bandwidth part, and downlink may indicate a downlink bandwidth part. This is because operation of only one activated or dormantized bandwidth part is possible for each uplink or downlink.

In the disclosure, when an activated state, a deactivated state, or a dormant state is operated and a cell or a bandwidth part is transitioned or switched, the transition and switching is performed in a unit of a bandwidth part, and when state transition or switching occurs in the unit of the bandwidth part, a bandwidth part (downlink bandwidth part or uplink bandwidth part) indicated to be subject to state transition or switching performs the state transition or switching according to a state transition or switching indication. For example, if a bandwidth part (downlink or uplink bandwidth part) is transitioned from an activated state to a dormant state, or is switched (activated) to a dormant bandwidth part, the bandwidth part may be transitioned to a dormant state or be switched (or activated) to a dormant bandwidth part.

In the disclosure, bandwidth part switching (BWP switching) means that, when bandwidth part switching is indicated by DCI of a PDCCH, if the switching is indicated by a bandwidth part identifier while allocating a downlink assignment, a downlink bandwidth part is switched to a bandwidth part indicated by the bandwidth part identifier, and when bandwidth part switching is indicated by DCI of a PDCCH, if the switching is indicated by a bandwidth part identifier while allocating a UL grant, an uplink bandwidth part is switched to a bandwidth part indicated by the bandwidth part identifier. Furthermore, a DCI format of a PDCCH is different as a format (format 1) for downlink assignment and a format (format 0) for a UL grant, and thus a terminal operation follows the DCI format without describing uplink and downlink separately.

A method of operating state transition in a unit of a bandwidth part (bandwidth part level) and an operation of a bandwidth part according to each state, proposed above in the disclosure, may be expanded and applied to various embodiments. The following description of the disclosure relates to specific embodiments for expanding and applying the contents proposed in the disclosure.

Figure 1H:
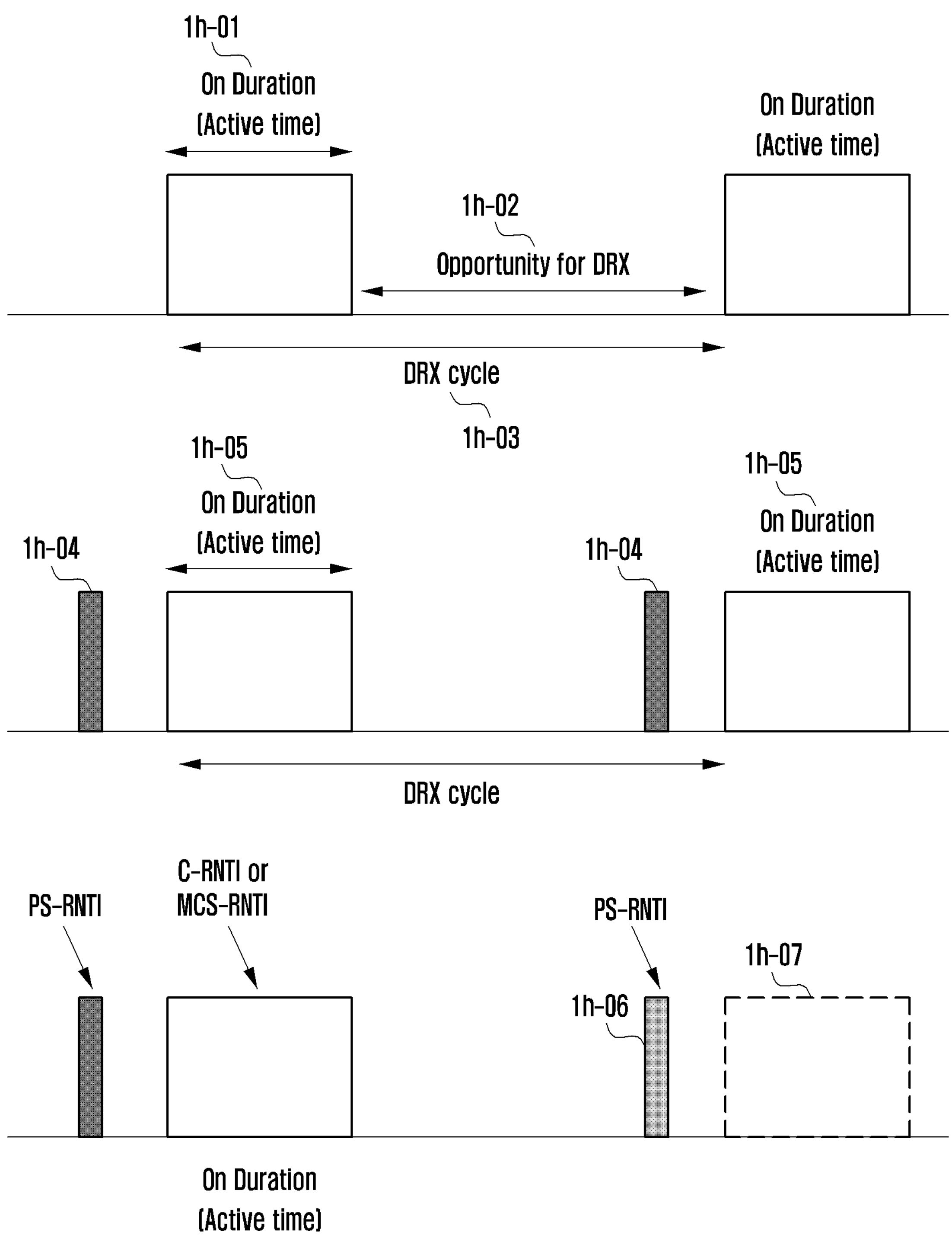
FIG. 1H is a diagram illustrating a DRX configuration or DRX operation method enabling conservation of a terminal battery according to an embodiment of the disclosure.

FIG. 1H is a diagram illustrating a DRX configuration or DRX operation method enabling conservation of a terminal battery according to an embodiment of the disclosure.

In FIG. 1H, a base station may configure, for a terminal, a DRX function including a DRX cycle, a start point, an offset, or on-duration (activation interval or active time) with respect to a PCell, SCell, or PSCell by using an RRC message as illustrated in FIG. 1F. In the disclosure, configuring the DRX function for a PCell, SCell, or PSCell is considered.

As described above, when the DRX function is configured for the PCell (or SCell or PSCell), the terminal may apply the DRX function by considering a DRX cycle 1*h*-03 and a DRX start time or offset. When the DRX function is applied, the terminal may monitor a PDCCH or DCI of a PDCCH, which may be received from the base station in the PCell, only in the active time interval (on-duration or active time) 1*h*-01 of DRX. In addition, the terminal may not be allowed to monitor a PDCCH or DCI of a PDCCH outside the active time interval of the DRX function (for outside active time 1*h*-02), so as to reduce battery consumption of the terminal.

In FIG. 1F, the base station may configure a power saving function (power saving mode) for the terminal by using an RRC message so as to further reduce battery consumption of the terminal. If the power saving function is configured together with the DRX function, the terminal monitors a PDCCH, outside the active time interval, for a short time interval 1*h*-04 configured by RRC before the active time 1*h*-01 for which the terminal is required to monitor a PDCCH according to the DRX function, and monitors and receives a wake up signal (WUS) outside the active time interval. The base station may use a bit of DCI of a PDCCH of the WUS to indicate whether the terminal is required to perform PDCCH monitoring or is not required to perform same for a next active time 1*h*-05 or 1*h*-07.

That is, the terminal, for which the power saving function or the DRX function is configured, may monitor a WUS for a short time interval 1*h*-04 or 1*h*-06 configured by an RRC message every before the active time 1*h*-05 or 1*h*-07, and if a value of a bit of DCI of a PDCCH relating to the next active time 1h-05 or 1h-07 in the received WUS is 0 (or 1) (1h-06), this may indicate the terminal not to monitor a PDCCH for the next active time 1h-07, or indicate the terminal not to monitor a PDCCH by preventing a MAC layer device from driving a timer corresponding to the next active time. If a value of a bit of DCI of a PDCCH relating to the next active time 1h-05 or 1h-07 in the received WUS is 1 (or 0) (1h-04), this may indicate the terminal to monitor a PDCCH for the next active time 1h-05, or indicate the terminal to monitor a PDCCH by allowing a MAC layer device to drive a timer corresponding to the next active time.

In addition, the terminal may not monitor a WUS or a PDCCH for WUS detection in the active time interval.

In addition, when the terminal, for which the power saving function or the DRX function is configured, monitors a WUS for the short time interval 1h-04 configured by an RRC message every before the active time 1h-05, the terminal may detect a signal by identifying a PDCCH by using a first RNTI identifier (e.g., PS-RNTI). The first RNTI identifier (e.g., PS-RNTI) may be configured for multiple terminals, and the base station may use the first RNTI identifier (e.g., PS-RNTI) to indicate, at once, the multiple terminals to monitor or not monitor a PDCCH in the next active time interval.

In addition, when the terminal, for which the power saving function or the DRX function is configured, monitors and detects a PDCCH for the active time 1h-05, the terminal may detect a signal, based on a second RNTI identifier (e.g., C-RNTI), a third RNTI (e.g., MCS-C-RNTI), or a fourth RNTI (SPS-C-RNTI or CS-RNTI) uniquely configured for the terminal by an RRC message. The second RNTI (e.g., C-RNTI) may be used to indicate general scheduling of the terminal, the third RNTI (e.g., MCS-C-RNTI) may be used to indicate a modulation and coding scheme of the terminal, and the fourth RNTI (SPS-C-RNTI or CS-RNTI) may be used to indicate periodic transmission resources of the terminal.

Based on the method proposed above in FIG. 1H, the base station may use DCI of a PDCCH to indicate to activate, deactivate, or dormantize the state of a cell or cell group of the terminal for the active time 1h-05 or the short time interval 1h-04 configured by an RRC message. In addition, the terminal may perform a PDCCH monitoring procedure to receive an indication for the state of the cell or cell group for the active time 1h-05 or the short time interval 1h-04 configured by the RRC message. In a case where DC is configured for the terminal, the terminal may monitor a PDCCH for the active time 1h-05 or the short time interval 1h-04 configured by the RRC message in a PCell of an MCG, may receive, through DCI of the PDCCH, an indication related to an activated, deactivated, or dormant state for a cell (SCell) of the MCG or a PSCell (or SCell) of an SCG, and may perform a cell (or bandwidth part) activation procedure, deactivation procedure, or dormantization procedure, or a bandwidth part switching procedure according to the indication. That is, the base station may indicate, for the terminal, an activated, deactivated, or dormant state for a cell (SCell) of an MCG or a PSCell (or SCell) of an SCG by using DCI of a PDCCH in a PCell of the MCG in the active time 1h-05 or the short time interval 1h-04 configured by the RRC message.

Figure 1I:
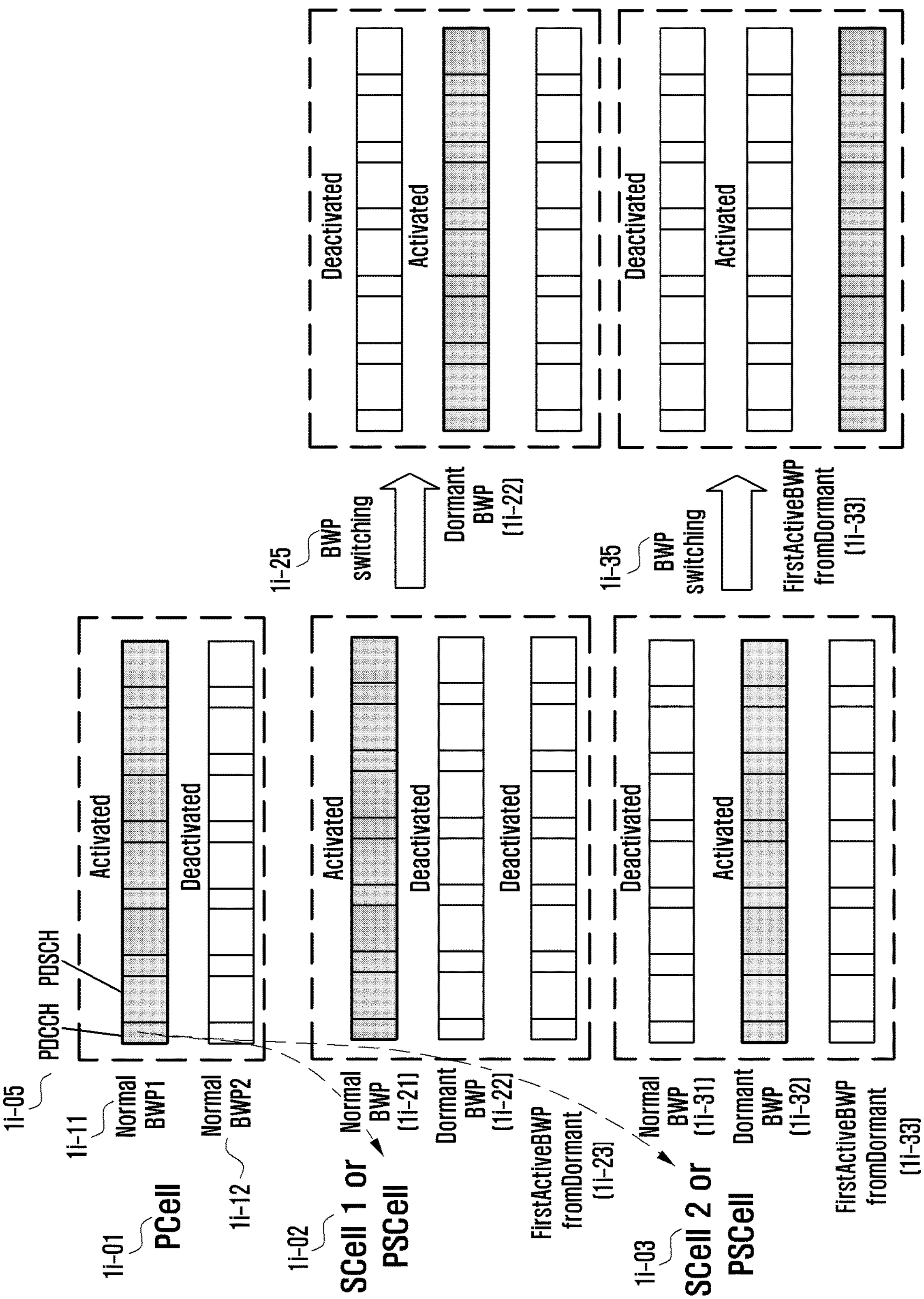
FIG. 1I is a diagram illustrating a concept of a method of operating a dormant bandwidth part in an activated SCell or PSCell according to an embodiment of the disclosure.

FIG. 1I is a diagram illustrating a concept of a method of operating a dormant bandwidth part in an activated SCell or PSCell according to an embodiment of the disclosure.

As shown in FIG. 1F, a base station may, for CA, configure multiple SCells and assign each SCell identifier for a terminal by using an RRC message and configure a dormant bandwidth part for each SCell, or may configure, for DC, multiple cell groups and assign each cell group identifier, and configure or indicate a cell group suspension indicator for each cell group or a PSCell in each cell group, and configure a dormant bandwidth therefor. In addition, the multiple SCells may be configured to be included in each SCell group, and one SCell group may include multiple SCells. An SCell group identifier may be assigned to each SCell group, and multiple SCell identifiers may be configured to be included in or mapped to each SCell group identifier. An SCell identifier value or an SCell group identifier value may be allocated by a predetermined bit value, and may be an integer value (or natural number value). Alternatively, a PSCell of each cell group may be indicated by a cell group identifier.

In FIG. 1I, the base station may define a new bitmap in DCI of a PDCCH transmitted in a PCell and map each bit value of the bitmap to indicate an SCell identifier value, an SCell group identifier value, a cell group (or secondary cell group) identifier, or a PSCell (or SCell) of a cell group (or secondary cell group), and may define a value of each bit to indicate whether to switch to a dormant bandwidth part, to activate a dormant bandwidth part, or to suspend or resume a cell group for the SCell, the SCells belonging to the SCell group, the cell group (or secondary cell group), or the PSCell (or SCell) of the cell group (or secondary cell group), which corresponds to the bit. In addition, the base station may also indicate whether to switch from a dormant bandwidth part to a normal bandwidth part (e.g., a first active bandwidth part activated from dormant) or to activate a normal bandwidth part (e.g., a first active bandwidth part activated from dormant) for the SCell, the SCells belonging to the SCell group, the cell group (or secondary cell group) identifier, or the PSCell (or SCell) of the cell group (or secondary cell group), which corresponds to the bit.

In FIG. 1I, the terminal may receive DCI of a PDCCH in a PCell 1i-01 (1i-05), and read the DCI to identify whether the DCI contains a bitmap including an indication (e.g., this switches or activates to a dormant bandwidth part or switches or activates to a normal bandwidth part) for a bandwidth part of SCells or SCell groups, or an indication that suspends or resumes a cell group (or secondary cell group) or a PSCell (or SCell) of a cell group (or secondary cell group). If the bitmap is contained, the terminal may switch or activate a bandwidth part or suspend or resume a cell group for an SCell, SCells 1i-02 and 1i-03 belonging to an SCell group, a cell group (or secondary cell group), or a PSCell (or SCell) of a cell group (or secondary cell group), which is indicated by each bit of the bitmap, according to the value of the bit. For example, if a bit of the bitmap indicates a first SCell (or a first SCell identifier 1i-02), a cell group (or secondary cell group), or a PSCell (or SCell) of a cell group (or secondary cell group) or indicates an SCell group (or SCell group identifier) including the first SCell and the value of the bit is 0 (or 1), the terminal may, for the first SCell 1i-02, the cell group (or secondary cell group), or the PSCell (or SCell) of the cell group (or secondary cell group), activate a bandwidth part 1i-21 to a dormant bandwidth part 1i-22, switch the current bandwidth part 1i-21 to the dormant bandwidth part 1i-22, or if the current bandwidth part is not a dormant bandwidth part, switch or activate the current activated bandwidth part 1i-21 to the dormant bandwidth part 1i-22 (1i-25) or suspend or deactivate the cell group. As another method, the terminal may maintain a bandwidth part of the cell group (or secondary cell group) or the PSCell (or SCell) of the cell group (or secondary cell group) without change, apply second DRX configuration information or second SRS configuration information, proposed above in the disclosure, and perform PDCCH monitoring according to a long period or perform SRS transmission according to a long period so as to reduce power consumption of the terminal.

In FIG. 1I, the terminal may receive DCI of a PDCCH in the PCell **1*i*-01, and read the DCI to identify whether the DCI contains a bitmap including an indication (e.g., this switches or activates to a dormant bandwidth part or switches or activates to a normal bandwidth part) for a bandwidth part of SCells or SCell groups, an indication for a bandwidth part of a cell group (or secondary cell group) or a PSCell (or SCell) of a cell group (or secondary cell group), or an indication that suspends or resumes a cell group. If the bitmap is contained, the terminal may switch or activate a bandwidth part or suspend or resume a cell group for an SCell, SCells 1*i*-02 and 1*i*-03 belonging to an SCell group, a cell group (or secondary cell group), or a PSCell (or SCell) of a cell group (or secondary cell group), which is indicated by each bit of the bitmap, according to the value of the bit. For example, in a case where a bit of the bitmap indicates a second SCell (or a second SCell identifier 1*i*-03) or indicates an SCell group (or SCell group identifier) including the second SCell, a cell group (or secondary cell group), or a PSCell (or SCell) of a cell group (or secondary cell group) and the value of the bit is 1 (or 0), if, for the second SCell 1*i*-03, a currently activated bandwidth part is a dormant bandwidth part 1*i*-32, a currently activated bandwidth part is not a normal bandwidth part, or a current bandwidth part (or cell) has been activated and the current bandwidth part has been activated to the dormant bandwidth part 1*i*-32 (or activated to a bandwidth part other than a normal bandwidth part), the terminal may switch or activate a bandwidth part of the second SCell 1*i*-03 to a bandwidth part (e.g., a first active bandwidth part 1*i*-33 activated from dormant) configured by an RRC message (1*i*-35**), or may resume or activate the cell group. In a case where the value of a bit is 1 (or 0) and thus an SCell, SCells belonging to an SCell group, a cell group (or secondary cell group), or a PSCell (or SCell) of a cell group (or secondary cell group), which is indicated by the bit, is required to be switched or activated to a bandwidth part other than a dormant bandwidth part, or the cell group is required to be resumed, if the state of the SCell or each SCell belonging to the SCell group is a deactivated state or the state of the SCell is an activated state and an activated bandwidth part is not a dormant bandwidth part (or is a normal bandwidth part), the terminal may not apply, neglect, or not read the value of the bit, or if the cell group (or secondary cell group) or the PSCell (or SCell) of the cell group (or secondary cell group) is already in an activated state or a resumed state, the terminal may not apply, neglect, or not read the value of the bit. In addition, in a case where the value of a bit is 0 (or 1) and thus an SCell, SCells belonging to an SCell group, a cell group (or secondary cell group), or a PSCell (or SCell) of a cell group (or secondary cell group), which is indicated by the bit, is required to be switched or activated to a dormant bandwidth part, or the cell group is required to be suspended, if the state of the SCell or each SCell belonging to the SCell group is an activated state and an activated bandwidth part is a dormant bandwidth part, the terminal may not apply, neglect, or not read the value of the bit, or if the cell group (or secondary cell group) or the PSCell (or SCell) of the cell group (or secondary cell group) is already in a suspended state or a deactivated state, the terminal may not apply, neglect, or not read the value of the bit.

The following description of the disclosure proposes methods enabling a cell (SCell, PSCell, or SCell) to be quickly activated when the cell is activated.

Specifically, a base station may configure first channel measurement configuration information enabling a terminal to quickly measure and report a channel when activating a cell, by using an RRC message (RRCReconfiguration or RRCResume). The first channel measurement configuration information may include configuration information, such as a period of a frequent channel measurement signal (e.g., a radio resource, a temporary reference signal (TRS), a synchronization signal block (SSB), a channel state information reference signal (CSI-RS), or a reference signal (RS)), transmission resource information (a frequency or time transmission resource on which the frequent channel measurement signal is transmitted) on a transmission resource on which the signal is transmitted, an interval, a count (the count of the frequent channel measurement signal being transmitted), a timer value (a time at which the frequent channel measurement signal is transmitted), a time interval (an interval for which the frequent channel measurement signal is transmitted (e.g., an offset in a time unit (slot, subframe, or symbol)), or a transmission resource, a period, an interval, a timing, or an offset required when a terminal reports a measurement result, so as to enable a base station to temporarily transmit a large or frequent number of the channel measurement signals so that fast channel measurement is possible in a cell in configuration information of the cell (PCell, PSCell, or SCell) in the cell group to quickly activate the cell or cell group. The first channel measurement configuration information may configure a short reporting period (or transmission resource) according to which the terminal may report a channel measurement result, or may configure a transmission resource for channel measurement so as to enable the base station to transmit a large or frequent number of many channel measurement signals (or a transmission resource (e.g., a radios resource or a temporary reference signal (TRS))) to support fast channel measurements or many signal measurements by the terminal. The first channel measurement configuration information may include configuration information on a signal for channel measurement for a particular terminal (or terminals), the signal being transmitted by a base station in the cell or bandwidth part. In addition, the first channel measurement configuration information may be differently configured for each cell or bandwidth part with respect to multiple cells or bandwidth parts configured by the RRC message, and may configure, together, beam-related configuration information (transmission configuration indication (TCI) state or quasi co-location (QCL)), such as beam direction, beam number, or beam location, to support the terminal to easily measure a transmission resource for channel measurement. In addition, a timing advance (TA) value (or offset value), a timer (time alignment timer (TAT)) indicating the validity of the TA value, or a timer value (TAT value) for synchronization of a downlink signal of a base station or an uplink signal of the base station may be configured in the first channel measurement configuration information so that channel measurement or channel measurement reporting is performed correctly. For example, the first channel measurement configuration information may include a period of the signal for channel measurement, a count of the transmitted signal, a duration for which the signal is transmitted, an offset for a time at which the signal is transmitted, a time interval between transmitted signals, a list of multiple transmittable signals for channel measurement, a time transmission resource (or frequency transmission resource) indicating the location of the transmitted signal, a transmission resource (time transmission resource or frequency transmission resource) on which a measurement result is to be reported, a period according to which a measurement result is to be reported, or beam-related configuration information (transmission configuration indication (TCI) state or quasi co-location (QCL)) for measuring the signals for channel measurement. In addition, the first channel measurement configuration information configured by an RRC message may include multiple pieces of channel measurement signal information, and an RRC message, a MAC CE, or DCI may be used to indicate beam configuration information or one piece of channel measurement signal information among the configured multiple pieces of channel measurement signal information, to cause a terminal to apply or use the indicated piece of channel measurement signal information or the indicated beam configuration information to perform channel measurement or perform channel measurement reporting. In the indicating method, mapping between each piece of channel measurement signal information configured above and a bitmap, an index, or an identifier may be defined and an indication may be performed based thereon. As another method, the RRC message or the MAC CE may be used to configure or indicate channel measurement signal information to cause a terminal to apply or use the configured (or indicated) channel measurement signal information to perform channel measurement or perform channel measurement reporting.

As another method, when first channel measurement configuration information is included in the RRC message and is configured for a terminal thereby, in a case where a state of a cell is configured as an activated state in the RRC message and thus activation of the cell is indicated by the RRC message, the first channel measurement configuration information may be applied or used to enable the terminal to quickly measure or report a channel so as to quickly activate the cell. For example, first channel measurement configuration information, channel measurement signal information, or beam-related configuration information, which may be applied in a case where a state of a cell is configured as an activated state in an RRC message and thus activation of the cell is indicated by the RRC message, may be configured in the RRC message as separate configuration information (a default configuration, channel measurement signal information (or beam-related configuration information) corresponding to identifier 0, or if only one piece of channel measurement signal information (or beam-related configuration information) is configured, the one piece of channel measurement signal information (or beam-related configuration information).

Configuration of first channel measurement configuration information proposed in the disclosure is possible only for downlink bandwidth part configuration information of each cell. That is, first channel measurement configuration information proposed in the disclosure may not be allowed to be configured for uplink bandwidth part configuration information of each cell. This is because that only when a terminal measures a channel for downlink first, the terminal is able to report a measurement result for the channel or a cell, then correctly receive a PDCCH, and follow an indication of a base station.

First channel measurement configuration information proposed in the disclosure is initially deactivated when being configured by an RRC message or after being handed over and, later, may be activated by MAC control information, DCI information of a PDCCH, or an RRC message proposed in the disclosure. As described above, in a case of configuration by an RRC message, an initial state is required to be a deactivated state to enable a base station to easily manage a cell state of a terminal or a procedure of performing channel measurement, and to enable the terminal to perform channel measurement at a precise timing relating to when or where to perform the channel measurement, without a problem of a processing delay of an RRC message.

In addition, the RRC message (RRCReconfiguration or RRCResume) may include second channel measurement configuration information, or the same information may be configured by the RRC message. The second channel measurement configuration information may include general channel measurement configuration information, such as a transmission resource, a period, a time interval, or a count of a channel measurement signal, or a transmission resource, a period, or a time interval for channel measurement reporting.

The following description of the disclosure proposes a structure of MAC control information (MAC control element) or an indication method thereof, by which, when first channel measurement configuration information or second channel measurement information is configured for a terminal by an RRC message as described above, while a cell is activated, the first channel measurement configuration information may be used to quickly measure a channel or report a measurement result and quickly activate the cell. For example, MAC control information (or RRC message) proposed in the disclosure may indicate which of multiple cells (SCells) configured by RRC is to be activated or deactivated, or if same indicates a cell to be activated, the MAC control information (or RRC message) may indicate which measurement signal information in first channel measurement configuration information, configured by an RRC message as described above, is to be applied, how to measure a signal (e.g., this may indicate how many times a signal transmission resource is to be measured, how many signals are to be transmitted, what time interval in which the signal is to be measured, what offset based on which a measurement time interval is to be determined, what period according to which the signal is to be measured, or what transmission resource on which the signal is to be measured), and how to perform reporting (e.g., this may indicate how many times a measurement result is to be reported, what time interval in which the measurement result is to be reported, or what offset based on which a measurement result report transmission resource is to be determined, what period according to which the measurement result is to be reported, or what transmission resource on which the measurement result is to be reported), thereby enabling the cell to be quickly activated based on the first channel measurement configuration information configured by the RRC message.

Figure 1J:
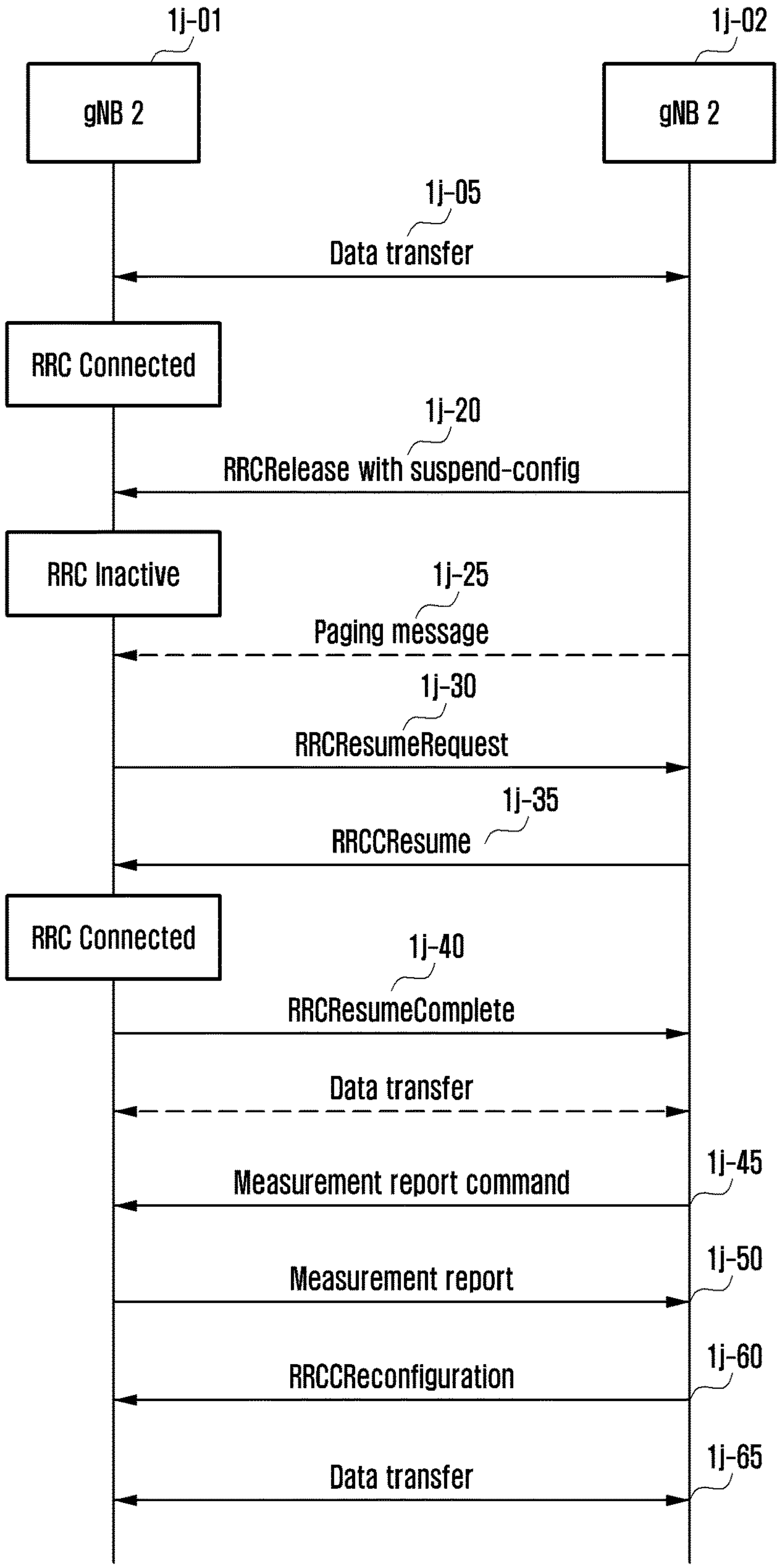
FIG. 1J is a diagram illustrating an embodiment of expanding and applying embodiments proposed in the disclosure to an RRC inactive mode terminal.

FIG. 1J is a diagram illustrating an embodiment of expanding and applying embodiments proposed in the disclosure to an RRC inactive mode terminal.

In the disclosure, a cell group or cell may indicate a PCell of a master cell group (MCG), an SCell of an MCG, a PSCell of a secondary cell group (SCG), or an SCell of an SCG.

The embodiment proposes that, even when a terminal transitions to an RRC inactive mode, the terminal does not release or discard and continuously stores pieces of SCell configuration information (e.g., pieces of configuration information described or proposed in FIG. 1F) or pieces of PSCell (or SCell) configuration information for a cell group (e.g., secondary cell group), which have been configured or stored for embodiments, proposed above as in FIG. 1F, in an RRC-connected mode. In addition, the embodiment proposes that the RRC inactive mode terminal determines whether to discard or release, maintain and apply, or reconfigure the stored SCell configuration information (e.g., pieces of configuration information described or proposed in FIG. 1F) or the stored pieces of PSCell (or SCell) configuration information for the cell group (e.g., secondary cell group), by using a reconfiguration procedure or an indicator of an RRCResume message or RRCReconfiguration message transmitted by a base station when an RRC connection resumption procedure is performed. In addition, when an RRCRelease message including a configuration or an indicator that transitions the terminal to an RRC inactive mode is transmitted to the terminal, the base station may include, in the RRCRelease message, and transmit, to the terminal, configuration information or an indicator indicating whether to discard or release, maintain and apply, or reconfigure the stored SCell configuration information (e.g., pieces of configuration information described or proposed in FIG. 1F) or the stored pieces of PSCell (or SCell) configuration information for the cell group (e.g., secondary cell group). In addition, when the terminal moves in the RRC inactive mode and performs a RAN notification area (RNA) update, the terminal may receive and apply, through the RRCRelease message transmitted to the terminal by the base station, configuration information or an indicator indicating whether to discard or release, maintain and apply, or reconfigure the stored SCell configuration information (e.g., pieces of configuration information described or proposed in FIG. 1F) or the stored pieces of PSCell (or SCell) configuration information for the cell group (e.g., secondary cell group).

In the embodiment proposed in the disclosure, the base station may allow a first active bandwidth part of bandwidth part configuration information of downlink or uplink of each cell to be configured as a dormant partial bandwidth in the SCell configuration information (e.g., pieces of configuration information described or proposed in FIG. 1F) or the pieces of PSCell (or SCell) configuration information for the cell group (e.g., secondary cell group) of the RRC message. Therefore, when the terminal activates each SCell, each cell group, or a PSCell of each cell group, the terminal is able to directly operate, as a dormant bandwidth part, a downlink bandwidth part or uplink bandwidth part of each SCell, each cell group, or the PSCell of each cell group, or is able to suspend or resume the cell group so as to reduce the battery consumption of the terminal.

As another method, in the embodiment proposed in the disclosure, the base station may not configure a first active bandwidth part of bandwidth part configuration information of downlink or uplink of each cell as a dormant partial bandwidth in the SCell configuration information (e.g., pieces of configuration information described or proposed in FIG. 1F) or the pieces of PSCell (or SCell) configuration information for the cell group (e.g., secondary cell group) of the RRC message. Therefore, when the terminal activates or resumes each SCell, each cell group, or a PSCell of each cell group, the terminal is able to always activate, to a first active bandwidth part, a downlink bandwidth part or uplink bandwidth part of each SCell, each cell group, or the PSCell of each cell group, and is able to switch or activate same to a dormant bandwidth part or to suspend or resume the cell group in the embodiments proposed in the disclosure, so as to reduce the battery consumption of the terminal.

Furthermore, the embodiment proposed above may be expanded and applied to each SCell configuration information or PSCell configuration information of a master cell group (MCG) or a secondary cell group (SCG) of a terminal for which dual connectivity (DC) has been configured. That is, when transitioning to an RRC inactive mode, the terminal may also store pieces of SCell configuration information or PSCell configuration information of an SCG, and when, as described above, an RRC connection resumption procedure is performed or the terminal is transitioned to an RRC inactive mode, an RRC message (e.g., RRCResume, RRCReconfiguration, or RRCRelease) may be used to include and transmit, to the terminal, configuration information or an indicator indicating whether to discard or release, maintain and apply, or reconfigure the stored SCell configuration information (e.g., pieces of configuration information described or proposed in FIG. 1F) or the stored PSCell configuration information of the MCG or SCG.

In FIG. 1J, a terminal **1*j*-01 may perform network connection with a base station 1*j*-02 and transmit or receive data therewith (1*j*-05). If the base station 1*j*-02 is required to transition the terminal 1*j*-01 to an RRC inactive mode for a predetermined reason, the base station 1*j*-02 may transmit an RRCRelease message 1*j*-20 to the terminal 1*j*-01 to be transitioned to the RRC inactive mode. The base station may include, in the RRC message (e.g., RRCRelease), and transmit, to the terminal 1*j*-01, configuration information or an indicator indicating whether to discard or release, maintain and apply, or reconfigure the stored SCell configuration information (e.g., pieces of configuration information described or proposed in FIG. 1F) of the MCG or SCG or the stored PSCell (or SCell) configuration information of the cell group (secondary cell group). In a case of the terminal 1*j*-01 applying DC, the base station 1*j*-02 may determine whether to suspend or resume a master cell group bearer configuration, RRC configuration information, or SCell configuration information of an MCG or SCG and may inquire of a secondary cell base station (not illustrated) whether to suspend or resume a secondary cell group bearer configuration and RRC configuration information, receive a response therefrom, and determine whether to suspend or resume same (1*j*-15). In addition, the base station 1*j*-02 may configure, through the RRCRelease message, a frequency list to be measured by the terminal 1*j*-01** in an RRC idle mode or RRC inactive mode, frequency measurement configuration information, or a duration for which frequency is to be measured.

When, while moving, the RRC inactive mode terminal **1*j*-01 receives a paging message (1*j*-25**), is required to transmit uplink data, or is required to update a RAN notification area, the terminal may perform an RRC connection resumption procedure.

If the terminal **1*j*-01 is required to configure a connection, the terminal may perform a random access procedure, and when the terminal transmits an RRCResumeRequest message to the base station 1*j*-02, a terminal operation proposed in relation to transmission of the message is as follows (1*j*-30**).

1. The terminal **1*j*-01** identifies system information, and if the system information indicates transmission of a full terminal connection resumption identifier (I-RNTI or full resume ID), the terminal prepares to transmit a stored full terminal connection resumption identifier (I-RNTI) by including same in the message. If the system information indicates transmission of a truncated terminal connection resumption identifier (truncated I-RNTI or truncated resume ID), the terminal configures a stored full terminal connection resumption identifier (I-RNTI) to be the truncated terminal connection resumption identifier (truncated resume ID) in a predetermined method, and prepares to transmit same by including same in the message.

2. The terminal **1*j*-01** recovers RRC connection setup information and security context information from stored terminal context.

3. The terminal **1*j*-01** updates a new KgNB security key corresponding to the master cell group, based on a current KgNB security key, a NextHop (NH) value, and an NCC value which has been received and stored from an RRCRelease message.

4. If the terminal **1*j*-01** has received an SCG-counter value (or sk-counter) from the RRCRelease message, the terminal updates a new SKgNB security key corresponding to the secondary cell group, based on a KgNB security key and the SCG-counter value (or sk-counter value).

5. The terminal **1*j*-01** derives new security (K_RRCenc, K_RRC_int, K_UPint, and K_UPenc) keys to be used in an integrity protection and verification procedure and an encryption and decryption procedure, by using the newly updated KgNB security key.

6. If the terminal **1*j*-01** has received an SCG-counter value (or sk-counter) from the RRCRelease message, the terminal derives new security keys (SK_RRCenc, SK_RRC_int, SK_UPint, and SK_UPenc) to be used in an integrity protection and verification procedure and an encryption and decryption procedure, by using the newly updated SKgNB security key corresponding to a secondary cell group.

7. The terminal **1*j*-10** calculates MAC-I and prepares to transmit same by including same in the message.

8. The terminal **1*j*-01** resumes SRB1 (the terminal is required to resume same in advance because the terminal will receive an RRCResume message through SRB1 as a response for the RRCResumeRequest message to be transmitted).

9. The terminal **1*j*-01** configures the RRCResumeRequest message and transfers same to a lower layer device.

10. The terminal **1*j*-01** applies the updated security keys and a previously configured algorithm for all bearers (MCG terminated RBs) except SRB0 corresponding to the master cell group, to resume an integrity protection and verification procedure and apply integrity verification and protection for pieces of data transmitted and received thereafter. (In order to increase reliability and security for pieces of data transmitted and received from SRB1 or DRBs later).

11. The terminal **1*j*-01** applies the updated security keys and a previously configured algorithm for all bearers (MCG terminated RBs) except SRB0 corresponding to the master cell group, to resume an encryption and decryption procedure and apply encryption and decryption for pieces of data transmitted and received thereafter. (In order to increase reliability and security for pieces of data transmitted and received from SRB1 or DRBs later).

12. If the terminal **1*j*-01** has received an SCG-counter value (or sk-counter) from the RRCRelease message, the terminal applies the updated security keys and a previously configured algorithm for all bearers (SCG terminated RBs) corresponding to the secondary cell group, to resume an integrity protection and verification procedure and apply integrity verification and protection for pieces of data transmitted and received thereafter. (In order to increase reliability and security for pieces of data transmitted and received from DRBs later).

13. If the terminal **1*j*-01** has received an SCG-counter value (or sk-counter) from the RRCRelease message, the terminal applies the updated security keys and a previously configured algorithm for all bearers (SCG terminated RBs) corresponding to the secondary cell group, to resume an encryption and decryption procedure and apply encryption and decryption for pieces of data transmitted and received thereafter. (In order to increase reliability and security for pieces of data transmitted and received from DRBs later).

When the terminal **1*j*-01 is required to configure a connection and thus performs a random access procedure, transmits an RRCResumeRequest message to the base station, and then receives an RRCResume message as a response therefor, a proposed terminal operation is as follows (1*j*-35). If the RRCResume message includes an indicator indicating the terminal 1*j*-01 to, if there is a valid frequency measurement result obtained by measurement in an RRC inactive mode, report the result, the terminal 1*j*-01 may configure and report the frequency measurement result in an RRCResumeComplete (1*j*-40). In addition, the base station 1*j*-02 may include, in the RRC message (e.g., RRCResume), and transmit, to the terminal 1*j*-01, configuration information or an indicator indicating whether to discard or release, maintain and apply, or reconfigure the SCell configuration information (e.g., pieces of configuration information described or proposed in FIG. 1F) of the MCG or SCG, which is stored in the terminal 1*j*-01**.

1. When the message is received, the terminal **1*j*-01** reconstructs a PDCP state corresponding to the master cell group, resets a COUNT value, and re-establishes PDCP layer devices of SBR2 and all DRBs (MCG terminated RBs) corresponding to the master cell group.

2. If the terminal **1*j*-01** has received an SCG-counter value (or sk-counter) from the message, the terminal updates a new SKgNB security key corresponding to the secondary cell group, based on a KgNB security key and the SCG-counter value (or sk-counter value). Then, the terminal derives new security keys (SK_RRCenc, SK_RRC_int, SK_UPint, and SK_UPenc) to be used in an integrity protection and verification procedure and an encryption and decryption procedure, by using the newly updated SKgNB security key corresponding to the secondary cell group.

3. If the message includes master cell group (masterCellgroup) configuration information, A. The terminal **1*j*-01** performs and applies the mater cell group configuration information included in the message. The master cell group information may include configuration information on RLC layer devices belonging to the master cell group, a logical channel identifier, and a bearer identifier.

4. If the message includes bearer configuration information (radioBearerConfig), A. The terminal **1*j*-01** performs and applies the bearer configuration information (radioBearerConfig) included in the message. The bearer configuration information (radioBearerConfig) may include configuration information on PDCP layer devices for each bearer, configuration information on SDAP layer devices, a logical channel identifier, and a bearer identifier.

5. If the message includes secondary cell group (master-Cellgroup) configuration information, A. The terminal **1*j*-01** performs and applies the secondary group configuration information included in the message. The secondary cell group information may include configuration information on RLC layer devices belonging to the secondary cell group, a logical channel identifier, and a bearer identifier.

6. If the message includes secondary bearer configuration information (radioBearerConfig), A. The terminal **1*j*-01** performs and applies the secondary bearer configuration information (radioBearerConfig) included in the message. The secondary bearer configuration information (radioBearerConfig) may include configuration information on PDCP layer devices for each secondary bearer, configuration information on SDAP layer devices, a logical channel identifier, and a bearer identifier.

7. The terminal **1*j*-01** resumes SRB2 and all the DRBs (MCB terminated RBs) corresponding to the master cell group.

8. If the message includes frequency measurement configuration information (measConfig), A. The terminal **1*j*-01** performs and applies the frequency measurement configuration information included in the message. That is, the terminal may perform frequency measurement according to the configuration.

9. The terminal **1*j*-01** transitions to an RRC-connected mode.

10. The terminal **1*j*-01** indicates, to a higher layer device, that a suspended RRC connection has been resumed.

11. Then, the terminal configures and transfers an RRCResumeComplete message to transmit same to a lower layer (**1*j*-40**).

If the terminal **1*j*-01 has bearer configuration information for a suspended secondary cell group and terminal context information, when the terminal performs frequency measurement, based on frequency configuration information configured by system information, an RRCRelease message, or an RRCResume message and there is a valid result, the terminal may include, in the RRCResumeComplete message, and transmit an indicator to indicate that there is the result (1*j*-40). When the base station 1*j*-02 receives the indicator, if resumption of carrier aggregation (CA) or dual connectivity (DC) is required, the base station may indicate the terminal 1*j*-01 to report the frequency measurement result (1*j*-45) and receive the frequency measurement result reported from the terminal 1*j*-01 or receive the frequency measurement result reported by the RRCResumeComplete message (1*j*-50). When the frequency measurement result is received, the base station 1*j*-02 may inquire of the secondary cell base station whether to resume bearer information for the suspended secondary cell group, receive a response, and determine same, and the base station 1*j*-02 may transmit an RRCReconfiguration message to the terminal 1*j*-01 to indicate whether to resume or release bearers for the secondary cell group (1*j*-60). In addition, the base station 1*j*-02 may include, in the RRC message (e.g., RRCReconfiguration), and transmit, to the terminal, configuration information or an indicator indicating whether to discard or release, maintain and apply, or reconfigure the SCell configuration information (e.g., pieces of configuration information described or proposed in FIG. 1F) of the MCG or SCG, which is stored in the terminal 1*j*-01**.

In the embodiment proposed in FIG. 1J of the disclosure, the base station **1*j*-02 may allow a first active bandwidth part of bandwidth part configuration information of downlink or uplink of each cell to be configured as a dormant partial bandwidth in the SCell configuration information (e.g., pieces of configuration information described or proposed in FIG. 1F) or the PSCell (or SCell) configuration information for the cell group (e.g., secondary cell group) of the RRC message (e.g., RRCRelease, RRCResume, or RRCReconfiguration). Therefore, when the terminal 1*j*-01 activates each SCell or a PSCell of a cell group (e.g., secondary cell group), the terminal is able to directly operate, as a dormant bandwidth part, a downlink bandwidth part or uplink bandwidth part of each SCell or the PSCell, or is able to suspend or resume the cell group so as to reduce the battery consumption of the terminal 1*j*-01. For example, in a case where in relation to each SCell or the PSCell, an SCell state is configured as an activated state, a cell group state is configured as an activated state, a suspended state, or a deactivated state, or an indication that suspends or resumes a cell group is configured in the SCell configuration information or cell group configuration information of the RRC message (e.g., RRCRelease, RRCResume, or RRCReconfiguration), or in a case where an indication that activates the SCell is received through MAC control information proposed in the disclosure, the terminal 1*j*-01 may activate, resume, or suspend the SCell or PSCell, and may operate a method of, when activating the SCell or PSCell, directly activating a downlink bandwidth part or an uplink bandwidth part of the SCell or PSCell to a dormant bandwidth part so as to conserve the battery of the terminal 1*j*-01**.

Furthermore, in a case where, as described above, the RRC inactive mode terminal transitions to an RRC-connected mode and recovers, applies, or reconfigures SCell configuration information or PSCell (or SCell) configuration information of a cell group (e.g., secondary cell group), proposed in the disclosure, the terminal may switch or activate between bandwidth parts or activate or apply a dormant bandwidth part for each activated SCell or a PSCell (or SCell) of the cell group according to embodiments proposed in the disclosure. In addition, the embodiments of the disclosure may be expanded and applied even when a handover is performed.

When the terminal **1*j*-01 receives a suspension, resumption, activation, or deactivation indicator for a cell, a cell group, or a PSCell of a cell group according to the embodiments proposed in the disclosure, a PHY layer device or MAC layer device having received the indication may indicate the indication to a higher layer device (e.g., MAC layer device, RLC layer device, PDCP layer device, or RRC layer device). When the indication (e.g., cell group suspension, resumption, activation, or deactivation) is received from a lower layer device, the higher layer device may perform a procedure of a protocol layer device relating to cell group suspension, resumption, activation, or deactivation corresponding to the indication. Alternatively, when the terminal 1*j*-01** receives a suspension, resumption, activation, or deactivation indicator for a cell group or a PSCell of a cell group through an RRC message as in the embodiments of the disclosure, an RRC layer device having received the indication may indicate the indication to a lower layer device (e.g., PHY layer device, MAC layer device, RLC layer device, or PDCP layer device). When the indication (e.g., cell group suspension, resumption, activation, or deactivation) is received from a higher layer device (e.g., RRC layer device), the lower layer device may perform a procedure of a protocol layer device relating to cell group suspension, resumption, activation, or deactivation corresponding to the indication.

Various embodiments may be configured and operated by combining or expanding the embodiments proposed in the disclosure.

Figure 1K:
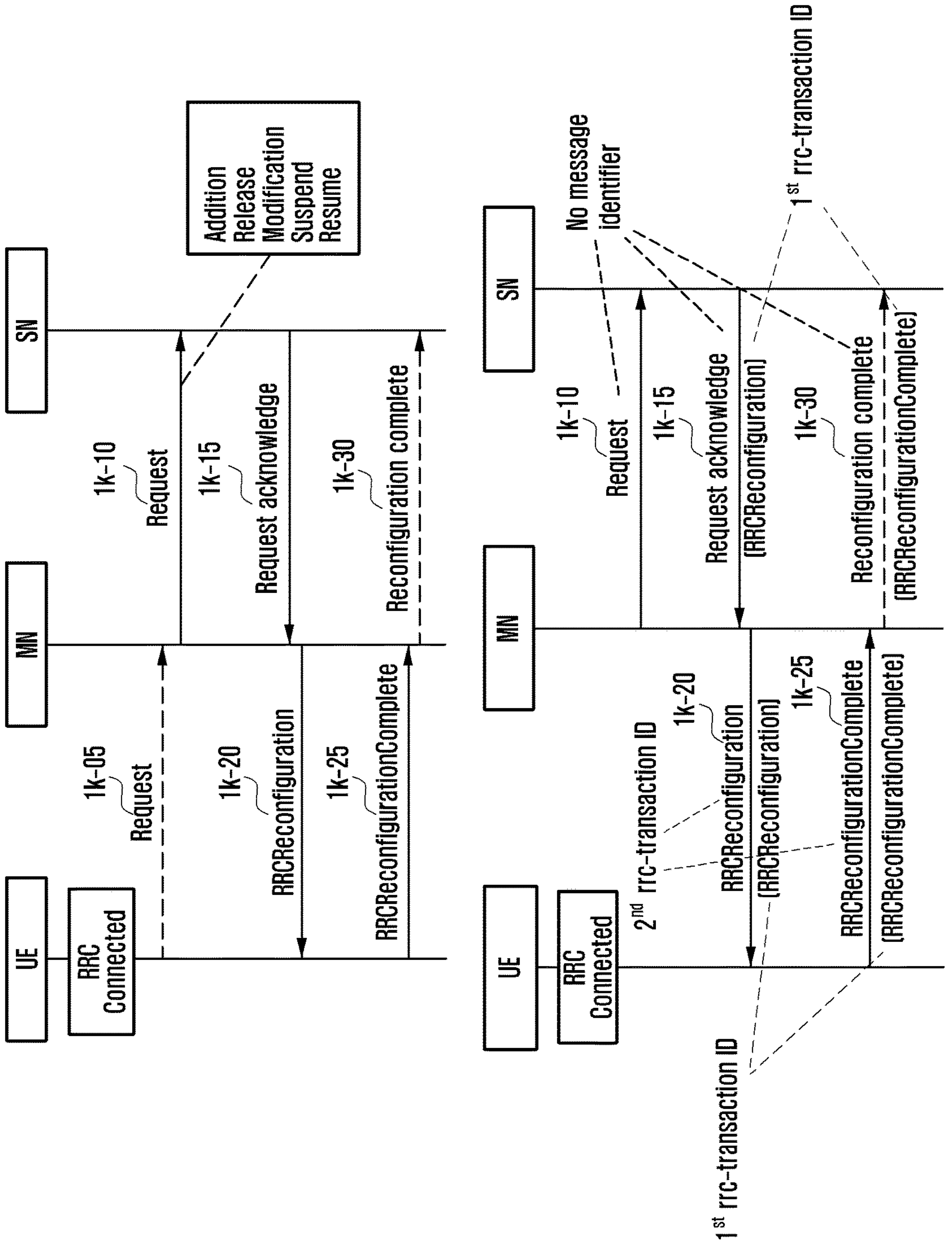
FIG. 1K illustrates a signaling procedure of configuring or releasing DC or activating, resuming, suspending, or deactivating a secondary cell group configured by DC in a next-generation mobile communication system according to an embodiment of the disclosure.

FIG. 1K illustrates a signaling procedure of configuring or releasing DC or activating, resuming, suspending, or deactivating a secondary cell group configured by DC in a next-generation mobile communication system according to an embodiment of the disclosure.

As illustrated in FIG. 1K, a first signaling procedure of configuring or releasing DC or configuring, releasing, activating, resuming, suspending, or deactivating a secondary cell group configured by DC is as follows.

In FIG. 1K, a terminal may configure an RRC connection with a network or a base station as illustrated in FIG. 1F of the disclosure, and may perform data transmission or reception with the base station (e.g., a master cell group, a master node (MN), a master cell group (MCG), or cells (PCell or SCell) of a master cell group).

The base station may configure DC for the terminal according to a predetermined reason (e.g., when a high data transfer rate is required, when there is a request of the terminal (1_k_-05), or when a high QoS requirement is required to be satisfied). For example, the terminal may transmit a request to the base station to configure, release, activate, deactivate, resume, or suspend DC, a cell group (e.g., secondary cell group), or a cell, and the request message may include a frequency (or channel) measurement result report, a cell group identifier, cell identifiers, or measurement results (1_k_-05). As another method, the base station may consider the amount of downlink (or uplink) data or the amount of buffers to determine whether the base station configures, releases, adds, deactivates, activates, resumes, changes, reconfigures, or suspends DC, a cell group (e.g., secondary cell group), or a cell.

The master base station (master node (MN) or master cell group (MCG)) may receive a frequency or channel measurement report for each frequency or channel received from the terminal, and determine a secondary base station (secondary node (SN) or secondary cell group (SCG)) for which DC is to be configured, based on the measurement report. Alternatively, the master base station may consider the amount of downlink (or uplink) data or the amount of buffers to determine whether the (master) base station configures, releases, adds, deactivates, activates, resumes, changes, reconfigures, or suspends DC, a cell group (e.g., secondary cell group), or a cell. The master base station may transmit a message that requests whether configuring or adding a secondary cell group of the terminal is possible, to the secondary base station via an Xn interface (e.g., an inter-base station interface) or an Sn interface (an interface between a base station and an AMF, UMF, or a base station) in order to configure, release, add, deactivate, activate, resume, change, reconfigure, or suspend DC, a cell group (e.g., secondary cell group), or a cell for the determined secondary base station (1_k_-10). In the request message, each separate new request message may be defined and used to configure, release, add, deactivate, activate, resume, change, reconfigure, or suspend DC, a cell group (e.g., secondary cell group), or a cell for the secondary base station. As another method, a new indicator may be defined in an existing message (e.g., SN addition request message, SN modification request message, or SN release request message), to indicate (or request) to configure, release, add, deactivate, activate, resume, change, reconfigure, or suspend a cell group (e.g., secondary cell group) or a cell. The request message may include information such as cell group configuration information (e.g., master cell group configuration information), bearer configuration information, capability information of the terminal, or frequency (or channel) measurement result information of the terminal, which is currently configured for the terminal, so that, when the secondary base station refers to the pieces of information to configure a secondary cell group for the terminal, the secondary base station may configure secondary cell group configuration information or bearer configuration information to match a terminal capability, not exceed the terminal capability, or to match bearer configuration information of a master cell group.

If the secondary base station (SCG) having received the request message 1_k_-10 rejects the request message, the secondary base station may configure and transmit a rejection message to the master base station via an Xn interface (e.g., an inter-base station interface) or an Sn interface (an interface between a base station and an AMF, UMF, or a base station) (1_k_-15). If the request message is accepted, the secondary base station may transmit, to the master base station, a request accept message including configuration information or an indicator for configuring, releasing, adding, deactivating, activating, resuming, changing, reconfiguring, or suspending DC, a cell group (e.g., secondary cell group), or a cell via an Xn interface (e.g., an inter-base station interface) or an Sn interface (an interface between a base station and an AMF, UMF, or a base station) (1_k_-15). The request accept message may include some of the following pieces of information.

Identifier identical to a message identifier included in a request message or an indicator indicating acceptance of a request of the request message Configuration information or indicator (configuration information or an indicator for a mater cell group) for configuring, releasing, adding, deactivating, activating, resuming, changing, reconfiguring, or suspending DC, a cell group (e.g., secondary cell group), or a cell First RRC message (e.g., RRCReconfiguration message) including configuration information or an indicator for configuring, releasing, adding, deactivating, activating, resuming, changing, reconfiguring, or suspending DC, a cell group (e.g., secondary cell group), or a cell The first RRC message may include some of the following pieces of information.

First RRC message identifier (e.g., rrc-Transaction identifier) for distinguishing the first RRC message. Since the terminal and the base station (e.g., the secondary base station) transmit or receive several RRC messages, an identifier for distinguishing each RRC message may be included in the RRC message. For example, an RRC message (e.g., RRCReconfiguration) transmitted by a transmission node, an RRC message (e.g., RRCReconfigurationComplete) transmitted by a reception node and corresponding to the RRC message (e.g., RRCReconfiguration), or an RRC message transmitted by a transmission node and corresponding to the RRC message may include the same first RRC message identifier.

Configuration information or indicator (configuration information or an indicator for the terminal) for configuring, releasing, adding, deactivating, activating, resuming, changing, reconfiguring, or suspending DC, a cell group (e.g., secondary cell group), or a cell Indicator (e.g., activated, deactivated, suspended, or resumed) indicating the state of a cell group Cell group identifier for distinguishing between cell groups. The cell group identifier may be assigned by the master base station, or one identifier among promised identifiers may be assigned by the secondary base station.

Cell group or cell configuration information

Bearer configuration information. For example, indicator information (e.g., a PDCP suspension indicator, a PDCP reestablishment indicator, a PDCP data recovery indicator, an RLC reestablishment indicator, a MAC partial initialization indicator, a MAC initialization indicator, or an indicator that triggers a new operation) that indicates an operation of a protocol layer device (e.g., SDAP layer device, PDCP layer device, RLC layer device, or MAC layer device) of each bearer If the configuration information or indicator for configuring, adding, activating, resuming, changing, or reconfiguring DC, a cell group (e.g., secondary cell group), or a cell is included, a first indicator (e.g., mobility- ControlInfor or ReconfigurationWithSync) may be included together. However, if the configuration information or indicator for releasing, deactivating, reconfiguring, or suspending DC, a cell group (e.g., secondary cell group), or a cell is included, the first indicator (e.g., mobilityControlInfor or ReconfigurationWithSync) may not be included. The first indicator may be an indicator that triggers a random access procedure for the cell group or cell, an indicator that synchronizes a signal with a new cell, an indicator that indicates frequency shift of the terminal, or an indicator that indicates a change of the cell group (or cell).

If the configuration information or indicator for configuring, adding, activating, resuming, changing, or reconfiguring DC, a cell group (e.g., secondary cell group), or a cell is included, random access configuration information may be included together. However, if the configuration information or indicator for releasing, deactivating, reconfiguring, or suspending DC, a cell group (e.g., secondary cell group), or a cell is included, the random access configuration information may not be included. The random access configuration information may include random access transmission resource information (time or frequency transmission resource) or designated preamble information for preamble transmission for the cell group or cell.

Time information indicating when to activate, resume, deactivate, or suspend DC, a cell group (e.g., secondary cell group), or a cell (PSCell or SCG SCell)) (e.g., information (e.g., X) indicating a timing, a time unit, a subframe, time slot, or symbol unit), for example, time information indicating whether to activate, resume, deactivate, or suspend a cell in the (n+X)th cell if the message is received in the n-th time unit.

First channel measurement configuration information for each cell or each bandwidth part Second channel measurement configuration information for each cell or each bandwidth part Indicator that adds a cell group configuration, indicator (ReconfigurationWithSync) indicating a cell group change, or indicator (ReconfigurationWithSync or newly defined indicator) indicating a random access procedure Indicator (ReconfigurationWithSync or newly defined indicator) indicating whether to activate a cell group by performing a random access procedure or activate the cell group without the random access procedure when the cell group is activated Radio resource management (RRM) configuration information or frequency measurement configuration information, or separate radio resource management (RRM) configuration information or frequency measurement configuration information (e.g., frequency measurement configuration information (reduced or relaxed RRM configuration information) simplified for battery conservation) which is to be applied or is required to be performed when a cell group is deactivated)

Configuration information for radio link monitoring (RLM) or configuration information for RLM which is to be applied or is required to be performed when a cell group is deactivated. For example, the configuration information is configuration information of a beam for each cell or configuration information of a beam for each bandwidth part, which is required to be measured by the terminal when a cell group is deactivated, may include beam-related configuration information (transmission configuration indication (TCI) state or quasi co-location (QCL)), may include a timing advance (TA) value (or offset value), a timer (time alignment timer (TAT)) indicating the validity of the TA value, or a timer value (TAT value) for synchronization of a downlink signal of the base station or an uplink signal of the base station, or may include synchronization signal block (SSB) configuration information, channel state information reference signal (CSI-RS) configuration information, or reference signal (RS) configuration information indicating a subject required to be measured, or transmission resource information (e.g., PUCCH configuration information (e.g., scheduling request (SR) information or particular transmission resource), frequency transmission resource, or time transmission resource) for reporting a result when beam failure occurs. In addition, the configuration information may include bandwidth part configuration information (e.g., this may be indicated by a bandwidth part identifier) indicating which bandwidth part in which an RLM procedure is to be performed. As another method, when the state of a cell group is a deactivated state, the terminal may perform an RLM procedure in a first active bandwidth part (or a first active downlink bandwidth part, firstActiveDownlinkBWP-ID) configured by the RRC message, to early monitor the first active bandwidth part required to be activated when the cell group is activated, so as to minimize delays in cell group activation. As another method, in a case where the state of a cell group is configured as a deactivated state (activated state), the terminal may perform an RLM procedure in a bandwidth part lastly (or previously) activated before the cell group state becomes deactivated, to continuously maintain a connection with the cell group (e.g., in a case where bandwidth part configuration information indicating which bandwidth part in which the RLM procedure is to be performed is not configured), or when the cell group is activated, the terminal may perform an activation procedure in a first active bandwidth part (or a first active downlink bandwidth part, firstActiveDownlinkBWP-ID) configured by an RRC message. When a cell group is activated, if bandwidth part-related configuration information indicating which bandwidth part in which an RLM procedure is to be performed is not configured, the terminal may also perform the RLM procedure in the lastly (or previously) activated bandwidth part. In addition, the configuration information may include beam-related configuration information (e.g., this may be indicated by a bandwidth part identifier, a TCI state, or QCL configuration information) indicating which beam in which an RLM procedure is to be performed. As another method, when the state of a cell group is a deactivated state, the terminal may perform an RLM procedure in a beam (e.g., TCI state or QCL configuration information) configured by the RRC message, or may activate the beam, perform the RLM procedure, and early monitor the beam required to be activated when the cell group is activated, so as to minimize delays in cell group activation. As another method, in a case where the state of a cell group is configured as a deactivated state (activated state), the terminal may perform an RLM procedure in a beam lastly (or previously) activated before the cell group state becomes deactivated, to continuously maintain a connection with the cell group (e.g., in a case where beam-related configuration information indicating which beam in which the RLM procedure is to be performed is not configured), or when the cell group is activated, the terminal may perform an activation procedure in a beam configured by an RRC message. When a cell group is activated, if beam-related configuration information indicating which beam in which an RLM procedure is to be performed is not configured, the terminal may also perform the RLM procedure in the lastly (or previously) activated beam.

Configuration information for a beam failure detection procedure or beam failure detection (BFD) or configuration information for BFD which is to be applied or is required to be performed when a cell group is deactivated. For example, the configuration information is configuration information of a beam for each cell or configuration information of a beam for each bandwidth part, which is required to be measured by the terminal when a cell group is deactivated, may include beam-related configuration information (transmission configuration indication (TCI) state or quasi co-location (QCL)), may include a timing advance (TA) value (or offset value), a timer (time alignment timer (TAT)) indicating the validity of the TA value, or a timer value (TAT value) for synchronization of a downlink signal of the base station or an uplink signal of the base station, or may include synchronization signal block (SSB) configuration information, channel state information reference signal (CSI-RS) configuration information, or reference signal (RS) configuration information indicating a subject required to be measured, or transmission resource information (e.g., PUCCH configuration information (e.g., scheduling request (SR) information or particular transmission resource), frequency transmission resource, or time transmission resource) for reporting a result when beam failure occurs. In addition, the configuration information may include bandwidth part configuration information (e.g., this may be indicated by a bandwidth part identifier) indicating which bandwidth part in which a beam failure detection procedure is to be performed. As another method, when the state of a cell group is a deactivated state, the terminal may perform a beam failure detection procedure in a first active bandwidth part (or a first active downlink bandwidth part, firstActiveDownlinkBWP-ID) configured by the RRC message, to early monitor the first active bandwidth part required to be activated when the cell group is activated, so as to minimize delays in cell group activation. As another method, in a case where the state of a cell group is configured as a deactivated state (activated state), the terminal may perform a beam failure detection procedure in a bandwidth part lastly (or previously) activated before the cell group state becomes deactivated, to continuously maintain a connection with the cell group (e.g., in a case where bandwidth part configuration information indicating which bandwidth part in which the beam failure detection procedure is to be performed is not configured), or when the cell group is activated, the terminal may perform an activation procedure in a first active bandwidth part (or a first active downlink bandwidth part, firstActiveDownlinkBWP-ID) configured by an RRC message. When a cell group is activated, if bandwidth part-related configuration information indicating which bandwidth part in which a beam failure detection procedure is to be performed is not configured, the terminal may also perform the beam failure detection procedure in the lastly (or previously) activated bandwidth part. In addition, the configuration information may include beam-related configuration information (e.g., this may be indicated by a bandwidth part identifier, a TCI state, or QCL configuration information) indicating which beam in which a beam failure detection procedure is to be performed. As another method, when the state of a cell group is a deactivated state, the terminal may perform a beam failure detection procedure in a beam (e.g., TCI state or QCL configuration information) configured by the RRC message, to early monitor the beam required to be activated when the cell group is activated, so as to minimize delays in cell group activation. As another method, in a case where the state of a cell group is configured as a deactivated state (activated state), the terminal may perform a beam failure detection procedure in a beam lastly (or previously) activated before the cell group state becomes deactivated, to continuously maintain a connection with the cell group (e.g., in a case where beam-related configuration information indicating which beam in which the beam failure detection procedure is to be performed is not configured), or when the cell group is activated, the terminal may perform an activation procedure in a beam configured by an RRC message. When a cell group is activated, if beam-related configuration information indicating which beam in which a beam failure detection procedure is to be performed is not configured, the terminal may also perform the beam failure detection procedure in the lastly (or previously) activated beam.

When the request accept message 1*k*-15 is received from the secondary base station (SCG or SN), the master base station (MCG or MN) may identify the request accept message, and transmit, to the terminal, a second RRC message (e.g., RRCReconfiguration) including information (a first RRC message included in the request accept message 1*k*-15) included in the request accept message (1*k*-20). The second RRC message may include some of the following pieces of information.

Second RRC message identifier (e.g., rrc-Transaction identifier) for distinguishing the second RRC message. Since the terminal and the base station (e.g., the master base station) transmit or receive several RRC messages, an identifier for distinguishing each RRC message may be included in the RRC message. For example, an RRC message (e.g., RRCReconfiguration) transmitted by a transmission node, an RRC message (e.g., RRCReconfigurationComplete) transmitted by a reception node and corresponding to the RRC message (e.g., RRCReconfiguration), or an RRC message transmitted by a transmission node and corresponding to the RRC message may include the same second RRC message identifier.

First RRC message included in the request accept message 1*k*-15

Configuration information or indicator (configuration information or an indicator for the terminal) for configuring, releasing, adding, deactivating, activating, resuming, changing, reconfiguring, or suspending DC, a cell group (e.g., secondary cell group), or a cell Indicator (e.g., activated, deactivated, suspended, or resumed) indicating the state of a cell group Cell group identifier for distinguishing between cell groups. The cell group identifier may be assigned by the master base station, or one identifier among promised identifiers may be assigned by the secondary base station.

Cell group or cell configuration information

Bearer configuration information. For example, indicator information (e.g., a PDCP suspension indicator, a PDCP reestablishment indicator, a PDCP data recovery indicator, an RLC reestablishment indicator, a MAC partial initialization indicator, a MAC initialization indicator, or an indicator that triggers a new operation) that indicates an operation of a protocol layer device (e.g., SDAP layer device, PDCP layer device, RLC layer device, or MAC layer device) of each bearer If the configuration information or indicator for configuring, adding, activating, resuming, changing, or reconfiguring DC, a cell group (e.g., secondary cell group), or a cell is included, a first indicator (e.g., mobilityControlInfor or ReconfigurationWithSync) may be included together. However, if the configuration information or indicator for releasing, deactivating, reconfiguring, or suspending DC, a cell group (e.g., secondary cell group), or a cell is included, the first indicator (e.g., mobilityControlInfor or ReconfigurationWithSync) may not be included. The first indicator may be an indicator that triggers a random access procedure for the cell group or cell, an indicator that synchronizes a signal with a new cell, an indicator that indicates frequency shift of the terminal, or an indicator that indicates a change of the cell group (or cell). As another example, the terminal may perform PDCCH monitoring in a cell group or a cell indicated or configured above, and trigger and perform a random access procedure according to an indication indicated by a PDCCH. For example, a higher layer device (e.g., RRC layer device) may transmit an indicator that triggers a random access procedure to a lower layer device (e.g., MAC layer device).

If the configuration information or indicator for configuring, adding, activating, resuming, changing, or reconfiguring DC, a cell group (e.g., secondary cell group), or a cell is included, random access configuration information may be included together. However, if the configuration information or indicator for releasing, deactivating, reconfiguring, or suspending DC, a cell group (e.g., secondary cell group), or a cell is included, the random access configuration information may not be included. The random access configuration information may include random access transmission resource information (time or frequency transmission resource) or designated preamble information for preamble transmission for the cell group or cell.

Time information indicating when to activate, resume, deactivate, or suspend DC, a cell group (e.g., secondary cell group), or a cell (PSCell or SCG SCell)) (e.g., information (e.g., X) indicating a timing, a time unit, a subframe, time slot, or symbol unit), for example, time information indicating whether to activate, resume, deactivate, or suspend a cell in the (n+X)th cell if the message is received in the n-th time unit.

First channel measurement configuration information for each cell or each bandwidth part Second channel measurement configuration information for each cell or each bandwidth part Indicator that adds a cell group configuration, indicator (ReconfigurationWithSync) indicating a cell group change, or indicator (ReconfigurationWithSync or newly defined indicator) indicating a random access procedure Indicator (ReconfigurationWithSync or newly defined indicator) indicating whether to activate a cell group by performing a random access procedure or activate the cell group without the random access procedure when the cell group is activated Radio resource management (RRM) configuration information or frequency measurement configuration information, or separate radio resource management (RRM) configuration information or frequency measurement configuration information (e.g., frequency measurement configuration information (reduced or relaxed RRM configuration information) simplified for battery conservation) which is to be applied or is required to be performed when a cell group is deactivated)

Configuration information for radio link monitoring (RLM) or configuration information for RLM which is to be applied or is required to be performed when a cell group is deactivated. For example, the configuration information is configuration information of a beam for each cell or configuration information of a beam for each bandwidth part, which is required to be measured by the terminal when a cell group is deactivated, may include beam-related configuration information (transmission configuration indication (TCI) state or quasi co-location (QCL)), may include a timing advance (TA) value (or offset value), a timer (time alignment timer (TAT)) indicating the validity of the TA value, or a timer value (TAT value) for synchronization of a downlink signal of the base station or an uplink signal of the base station, or may include synchronization signal block (SSB) configuration information, channel state information reference signal (CSI-RS) configuration information, or reference signal (RS) configuration information indicating a subject required to be measured, or transmission resource information (e.g., PUCCH configuration information (e.g., scheduling request (SR) information or particular transmission resource), frequency transmission resource, or time transmission resource) for reporting a result when beam failure occurs. In addition, the configuration information may include bandwidth part configuration information (e.g., this may be indicated by a bandwidth part identifier) indicating which bandwidth part in which an RLM procedure is to be performed. As another method, when the state of a cell group is a deactivated state, the terminal may perform an RLM procedure in a first active bandwidth part (or a first active downlink bandwidth part, firstActiveDownlinkBWP-ID) configured by the RRC message, to early monitor the first active bandwidth part required to be activated when the cell group is activated, so as to minimize delays in cell group activation. As another method, in a case where the state of a cell group is configured as a deactivated state (activated state), the terminal may perform an RLM procedure in a bandwidth part lastly (or previously) activated before the cell group state becomes deactivated, to continuously maintain a connection with the cell group (e.g., in a case where bandwidth part configuration information indicating which bandwidth part in which the RLM procedure is to be performed is not configured), or when the cell group is activated, the terminal may perform an activation procedure in a first active bandwidth part (or a first active downlink bandwidth part, firstActiveDownlinkBWP-ID) configured by an RRC message. When a cell group is activated, if bandwidth part-related configuration information indicating which bandwidth part in which an RLM procedure is to be performed is not configured, the terminal may also perform the RLM procedure in the lastly (or previously) activated bandwidth part. In addition, the configuration information may include beam-related configuration information (e.g., this may be indicated by a bandwidth part identifier, a TCI state, or QCL configuration information) indicating which beam in which an RLM procedure is to be performed. As another method, when the state of a cell group is a deactivated state, the terminal may perform an RLM procedure in a beam (e.g., TCI state or QCL configuration information) configured by the RRC message, or may activate the beam, perform the RLM procedure, and early monitor the beam required to be activated when the cell group is activated, so as to minimize delays in cell group activation. As another method, in a case where the state of a cell group is configured as a deactivated state (activated state), the terminal may perform an RLM procedure in a beam lastly (or previously) activated before the cell group state becomes deactivated, to continuously maintain a connection with the cell group (e.g., in a case where beam-related configuration information indicating which beam in which the RLM procedure is to be performed is not configured), or when the cell group is activated, the terminal may perform an activation procedure in a beam configured by an RRC message. When a cell group is activated, if beam-related configuration information indicating which beam in which an RLM procedure is to be performed is not configured, the terminal may also perform the RLM procedure in the lastly (or previously) activated beam.

Configuration information for a beam failure detection procedure or beam failure detection (BFD) or configuration information for BFD which is to be applied or is required to be performed when a cell group is deactivated. For example, the configuration information is configuration information of a beam for each cell or configuration information of a beam for each bandwidth part, which is required to be measured by the terminal when a cell group is deactivated, may include beam-related configuration information (transmission configuration indication (TCI) state or quasi co-location (QCL)), may include a timing advance (TA) value (or offset value), a timer (time alignment timer (TAT)) indicating the validity of the TA value, or a timer value (TAT value) for synchronization of a downlink signal of the base station or an uplink signal of the base station, or may include synchronization signal block (SSB) configuration information, channel state information reference signal (CSI-RS) configuration information, or reference signal (RS) configuration information indicating a subject required to be measured, or transmission resource information (e.g., PUCCH configuration information (e.g., scheduling request (SR) information or particular transmission resource), frequency transmission resource, or time transmission resource) for reporting a result when beam failure occurs. In addition, the configuration information may include bandwidth part configuration information (e.g., this may be indicated by a bandwidth part identifier) indicating which bandwidth part in which a beam failure detection procedure is to be performed. As another method, when the state of a cell group is a deactivated state, the terminal may perform a beam failure detection procedure in a first active bandwidth part (or a first active downlink bandwidth part, firstActiveDownlinkBWP-ID) configured by the RRC message, to early monitor the first active bandwidth part required to be activated when the cell group is activated, so as to minimize delays in cell group activation. As another method, in a case where the state of a cell group is configured as a deactivated state (activated state), the terminal may perform a beam failure detection procedure in a bandwidth part lastly (or previously) activated before the cell group state becomes deactivated, to continuously maintain a connection with the cell group (e.g., in a case where bandwidth part configuration information indicating which bandwidth part in which the beam failure detection procedure is to be performed is not configured), or when the cell group is activated, the terminal may perform an activation procedure in a first active bandwidth part (or a first active downlink bandwidth part, firstActiveDownlinkBWP-ID) configured by an RRC message. When a cell group is activated, if bandwidth part-related configuration information indicating which bandwidth part in which a beam failure detection procedure is to be performed is not configured, the terminal may also perform the beam failure detection procedure in the lastly (or previously) activated bandwidth part. In addition, the configuration information may include beam-related configuration information (e.g., this may be indicated by a bandwidth part identifier, a TCI state, or QCL configuration information) indicating which beam in which a beam failure detection procedure is to be performed. As another method, when the state of a cell group is a deactivated state, the terminal may perform a beam failure detection procedure in a beam (e.g., TCI state or QCL configuration information) configured by the RRC message, to early monitor the beam required to be activated when the cell group is activated, so as to minimize delays in cell group activation. As another method, in a case where the state of a cell group is configured as a deactivated state (activated state), the terminal may perform a beam failure detection procedure in a beam lastly (or previously) activated before the cell group state becomes deactivated, to continuously maintain a connection with the cell group (e.g., in a case where beam-related configuration information indicating which beam in which the beam failure detection procedure is to be performed is not configured), or when the cell group is activated, the terminal may perform an activation procedure in a beam configured by an RRC message. When a cell group is activated, if beam-related configuration information indicating which beam in which a beam failure detection procedure is to be performed is not configured, the terminal may also perform the beam failure detection procedure in the lastly (or previously) activated beam.

When the second RRC message **1*k*-20** is received from the master base station (MCG or MN), the terminal may read and identify the second RRC message, or read information (e.g., the first RRC message included in the second RRC message) included in the second RRC message and configure, add, change, resume, suspend, or deactivate DC or a cell group (e.g., secondary cell group). In addition, when the second RRC message or the first RRC message includes a first indicator that triggers a random access procedure, the terminal may trigger the random access procedure for a cell group or cell configured or indicated above. When the random access procedure is performed, if the RRC message includes random access information or there is stored random access information, the terminal may perform a random access procedure (e.g., a contention-free random access procedure (e.g., 4-step random access or 2-step random access), based on the random access information which is stored or is received from the RRC message, or based on system information. If the RRC message does not include random access information, the terminal may perform a random access procedure (e.g., a contention-based random access procedure (e.g., 4-step random access or 2-step random access). As another example, the terminal may perform PDCCH monitoring in a cell group or a cell indicated or configured above, and trigger and perform a random access procedure according to an indication indicated by a PDCCH. For example, a higher layer device (e.g., RRC layer device) may transmit an indicator that triggers a random access procedure to a lower layer device (e.g., MAC layer device).

The following description of the disclosure proposes a first embodiment of a terminal operation considering DC configuration information when the terminal receives the RRC message (e.g., RRCReconfiguration message). The embodiment proposes a procedure enabling activation of a cell group without a random access procedure (RACH less activation) when the terminal activates, adds, or changes the cell group.

If the terminal receives an RRCReconfiguration message, the terminal may perform the following procedure.

1> If a MCG (or master node (MN)) of the terminal is configured by LTE (E-UTRA) and an SCG (or secondary node (SN)) is configured by NR (i.e., E-UTRA nr-SecondaryCellGroupConfig is configured) or if the terminal is configured by next generation E-UTRA NR-dual connectivity connected to 5GC ((NG)EN-DC), 2> If the RRCReconfiguration message is received through an E-UTRA RRC message in a MobilityFromNRCommand message (message indicating a handover to (NG)EN-DC in NR), 3> If reconfigurationWithSync configuration information is included in spCellConfig of an SCG in the message or if the cell group state of the SCG is not configured to be a deactivated state, a 4> The terminal may perform (or trigger or start) a random access procedure for an SpCell (or SCG or PSCell).

3> Otherwise (else if), if the cell group state of the SCG is not configured to be a deactivated state, if a new indicator (e.g., RACH-less indication) is included in the message to indicate a random access procedure not to be performed, or if reconfigurationWithSync configuration information is not included in spCellConfig of the SCG in the message, 4> The terminal may not perform (or trigger or start) a random access procedure for an SpCell (or SCG or PSCell).

4> The terminal may activate the SpCell without a random access procedure, may start PDCCH monitoring for the SpCell, or may start PDSCH reception.

3> Otherwise (else),

4> The procedure performed by the terminal is terminated.

1> If a MCG (or master node (MN)) of the terminal is configured by NR and an SCG (or secondary node (SN)) is configured by NR (i.e., E-UTRA nr-SecondaryCellGroupConfig is configured), if the terminal is configured by NR-dual connectivity connected to 5GC (NR-DC), if the RRCReconfiguration message is received in an nr-SCG of mrdc-SecondaryCellGroup configuration information through SRB1, or if the mrdc-SecondaryCellGroup configuration information is received from an RRCReconfiguration or RRCResume message through SRB1, 2> If reconfigurationWithSync configuration information is included in spCellConfig of an nr-SCG in the message or if the cell group state of the SCG is not configured to be a deactivated state, 3> The terminal may perform (or trigger or start) a random access procedure for an SpCell (or SCG or PSCell).

2> Otherwise (else if), if the cell group state of the SCG is not configured to be a deactivated state, if a new indicator (e.g., RACH-less indication) is included in the message to indicate a random access procedure not to be performed, or if reconfigurationWithSync configuration information is not included in spCellConfig of the SCG in the message, 3> The terminal may not perform (or trigger or start) a random access procedure for an SpCell (or SCG or PSCell).

3> The terminal may activate the SpCell without a random access procedure, may start PDCCH monitoring for the SpCell, or may start PDSCH reception.

2> Otherwise (else),

3> The procedure performed by the terminal is terminated.

1> if reconfigurationWithSync configuration information is included in spCellConfig of an MCG or SCG in the message, and a MAC layer device of an NR cell group successfully completes the random access procedure which has been triggered above, 2> A first timer (T304) for the cell group may be suspended (or if the timer is running).

2> A second timer (T310) for the cell group or source SpCell may be suspended (or if the timer is running).

When reconfigurationWithSync is included in the message, and the terminal performs a reconfiguration procedure (reconfiguration with Sync) for synchronization, the following procedure may be performed.

1> If a dual active protocol stack (DAPS) bearer is not configured, if the state of a cell group (or SCG) is not configured to be a deactivated state, if an RLM-related configuration or beam failure detection-related configuration information for a deactivated cell group is not configured (if the state of the cell group is configured to be a deactivated state, a second timer is continuously driven and an RLM procedure is performed so as to support fast cell group activation), or if this procedure is not performed for a deactivated cell group (or SCG), 2> A second timer (T310) for the cell group or SpCell may be suspended (or if the timer is running).

1> A third timer (T312) for the cell group or SpCell may be suspended (or if the timer is running).

1> if the state of a cell group (or SCG) is not configured to be a deactivated state, or if this procedure is not performed for a deactivated cell group (or SCG), 2> A first timer (T304) for the SpCell (PCell of MCG or PSCell of SCG) is configured to have a first timer (T304) value included in reconfigurationWithSync configuration information of the message, and may be started.

If RLM-related configuration information or beam failure detection-related configuration information for a deactivated cell group (or SCG) is configured in an RRC message (e.g., RRCReconfiguration message) as proposed in the disclosure, the terminal may perform a radio link failure detection procedure as below.

1> If a cell group state is configured to be a deactivated state (or a beam failure detection procedure or an RLM procedure is configured for a deactivated cell group), or if an indication indicating that the number of times of non-synchronization for an SpCell is a predetermined count (e.g., N310 value) is received from a lower layer device, A second timer (T310) for the SpCell may be started (The second timer may be suspended if the second timer is running when the cell group state is activated, is configured to be activated, or is not configured to be deactivated or when a random access procedure for the SpCell is started or performed. In addition, if the second timer expires, the terminal may declare that radio link failure for the cell group has occurred).

1> If a DAPS bearer is configured, if an indication indicating that the number of times of non-synchronization for a source SpCell is a predetermined count (e.g., N310 value) is received from a lower layer device, or if a first timer is running, A second timer (T310) for the source SpCell may be started.

1> If an indication indicating that the number of times of non-synchronization for an SpCell is a predetermined count (e.g., N310 value) is received from a lower layer device, or if a first timer (T304) or a fourth timer is not running, A second timer (T310) for the source SpCell may be started.

The following description of the disclosure proposes a second embodiment of a terminal operation considering DC configuration information when the terminal receives the RRC message (e.g., RRCReconfiguration message). The embodiment proposes a procedure enabling activation of a cell group without a random access procedure (RACH less activation) when the terminal activates, adds, or changes the cell group.

If the terminal receives an RRCReconfiguration message, the terminal may perform the following procedure.

1> If a MCG (or master node (MN)) of the terminal is configured by LTE (E-UTRA) and an SCG (or secondary node (SN)) is configured by NR (i.e., E-UTRA nr-SecondaryCellGroupConfig is configured) or if the terminal is configured by next generation E-UTRA NR-dual connectivity connected to 5GC ((NG)EN-DC), 2> If the RRCReconfiguration message is received through an E-UTRA RRC message in a Mobility-FromNRCommand message (message indicating a handover to (NG)EN-DC in NR), 3> If reconfigurationWithSync configuration information is included in spCellConfig of an SCG in the message, if the cell group state of the SCG is not configured to be a deactivated state, if a time alignment timer (TAT) driven in a MAC layer device (timer for determining the validity of a timing advance (TA) value for synchronization between a terminal and a base station) is not running (or the timer has expired or an indication indicating that the timer has expired is received from a lower layer device), if an indication indicating that beam failure is detected is received from a lower layer device (or if beam failure has occurred), if a beam failure detection procedure or an RLM procedure for a deactivated cell group is not configured, or if a radio link failure procedure is detected in an RLM procedure (or a second timer (T310) has expired or a radio link with the SCG is not valid), a 4> The terminal may perform (or trigger or start) a random access procedure for an SpCell (or SCG or PSCell).

3> Otherwise (else if), if the cell group state of the SCG is not configured to be a deactivated state, if a new indicator (e.g., RACH-less indication) is included in the message to indicate a random access procedure not to be performed, if a time alignment timer (TAT) driven in a MAC layer device (timer for determining the validity of a timing advance (TA) value for synchronization between a terminal and a base station) is running (or the timer has not expired or an indication indicating that the timer has expired is not received from a lower layer device), if an indication indicating that beam failure is detected is not received from a lower layer device (or if beam failure has not occurred), if a beam failure detection procedure or an RLM procedure for a deactivated cell group is configured, if a radio link failure procedure is not detected in an RLM procedure (or a second timer (T310) has not expired or a radio link with the SCG is valid), or if reconfigurationWithSync configuration information is not included in spCellConfig of the SCG in the message, 4> The terminal may not perform (or trigger or start) a random access procedure for an SpCell (or SCG or PSCell).

4> The terminal may activate the SpCell without a random access procedure, may start PDCCH monitoring for the SpCell, or may start PDSCH reception.

3> Otherwise (else if), if the cell group state of the SCG is not configured to be a deactivated state, if a new indicator (e.g., RACH-less indication) is included in the message to indicate a random access procedure not to be performed, if a time alignment timer (TAT) driven in a MAC layer device (timer for determining the validity of a timing advance (TA) value for synchronization between a terminal and a base station) is not running (or the timer has expired or an indication indicating that the timer has expired is received from a lower layer device), if an indication indicating that beam failure is detected is received from a lower layer device (or if beam failure has occurred), if a beam failure detection procedure or an RLM procedure for a deactivated cell group is not configured, if a radio link failure procedure is detected in an RLM procedure (or a second timer (T310) has expired or a radio link with the SCG is not valid), or if reconfigurationWithSync configuration information is not included in spCellConfig of the SCG in the message, 4> The terminal may perform (or trigger or start) a random access procedure for an SpCell (or SCG or PSCell).

3> Otherwise (else),

4> The procedure performed by the terminal is terminated.

1> If a MCG (or master node (MN)) of the terminal is configured by NR and an SCG (or secondary node (SN)) is configured by NR (i.e., E-UTRA nr-SecondaryCellGroupConfig is configured), if the terminal is configured by NR-dual connectivity connected to 5GC (NR-DC), if the RRCReconfiguration message is received in an nr-SCG of mrdc-SecondaryCellGroup configuration information through SRB1, or if the mrdc-SecondaryCellGroup configuration information is received from an RRCReconfiguration or RRCResume message through SRB1, 2> If reconfigurationWithSync configuration information is included in spCellConfig of an nr-SCG in the message, if the cell group state of the SCG is not configured to be a deactivated state, if a time alignment timer (TAT) driven in a MAC layer device (timer for determining the validity of a timing advance (TA) value for synchronization between a terminal and a base station) is not running (or the timer has expired or an indication indicating that the timer has expired is received from a lower layer device), if an indication indicating that beam failure is detected is received from a lower layer device (or if beam failure has occurred), if a beam failure detection procedure or an RLM procedure for a deactivated cell group is not configured, or if a radio link failure procedure is detected in an RLM procedure (or a second timer (T310) has expired or a radio link with the SCG is not valid), 3> The terminal may perform (or trigger or start) a random access procedure for an SpCell (or SCG or PSCell).

2> Otherwise (else if), if the cell group state of the SCG is not configured to be a deactivated state, if a new indicator (e.g., RACH-less indication) is included in the message to indicate a random access procedure not to be performed, if a time alignment timer (TAT) driven in a MAC layer device (timer for determining the validity of a timing advance (TA) value for synchronization between a terminal and a base station) is running (or the timer has not expired or an indication indicating that the timer has expired is not received from a lower layer device), if an indication indicating that beam failure is detected is not received from a lower layer device (or if beam failure has not occurred), if a beam failure detection procedure or an RLM procedure for a deactivated cell group is configured, if reconfigurationWithSync configuration information is not included in spCellConfig of the SCG in the message, or if a radio link failure procedure is not detected in an RLM procedure (or a second timer (T310) has not expired or a radio link with the SCG is valid), 3> The terminal may not perform (or trigger or start) a random access procedure for an SpCell (or SCG or PSCell).

3> The terminal may activate the SpCell without a random access procedure, may start PDCCH monitoring for the SpCell, or may start PDSCH reception.

2> Otherwise (else if), if the cell group state of the SCG is not configured to be a deactivated state, if a new indicator (e.g., RACH-less indication) is included in the message to indicate a random access procedure not to be performed, if a time alignment timer (TAT) driven in a MAC layer device (timer for determining the validity of a timing advance (TA) value for synchronization between a terminal and a base station) is not running (or the timer has expired or an indication indicating that the timer has expired is received from a lower layer device), if an indication indicating that beam failure is detected is received from a lower layer device (or if beam failure has occurred), if a beam failure detection procedure or an RLM procedure for a deactivated cell group is not configured, if a radio link failure procedure is detected in an RLM procedure (or a second timer (T310) has expired or a radio link with the SCG is not valid), or if reconfigurationWithSync configuration information is not included in spCellConfig of the SCG in the message, 3> The terminal may perform (or trigger or start) a random access procedure for an SpCell (or SCG or PSCell).

2> Otherwise (else),

3> The procedure performed by the terminal is terminated.

1> if reconfigurationWithSync configuration information is included in spCellConfig of an MCG or SCG in the message, and a MAC layer device of an NR cell group successfully completes the random access procedure which has been triggered above, 2> A first timer (T304) for the cell group may be suspended (or if the timer is running).

2> A second timer (T310) for the cell group or source SpCell may be suspended (or if the timer is running).

When reconfigurationWithSync is included in the message, and the terminal performs a reconfiguration procedure (reconfiguration with Sync) for synchronization, the following procedure may be performed.

1> If a dual active protocol stack (DAPS) bearer is not configured, if the state of a cell group (or SCG) is not configured to be a deactivated state, if an RLM-related configuration or beam failure detection-related configuration information for a deactivated cell group is not configured (if the state of the cell group is configured to be a deactivated state, a second timer is continuously driven and an RLM procedure is performed so as to support fast cell group activation), or if this procedure is not performed for a deactivated cell group (or SCG), 2> A second timer (T310) for the cell group or SpCell may be suspended (or if the timer is running).

1> A third timer (T312) for the cell group or SpCell may be suspended (or if the timer is running).

1> if the state of a cell group (or SCG) is not configured to be a deactivated state, or if this procedure is not performed for a deactivated cell group (or SCG), 2> A first timer (T304) for the SpCell (PCell of MCG or PSCell of SCG) is configured to have a first timer (T304) value included in reconfigurationWithSync configuration information of the message, and may be started.

If RLM-related configuration information or beam failure detection-related configuration information for a deactivated cell group (or SCG) is configured in an RRC message (e.g., RRCReconfiguration message) as proposed in the disclosure, the terminal may perform a radio link failure detection procedure as below.

1> If a cell group state is configured to be a deactivated state (or a beam failure detection procedure or an RLM procedure is configured for a deactivated cell group), or if an indication indicating that the number of times of non-synchronization for an SpCell is a predetermined count (e.g., N310 value) is received from a lower layer device, A second timer (T310) for the SpCell may be started (The second timer may be suspended if the second timer is running when the cell group state is activated, is configured to be activated, or is not configured to be deactivated or when a random access procedure for the SpCell is started or performed or the random access procedure is successfully completed. In addition, if the second timer expires, the terminal may declare that radio link failure for the cell group has occurred).

1> If a DAPS bearer is configured, if an indication indicating that the number of times of non-synchronization for a source SpCell is a predetermined count (e.g., N310 value) is received from a lower layer device, or if a first timer is running, A second timer (T310) for the source SpCell may be started.

1> If an indication indicating that the number of times of non-synchronization for an SpCell is a predetermined count (e.g., N310 value) is received from a lower layer device, or if a first timer (T304) or a fourth timer is not running, A second timer (T310) for the source SpCell may be started.

The following description of the disclosure proposes a third embodiment of a terminal operation considering DC configuration information when the terminal receives the RRC message (e.g., RRCReconfiguration message). The embodiment proposes a procedure enabling activation of a cell group without a random access procedure (RACH less activation) when the terminal activates, adds, or changes the cell group.

If the terminal receives an RRCReconfiguration message, the terminal may perform the following procedure.

1> If a MCG (or master node (MN)) of the terminal is configured by LTE (E-UTRA) and an SCG (or secondary node (SN)) is configured by NR (i.e., E-UTRA nr-SecondaryCellGroupConfig is configured) or if the terminal is configured by next generation E-UTRA NR-dual connectivity connected to 5GC ((NG)EN-DC), 2> If the RRCReconfiguration message is received through an E-UTRA RRC message in a MobilityFromNRCommand message (message indicating a handover to (NG)EN-DC in NR), 3> If reconfigurationWithSync configuration information is included in spCellConfig of an SCG in the message, if the cell group state of the SCG is not configured to be a deactivated state, if a time alignment timer (TAT) driven in a MAC layer device (timer for determining the validity of a timing advance (TA) value for synchronization between a terminal and a base station) is not running (or the timer has expired or an indication indicating that the timer has expired is received from a lower layer device), if an indication indicating that beam failure is detected is received from a lower layer device (or if beam failure has occurred), if a beam failure detection procedure or an RLM procedure for a deactivated cell group is not configured, or if a radio link failure procedure is detected in an RLM procedure (or a second timer (T310) has expired or a radio link with the SCG is not valid), 4> The terminal may perform (or trigger or start) a random access procedure for an SpCell (or SCG or PSCell).

3> Otherwise (else if), if the cell group state of the SCG is not configured to be a deactivated state, if a new indicator (e.g., RACH-less indication or second reconfigurationWithcSync) is included in the message to indicate a random access procedure not to be performed, if a time alignment timer (TAT) driven in a MAC layer device (timer for determining the validity of a timing advance (TA) value for synchronization between a terminal and a base station) is running (or the timer has not expired or an indication indicating that the timer has expired is not received from a lower layer device), if an indication indicating that beam failure is detected is not received from a lower layer device (or if beam failure has not occurred), if a beam failure detection procedure or an RLM procedure for a deactivated cell group is configured, if a radio link failure procedure is not detected in an RLM procedure (or a second timer (T310) has not expired or a radio link with the SCG is valid), or if reconfigurationWithSync configuration information is not included in spCellConfig of the SCG in the message, 4> The terminal may not perform (or trigger or start) a random access procedure for an SpCell (or SCG or PSCell).

4> The terminal may activate the SpCell without a random access procedure, may start PDCCH monitoring for the SpCell, or may start PDSCH reception.

4> The terminal may introduce a fourth timer to identify whether the SpCell is successfully activated without a random access procedure. For example, when the condition is satisfied, the fourth timer may be started. The fourth timer may be suspended when a PDCCH or a PDSCH is successfully received from the SpCell. If the fourth timer expires, the terminal may trigger an SCG failure reporting procedure and report same via an MCG. As another method, when the fourth timer expires, the terminal may perform a random access procedure (contention-based random access (CBRA) or contention-free random access (CFRA)) or a two-step random access procedure (two-step RACH), based on configuration information (e.g., this may be configured by second reconfigurationWithSync, or preamble information, smtc information, or a new terminal identifier (RNTI value) may be configured, or a need code may be configured as S to be stored and used) for a separate random access procedure, configured by the RRC message or broadcast by system information (that is, the terminal may fall back to a random access procedure). As another method, if the terminal fails a procedure of activating a cell group without a random access procedure (e.g., the terminal fails to successfully receive a PDCCH or PDSCH for a predetermined time), the terminal may perform a random access procedure (contention-based random access (CBRA) or contention-free random access (CFRA)) or a two-step random access procedure (two-step RACH), based on configuration information for a separate random access procedure, configured by the RRC message or broadcast by system information (that is, the terminal may fall back to a random access procedure). The configuration information for the separate random access procedure may be configured when an indication that deactivates a cell group is transmitted to the terminal through an RRC message, or may be configured when an indication (or reconfigurationWithSync) that activates the cell group is transmitted to the terminal through an RRC message.

3> Otherwise (else if), if the cell group state of the SCG is not configured to be a deactivated state, if a new indicator (e.g., RACH-less indication) is included in the message to indicate a random access procedure not to be performed, if a time alignment timer (TAT) driven in a MAC layer device (timer for determining the validity of a timing advance (TA) value for synchronization between a terminal and a base station) is not running (or the timer has expired or an indication indicating that the timer has expired is received from a lower layer device), if an indication indicating that beam failure is detected is received from a lower layer device (or if beam failure has occurred), if a beam failure detection procedure or an RLM procedure for a deactivated cell group is not configured, if a radio link failure procedure is detected in an RLM procedure (or a second timer (T310) has expired or a radio link with the SCG is not valid), or if reconfigurationWithSync configuration information is not included in spCellConfig of the SCG in the message, 4> The terminal may perform (or trigger or start) a random access procedure for an SpCell (or SCG or PSCell).

3> Otherwise (else),

4> The procedure performed by the terminal is terminated.

1> If a MCG (or master node (MN)) of the terminal is configured by NR and an SCG (or secondary node (SN)) is configured by NR (i.e., E-UTRA nr-SecondaryCellGroupConfig is configured), if the terminal is configured by NR-dual connectivity connected to 5GC (NR-DC), if the RRCReconfiguration message is received in an nr-SCG of mrdc-SecondaryCellGroup configuration information through SRB1, or if the mrdc-SecondaryCellGroup configuration information is received from an RRCReconfiguration or RRCResume message through SRB1, 2> If reconfigurationWithSync configuration information is included in spCellConfig of an nr-SCG in the message, if the cell group state of the SCG is not configured to be a deactivated state, if a time alignment timer (TAT) driven in a MAC layer device (timer for determining the validity of a timing advance (TA) value for synchronization between a terminal and a base station) is not running (or the timer has expired or an indication indicating that the timer has expired is received from a lower layer device), if an indication indicating that beam failure is detected is received from a lower layer device (or if beam failure has occurred), if a beam failure detection procedure or an RLM procedure for a deactivated cell group is not configured, or if a radio link failure procedure is detected in an RLM procedure (or a second timer (T310) has expired or a radio link with the SCG is not valid), 3> The terminal may perform (or trigger or start) a random access procedure for an SpCell (or SCG or PSCell).

2> Otherwise (else if), if the cell group state of the SCG is not configured to be a deactivated state, if a new indicator (e.g., RACH-less indication or second reconfigurationWithcSync) is included in the message to indicate a random access procedure not to be performed, if a time alignment timer (TAT) driven in a MAC layer device (timer for determining the validity of a timing advance (TA) value for synchronization between a terminal and a base station) is running (or the timer has not expired or an indication indicating that the timer has expired is not received from a lower layer device), if an indication indicating that beam failure is detected is not received from a lower layer device (or if beam failure has not occurred), if a beam failure detection procedure or an RLM procedure for a deactivated cell group is configured, if a radio link failure procedure is not detected in an RLM procedure (or a second timer (T310) has not expired or a radio link with the SCG is valid), or if reconfigurationWithSync configuration information is not included in spCellConfig of the SCG in the message, 3> The terminal may not perform (or trigger or start) a random access procedure for an SpCell (or SCG or PSCell).

3> The terminal may activate the SpCell without a random access procedure, may start PDCCH monitoring for the SpCell, or may start PDSCH reception.

4> The terminal may introduce a new fourth timer to identify whether the SpCell is successfully activated without a random access procedure. For example, when the condition is satisfied, the fourth timer may be started. The fourth timer may be suspended when a PDCCH or a PDSCH is successfully received from the SpCell. If the fourth timer expires, the terminal may trigger an SCG failure reporting procedure and report same via an MCG. As another method, when the fourth timer expires, the terminal may perform a random access procedure (contention-based random access (CBRA) or contention-free random access (CFRA)) or a two-step random access procedure (two-step RACH), based on configuration information (e.g., this may be configured by second reconfigurationWithSync, or preamble information, smtc information, or a new terminal identifier (RNTI value) may be configured, or a need code may be configured as S to be stored and used) for a separate random access procedure, configured by the RRC message or broadcast by system information (that is, the terminal may fall back to a random access procedure). As another method, if the terminal fails a procedure of activating a cell group without a random access procedure (e.g., the terminal fails to successfully receive a PDCCH or PDSCH for a predetermined time), the terminal may perform a random access procedure (contention-based random access (CBRA) or contention-free random access (CFRA)) or a two-step random access procedure (two-step RACH), based on configuration information for a separate random access procedure, configured by the RRC message or broadcast by system information (that is, the terminal may fall back to a random access procedure). The configuration information for the separate random access procedure may be configured when an indication that deactivates a cell group is transmitted to the terminal through an RRC message, or may be configured when an indication (or reconfigurationWithSync) that activates the cell group is transmitted to the terminal through an RRC message.

2> Otherwise (else if), if the cell group state of the SCG is not configured to be a deactivated state, if a new indicator (e.g., RACH-less indication) is included in the message to indicate a random access procedure not to be performed, if a time alignment timer (TAT) driven in a MAC layer device (timer for determining the validity of a timing advance (TA) value for synchronization between a terminal and a base station) is not running (or the timer has expired or an indication indicating that the timer has expired is received from a lower layer device), if an indication indicating that beam failure is detected is received from a lower layer device (or if beam failure has occurred), if a beam failure detection procedure or an RLM procedure for a deactivated cell group is not configured, if a radio link failure procedure is detected in an RLM procedure (or a second timer (T310) has expired or a radio link with the SCG is not valid), or if reconfigurationWithSync configuration information is not included in spCellConfig of the SCG in the message, 3> The terminal may perform (or trigger or start) a random access procedure for an SpCell (or SCG or PSCell).

2> Otherwise (else),

3> The procedure performed by the terminal is terminated.

1> if reconfigurationWithSync configuration information is included in spCellConfig of an MCG or SCG in the message, and a MAC layer device of an NR cell group successfully completes the random access procedure which has been triggered above, 2> A first timer (T304) for the cell group may be suspended (or if the timer is running).

2> A second timer (T310) for the cell group or source SpCell may be suspended (or if the timer is running).

When reconfigurationWithSync is included in the message, and the terminal performs a reconfiguration procedure (reconfiguration with Sync) for synchronization, the following procedure may be performed.

1> If a dual active protocol stack (DAPS) bearer is not configured, if the state of a cell group (or SCG) is not configured to be a deactivated state, if an RLM-related configuration or beam failure detection-related configuration information for a deactivated cell group is not configured (if the state of the cell group is configured to be a deactivated state, a second timer is continuously driven and an RLM procedure is performed so as to support fast cell group activation), or if this procedure is not performed for a deactivated cell group (or SCG), 2> A second timer (T310) for the cell group or SpCell may be suspended (or if the timer is running).

1> A third timer (T312) for the cell group or SpCell may be suspended (or if the timer is running).

1> if the state of a cell group (or SCG) is not configured to be a deactivated state, or if this procedure is not performed for a deactivated cell group (or SCG), 2> A first timer (T304) for the SpCell (PCell of MCG or PSCell of SCG) is configured to have a first timer (T304) value included in reconfigurationWithSync configuration information of the message, and may be started.

If RLM-related configuration information or beam failure detection-related configuration information for a deactivated cell group (or SCG) is configured in an RRC message (e.g., RRCReconfiguration message) as proposed in the disclosure, the terminal may perform a radio link failure detection procedure as below.

1> If a cell group state is configured to be a deactivated state (or a beam failure detection procedure or an RLM procedure is configured for a deactivated cell group), or if an indication indicating that the number of times of non-synchronization for an SpCell is a predetermined count (e.g., N310 value) is received from a lower layer device, A second timer (T310) for the SpCell may be started (The second timer may be suspended if the second timer is running when the cell group state is activated, is configured to be activated, or is not configured to be deactivated or when a random access procedure for the SpCell is started or performed or the random access procedure is successfully completed. In addition, if the second timer expires, the terminal may declare that radio link failure for the cell group has occurred).

1> If a DAPS bearer is configured, if an indication indicating that the number of times of non-synchronization for a source SpCell is a predetermined count (e.g., N310 value) is received from a lower layer device, or if a first timer is running, A second timer (T310) for the source SpCell may be started.

1> If an indication indicating that the number of times of non-synchronization for an SpCell is a predetermined count (e.g., N310 value) is received from a lower layer device, or if a first timer (T304) or a fourth timer is not running, A second timer (T310) for the source SpCell may be started.

The following description of the disclosure proposes a method enabling, when a terminal for which DC is configured above in the disclosure receives the RRC message (RRCReconfiguration or RRCResume), in a case where the state of a cell group or cell is configured to be an activated state (or is not configured to be a deactivated state) or configured to be a deactivated state, the terminal to effectively perform a beam failure detection procedure, an RLM procedure, a TA adjustment (or management) procedure, a PDCCH monitoring procedure, or a random access procedure or a method of determining a bandwidth part. Therefore, a base station may selectively configure a procedure of the terminal, consider the battery conservation of the terminal, and prevent an unnecessary terminal procedure. The RLM procedure is a procedure of detecting whether a current radio link state of the terminal is valid, based on a second timer (T310), or the beam failure detection procedure is a procedure of determining the signal strength of a beam or beam alignment in a lower layer device (MAC layer device or PHY layer device).

1> If deactivation of a cell or cell group is configured (or indicated) for the terminal by an RRC message (or MAC CE or DCI of PDCCH), 2> The terminal may continuously maintain a time alignment timer (TAT) for a primary timing advance group (PTAG) (or the terminal may not suspend same. Alternatively, while the timer is running (or until the timer expires), the terminal may consider that a timing advance (TA) value is valid). Alternatively, the terminal may consider that a TAT for a secondary timing advance group (STAG) is suspended or expired. Alternatively, the terminal may consider that remaining TATs except for the TAT for the PTAG are suspended or expired. If the message includes a TA value for a cell group or cell, the terminal may configure (or initialize) a current TA value to be the TA value or may start (or restart) the TAT. If the TAT for the PTAG expires, the terminal may report the timer expiration to the base station (e.g., through an RRC message, through a PUCCH transmission resource, through MAC control information, or by performing a random access procedure), a TA value may be re-configured for the terminal by the base station (e.g., through an RRC message, a PUCCH transmission resource, MAC control information, or a response message (random access response (RAR) of a random access procedure), or when the TA value is re-configured, the terminal may start (or restart) the TAT. As another method, if the TAT for the PTAG expires, when information indicating cell or cell group activation (or information not indicating deactivation) is received later through the message described above, the terminal may report the timer expiration to the base station (e.g., through an RRC message, through a PUCCH transmission resource, through MAC control information, or by performing a random access procedure), a TA value may be re-configured for the terminal by the base station (e.g., through an RRC message, a PUCCH transmission resource, MAC control information, or a response message (random access response (RAR) of a random access procedure), or when the TA value is re-configured, the terminal may start (or restart) the TAT. As another method, if the TAT for the PTAG expires, the terminal may not perform a procedure of updating a TA value, and consider that the TA value is not valid any more.

2> If a bandwidth part for the cell or cell group indicated to be deactivated is not configured in the message (there is no bandwidth part configuration information for the cell or cell group in the message), 3> The terminal may consider a current active bandwidth part (or a previously activated bandwidth part, a lastly activated bandwidth part, or a bandwidth part that has been activated before receiving the message) as a bandwidth part required to be subject to a proposed terminal procedure (or required to be monitored, required to be activated, required to be subject to a beam failure detection procedure, required to be subject to an RLM procedure, required to subject to TA value maintenance, required to be subject to a random access procedure, or required to subject to PDCCH monitoring) for the cell or cell group indicated to be deactivated.

2> If a bandwidth part (e.g., a first active downlink (or uplink) bandwidth part (e.g., firstActiveDownlinkBWP, firstActiveUplinkBWP, or a newly defined bandwidth part) for the cell or cell group indicated to be deactivated is configured in the message (there is bandwidth part configuration information for the cell or cell group in the message), 3> The terminal may consider the bandwidth part configured in the message as a bandwidth part required to be subject to a proposed terminal procedure (or required to be monitored, required to be activated, required to be subject to a beam failure detection procedure, required to be subject to an RLM procedure, required to subject to TA value maintenance, required to be subject to a random access procedure, or required to subject to PDCCH monitoring) for the cell or cell group indicated to be deactivated. Alternatively, the terminal may switch (or activate) to the bandwidth part configured in the message, to perform a proposed terminal procedure for the cell or cell group indicated to be deactivated. As another method, when a bandwidth part is configured in the message, the base station may always configure the bandwidth part to be a current active bandwidth part of the terminal (or a previously activated bandwidth part, a lastly activated bandwidth part, or a bandwidth part that has been activated before receiving the message), to enable the terminal to perform a proposed terminal procedure in the current active bandwidth part (or a previously activated bandwidth part, a lastly activated bandwidth part, or a bandwidth part that has been activated before receiving the message).

2> If a beam failure detection procedure (beam failure detection or beam failure recovery) or an RLM procedure (radio link monitoring) for the cell or cell group indicated to be deactivated is configured in the message or if relevant configuration information is included in the message, 3> The terminal performs a beam failure detection procedure or an RLM procedure for the cell or cell group indicated to be deactivated, in the bandwidth part determined in the proposed procedure, based on the configuration information for the beam failure detection (beam failure detection or beam failure recovery) procedure or the RLM procedure.

2> If a beam failure detection procedure (beam failure detection or beam failure recovery) or an RLM procedure (radio link monitoring) for the cell or cell group indicated to be deactivated is not configured in the message or if relevant configuration information is not included in the message, 3> The terminal does not perform the beam failure detection (beam failure detection or beam failure recovery) procedure or the RLM procedure for the cell or cell group indicated to be deactivated, in the bandwidth part determined in the proposed procedure.

2> If the message includes bearer configuration information (configuration information related to a PHY layer device, a MAC layer device, an RLC layer device, a PDCP layer device, or an SDAP layer device), security key-related configuration information, or cell or cell group configuration information, the terminal may apply (or configure or re-configure) the received configuration information while maintaining the cell or cell group at a deactivated state.

1> If activation of a cell or cell group is configured (or indicated) or deactivation is not configured (or not indicated) for the terminal by an RRC message (or MAC CE or DCI of PDCCH), 2> If a bandwidth part for the cell or cell group indicated to be activated is not configured in the message (there is no bandwidth part configuration information for the cell or cell group in the message), 3> The terminal may consider a current active bandwidth part (or a previously activated bandwidth part, a lastly activated bandwidth part, or a bandwidth part that has been activated before receiving the message) as a bandwidth part required to be subject to a proposed terminal procedure (or required to be monitored, required to be activated, required to be subject to a beam failure detection procedure, required to be subject to an RLM procedure, required to subject to TA value maintenance, required to be subject to a random access procedure, or required to subject to PDCCH monitoring) for the cell or cell group indicated to be deactivated.

2> If a bandwidth part (e.g., a first active downlink (or uplink) bandwidth part (e.g., firstActiveDownlinkBWP or firstActiveUplinkBWP) or a newly defined bandwidth part) for the cell or cell group indicated to be activated is configured in the message (there is bandwidth part configuration information for the cell or cell group in the message), 3> The terminal may consider the bandwidth part configured in the message as a bandwidth part required to be subject to a proposed terminal procedure (or required to be monitored, required to be activated, required to be subject to a beam failure detection procedure, required to be subject to an RLM procedure, required to subject to TA value maintenance, required to be subject to a random access procedure, or required to subject to PDCCH monitoring) for the cell or cell group indicated to be activated. Alternatively, the terminal may switch (or activate) to the bandwidth part configured in the message, to perform a proposed terminal procedure for the cell or cell group indicated to be deactivated.

2> The terminal may perform a procedure of the first embodiment, the second embodiment, or the third embodiment of a terminal operation considering DC configuration information proposed above in the disclosure, for the cell or cell group indicated to be activated, in the bandwidth part determined in the proposed procedure, and may activate the cell or cell group, based on or without a random access procedure according to conditions proposed in the embodiments.

3> If the conditions proposed in the procedure of the first embodiment, the second embodiment, or the third embodiment of a terminal operation considering DC configuration information proposed above in the disclosure are satisfied, thus the terminal activates the cell or cell group without a random access procedure, but fails the activation and then falls back to the random access procedure or performs the random access procedure through the fallback, 4> When a random access procedure is performed in the fallback procedure, the terminal may perform the random access procedure (a normal random access procedure (4-step random access procedure) or a 2-step random access procedure (two-step RACH) considering the message or system information) in the bandwidth part determined in the proposed procedure, a current bandwidth part (a previously activated bandwidth part or a lastly activated bandwidth part), a first active downlink (or uplink) bandwidth part (e.g., firstActiveDownlinkBWP, firstActiveUplinkBWP, or a newly defined bandwidth part) configured in the message, an initial bandwidth part (or an initial BWP or an initial bandwidth part broadcast (or configured) by system information of the cell or cell group).

2> If the message includes bearer configuration information (configuration information related to a PHY layer device, a MAC layer device, an RLC layer device, a PDCP layer device, or an SDAP layer device), security key-related configuration information, or cell or cell group configuration information, the terminal may apply (or configure or re-configure) the received configuration information while activating the cell or cell group.

The terminal may receive the second RRC message **1*k*-20 from the master base station (MCG or MN) or apply the received configuration information, and generate a third RRC message 1*k*-25 or a fourth message and transmit same to the base station (1*k*-25**). The third RRC message may include some of the following pieces of information.

Second RRC message identifier having the same value as a second RRC message identifier included in the second RRC message Indicator or identifier indicating that the second RRC message has been successfully received Fourth RRC message including a response indicating that a first RRC message generated and transmitted by a secondary base station has been successfully received. The fourth RRC message may include some of the following pieces of information.

First RRC message identifier having the same value as a first RRC message identifier included in the first RRC message Indicator or identifier indicating that the first RRC message has been successfully received Response indicator indicating that the first RRC message has been successfully applied The base station (e.g., master base station) may, when receiving a third RRC message, identify whether the third message is a response message for a second RRC message, through a second identifier. The base station may identify a fourth RRC message included in the third RRC message, include the fourth RRC message in a configuration complete message indicating, to a secondary cell group base station, that configuration has been completed, and transmit the third RRC message to the secondary base station via an Xn interface (e.g., an inter-base station interface) or an Sn interface (an interface between a base station and an AMF, UMF, or a base station) (**1*k*-30**). The configuration complete message may include some of the following pieces of information.

Fourth RRC message included in the third RRC message

Indicator or identifier indicating that a configuration (cell group addition, change, or release) or an indication (cell group activation, deactivation, suspension, or resumption) indicated by the request accept message or a first RRC message has been completed The base station (e.g., secondary base station) may, when receiving the configuration complete message, read or identify a fourth RRC message included in the configuration complete message, and identify whether the fourth message is a response message for a first RRC message, through a first identifier. Then, the base station may identify whether a configuration or indication indicated thereby has been successfully completed. The secondary base station may, when receiving the configuration complete message or the fourth RRC message, transmit, to the master base station in response to the message, a response message indicating that the configuration complete message or the fourth RRC message has been successfully received.

Figure 1L:
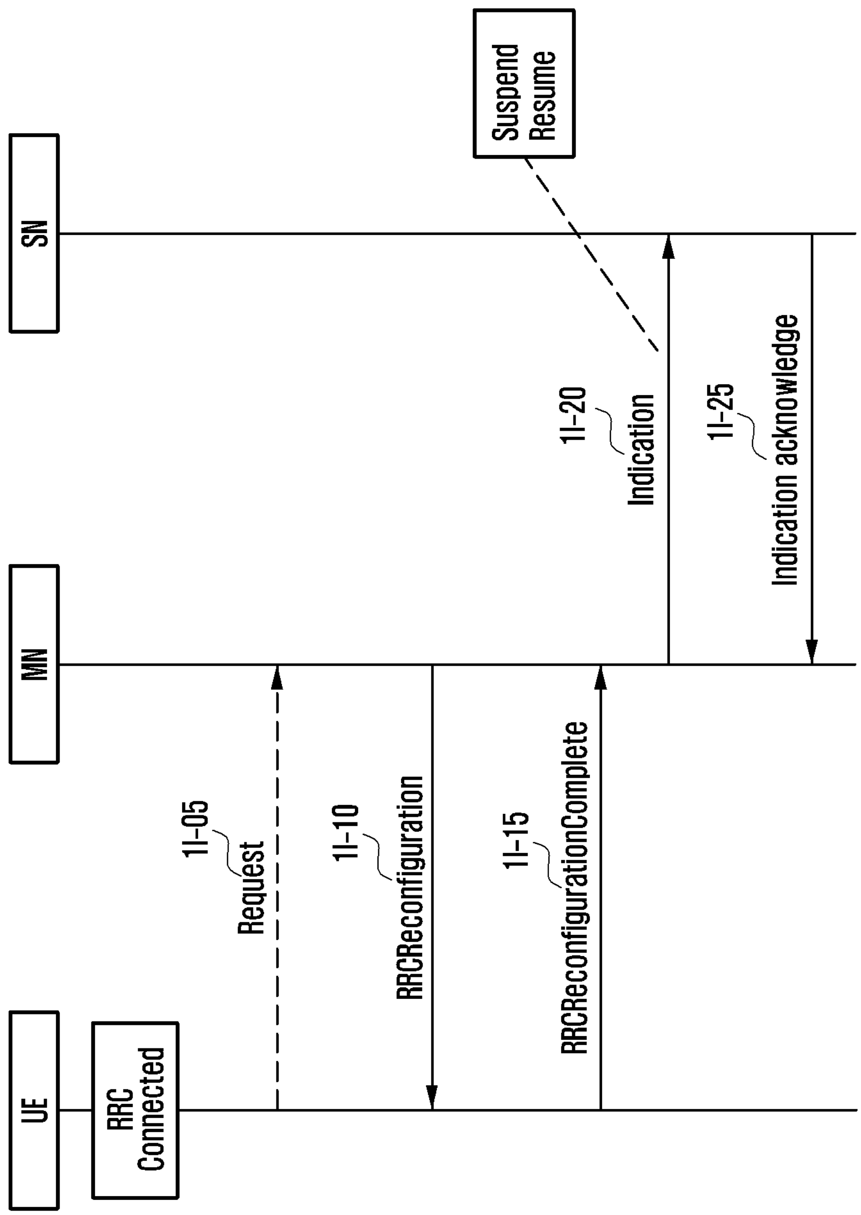
FIG. 1L is a diagram illustrating a second signaling procedure of configuring or releasing DC or configuring, releasing, activating, resuming, suspending, or deactivating a secondary cell group configured by DC according to an embodiment of the disclosure.

FIG. 1L is a diagram illustrating a second signaling procedure of configuring or releasing DC or configuring, releasing, activating, resuming, suspending, or deactivating a secondary cell group configured by DC according to an embodiment of the disclosure.

In FIG. 1L, a terminal may configure an RRC connection with a network or a base station as illustrated in FIG. 1F of the disclosure, and may perform data transmission or reception with the base station (e.g., a master cell group, a master node (MN), a master cell group (MCG), or cells (PCell or SCell) of a master cell group).

The base station may configure DC for the terminal according to a predetermined reason (e.g., when a high data transfer rate is required, when there is a request of the terminal (**1*l*-05), or when a high QoS requirement is required to be satisfied). For example, the terminal may transmit a request to the base station to configure, release, activate, deactivate, resume, or suspend DC, a cell group (e.g., secondary cell group), or a cell, and the request message may include a frequency (or channel) measurement result report, a cell group identifier, cell identifiers, or measurement results (1*l*-05**). As another method, the base station may consider the amount of downlink (or uplink) data or the amount of buffers to determine whether the base station configures, releases, adds, deactivates, activates, resumes, changes, reconfigures, or suspends DC, a cell group (e.g., secondary cell group), or a cell.

The master base station (master node (MN) or master cell group (MCG)) may receive a frequency or channel measurement report for each frequency or channel received from the terminal, and determine a secondary base station (secondary node (SN) or secondary cell group (SCG)) for which DC is to be configured, based on the measurement report. Alternatively, the master base station may consider the amount of downlink (or uplink) data or the amount of buffers to determine whether the base station configures, releases, adds, deactivates, activates, resumes, changes, reconfigures, or suspends DC, a cell group (e.g., secondary cell group), or a cell. The master base station may transmit a first RRC message to the terminal to configure, release, add, deactivate, activate, resume, change, reconfigure, or suspend DC, a cell group (e.g., secondary cell group), or a cell for the determined secondary base station (**1*l*-10**). In the first RRC message, each separate new request message may be defined and indicated to indicate the terminal to configure, release, add, deactivate, activate, resume, change, reconfigure, or suspend DC, a cell group (e.g., secondary cell group), or a cell. As another method, a new indicator may be defined in an existing message (e.g., RRCReconfiguration message or RRCResume message), to indicate (or request) to configure, release, add, deactivate, activate, resume, change, reconfigure, or suspend a cell group (e.g., secondary cell group) or a cell. The first RRC message may include some of the following pieces of information.

- First RRC message identifier (e.g., rrc-Transaction identifier) for distinguishing the first RRC message. Since the terminal and the base station (e.g., the master base station) transmit or receive several RRC messages, an identifier for distinguishing each RRC message may be included in the RRC message. For example, an RRC message (e.g., RRCReconfiguration) transmitted by a transmission node, an RRC message (e.g., RRCReconfigurationComplete) transmitted by a reception node and corresponding to the RRC message (e.g., RRCReconfiguration), or an RRC message transmitted by a transmission node and corresponding to the RRC message may include the same first RRC message identifier.
- Configuration information or indicator (configuration information or an indicator for the terminal) for configuring, releasing, adding, deactivating, activating, resuming, changing, reconfiguring, or suspending DC, a cell group (e.g., secondary cell group), or a cell
- Indicator (e.g., activated, deactivated, suspended, or resumed) indicating the state of a cell group
- Cell group identifier for distinguishing between cell groups (The cell group identifier may be assigned by the master base station, or one identifier among promised identifiers may be assigned by the secondary base station.
- Cell group or cell configuration information
- Bearer configuration information. For example, indicator information (e.g., a PDCP suspension indicator, a PDCP reestablishment indicator, a PDCP data recovery indicator, an RLC reestablishment indicator, a MAC partial initialization indicator, a MAC initialization indicator, or an indicator that triggers a new operation) that indicates an operation of a protocol layer device (e.g., SDAP layer device, PDCP layer device, RLC layer device, or MAC layer device) of each bearer
- If the configuration information or indicator for configuring, adding, activating, resuming, changing, or reconfiguring DC, a cell group (e.g., secondary cell group), or a cell is included, a first indicator (e.g., mobilityControlInfor or ReconfigurationWithSync) may be included together. However, if the configuration information or indicator for releasing, deactivating, reconfiguring, or suspending DC, a cell group (e.g., secondary cell group), or a cell is included, the first indicator (e.g., mobilityControlInfor or ReconfigurationWithSync) may not be included. The first indicator may be an indicator that triggers a random access procedure for the cell group or cell, an indicator that synchronizes a signal with a new cell, an indicator that indicates frequency shift of the terminal, or an indicator that indicates a change of the cell group (or cell). As another example, the terminal may perform PDCCH monitoring in a cell group or a cell indicated or configured above, and trigger and perform a random access procedure according to an indication indicated by a PDCCH. For example, a higher layer device (e.g., RRC layer device) may transmit an indicator that triggers a random access procedure to a lower layer device (e.g., MAC layer device).
- If the configuration information or indicator for configuring, adding, activating, resuming, changing, or reconfiguring DC, a cell group (e.g., secondary cell group), or a cell is included, random access configuration information may be included together. However, if the configuration information or indicator for releasing, deactivating, reconfiguring, or suspending DC, a cell group (e.g., secondary cell group), or a cell is included, the random access configuration information may not be included. The random access configuration information may include random access transmission resource information (time or frequency transmission resource) or designated preamble information for preamble transmission for the cell group or cell.
- Time information indicating when to activate, resume, deactivate, or suspend DC, a cell group (e.g., secondary cell group), or a cell (PSCell or SCG SCell)) (e.g., information (e.g., X) indicating a timing, a time unit, a subframe, time slot, or symbol unit), for example, time information indicating whether to activate, resume, deactivate, or suspend a cell in the (n+X)th cell if the message is received in the n-th time unit.
- First channel measurement configuration information for each cell or each bandwidth part
- Second channel measurement configuration information for each cell or each bandwidth part
- Indicator that adds a cell group configuration, indicator (ReconfigurationWithSync) indicating a cell group change, or indicator (ReconfigurationWithSync or newly defined indicator) indicating a random access procedure
- Indicator (ReconfigurationWithSync or newly defined indicator) indicating whether to activate a cell group by performing a random access procedure or activate the cell group without the random access procedure when the cell group is activated
- Radio resource management (RRM) configuration information or frequency measurement configuration information, or separate radio resource management (RRM) configuration information or frequency measurement configuration information (e.g., frequency measurement configuration information (reduced or relaxed RRM configuration information) simplified for battery conservation) which is to be applied or is required to be performed when a cell group is deactivated)
- Configuration information for radio link monitoring (RLM) or configuration information for RLM which is to be applied or is required to be performed when a cell group is deactivated. For example, the configuration information is configuration information of a beam for each cell or configuration information of a beam for each bandwidth part, which is required to be measured by the terminal when a cell group is deactivated, may include beam-related configuration information (transmission configuration indication (TCI) state or quasi co-location (QCL)), may include a timing advance (TA) value (or offset value), a timer (time alignment timer (TAT)) indicating the validity of the TA value, or a timer value (TAT value) for synchronization of a downlink signal of the base station or an uplink signal of the base station, or may include synchronization signal block (SSB) configuration information, channel state information reference signal (CSI-RS) configuration information, or reference signal (RS) configuration information indicating a subject required to be measured, or transmission resource information (e.g., PUCCH configuration information (e.g., scheduling request (SR) information or particular transmission resource), frequency transmission resource, or time transmission resource) for reporting a result when beam failure occurs. In addition, the configuration information may include bandwidth part configuration information (e.g., this may be indicated by a bandwidth part identifier) indicating which bandwidth part in which an RLM procedure is to be performed. As another method, when the state of a cell group is a deactivated state, the terminal may perform an RLM procedure in a first active bandwidth part (or a first active downlink bandwidth part, firstActiveDownlinkBWP-ID) configured by the RRC message, to early monitor the first active bandwidth part required to be activated when the cell group is activated, so as to minimize delays in cell group activation. As another method, in a case where the state of a cell group is configured as a deactivated state (activated state), the terminal may perform an RLM procedure in a bandwidth part lastly (or previously) activated before the cell group state becomes deactivated, to continuously maintain a connection with the cell group (e.g., in a case where bandwidth part configuration information indicating which bandwidth part in which the RLM procedure is to be performed is not configured), or when the cell group is activated, the terminal may perform an activation procedure in a first active bandwidth part (or a first active downlink bandwidth part, firstActiveDownlinkBWP-ID) configured by an RRC message. When a cell group is activated, if bandwidth part-related configuration information indicating which bandwidth part in which an RLM procedure is to be performed is not configured, the terminal may also perform the RLM procedure in the lastly (or previously) activated bandwidth part. In addition, the configuration information may include beam-related configuration information (e.g., this may be indicated by a bandwidth part identifier, a TCI state, or QCL configuration information) indicating which beam in which an RLM procedure is to be performed. As another method, when the state of a cell group is a deactivated state, the terminal may perform an RLM procedure in a beam (e.g., TCI state or QCL configuration information) configured by the RRC message, or may activate the beam, perform the RLM procedure, and early monitor the beam required to be activated when the cell group is activated, so as to minimize delays in cell group activation. As another method, in a case where the state of a cell group is configured as a deactivated state (activated state), the terminal may perform an RLM procedure in a beam lastly (or previously) activated before the cell group state becomes deactivated, to continuously maintain a connection with the cell group (e.g., in a case where beam-related configuration information indicating which beam in which the RLM procedure is to be performed is not configured), or when the cell group is activated, the terminal may perform an activation procedure in a beam configured by an RRC message. When a cell group is activated, if beam-related configuration information indicating which beam in which an RLM procedure is to be performed is not configured, the terminal may also perform the RLM procedure in the lastly (or previously) activated beam.

Configuration information for a beam failure detection procedure or beam failure detection (BFD) or configuration information for BFD which is to be applied or is required to be performed when a cell group is deactivated. For example, the configuration information is configuration information of a beam for each cell or configuration information of a beam for each bandwidth part, which is required to be measured by the terminal when a cell group is deactivated, may include beam-related configuration information (transmission configuration indication (TCI) state or quasi co-location (QCL)), may include a timing advance (TA) value (or offset value), a timer (time alignment timer (TAT)) indicating the validity of the TA value, or a timer value (TAT value) for synchronization of a downlink signal of the base station or an uplink signal of the base station, or may include synchronization signal block (SSB) configuration information, channel state information reference signal (CSI-RS) configuration information, or reference signal (RS) configuration information indicating a subject required to be measured, or transmission resource information (e.g., PUCCH configuration information (e.g., scheduling request (SR) information or particular transmission resource), frequency transmission resource, or time transmission resource) for reporting a result when beam failure occurs. In addition, the configuration information may include bandwidth part configuration information (e.g., this may be indicated by a bandwidth part identifier) indicating which bandwidth part in which a beam failure detection procedure is to be performed. As another method, when the state of a cell group is a deactivated state, the terminal may perform a beam failure detection procedure in a first active bandwidth part (or a first active downlink bandwidth part, firstActiveDownlinkBWP-ID) configured by the RRC message, to early monitor the first active bandwidth part required to be activated when the cell group is activated, so as to minimize delays in cell group activation. As another method, in a case where the state of a cell group is configured as a deactivated state (activated state), the terminal may perform a beam failure detection procedure in a bandwidth part lastly (or previously) activated before the cell group state becomes deactivated, to continuously maintain a connection with the cell group (e.g., in a case where bandwidth part configuration information indicating which bandwidth part in which the beam failure detection procedure is to be performed is not configured), or when the cell group is activated, the terminal may perform an activation procedure in a first active bandwidth part (or a first active downlink bandwidth part, firstActiveDownlinkBWP-ID) configured by an RRC message. When a cell group is activated, if bandwidth part-related configuration information indicating which bandwidth part in which a beam failure detection procedure is to be performed is not configured, the terminal may also perform the beam failure detection procedure in the lastly (or previously) activated bandwidth part. In addition, the configuration information may include beam-related configuration information (e.g., this may be indicated by a bandwidth part identifier, a TCI state, or QCL configuration information) indicating which beam in which a beam failure detection procedure is to be performed. As another method, when the state of a cell group is a deactivated state, the terminal may perform a beam failure detection procedure in a beam (e.g., TCI state or QCL configuration information) configured by the RRC message, to early monitor the beam required to be activated when the cell group is activated, so as to minimize delays in cell group activation. As another method, in a case where the state of a cell group is configured as a deactivated state (activated state), the terminal may perform a beam failure detection procedure in a beam lastly (or previously) activated before the cell group state becomes deactivated, to continuously maintain a connection with the cell group (e.g., in a case where beam-related configuration information indicating which beam in which the beam failure detection procedure is to be performed is not configured), or when the cell group is activated, the terminal may perform an activation procedure in a beam configured by an RRC message. When a cell group is activated, if beam-related configuration information indicating which beam in which a beam failure detection procedure is to be performed is not configured, the terminal may also perform the beam failure detection procedure in the lastly (or previously) activated beam.

When the first RRC message **1*l*-15** is received from the master base station, the terminal may read and identify the first RRC message, and configure, add, change, resume, suspend, or deactivate DC or a cell group (e.g., secondary cell group). In addition, when the first RRC message includes a first indicator that triggers a random access procedure, the terminal may trigger the random access procedure for a cell group or cell configured or indicated above. When the random access procedure is performed, if the RRC message includes random access information or there is stored random access information, the terminal may perform a random access procedure (e.g., a contention-free random access procedure (e.g., 4-step random access or 2-step random access), based on the random access information which is stored or is received from the RRC message, or based on system information. If the RRC message does not include random access information, the terminal may perform a random access procedure (e.g., a contention-based random access procedure (e.g., 4-step random access or 2-step random access). As another example, the terminal may perform PDCCH monitoring in a cell group or a cell indicated or configured above, and trigger and perform a random access procedure according to an indication indicated by a PDCCH. For example, a higher layer device (e.g., RRC layer device) may transmit an indicator that triggers a random access procedure to a lower layer device (e.g., MAC layer device).

The terminal may receive the first RRC message **1*l*-10 or apply the received configuration information, and generate a second RRC message and transmit same to the base station (1*l*-15**). The second RRC message may include some of the following pieces of information.

- First RRC message identifier having the same value as a first RRC message identifier included in the first RRC message
- Indicator or identifier indicating that the first RRC message has been successfully received The base station (e.g., master base station) may, when receiving a second RRC message, identify whether the third message is a response message for a first RRC message, through a first identifier. The base station may identify the first RRC message and may transmit an indication message including an indication indicating, to a secondary cell group base station, that a cell group has been configured, added, released, activated, resumed, suspended, or deactivated, to the secondary base station via an Xn interface (e.g., an inter-base station interface) or an Sn interface (an interface between a base station and an AMF, UMF, or a base station) (**1*l*-20**). The indication message may include some of the following pieces of information.

- Identifier enabling the indication message to be distinguished
- Configuration information or indicator (e.g., configuration information or an indicator for a secondary cell group) for indicating that DC, a cell group (e.g., secondary cell group), or a cell has been configured, released, added, deactivated, activated, resumed, changed, reconfigured, or suspended The base station (e.g., secondary base station) may, when receiving the indication message, read or identify configuration information or a message included in the indication message, generate an indication identification message as a response message for the indication message, and transmit same to the master base station (**1*l*-25**).

- Identifier having the same value as an identifier included in the indication message
- Indicator or identifier indicating that the indication message has been successfully received
- Response indicator indicating that the indication message has been successfully applied Signaling procedures proposed above in the disclosure may be combined with each other and modified to be expanded to new signaling procedures. For example, when the master base station receives the message **1*l*-05 from the terminal, the master base station may ask or make a request to the secondary base station as indicated by reference numeral 1*l*-20 or 1*k*-10 in FIG. 1K, then receive a response message as a response therefor as indicated by reference numeral 1*l*-25 or 1*k*-15 in FIG. 1K, and then configure an RRC message corresponding to reference numeral 1*l*-10 according to the response message and transmit same to the terminal, and the terminal may configure a cell group according to an indication of the RRC message and transmit the message 1*l*-15** to the master base station as a response for the RRC message.

Figure 1M:
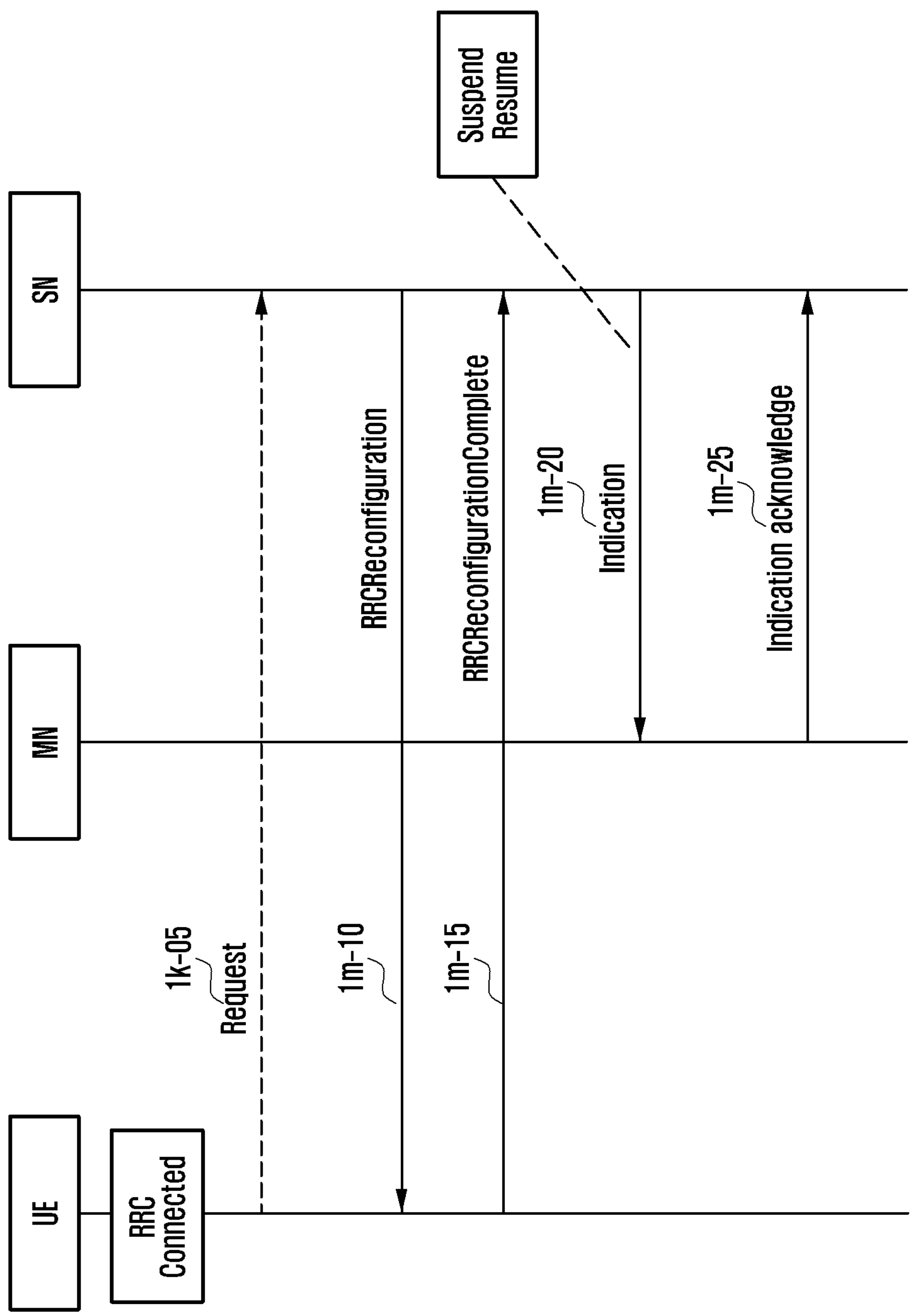
FIG. 1M is a diagram illustrating a third signaling procedure of configuring or releasing DC or configuring, releasing, activating, resuming, suspending, or deactivating a secondary cell group configured by DC according to an embodiment of the disclosure.

FIG. 1M is a diagram illustrating a third signaling procedure of configuring or releasing DC or configuring, releasing, activating, resuming, suspending, or deactivating a secondary cell group configured by DC according to an embodiment of the disclosure.

In FIG. 1M, a terminal may configure an RRC connection with a network or a base station as illustrated in FIG. 1F of the disclosure, and may perform data transmission or reception with the base station (e.g., a master cell group, a master node (MN), a master cell group (MCG), or cells (PCell or SCell) of a master cell group).

In FIG. 1M, according to a configuration procedure of FIG. 1F, the base station may configure, for the terminal, an SRB (e.g., SRB3) enabling direct transmission or reception of an RRC message or a control message between the terminal and a secondary base station.

The base station (e.g., secondary base station or master base station) may configure DC for the terminal according to a predetermined reason (e.g., when a high data transfer rate is required, when there is a request of the terminal (**1*m*-05), or when a high QoS requirement is required to be satisfied). For example, the terminal may transmit a request to the base station to configure, release, activate, deactivate, resume, or suspend DC, a cell group (e.g., secondary cell group), or a cell, or transmit the request to the secondary base station through SRB3, and the request message may include a frequency (or channel) measurement result report, a cell group identifier, cell identifiers, or measurement results (1***m*-05). As another method, the secondary base station may consider the amount of downlink (or uplink) data or the amount of buffers to determine whether the (secondary) base station configures, releases, adds, deactivates, activates, resumes, changes, reconfigures, or suspends DC, a cell group (e.g., secondary cell group), or a cell.

The secondary base station (secondary node (SN) or secondary cell group (SCG)) may receive a frequency or channel measurement report for each frequency or channel received from the terminal and, based on the measurement report, may determine whether to configure, release, add, deactivate, activate, resume, change, reconfigure, or suspend DC, a cell group (e.g., secondary cell group), or a cell. Alternatively, the secondary base station may consider the amount of downlink (or uplink) data or the amount of buffers to determine whether the base station configures, releases, adds, deactivates, activates, resumes, changes, reconfigures, or suspends DC, a cell group (e.g., secondary cell group), or a cell.

The secondary base station may transmit a first RRC message to the terminal through SRB3 to configure, release, add, deactivate, activate, resume, change, reconfigure, or suspend DC, a cell group (e.g., secondary cell group), or a cell (1*m*-10). In the first RRC message, each separate new request message may be defined and indicated to indicate the terminal to configure, release, add, deactivate, activate, resume, change, reconfigure, or suspend DC, a cell group (e.g., secondary cell group), or a cell. As another method, a new indicator may be defined in an existing message (e.g., RRCReconfiguration message or RRCResume message), to indicate (or request) to configure, release, add, deactivate, activate, resume, change, reconfigure, or suspend a cell group (e.g., secondary cell group) or a cell. The first RRC message may include some of the following pieces of information.

- First RRC message identifier (e.g., rrc-Transaction identifier) for distinguishing the first RRC message. Since the terminal and the base station (e.g., the secondary base station) transmit or receive several RRC messages, an identifier for distinguishing each RRC message may be included in the RRC message. For example, an RRC message (e.g., RRCReconfiguration) transmitted by a transmission node, an RRC message (e.g., RRCReconfigurationComplete) transmitted by a reception node and corresponding to the RRC message (e.g., RRCReconfiguration), or an RRC message transmitted by a transmission node and corresponding to the RRC message may include the same first RRC message identifier.
- Configuration information or indicator (configuration information or an indicator for the terminal) for configuring, releasing, adding, deactivating, activating, resuming, changing, reconfiguring, or suspending DC, a cell group (e.g., secondary cell group), or a cell
- Indicator (e.g., activated, deactivated, suspended, or resumed) indicating the state of a cell group
- Cell group identifier for distinguishing between cell groups. The cell group identifier may be assigned by the master base station, or one identifier among promised identifiers may be assigned by the secondary base station.
- Cell group or cell configuration information
- Bearer configuration information. For example, indicator information (e.g., a PDCP suspension indicator, a PDCP reestablishment indicator, a PDCP data recovery indicator, an RLC reestablishment indicator, a MAC partial initialization indicator, a MAC initialization indicator, or an indicator that triggers a new operation) that indicates an operation of a protocol layer device (e.g., SDAP layer device, PDCP layer device, RLC layer device, or MAC layer device) of each bearer
- If the configuration information or indicator for configuring, adding, activating, resuming, changing, or reconfiguring DC, a cell group (e.g., secondary cell group), or a cell is included, a first indicator (e.g., mobilityControlInfor or ReconfigurationWithSync) may be included together. However, if the configuration information or indicator for releasing, deactivating, reconfiguring, or suspending DC, a cell group (e.g., secondary cell group), or a cell is included, the first indicator (e.g., mobilityControlInfor or ReconfigurationWithSync) may not be included. The first indicator may be an indicator that triggers a random access procedure for the cell group or cell, an indicator that synchronizes a signal with a new cell, an indicator that indicates frequency shift of the terminal, or an indicator that indicates a change of the cell group (or cell). As another example, the terminal may perform PDCCH monitoring in a cell group or a cell indicated or configured above, and trigger and perform a random access procedure according to an indication indicated by a PDCCH. For example, a higher layer device (e.g., RRC layer device) may transmit an indicator that triggers a random access procedure to a lower layer device (e.g., MAC layer device).
- If the configuration information or indicator for configuring, adding, activating, resuming, changing, or reconfiguring DC, a cell group (e.g., secondary cell group), or a cell is included, random access configuration information may be included together. However, if the configuration information or indicator for releasing, deactivating, reconfiguring, or suspending DC, a cell group (e.g., secondary cell group), or a cell is included, the random access configuration information may not be included. The random access configuration information may include random access transmission resource information (time or frequency transmission resource) or designated preamble information for preamble transmission for the cell group or cell.
- Time information indicating when to activate, resume, deactivate, or suspend DC, a cell group (e.g., secondary cell group), or a cell (PSCell or SCG SCell)) (e.g., information (e.g., X) indicating a timing, a time unit, a subframe, time slot, or symbol unit), for example, time information indicating whether to activate, resume, deactivate, or suspend a cell in the (n+X)th cell if the message is received in the n-th time unit.
- First channel measurement configuration information for each cell or each bandwidth part
- Second channel measurement configuration information for each cell or each bandwidth part
- Indicator that adds a cell group configuration, indicator (ReconfigurationWithSync) indicating a cell group change, or indicator (ReconfigurationWithSync or newly defined indicator) indicating a random access procedure
- Indicator (ReconfigurationWithSync or newly defined indicator) indicating whether to activate a cell group by performing a random access procedure or activate the cell group without the random access procedure when the cell group is activated Radio resource management (RRM) configuration information or frequency measurement configuration information, or separate radio resource management (RRM) configuration information or frequency measurement configuration information (e.g., frequency measurement configuration information (reduced or relaxed RRM configuration information) simplified for battery conservation) which is to be applied or is required to be performed when a cell group is deactivated)

Configuration information for radio link monitoring (RLM) or configuration information for RLM which is to be applied or is required to be performed when a cell group is deactivated. For example, the configuration information is configuration information of a beam for each cell or configuration information of a beam for each bandwidth part, which is required to be measured by the terminal when a cell group is deactivated, may include beam-related configuration information (transmission configuration indication (TCI) state or quasi co-location (QCL)), may include a timing advance (TA) value (or offset value), a timer (time alignment timer (TAT)) indicating the validity of the TA value, or a timer value (TAT value) for synchronization of a downlink signal of the base station or an uplink signal of the base station, or may include synchronization signal block (SSB) configuration information, channel state information reference signal (CSI-RS) configuration information, or reference signal (RS) configuration information indicating a subject required to be measured, or transmission resource information (e.g., PUCCH configuration information (e.g., scheduling request (SR) information or particular transmission resource), frequency transmission resource, or time transmission resource) for reporting a result when beam failure occurs. In addition, the configuration information may include bandwidth part configuration information (e.g., this may be indicated by a bandwidth part identifier) indicating which bandwidth part in which an RLM procedure is to be performed. As another method, when the state of a cell group is a deactivated state, the terminal may perform an RLM procedure in a first active bandwidth part (or a first active downlink bandwidth part, firstActiveDownlinkBWP-ID) configured by the RRC message, to early monitor the first active bandwidth part required to be activated when the cell group is activated, so as to minimize delays in cell group activation. As another method, in a case where the state of a cell group is configured as a deactivated state (activated state), the terminal may perform an RLM procedure in a bandwidth part lastly (or previously) activated before the cell group state becomes deactivated, to continuously maintain a connection with the cell group (e.g., in a case where bandwidth part configuration information indicating which bandwidth part in which the RLM procedure is to be performed is not configured), or when the cell group is activated, the terminal may perform an activation procedure in a first active bandwidth part (or a first active downlink bandwidth part, firstActiveDownlinkBWP-ID) configured by an RRC message. When a cell group is activated, if bandwidth part-related configuration information indicating which bandwidth part in which an RLM procedure is to be performed is not configured, the terminal may also perform the RLM procedure in the lastly (or previously) activated bandwidth part. In addition, the configuration information may include beam-related configuration information (e.g., this may be indicated by a bandwidth part identifier, a TCI state, or QCL configuration information) indicating which beam in which an RLM procedure is to be performed. As another method, when the state of a cell group is a deactivated state, the terminal may perform an RLM procedure in a beam (e.g., TCI state or QCL configuration information) configured by the RRC message, or may activate the beam, perform the RLM procedure, and early monitor the beam required to be activated when the cell group is activated, so as to minimize delays in cell group activation. As another method, in a case where the state of a cell group is configured as a deactivated state (activated state), the terminal may perform an RLM procedure in a beam lastly (or previously) activated before the cell group state becomes deactivated, to continuously maintain a connection with the cell group (e.g., in a case where beam-related configuration information indicating which beam in which the RLM procedure is to be performed is not configured), or when the cell group is activated, the terminal may perform an activation procedure in a beam configured by an RRC message. When a cell group is activated, if beam-related configuration information indicating which beam in which an RLM procedure is to be performed is not configured, the terminal may also perform the RLM procedure in the lastly (or previously) activated beam.

Configuration information for a beam failure detection procedure or beam failure detection (BFD) or configuration information for BFD which is to be applied or is required to be performed when a cell group is deactivated. For example, the configuration information is configuration information of a beam for each cell or configuration information of a beam for each bandwidth part, which is required to be measured by the terminal when a cell group is deactivated, may include beam-related configuration information (transmission configuration indication (TCI) state or quasi co-location (QCL)), may include a timing advance (TA) value (or offset value), a timer (time alignment timer (TAT)) indicating the validity of the TA value, or a timer value (TAT value) for synchronization of a downlink signal of the base station or an uplink signal of the base station, or may include synchronization signal block (SSB) configuration information, channel state information reference signal (CSI-RS) configuration information, or reference signal (RS) configuration information indicating a subject required to be measured, or transmission resource information (e.g., PUCCH configuration information (e.g., scheduling request (SR) information or particular transmission resource), frequency transmission resource, or time transmission resource) for reporting a result when beam failure occurs. In addition, the configuration information may include bandwidth part configuration information (e.g., this may be indicated by a bandwidth part identifier) indicating which bandwidth part in which a beam failure detection procedure is to be performed. As another method, when the state of a cell group is a deactivated state, the terminal may perform a beam failure detection procedure in a first active bandwidth part (or a first active downlink bandwidth part, firstActiveDownlinkBWP-ID) configured by the RRC message, to early monitor the first active bandwidth part required to be activated when the cell group is activated, so as to minimize delays in cell group activation. As another method, in a case where the state of a cell group is configured as a deactivated state (activated state), the terminal may perform a beam failure detection procedure in a bandwidth part lastly (or previously) activated before the cell group state becomes deactivated, to continuously maintain a connection with the cell group (e.g., in a case where bandwidth part configuration information indicating which bandwidth part in which the beam failure detection procedure is to be performed is not configured), or when the cell group is activated, the terminal may perform an activation procedure in a first active bandwidth part (or a first active downlink bandwidth part, firstActiveDownlinkBWP-ID) configured by an RRC message. When a cell group is activated, if bandwidth part-related configuration information indicating which bandwidth part in which a beam failure detection procedure is to be performed is not configured, the terminal may also perform the beam failure detection procedure in the lastly (or previously) activated bandwidth part. In addition, the configuration information may include beam-related configuration information (e.g., this may be indicated by a bandwidth part identifier, a TCI state, or QCL configuration information) indicating which beam in which a beam failure detection procedure is to be performed. As another method, when the state of a cell group is a deactivated state, the terminal may perform a beam failure detection procedure in a beam (e.g., TCI state or QCL configuration information) configured by the RRC message, to early monitor the beam required to be activated when the cell group is activated, so as to minimize delays in cell group activation. As another method, in a case where the state of a cell group is configured as a deactivated state (activated state), the terminal may perform a beam failure detection procedure in a beam lastly (or previously) activated before the cell group state becomes deactivated, to continuously maintain a connection with the cell group (e.g., in a case where beam-related configuration information indicating which beam in which the beam failure detection procedure is to be performed is not configured), or when the cell group is activated, the terminal may perform an activation procedure in a beam configured by an RRC message. When a cell group is activated, if beam-related configuration information indicating which beam in which a beam failure detection procedure is to be performed is not configured, the terminal may also perform the beam failure detection procedure in the lastly (or previously) activated beam.

When the first RRC message 1*m*-15 is received from the secondary base station (SCG or SN) through SRB3, the terminal may read and identify the first RRC message, and configure, add, change, resume, suspend, or deactivate DC or a cell group (e.g., secondary cell group). In addition, when the first RRC message includes a first indicator that triggers a random access procedure, the terminal may trigger the random access procedure for a cell group or cell configured or indicated above. When the random access procedure is performed, if the RRC message includes random access information or there is stored random access information, the terminal may perform a random access procedure (e.g., a contention-free random access procedure (e.g., 4-step random access or 2-step random access), based on the random access information which is stored or is received from the RRC message, or based on system information. If the RRC message does not include random access information, the terminal may perform a random access procedure (e.g., a contention-based random access procedure (e.g., 4-step random access or 2-step random access). As another example, the terminal may perform PDCCH monitoring in a cell group or a cell indicated or configured above, and trigger and perform a random access procedure according to an indication indicated by a PDCCH. For example, a higher layer device (e.g., RRC layer device) may transmit an indicator that triggers a random access procedure to a lower layer device (e.g., MAC layer device).

The terminal may receive the first RRC message 1*m*-10 or apply the received configuration information, and generate a second RRC message and transmit same to the secondary base station through SRB3 (1*m*-15). The second RRC message may include some of the following pieces of information.

- First RRC message identifier having the same value as a first RRC message identifier included in the first RRC message
- Indicator or identifier indicating that the first RRC message has been successfully received The base station (e.g., secondary base station) may, when receiving a second RRC message, identify whether the third message is a response message for a first RRC message, through a first identifier. The base station may identify the first RRC message and may transmit an indication message including an indication indicating, to the master base station or a master cell group base station, that a cell group has been configured, added, released, activated, resumed, suspended, or deactivated, to the master base station via an Xn interface (e.g., an inter-base station interface) or an Sn interface (an interface between a base station and an AMF, UMF, or a base station) (1*m*-20). The indication message may include some of the following pieces of information.

- Identifier enabling the indication message to be distinguished
- Configuration information or indicator (e.g., configuration information or an indicator for a secondary cell group) for indicating that DC, a cell group (e.g., secondary cell group), or a cell has been configured, released, added, deactivated, activated, resumed, changed, reconfigured, or suspended The base station (e.g., master base station) may, when receiving the indication message, read or identify configuration information or a message included in the indication message, generate an indication identification message as a response message for the indication message, and transmit same to the secondary base station (1*m*-25).

- Identifier having the same value as an identifier included in the indication message
- Indicator or identifier indicating that the indication message has been successfully received
- Response indicator indicating that the indication message has been successfully applied When a message is transmitted to a terminal to configure or indicate, for or to the terminal, cell group or cell configuration information proposed above in the disclosure, if, for example, the message includes configuration information or an indicator for configuring, adding, activating, resuming, changing, or reconfiguring DC, a cell group (e.g., secondary cell group), or a cell, SDAP configuration information may be included or reconfigured or mapping configuration information for a bearer and a QoS flow of an SDAP layer device may be included, configured, or reconfigured. However, if the message includes configuration information or an indicator for releasing, deactivating, reconfiguring, or suspending DC, a cell group (e.g., secondary cell group), or a cell, SDAP configuration information may not be included or not be reconfigured or mapping configuration information for a bearer and a QoS flow of an SDAP layer device may not be included, not be configured, not be reconfigured, or may be suspended from being applied.

Signaling procedures proposed above in the disclosure may be combined with each other and modified to be expanded to new signaling procedures.

Signaling procedures proposed above in the disclosure may be expanded to multi-access technology. For example, pieces of configuration information of multiple cell groups may be configured for a terminal by an RRC message, and one or multiple cell groups (or cells) among the configured multiple cell groups may be activated or resumed by an indicator of a PDCCH, MAC control information or an RRC message, or one or multiple cell groups may be suspended or deactivated.

The following description of the disclosure proposes a terminal operation for each cell (PSCell or SCG SCell) or a terminal operation for each protocol layer device (e.g., an SDAP layer device, a PDCP layer device, an RLC layer device, a MAC layer device, or a PHY layer device), when DC, a cell group (e.g., secondary cell group) or a cell (PSCell or SCG SCell) is activated, resumed, added, deactivated, released, or suspended, as proposed above in the disclosure.

1> If a terminal receives configuration information or an indicator (e.g., through DCI of a PDCCH, MAC control information, or an RRC message) for configuring, adding, activating, resuming, changing, or reconfiguring DC, a cell group (e.g., secondary cell group), or a cell, the terminal may perform some of the following procedures.

2> A higher layer device (e.g., RRC layer device) may indicate the configuration information or indicator to a lower layer device (e.g., PDCP layer device, RLC layer device, MAC layer device, or PHY layer device).

2> A terminal operation for a PSCell: When the configuration information or indicator is received, the terminal may maintain a PSCell at an activated state, activate a downlink bandwidth part of the PSCell to a normal bandwidth part (e.g., a first active bandwidth part or a bandwidth part other than a dormant bandwidth part) configured by an RRC message or a lastly activated bandwidth part, and perform a terminal operation of an activated bandwidth part. As another method, when the configuration information or indicator is received, the terminal may maintain a PSCell at an activated state, reconfigure or convert a PDCCH monitoring period or a DRX configuration cycle of the PSCell to a short period, based on first DRX configuration information, and perform PDCCH monitoring while performing a terminal operation of an activated cell. Through the methods described above, the terminal may perform a terminal operation for a PSCell to quickly receive a scheduling indication from a cell group or cell and start data transmission or reception. In addition, in order to more quickly receive a scheduling indication from a cell group or cell and start data transmission or reception, the terminal may measure many or frequent channel signals, based on first channel measurement configuration information configured by an RRC message, to quickly report a channel measurement result to a base station. If a predetermined condition is satisfied, the terminal may also measure a channel signal, based on second channel measurement configuration information and report a measurement result to the base station again.

2> A terminal operation for an SCell of a secondary cell group: When the configuration information or indicator is received, the terminal may activate an SCell of a secondary cell group, activate a downlink bandwidth part or an uplink bandwidth part to a bandwidth part (e.g., a first active bandwidth part) configured by an RRC message, and perform a terminal operation of an activated SCell or bandwidth part. As another method, when the configuration information or indicator is received, if a dormant bandwidth part is configured in the SCell of the secondary cell group, the terminal may maintain the SCell at an activated state, activate a downlink bandwidth part of the SCell to a bandwidth part (e.g., a first active bandwidth part) configured by an RRC message, and perform a terminal operation of an activated bandwidth part, or if a dormant bandwidth part is not configured in the SCell of the secondary cell group, the terminal may switch the SCell to an activated state, activate a downlink bandwidth part or an uplink bandwidth part to a bandwidth part (e.g., a first active bandwidth part) configured by an RRC message, and perform a terminal operation of an activated SCell or bandwidth part. As another method, when the configuration information or indicator is received, the terminal may determine the state of the SCell or whether to switch, activate, or deactivate a bandwidth part according to SCell configuration information or an indicator configured in a message including the configuration information or indicator, and perform a terminal operation.

2> A terminal operation of a MAC layer device for a secondary cell group: When the configuration information or indicator is received, the terminal may perform an initialization procedure (MAC reset) for a MAC layer device (e.g., the terminal may initialize or release pieces of configuration information configured for the MAC layer device, suspend or initialize configured timers, or suspend or initialize a HARQ procedure). For example, the terminal may consider that a timing advance timer (TAT) indicating the validity of signal synchronization between the terminal and the base station is suspended or expired. As another method, when the configuration information or indicator is received, the terminal may perform a MAC partial initialization procedure (or when a message including the configuration information or indicator includes an indicator indicating a MAC partial initialization procedure, the terminal may perform the MAC partial initialization procedure). For example, the terminal may continuously maintain a timing advance timer (TAT) indicating the validity of signal synchronization between the terminal and the base station, or continuously perform HARQ retransmission being in operation. As another method, the terminal may maintain a current configuration without performing any procedure for the MAC layer device. In addition, if an indication that triggers a random access procedure is indicated from a higher layer device (e.g., RRC layer device), or if the TAT is suspended or expired, the terminal may trigger the random access procedure. As another method, if the TAT is not suspended or expired, the terminal may not trigger or perform a random access procedure. This is because, if the TAT is running, signal synchronization with the secondary cell group is successful or is being maintained, and thus an unnecessary random access procedure is performed. As another method, if the base station triggers a random access procedure through an indication of a PDCCH, the terminal may trigger the random access procedure and configure or adjust a timing advance (TA) value or start a TA timer. After the random access procedure is completed, the terminal may resume or activate the secondary cell group and restart data transmission or reception. The random access procedure may perform a contention-based random access (CBRA) procedure. As another method, when a random access procedure is performed, if designated random access configuration information (dedicated RACH config or dedicated preamble) is configured (or included) in a message (or previously received message) indicating cell group activation or resumption, the terminal may perform a contention-free random access (CFRA) procedure, or if designated random access configuration information (dedicated RACH config or dedicated preamble) is not configured (or included) in a message (or previously received message) indicating cell group activation or resumption, the terminal may perform a contention-based random access (CBRA) procedure or not perform the random access procedure.

2> An operation for a data radio bearer (DRB) configured for a secondary cell group: When the configuration information or indicator is received, the terminal may resume DRBs (or SN (SCG) terminated DRBs, DRBs in which a PDCP layer device is configured for the SCG, or bearers using RLC UM or RLC AM) included in the secondary cell group. For example, with respect to a split bearer (a bearer in which one RLC layer device is configured for the master cell group and another RLC layer device is configured for the secondary cell group) in which a PDCP layer device is configured for the master cell group, an RRC message including the configuration information or indicator may include an indicator (reestablishRLC) that triggers a re-establishment procedure of an RCL layer device configured for the secondary cell group, or the terminal may perform a re-establishment procedure for the RCL layer device configured for the secondary cell group. For example, with respect to a split bearer (a bearer in which one RLC layer device is configured for the master cell group and another RLC layer device is configured for the secondary cell group) in which a PDCP layer device is configured for the secondary cell group, an RRC message including the configuration information or indicator may include an indicator (reestablishRLC) that triggers a re-establishment procedure of an RCL layer device configured for the master cell group, or may include an indicator that triggers a PDCP re-establishment procedure (reestablishPDCP) or a PDCP resumption procedure (PDCP resume) in the PDCP layer device configured for the secondary cell group, or the terminal may perform a re-establishment procedure for the RCL layer device configured for the master cell group or perform the PDCP re-establishment procedure or the PDCP resumption procedure (PDCP resume) in the PDCP layer device configured for the secondary cell group. For example, with respect to bearers configured for the secondary cell group, the bearers may be resumed, an RRC layer device may indicate a PDCP layer device to trigger a PDCP re-establishment procedure or a PDCP resumption procedure, or a PDCP layer device may perform a PDCP re-establishment procedure or a PDCP resumption procedure (PDCP resume). The terminal may trigger a first PDCP resumption procedure for bearers (or bearers using RLC UM or bearer using RLC AM) configured for the secondary cell group, or perform the first PDCP resumption procedure in a PDCP layer device. As another method, when the secondary cell group is activated or resumed, in order to solve a security issue problem occurring by transmitting different data with the same security key, the terminal may trigger a second PDCP resumption procedure for bearers (or bearers using RLC UM or bearers using RLC AM) configured for the secondary cell group, or may perform the second PDCP resumption procedure in a PDCP layer device. As another method, in a case where a higher layer device triggers a PDCP layer device resumption procedure, a first PDCP resumption procedure may be triggered and performed, and in a case where a higher layer device indicates an indicator that triggers a PDCP layer device resumption procedure or activates or resumes a cell group (or cell), a second PDCP resumption procedure may be triggered and performed. As another method, in order to solve a security issue problem occurring by transmitting different data with the same security key, in a case where an indicator that activates or resumes a cell group (or cell) is indicated, the base station may include, in an RRC message including the indicator that activates or resumes the cell group (or cell), security key configuration information (e.g., sk-counter) to configure a new security key and allow a security key to be changed and updated, or in order to change or update a security key of bearers (bearers using RLC UM or bearers using RLC AM) configured for the secondary cell group, the base station may include a PDCP re-establishment procedure indicator in the RRC message or the terminal may perform a PDCP re-establishment procedure for the bearers. As another method, if the message including the indication that resumes or activates the cell group includes security configuration information, indicates change (or update) of security configuration information, or includes an indicator indicating a first PDCP resumption procedure, the terminal may trigger the first PDCP resumption procedure for bearers (or bearers using RLC UM or bearers using RLC AM) configured for the secondary cell group, or may perform the first PDCP resumption procedure in a PDCP layer device. However, if the message including the indication that resumes or activates the cell group does not include security configuration information, does not indicate change (or update) of security configuration information, or includes an indicator indicating a second PDCP resumption procedure, when the secondary cell group is activated or resumed, in order to solve a security issue problem occurring by transmitting different data with the same security key, the terminal may trigger the second PDCP resumption procedure for bearers (or bearers using RLC UM or bearers using RLC AM) configured for the secondary cell group, or may perform the second PDCP resumption procedure in a PDCP layer device. The methods proposed above may be performed when a message including an indication that suspends or deactivates a cell group is received. In addition, the methods proposed above may be applied to SCG bearers (bearers in which a PDCP layer device is put in the SCG or SCG terminated bearers).

2> An operation for a signaling radio bearer (SRB) configured for a secondary cell group: If the configuration information or indicator is received and a PSCell is activated, an activated downlink bandwidth part of the PSCell is a normal bandwidth part rather than a dormant bandwidth part, or the activated PSCell monitors a PDCCH according to a long period based on first DRX configuration information, the terminal may continuously maintain SRBs (or SN (SCG) terminated SRBs, SRBs for which a PDCP layer device is configured for the SCG, or SRB3s) included in the secondary cell group (e.g., the terminal may continuously transmit or receive a control message with the secondary base station). Alternatively, the terminal may perform a data discarding procedure (e.g., a discarding indication to a PDCP layer device, or an RLC re-establishment procedure) to discard old pieces of data (e.g., PDCP SDU or PDCP PDU) stored in the SRBs configured for the secondary cell group. As another method, when the configuration information or indicator is received, the terminal may resume SRBs (or SN (SCG) terminated SRBs, SRBs in which a PDCP layer device is configured for the SCG, or SRB3s) included in the secondary cell group. Alternatively, the terminal may perform a data discarding procedure (e.g., a discarding indication to a PDCP layer device, or an RLC re-establishment procedure) to discard old pieces of data (e.g., PDCP SDU or PDCP PDU) stored in the SRBs configured for the secondary cell group. For example, with respect to a split bearer (a bearer in which one RLC layer device is configured for the master cell group and another RLC layer device is configured for the secondary cell group) in which a PDCP layer device is configured for the master cell group, an RRC message including the configuration information or indicator may include an indicator (reestablishRLC) that triggers a re-establishment procedure of an RCL layer device configured for the secondary cell group, or the terminal may perform a re-establishment procedure for the RCL layer device configured for the secondary cell group. For example, with respect to a split bearer (a bearer in which one RLC layer device is configured for the master cell group and another RLC layer device is configured for the secondary cell group) in which a PDCP layer device is configured for the secondary cell group, an RRC message including the configuration information or indicator may include an indicator (reestablishRLC) that triggers a re-establishment procedure of an RCL layer device configured for the master cell group, or may include an indicator that triggers a PDCP re-establishment procedure (reestablishPDCP) or a PDCP resumption procedure (PDCP resume) in the PDCP layer device configured for the secondary cell group, or the terminal may perform a re-establishment procedure for the RCL layer device configured for the master cell group or perform the PDCP re-establishment procedure or the PDCP resumption procedure (PDCP resume) in the PDCP layer device configured for the secondary cell group. For example, with respect to bearers configured for the secondary cell group, the bearers may be resumed, an RRC layer device may indicate a PDCP layer device to trigger a PDCP re-establishment procedure or a PDCP resumption procedure, or a PDCP layer device may perform a PDCP re-establishment procedure or a PDCP resumption procedure (PDCP resume). The terminal may trigger a first PDCP resumption procedure for bearers configured for the secondary cell group, or perform the first PDCP resumption procedure in a PDCP layer device. As another method, when the secondary cell group is activated or resumed, in order to solve a security issue problem occurring by transmitting different data with the same security key, the terminal may trigger a second PDCP resumption procedure for bearers configured for the secondary cell group, or may perform the second PDCP resumption procedure in a PDCP layer device. As another method, in a case where a higher layer device triggers a PDCP layer device resumption procedure, a first PDCP resumption procedure may be triggered and performed, and in a case where a higher layer device indicates an indicator that triggers a PDCP layer device resumption procedure or activates or resumes a cell group (or cell), a second PDCP resumption procedure may be triggered and performed. As another method, in order to solve a security issue problem occurring by transmitting different data with the same security key, in a case where an indicator that activates or resumes a cell group (or cell) is indicated, the base station may include, in an RRC message including the indicator that activates or resumes the cell group (or cell), security key configuration information (e.g., sk-counter) to configure a new security key and allow a security key to be changed and updated, or in order to change or update a security key of bearers configured for the secondary cell group, the base station may include a PDCP re-establishment procedure indicator in the RRC message or the terminal may perform a PDCP re-establishment procedure for the bearers. As another method, if the message including the indication that resumes or activates the cell group includes security configuration information, indicates change (or update) of security configuration information, or includes an indicator indicating a first PDCP resumption procedure, the terminal may trigger the first PDCP resumption procedure for bearers configured for the secondary cell group, or may perform the first PDCP resumption procedure in a PDCP layer device. However, if the message including the indication that resumes or activates the cell group does not include security configuration information, does not indicate change (or update) of security configuration information, or includes an indicator indicating a second PDCP resumption procedure, when the secondary cell group is activated or resumed, in order to solve a security issue problem occurring by transmitting different data with the same security key, the terminal may trigger the second PDCP resumption procedure for bearers configured for the secondary cell group, or may perform the second PDCP resumption procedure in a PDCP layer device. The methods proposed above may be performed when a message including an indication that suspends or deactivates a cell group is received. In addition, the methods proposed above may be applied to SCG bearers (bearers in which a PDCP layer device is put in the SCG or SCG terminated bearers).

2> A terminal operation for a PUCCH SCell of a secondary cell group: When the configuration information or indicator is received, the terminal may activate a PUCCH SCell of a secondary cell group, activate a downlink bandwidth part or an uplink bandwidth part to a bandwidth part (e.g., a first active bandwidth part) configured by an RRC message, and perform a terminal operation of an activated SCell or bandwidth part. As another method, when the configuration information or indicator is received, if a dormant bandwidth part is configured in the PUCCH SCell of the secondary cell group, the terminal may maintain the SCell at an activated state, activate a downlink bandwidth part of the SCell to a bandwidth part (e.g., a first active bandwidth part) configured by an RRC message, and perform a terminal operation of an activated bandwidth part, or if a dormant bandwidth part is not configured in the SCell of the secondary cell group, the terminal may switch the SCell to an activated state, activate a downlink bandwidth part or an uplink bandwidth part to a bandwidth part (e.g., a first active bandwidth part) configured by an RRC message, and perform a terminal operation of an activated SCell or bandwidth part. As another method, when the configuration information or indicator is received, the terminal may determine the state of the SCell or whether to switch, activate, or deactivate a bandwidth part according to SCell configuration information or an indicator configured in a message including the configuration information or indicator, and perform a terminal operation. As another method, when the configuration information or indicator is received, the terminal may apply first DRX configuration information (e.g., suspend second DRX configuration information and reconfigure same to be first DRX configuration information) configured in an RRC message for a PUCCH SCell, perform PDCCH monitoring, and perform a terminal operation in an activated SCell.

2> The terminal may transmit, to the master cell group or secondary cell group, an indicator indicating that a cell group (e.g., secondary cell group) or cell has been configured, added, activated, resumed, changed, or reconfigured, and the indicator may be transmitted by the terminal to the secondary cell group (or base station) or the master cell group (or base station) through a physical signal (e.g., HARQ ACK, NACK, or new transmission resource), MAC control information, or an RRC message.

2> When an indicator that resumes, activates, or adds a cell group (e.g., secondary cell group) or cell is received, the terminal may trigger a PDCP state report in a PDCP layer device with respect to configured SCG bearers, bearers connected to an SCG RLC layer device, SCG split bearers, MCG bearers, or MCG split bearers, so as to allow reporting to the base station. This is because the PDCP state report is transmitted to enable identification of lost data or the state of window variables between the terminal and the base station so as to synchronize between a transmission window and a reception window.

1> If the terminal receives configuration information or an indicator (e.g., through DCI of a PDCCH, MAC control information, or an RRC message) for releasing, deactivating, reconfiguring, or suspending DC, a cell group (e.g., secondary cell group), or a cell, the terminal may perform some of the following procedures.

2> A higher layer device (e.g., RRC layer device) may indicate the configuration information or indicator to a lower layer device (e.g., PDCP layer device, RLC layer device, MAC layer device, or PHY layer device).

2> A terminal operation for a PSCell: When the configuration information or indicator is received, the terminal may maintain a PSCell at an activated state, activate a downlink bandwidth part of the PSCell to a dormant bandwidth part configured by an RRC message, and perform a terminal operation of a dormant bandwidth part. As another method, when the configuration information or indicator is received, the terminal may maintain a PSCell at an activated state, reconfigure or convert a PDCCH monitoring period or a DRX configuration cycle of the PSCell to a very long period, based on second DRX configuration information, and perform PDCCH monitoring while performing a terminal operation of an activated cell. As another method, when the configuration information or indicator is received, the terminal may deactivate a PSCell and perform a terminal operation of a deactivated cell. A terminal operation for a PSCell may be performed according to the above method, thereby reducing power consumption of the terminal.

2> A terminal operation for an SCell of a secondary cell group: when the configuration information or indicator is received, the terminal may deactivate an SCell of the secondary cell group and perform a terminal operation of a deactivated SCell. As another method, when the configuration information or indicator is received, if a dormant bandwidth part is configured in the SCell of the secondary cell group, the terminal may maintain the SCell at an activated state, activate a downlink bandwidth part of the SCell to a dormant bandwidth part, and perform a terminal operation of a dormant bandwidth part, or if a dormant bandwidth part is not configured in the SCell of the secondary cell group, the terminal may switch the SCell to a deactivated state and perform a terminal operation of a deactivated cell or bandwidth part. As another method, when the configuration information or indicator is received, the terminal may determine the state of the SCell or whether to switch, activate, or deactivate a bandwidth part according to SCell configuration information or an indicator configured in a message including the configuration information or indicator, and perform a terminal operation.

2> A terminal operation of a MAC layer device for a secondary cell group: When the configuration information or indicator is received, the terminal may perform an initialization procedure (MAC reset) for a MAC layer device (e.g., the terminal may initialize or release pieces of configuration information configured for the MAC layer device, suspend or initialize configured timers, or suspend or initialize a HARQ procedure). For example, the terminal may consider that a timing advance timer (TAT) indicating the validity of signal synchronization between the terminal and the base station is suspended or expired. As another method, in order to prevent data loss caused by the initialization procedure of the MAC layer device, when the configuration information or indicator is received, the terminal may perform a MAC partial initialization procedure (or when a message including the configuration information or indicator includes an indicator indicating a MAC partial initialization procedure, the terminal may perform the MAC partial initialization procedure). For example, the terminal may continuously maintain a timing advance timer (TAT) indicating the validity of signal synchronization between the terminal and the base station, or continuously perform HARQ retransmission being in operation. As another method, the terminal may maintain a current configuration without performing any procedure for the MAC layer device. In a case where the TAT is continuously maintained, if the TAT expires, even when the secondary cell group is suspended or deactivated, the terminal may perform a random access procedure to adjust or configure a timing advance (TA) again. When the random access procedure is performed, the terminal may indicate, by using an indicator, the base station that the random access procedure is for adjusting a TA (e.g., may include and transmit a buffer status report (MAC control information) and indicate that there is no data to transmit, or introduce a new indicator), after the random access procedure is completed, the base station may transmit, to the terminal, a message including an indication indicating the terminal to suspend or deactivate the cell group again, or after the random access procedure is completed, the terminal may maintain the cell group at a suspended or deactivated state (as another method, the terminal may autonomously maintain the cell group at a suspended or deactivated state without an indication of the base station). As another method, in a case where the TAT is continuously maintained, if the TAT expires, since the same TAT is driven in the base station, the base station may trigger a random access procedure (for TA adjustment or reconfiguration) for the terminal through a cell (PCell, SCell, or PSCell) of the master cell group or secondary cell group, or may transmit, to the terminal, a message including an indicator that resumes or activates the cell group.

2> An operation for a data radio bearer (DRB)(bearer using RLC UM or bearer using RLC AM) configured for a secondary cell group: When the configuration information or indicator is received, the terminal may suspend DRBs (or SN (SCG) terminated DRBs, DRBs in which a PDCP layer device is configured for the SCG, or bearers using RLC UM or RLC AM) included in the secondary cell group. For example, with respect to a split bearer (a bearer in which one RLC layer device is configured for the master cell group and another RLC layer device is configured for the secondary cell group) in which a PDCP layer device is configured for the master cell group, an RRC message including the configuration information or indicator may include an indicator (reestablishRLC) that triggers a re-establishment procedure of an RCL layer device configured for the secondary cell group, or may include an indicator that triggers a PDCP data recovery procedure (PDCP data recovery) in the PDCP layer device configured for the master cell group, or the terminal may perform a re-establishment procedure for the RCL layer device configured for the secondary cell group or perform the PDCP data recovery procedure (PDCP data recovery) in the PDCP layer device configured for the master cell group. For example, with respect to a split bearer (a bearer in which one RLC layer device is configured for the master cell group and another RLC layer device is configured for the secondary cell group) in which a PDCP layer device is configured for the secondary cell group, an RRC message including the configuration information or indicator may include an indicator (reestablishRLC) that triggers a re-establishment procedure of an RCL layer device configured for the master cell group, or may include an indicator that triggers a PDCP re-establishment procedure (reestablishPDCP) or a PDCP suspension procedure (PDCP suspend) in the PDCP layer device configured for the secondary cell group, or the terminal may perform a re-establishment procedure for the RCL layer device configured for the master cell group or perform the PDCP re-establishment procedure or the PDCP suspension procedure (PDCP suspend) in the PDCP layer device configured for the secondary cell group. For example, with respect to bearers (bearers using RLC UM or bearers using RLC AM) configured for the secondary cell group, the bearers may be suspended, an RRC layer device may indicate a PDCP layer device to trigger a PDCP re-establishment procedure or a PDCP suspension procedure, or a PDCP layer device may perform a PDCP re-establishment procedure or a PDCP suspension procedure (PDCP suspend). The terminal may trigger a first PDCP suspension procedure for bearers (or bearers using RLC UM or bearer using RLC AM) configured for the secondary cell group, or perform the first PDCP suspension procedure in a PDCP layer device. As another method, when the secondary cell group is activated or resumed, in order to solve a security issue problem occurring by transmitting different data with the same security key, the terminal may trigger a second PDCP suspension procedure for bearers (or bearers using RLC UM or bearers using RLC AM) configured for the secondary cell group, or may perform the second PDCP suspension procedure in a PDCP layer device. As another method, in a case where a higher layer device triggers a PDCP layer device suspension procedure, a first PDCP suspension procedure may be triggered and performed, and in a case where a higher layer device indicates an indicator that triggers a PDCP layer device suspension procedure or deactivates or suspends a cell group (or cell), a second PDCP suspension procedure may be triggered and performed. As another method, if the message including the indicator that suspends or deactivates the cell group includes security configuration information, indicates change (or update) of security configuration information, or includes an indicator indicating a first PDCP suspension procedure, the terminal may trigger the first PDCP suspension procedure for bearers (or bearers using RLC UM or bearers using RLC AM) configured for the secondary cell group, or may perform the first PDCP suspension procedure in a PDCP layer device. However, if the message including the indicator that suspends or deactivates the cell group does not include security configuration information, does not indicate change (or update) of security configuration information, or includes an indicator indicating a second PDCP suspension procedure, when the secondary cell group is activated or resumed, in order to solve a security issue problem occurring by transmitting different data with the same security key, the terminal may trigger the second PDCP suspension procedure for bearers (or bearers using RLC UM or bearers using RLC AM) configured for the secondary cell group, or may perform the second PDCP suspension procedure in a PDCP layer device. The methods proposed above may be performed when a message including an indication that resumes or activates a cell group is received. In addition, the methods proposed above may be applied to SCG bearers (bearers in which a PDCP layer device is put in the SCG or SCG terminated bearers).

2> An operation for a signaling radio bearer (SRB) configured for a secondary cell group: If the configuration information or indicator is received and a PSCell is activated, an activated downlink bandwidth part of the PSCell is a normal bandwidth part rather than a dormant bandwidth part, or the activated PSCell monitors a PDCCH according to a long period based on second DRX configuration information, the terminal may continuously maintain SRBs (or SN (SCG) terminated SRBs, SRBs for which a PDCP layer device is configured for the SCG, or SRB3s) included in the secondary cell group, without suspending same (e.g., the terminal may continuously transmit or receive a control message with the secondary base station). Alternatively, the terminal may perform a data discarding procedure (e.g., a discarding indication to a PDCP layer device, or an RLC re-establishment procedure) to discard old pieces of data (e.g., PDCP SDU or PDCP PDU) stored in the SRBs configured for the secondary cell group. As another method, when the configuration information or indicator is received, the terminal may suspend SRBs (or SN (SCG) terminated SRBs, SRBs in which a PDCP layer device is configured for the SCG, or SRB3s) included in the secondary cell group. Alternatively, the terminal may perform a data discarding procedure (e.g., a discarding indication to a PDCP layer device, or an RLC re-establishment procedure) to discard old pieces of data (e.g., PDCP SDU or PDCP PDU) stored in the SRBs configured for the secondary cell group. For example, with respect to a split SRB bearer (a bearer in which one RLC layer device is configured for the master cell group and another RLC layer device is configured for the secondary cell group) in which a PDCP layer device is configured for the master cell group, an RRC message including the configuration information or indicator may include an indicator (reestablishRLC) that triggers a re-establishment procedure of an RCL layer device configured for the secondary cell group, or may include an indicator that triggers a PDCP data recovery procedure (PDCP data recovery) in the PDCP layer device configured for the master cell group, or the terminal may perform a re-establishment procedure for the RCL layer device configured for the secondary cell group or perform the PDCP data recovery procedure (PDCP data recovery) in the PDCP layer device configured for the master cell group. For example, with respect to a split bearer (a bearer in which one RLC layer device is configured for the master cell group and another RLC layer device is configured for the secondary cell group) in which a PDCP layer device is configured for the secondary cell group, an RRC message including the configuration information or indicator may include an indicator (reestablishRLC) that triggers a re-establishment procedure of an RCL layer device configured for the master cell group, or may include an indicator that triggers a PDCP re-establishment procedure (reestablishPDCP) or a PDCP suspension procedure (PDCP suspend) in the PDCP layer device configured for the secondary cell group, or the terminal may perform a re-establishment procedure for the RCL layer device configured for the master cell group or perform the PDCP re-establishment procedure or the PDCP suspension procedure (PDCP suspend) in the PDCP layer device configured for the secondary cell group. For example, with respect to bearers configured for the secondary cell group, the bearers may be suspended, an RRC layer device may indicate a PDCP layer device to trigger a PDCP re-establishment procedure or a PDCP suspension procedure, or a PDCP layer device may perform a PDCP re-establishment procedure or a PDCP suspension procedure (PDCP suspend). The terminal may trigger a first PDCP suspension procedure for bearers configured for the secondary cell group, or perform the first PDCP suspension procedure in a PDCP layer device. As another method, when the secondary cell group is activated or resumed, in order to solve a security issue problem occurring by transmitting different data with the same security key, the terminal may trigger a second PDCP suspension procedure for bearers configured for the secondary cell group, or may perform the second PDCP suspension procedure in a PDCP layer device. As another method, in a case where a higher layer device triggers a PDCP layer device suspension procedure, a first PDCP suspension procedure may be triggered and performed, and in a case where a higher layer device indicates an indicator that triggers a PDCP layer device suspension procedure or deactivates or suspends a cell group (or cell), a second PDCP suspension procedure may be triggered and performed. As another method, if the message including the indicator that suspends or deactivates the cell group includes security configuration information, indicates change (or update) of security configuration information, or includes an indicator indicating a first PDCP suspension procedure, the terminal may trigger the first PDCP suspension procedure for bearers configured for the secondary cell group, or may perform the first PDCP suspension procedure in a PDCP layer device. However, if the message including the indicator that suspends or deactivates the cell group does not include security configuration information, does not indicate change (or update) of security configuration information, or includes an indicator indicating a second PDCP suspension procedure, when the secondary cell group is activated or resumed, in order to solve a security issue problem occurring by transmitting different data with the same security key, the terminal may trigger the second PDCP suspension procedure for bearers configured for the secondary cell group, or may perform the second PDCP suspension procedure in a PDCP layer device. The methods proposed above may be performed when a message including an indication that resumes or activates a cell group is received. In addition, the methods proposed above may be applied to SCG bearers (bearers in which a PDCP layer device is put in the SCG or SCG terminated bearers).

2> A terminal operation for a PUCCH SCell of a secondary cell group: When the configuration information or indicator is received, the terminal may deactivate a PUCCH SCell of the secondary cell group and perform a terminal operation of a deactivated SCell. As another method, when the configuration information or indicator is received, if a dormant bandwidth part is configured in the PUCCH SCell of the secondary cell group, the terminal may maintain the SCell at an activated state, activate a downlink bandwidth part of the SCell to a dormant bandwidth part, and perform a terminal operation of a dormant bandwidth part, or if a dormant bandwidth part is not configured in the PUCCH SCell of the secondary cell group, the terminal may switch the SCell to a deactivated state and perform a terminal operation of a deactivated cell or bandwidth part. As another method, when the configuration information or indicator is received, the terminal may determine the state of the SCell or whether to switch, activate, or deactivate a bandwidth part according to SCell configuration information or an indicator configured in a message including the configuration information or indicator, and perform a terminal operation. As another method, when the configuration information or indicator is received, the terminal may apply second DRX configuration information configured in an RRC message for a PUCCH SCell, perform PDCCH monitoring, based on a long period, and perform a terminal operation in an activated SCell.

2> The terminal may transmit, to the master cell group or secondary cell group, an indicator indicating that a cell group (e.g., secondary cell group) or cell has been suspended, deactivated, released, or changed, and the indicator may be transmitted by the terminal to the secondary cell group (or base station) or the master cell group (or base station) through a physical signal (e.g., HARQ ACK, NACK, or new transmission resource), MAC control information, or an RRC message.

2> When an indicator that suspends, deactivates, or releases a cell group (e.g., secondary cell group) or cell is received, the terminal may trigger a PDCP state report in a PDCP layer device with respect to configured SCG bearers, bearers connected to an SCG RLC layer device, SCG split bearers, MCG bearers, or MCG split bearers, so as to allow reporting to the base station. This is because the PDCP state report is transmitted to enable identification of lost data or the state of window variables between the terminal and the base station so as to synchronize between a transmission window and a reception window.

As another method, PDCP suspension procedures proposed above in the disclosure may be applied only to bearers (UM DRBs) using RLC UM and belonging to (configured for) a cell group (or SCG) when a cell or cell group state is configured as a deactivated state. For example, when a cell or cell group state is configured as a deactivated state, it may be indicated or performed that bearers (UM DRBs) using RLC UM and belonging to (configured for) the cell group (or SCG) are suspended and PDCP suspension procedures proposed above in the disclosure is triggered or performed for PDCP layer devices of the bearers (UM DRBs) using RLC UM and belonging to (configured for) the cell group (or SCG). This is because, if the bearers (UM DRBs) using RLC UM are not suspended or the PDCP suspension procedures are not performed, pieces of data may be pre-generated for the bearers, and if a security key is changed when the cell group is activated, a PDCP re-establishment procedure or an RLC re-establishment procedure is triggered so that the pre-generated pieces of data are all discarded, and the PDCP re-establishment procedure does not provide a retransmission procedure for bearers (UM DRBs) using RLC UM so that data loss occurs in the terminal. Therefore, in order to prevent such data loss, when a cell or cell group state is configured as a deactivated state, it may be indicated or performed that bearers (UM DRBs) using RLC UM and belonging to (configured for) the cell group (or SCG) are suspended and PDCP suspension procedures proposed above in the disclosure is triggered or performed for PDCP layer devices of the bearers (UM DRBs) using RLC UM and belonging to (configured for) the cell group (or SCG). On the other hand, PDCP suspension procedures proposed above in the disclosure may not be applied to bearers (AM DRBs) using RLC AM and belonging to (configured for) a cell group (or SCG) when a cell or cell group state is configured as a deactivated state. For example, when a cell or cell group state is configured as a deactivated state, advance generation of pieces of data are allowed for the bearers (AM DRBs) using RLC AM and belonging to (configured for) the cell group (or SCG). Therefore, if a security key is not changed, a data processing time may be shortened (e.g., only transmission may be suspended for the cell group). In addition, if a security key is changed when the cell group is activated, a PDCP re-establishment procedure or an RLC re-establishment procedure is triggered, so that the pre-generated pieces of data are all discarded. However, the PDCP re-establishment procedure provides a retransmission procedure for bearers (AM DRBs) using RLC AM, so that data loss does not occur. As another method, if a security key is changed (or is to be changed) when the cell or cell group is activated, when deactivation of the cell or cell group is indicated, a bearer suspension or PDCP suspension procedure proposed above is performed for each bearer (UM DRB or AM DRB), and if a security key is not changed (or is not to be changed) when the cell or cell group is activated, when deactivation of the cell or cell group is indicated, a bearer suspension or PDCP suspension procedure proposed above may not be performed for each bearer (UM DRB or AM DRB) (e.g., only transmission may be suspended for the cell group).

As another method, the base station may define a new indicator in an RRC message (e.g., RRCReconfiguration message) to indicate whether to suspend or not suspend each bearer (UM DRB or AM DRB), or whether to perform or not perform a PDCP suspension procedure therefor. The terminal may receive the RRC message, and if the indicator indicates bearer suspension or a PDCP suspension procedure to a bearer, the terminal may perform procedures proposed above.

Partial initialization (partial reset) of a MAC layer device proposed above in the disclosure may include one or multiple terminal operations in the following procedures.

A terminal performs an operation of flushing remaining HARQ processes (i.e., general HARQ process or HARQ process for system information) except a HARQ process for MBS among HARQ processes configured for a serving cell, and performs an operation of emptying (flushing), releasing (flush), initializing (flush), or omitting to flush the HARQ process for MBS after completion of a handover or after transition of an RRC state mode (to RRC inactive mode or RRC idle mode).

In a case of the flushing operation, the terminal may flush data of the HARQ process related to MBS at a time point at which a target base station is able to receive an MBS service or a time point at which G-RNTI monitoring starts, after completion of a handover or after transition of an RRC state mode (to RRC inactive mode or RRC idle mode). Alternatively, until a handover is completed or until transition of an RRC state mode (to RRC inactive mode or RRC idle mode) is completed, the terminal may continuously perform data reception using a G-RNTI, and in a case of a handover, the terminal may perform, for the target base station, an operation of monitoring a C-RNTI at a target allocated through the RRC message. As another method, even before completion of random access from the target base station, the terminal may continuously perform data reception using a G-RNTI.

If there is a random access procedure being performed, the terminal may suspend same.

Specifically, if there is a configured or indicated preamble identifier, preamble configuration information, or PRACH (random access configuration-related information) configuration information, the terminal may discard same.

If there is a temporary cell identifier (C-RNTI), the terminal may release same.

The terminal may flush a buffer for message3 transmission.

The terminal may configure 0 as all new data indicators for a HARQ process for uplink.

If an uplink DRX retransmission timer that is driven for uplink is running, the terminal may suspend same.

If all uplink HARQ-related timers are running, the terminal may suspend same.

The terminal suspends all time alignment timers (TATs) (e.g., TAT related to a secondary timing advance group (STAG)) except for a TAT related to the cell (PSCell) or a primary timing advance group (PTAG), or considers same as expiring (if the TATs are configured). For example, the terminal may continuously maintain the TAT related to the PTAG without suspending, so that when the terminal activates the cell or cell group again, fast activation without a random access procedure is possible. In addition, the terminal may suspend the TAT related to the secondary timing advance group (STAG) or consider same as expiring, so as to remove an unnecessary terminal procedure (if the TATs are configured). If the time alignment timer (TAT) related to the primary timing advance group (PTAG) has expired in the deactivated cell or cell group, a MAC layer device may indicate, to a higher layer device (e.g., RRC layer device), that the TAT has expired. Alternatively, if the time alignment timer (TAT) related to the primary timing advance group (PTAG) has expired in the deactivated cell or cell group, the terminal may suspend a beam failure detection procedure or an RLM procedure (or the terminal may consider that beam failure has occurred, or consider that a radio link is not valid). As another method, when the terminal detects beam failure, the terminal may suspend the TAT related to the PTAG (or consider same as expiring) or suspend an RLM procedure. As another method, when the terminal detects radio link failure, the terminal may suspend the TAT related to the PTAG (or consider same as expiring) or suspend a beam failure detection procedure (or may consider that beam failure has occurred).

In a case where the initialization procedure of the MAC layer device is performed, or in a case where a partial initialization procedure indicator of the MAC layer device is not included, is not indicated, or is not performed, the terminal may perform the entire initialization procedure of the MAC layer device, and accordingly, the terminal may flush all the configured general HARQ process, HARQ process for MBS, or HARQ process for system information.

The following description of the disclosure proposes procedures of a MAC layer device, which are required to be performed by a terminal for which DC is configured as described above, when a deactivated state of a cell group (or SCG), a beam failure detection procedure, or an RLM procedure is configured for the terminal through an RRC message. For example, the following description proposes the terminal performing different beam failure detection procedures or beam failure recovery procedures according to whether the cell group state configured through the RRC message is a deactivated state or an activated state.

1> If the terminal receives an RRC message, and a beam failure detection procedure, a first BFR procedure, or a second BFR procedure is configured in the RRC message, or a cell (PSCell or SCell) or cell group for which the beam failure detection procedure is configured is not configured to be in a deactivated state (or is configured to be in an activated state), 2> The terminal performs a beam failure detection procedure.

2> If beam failure for the cell (PS Cell or SCell) or cell group is detected,

3> The terminal performs the first BFR procedure or the second BFR procedure proposed in the disclosure.

2> If a problem in a random access procedure is detected due to beam failure,

3> The terminal may report the random access procedure problem caused by the beam failure to a base station.

1> Otherwise, if the terminal receives an RRC message, and a beam failure detection procedure, a first BFR procedure, or a second BFR procedure is configured in the RRC message, a cell (PSCell or SCell) or a cell group (SCG) is configured to be in a deactivated state in the RRC message and a beam failure detection procedure, a first BFR procedure, or a second BFR procedure is configured for the cell group, or a cell or cell group for which the beam failure detection procedure is configured is configured to be in a deactivated state, 2> The terminal performs a beam failure detection procedure.

2> If beam failure for the cell (PS Cell or SCell) or cell group is detected,

3> The terminal does not perform the first BFR procedure or the second BFR procedure proposed in the disclosure. This is because a random access procedure may be unnecessarily triggered for the deactivated cell group. The MAC layer device may indicate or report, to a higher layer device (or RRC layer device), that beam failure has been detected.

2> If beam failure for the deactivated cell group (SCG) or cell (PSCell) or the MAC layer device is detected, 3> The terminal reports the beam failure to a base station (or MCG). For example, the terminal may transmit an SCG failure report message (SCGFailureInformation) including the beam failure to the base station to report same.

2> If a problem in a random access procedure is detected due to beam failure,

3> The terminal may report the random access procedure problem caused by the beam failure to a base station.

The disclosure proposes a detailed procedure for a beam failure detection procedure of a MAC layer device of the terminal proposed above when the beam failure detection procedure is configured in the RRC message.

1> If an indication indicating that beam failure has occurred is received from a lower layer device, 2> The terminal may start or restart a timer (BeamFailureDetectionTimer) for beam failure detection (The timer may be configured in the RRC message).

2> The terminal increases the value of a variable (BFI_COUNTER) for identifying a beam failure count by 1.

2> If the value of the variable for identifying the beam failure count is equal to or greater than a beam failure maximum count (beamFailureInstanceMaxCount) (the beam failure maximum count may be configured by the RRC message), 3> If the serving cell (the cell in which the beam failure has occurred) is an SCell, 4> The terminal may trigger or perform a beam failure recovery procedure (beam failure recovery, BFR) for the cell.

3> Otherwise (else if), if the serving cell (the cell in which the beam failure has occurred) is a PSCell, a deactivated cell group, or a PSCell of a deactivated cell group, 4> The terminal may indicate, to a higher layer device (e.g., RRC layer device), that the beam failure has occurred for the cell.

4> The terminal may consider that a time alignment timer (TAT) corresponding to (related to) a primary timing advance group (PTAG) has expired. Alternatively, the terminal may suspend the TAT related to the PTAG. This is because, if beam failure has occurred for a deactivated cell group or cell, a TA value may be determined as being not valid any more, and thus unnecessary operation of the TAT is not needed. Alternatively, the terminal may suspend an RLM procedure or declare radio link failure. This is because, if beam failure has occurred for a deactivated cell group or cell, a radio link may be considered as being not valid anymore.

3> Otherwise (else),

The terminal may start or perform a random access procedure for the SpCell.

A beam failure recovery procedure (beam failure recovery, BFR) proposed above in the disclosure is as follows.

In the disclosure, a first BFR procedure (e.g., Rel-15 beam failure recovery (BFR)) is possible only for a PCell or an SpCell. That is, when beam failure occurs in a connected mode terminal, the terminal performs a random access procedure. The random access procedure follows whether a preamble for BFR is configured in the RRC message. The preamble may be configured for each beam. If the preamble for BFR is configured, a search space for BFR is configured together. If a preamble for BFR is configured, as described above, the terminal performs CFRA. That is, if failure occurs in beam #1, the terminal searches for a beam, and if a beam being valid is determined in beam #3, the terminal identifies whether a preamble for BFR is configured for beam #3, and if same is configured, the terminal performs CFRA through the preamble. The terminal waits for response and monitors a PDCCH in the configured search space. The base station recognizes that beam failure has occurred, when the terminal performs random access in the preamble, and provides scheduling (DL assignment or UL grant) to the terminal through a PDCCH. Then, the terminal continuously transmit or receive data in the beam and the beam is recovered (In the CFRA, the base station precisely recognizes beam failure and thus there is no need to transmit an RAR for TA reconfiguration).

If a preamble for BFR is not configured in the RRC message, the terminal performs CBRA. That is, if failure occurs in beam #1, the terminal searches for a beam, and if a beam being valid is determined in beam #3, the terminal identifies whether a preamble for BFR is configured for beam #3, and if same is not configured, the terminal performs CBRA. The terminal waits for response and waits for an RAR. The base station does not know why the terminal suddenly performs random access, but provides an RAR and completes a random access procedure. Then, the terminal performs data transmission and reception in the beam according to a PDCCH indication and the beam is recovered.

The first BFR procedure (e.g., Rel-15 beam failure recovery (BFR)) or BeamFailureRecoveryConfig for an SpCell is configured for a UL BWP. This is because if BFR is triggered, a BFR dedicated preamble may be configured for CFRA.

A second BFR procedure (e.g., Rel-16 beam failure recovery (BFR)) of the disclosure is possible for both an SpCell or an SCell. A dedicated scheduling request (SR) (or a transmission resource of a PUCCH) for BFR may be configured for each cell and each bandwidth part by using the RRC message. If beam failure for a bandwidth part of an SCell occurs, the terminal generates a BFR MAC CE. If beam failure for the bandwidth part occurs and the dedicated SR is configured (PCell or PUCCH SR), the terminal transmits the SR in a PUCCH. If beam failure reporting keep failing for the dedicated SR, the terminal performs CBRA as a random access procedure. In a case of exceeding of an SR count, the terminal may similarly perform only CBRA even when a BRS is transmitted and even in legacy. The random access procedure is performed in a PCell. Therefore, when a MAC CE is transmitted through the PCell for an SCell, the terminal may report which SCell in which failure has occurred, and optionally report a valid beam for each SCell when the terminal discovers a valid TCI set among TCI sets (or TCI sates) configured by RRC. If the terminal transmits a MAC CE including a valid beam for the SCell, when a HARQ ACK for a MAC PDU including the MAC CE is received, the valid beam is used by the terminal and the base station for the SCell. If a MAC CE for the SCell does not include a valid beam, the base station may designate a beam by using DCI of a PDCCH or a TCI state MAC CE as a response.

In addition, in the second BFR procedure (e.g., Rel-16 beam failure recovery (BFR)), a BFR procedure for an SpCell may also be improved.

For example, the second BFR procedure (e.g., Rel-16 beam failure recovery (BFR)) is possible for both a PCell or an SpCell like Rel-15. That is, when beam failure occurs, the terminal performs a random access procedure. The random access procedure varies according to whether a preamble for BFR is configured. The preamble may be configured for each beam. If the preamble for BFR is configured, a search space for BFR is configured together. If a preamble for BFR is configured, as described above, the terminal performs CFRA through the preamble. That is, if failure occurs in beam #1, the terminal searches for a beam, and if a beam being valid is determined in beam #3, the terminal identifies whether a preamble for BFR is configured for beam #3, and if same is configured, the terminal performs CFRA. The terminal waits for beam response and monitors a PDCCH in the configured search space. The base station recognizes that beam failure has occurred, when the terminal performs random access in the preamble, and provides scheduling (DL assignment or UL grant) to the terminal through a PDCCH. Then, the terminal continuously transmit or receive data in the beam and the beam is recovered (in the CFRA, the base station precisely recognizes beam failure and thus there is no need to transmit an RAR for TA reconfiguration).

If a preamble for BFR is not configured, the terminal performs CBRA. That is, if failure occurs in beam #1, the terminal searches for a beam, and if a beam being valid is determined in beam #3, the terminal identifies whether a preamble for BFR is configured for beam #3, and if same is not configured, the terminal performs CBRA. The terminal waits for response and waits for an RAR. The base station does not know why the terminal suddenly performs random access, but provides an RAR, and the terminal receives the RAR, then generates a BFR MAC CE, and transmits same through Msg3. However, the MAC CE is unable to include a valid beam for an SpCell. This is because a PCell transmits a BFR MAC CE for BFR occurring in the PCell unlike an SCell. That is because, when beam failure occurs in a PCell, the terminal searches for a valid beam and transmits a preamble for the valid beam, and thus the terminal and the base station recognize a valid beam for the PCell in a random access procedure in advance. That is, a valid beam is already included. Therefore, when a random access procedure is completed, the terminal performs data transmission and reception in beam #3 and the beam is recovered.

That is, when BFR is triggered for an Rel-16 SpCell, the terminal unconditionally triggers random access regardless of an SR, and configures a BFR MAC CE (if a preamble for BFR is not configured) and transmits same. In the RRC message for Rel-16 BFR or an SCell, BeamFailureRecoverySCellConfig is configured for a DL BWP. This is for, when BFR is triggered, configuring a candidate RS which may be included in a BFR MAC CE. The dedicated SR for SCell BFR is included in MAC-CellGroupConfig (configured in schedulingRequestConfig) in the RRC message.

In addition, the base station may configure beam failure RSs for the terminal by using the RRC message so that the terminal identifies beam failure. If failure occurs in all the RSs, the terminal detects beam failure and performs a random access procedure.

In a case where the base station configures a preamble for beam failure recovery in advance, the terminal may perform CFRA as a random access procedure, and the base station may recognize the preamble and identify whether the terminal has performed a random access procedure for beam recovery.

However, in a case where the base station does not configure a preamble for beam failure recovery in advance, the terminal performs CBRA. This is not distinguished in view of the base station from triggering a random access procedure after a BSR being triggered to transmit uplink data in a state where an SR is not configured. However, the base station may determine one of the two cases by recognizing that the terminal has suddenly performed the random access procedure. If there is a BSR, the base station may receive BSR information, if there is no BSR, the base station may recognize BFR, and even if the two cases are simultaneously triggered, the base station is able to read a BSR and recognize a preamble to perform implicit determination. The terminal may recognize, when reading an SSB, the number of beams, and which beam is transmitted according to what period and on what time and frequency resource. Then, the terminal may measure the strength of the beams, and perform a random access procedure for a beam exceeding a predetermined criterion. If the terminal selects a beam, the terminal may perform random access for the beam by considering the time and frequency resources or the period.

The following description of the disclosure proposes procedures that a terminal is required to perform when the state of a cell group is configured as an activated state or a deactivated state or when a PSCell of a cell group is configured to be in an activated state or a deactivated state. The terminal may receive an indication for an activated state or a deactivated state for a cell group or cell (PSCell) through an RRC message (RRCReconfiguration or RRCResume), MAC control information, or PDCCH DCI. For example, if a deactivated state is configured by the RRC message (RRCReconfiguration or RRCResume), MAC control information, or PDCCH DCI, the terminal may deactivate the cell group (or SCG) or cell (or PSCell), and if a deactivated state is not configured by the RRC message (RRCReconfiguration or RRCResume), MAC control information, or PDCCH DCI (or an activated state is configured thereby), the terminal may activate the cell group or cell.

A terminal operation when an indication that activates a cell group or cell is received (or an indication that deactivates same is not received) is as follows in the disclosure.

If an indication that activates a cell group (or SCG) or cell (or PSCell) of a terminal is received through DCI (L1 control signal) of a PDCCH, a MAC CE, or an RRC message (or an indication that deactivates same is not received), the terminal may perform one or multiple operations among the following operations.

- The terminal activates the cell group or cell.
- The terminal switches or activates to an uplink bandwidth part or downlink bandwidth part (e.g., a first active downlink bandwidth part or a first active uplink bandwidth part) configured by the RRC message. As another method, when the terminal performs a random access procedure (or if reconfigurationWithSync is configured, if beam failure is detected, if radio link failure is detected, or if a TAT is not running (or has expired)) to activate the cell group or cell, the terminal may switch or activate to an uplink bandwidth part or downlink bandwidth part (e.g., a first active downlink bandwidth part, a first active uplink bandwidth part, or a newly defined bandwidth part) configured by the RRC message. In addition, when a random access procedure is performed, the terminal may perform the random access procedure in the bandwidth part. However, the terminal may not perform a random access procedure (or if the terminal is configured not to perform the random access procedure, if beam failure is not detected, if radio link failure is not detected, or if a TAT is running (or has not expired)), and the terminal may activate a previously (or lastly) activated bandwidth part.
- The terminal transmits a sounding reference signal (SRS) so that a base station performs channel measurement for uplink in the activated bandwidth part. For example, the terminal may periodically transmit same.
- If a PUCCH is configured in the activated bandwidth part, the terminal performs PUCCH transmission.
- If there is a type 1 configuration transmission resource suspended to be used, the terminal may initialize a stored type 1 transmission resource to be an original configuration and use same. The type 1 configuration transmission resource is a periodic transmission resource (uplink or downlink) pre-allocated by an RRC message, and means a transmission resource which may be activated by an RRC message and then used.
- The terminal triggers a PHR for the bandwidth part. The PHR may be triggered for a MCG or SCG. In addition, the PHR may be reported to the MCG or SCG.
- The terminal may report a channel measurement result (CSI, CQI, PMI, RI, PTI, or CRI) for downlink in the activated bandwidth part according to a base station configuration.
- The terminal monitors a PDCCH to read an indication of the base station in the activated bandwidth part.
- The terminal monitors a PDCCH to read cross scheduling for the activated bandwidth part.
- The terminal starts or restarts a bandwidth part inactivity timer. As another method, only when a bandwidth part dormantization timer is not configured, the terminal may start or restart a bandwidth part inactivity timer. The bandwidth part dormantization timer may be configured by an RRC message, and when the timer expires, the terminal may dormantize the bandwidth part or switch the bandwidth part to a dormant bandwidth part. For example, the terminal may start or restart the bandwidth part inactivity timer only in a dormant bandwidth part.

A terminal operation when an indication that deactivates a cell group or cell is received is as follows in the disclosure.

If an indication that deactivates a cell group (or SCG) or cell (or PSCell) of a terminal is received through DCI (L1 control signal) of a PDCCH, a MAC CE, or an RRC message, the terminal may perform one or multiple operations among the following operations.

The terminal deactivates the cell group, the cell, or an uplink or downlink bandwidth part indicated above.

The terminal suspends all time alignment timers (TATs) (e.g., TAT related to a secondary timing advance group (STAG)) except for a TAT related to the cell (PSCell) or a primary timing advance group (PTAG), or considers same as expiring (if the TATs are configured). For example, the terminal may continuously maintain the TAT related to the PTAG without suspending, so that when the terminal activates the cell or cell group again, fast activation without a random access procedure is possible. In addition, the terminal may suspend the TAT related to the secondary timing advance group (STAG) or consider same as expiring, so as to remove an unnecessary terminal procedure (if the TATs are configured). If the time alignment timer (TAT) related to the primary timing advance group (PTAG) has expired in the deactivated cell or cell group, a MAC layer device may indicate, to a higher layer device (e.g., RRC layer device), that the TAT has expired. Alternatively, if the time alignment timer (TAT) related to the primary timing advance group (PTAG) has expired in the deactivated cell or cell group, the terminal may suspend a beam failure detection procedure or an RLM procedure (or the terminal may consider that beam failure has occurred, or consider that a radio link is not valid). As another method, when the terminal detects beam failure, the terminal may suspend the TAT related to the PTAG (or consider same as expiring) or suspend an RLM procedure. As another method, when the terminal detects radio link failure, the terminal may suspend the TAT related to the PTAG (or consider same as expiring) or suspend a beam failure detection procedure (or may consider that beam failure has occurred).

The terminal suspends a bandwidth part inactivity timer (e.g., an inactivity timer for a downlink bandwidth part) which is configured for and is running in the cell or bandwidth part.

The terminal may release (clear) a periodic downlink transmission resource (DL SPS or configured downlink assignment) or a periodic uplink transmission resource (UL SPS or configured uplink grant Type 2) configured in the cell or bandwidth part. The meaning of the clearing indicates that configuration information, such as period information configured by an RRC message, is stored in the terminal, but the terminal removes and does not use any longer information on a periodic transmission resource indicated or activated by L1 signaling (e.g., DCI). The periodic transmission resource may be called a type 2 configuration transmission resource. In addition, the operation of releasing the periodic transmission resource may be performed only when the SCell transitions from an activated state to a deactivated state. This is because, in a case where the SCell transitions from a dormant state to a deactivated state, there has been no periodic transmission resource in the dormant state and thus the releasing operation is also not needed. As another method, only when the periodic downlink transmission resources or periodic uplink transmission resources are configured or are configured and used, the terminal may release the periodic transmission resources.

The terminal may suspend to use a periodic uplink transmission resource (configured uplink grant type 1 configured by RRC) configured in the cell or bandwidth part. The meaning of the suspending to use indicates that transmission resource configuration information configured by an RRC message is stored in the terminal, but the terminal does not use same any longer. The periodic transmission resource may be called a type 1 configuration transmission resource. In addition, the operation of releasing the periodic transmission resource may be performed only when the SCell transitions from an activated state to a deactivated state. This is because, in a case where the SCell transitions from a dormant state to a deactivated state, there has been no periodic transmission resource in the dormant state and thus the releasing operation is also not needed. As another method, only when the periodic downlink transmission resources or periodic uplink transmission resources are configured or are configured and used, the terminal may release the periodic transmission resources.

The terminal empties all HARQ buffers configured for the cell or bandwidth part.

If there is a PUSCH transmission resource configured for periodic channel measurement reporting (semi-persistent CSI reporting) for the cell or bandwidth part, the terminal releases (clears) same.

The terminal does not transmit an SRS for the cell or bandwidth part.

The terminal does not perform channel measurement (CSI, CQI, PMI, RI, PTI, or CRI) for downlink for the cell or bandwidth part, and does not perform reporting.

The terminal does not transmit uplink data through a UL-SCH in the cell or bandwidth part.

The terminal does not perform a random access procedure for the cell or bandwidth part.

The terminal does not monitor a PDCCH in the cell or bandwidth part.

The terminal does not monitor a PDCCH for the cell or bandwidth part. In addition, in a case of cross scheduling, the terminal does not monitor a PDCCH for the cell in a scheduled cell.

The terminal does not perform PUCCH or SPUCCH transmission in the cell or bandwidth part.

A first PDCP suspension (or resumption) procedure proposed above in the disclosure may include one or multiple terminal operations in the following procedures. The procedure proposed above may be applied or configured for a bearer using RLC UM or a bearer using RLC AM, or a terminal may perform the proposed procedure for a bearer using RLC UM or a bearer using RLC AM.

A transmission PDCP layer device of the terminal may initialize a transmission window variable or configure same to have an initial value, or discard stored data (e.g., PDCP PDU or PDCP SDU). As another method, the device may discard only PDCP PDU to prevent data loss as described above. This is a procedure for preventing old data from being transmitted or retransmitted when a secondary cell group is activated or resumed later.

A reception PDCP layer device of the terminal may suspend or initialize a reordering timer (t-ordering) (a timer for arranging data in ascending order, based on PDCP sequence number or COUNT value) if the reordering timer is running.

Alternatively, the device may perform a header decompression procedure for pieces of stored data (e.g., PDCP SDU) and transfer the pieces of data to a higher layer device in an ascending order of COUNT values. The reception PDCP layer device of the terminal may initialize a reception window variable or configure same to have an initial value.

A second PDCP suspension (or resumption) procedure proposed above in the disclosure may include one or multiple terminal operations in the following procedures. The procedure proposed above may be applied or configured for a bearer using RLC UM or a bearer using RLC AM, or a terminal may perform the proposed procedure for a bearer using RLC UM or a bearer using RLC AM.

- The transmission PDCP layer device of the terminal may not initialize a transmission window variable or not configure same to have an initial value, and may maintain a variable value without change. The reason why the device maintains the variable value (e.g., COUNT value) is to solve a security issue problem occurring by transmitting different data with the same security key (e.g., COUNT value) when a secondary cell group is activated or resumed. The transmission PDCP layer device of the terminal may discard stored data (e.g., PDCP PDU or PDCP SDU). As another method, the device may discard only PDCP PDU to prevent data loss as described above. This is a procedure for preventing old data from being transmitted or retransmitted when a secondary cell group is activated or resumed later. As another method, the transmission PDCP layer device may store the values of transmission window variables, and initialize (e.g., configure same to be 0) the window variables. When a cell group is resumed or activated, if security configuration information is changed or if a message that indicates resumption or activation of the cell group includes security configuration information, or indicates security key change, the device may use the initialized window variables, or when a cell group is resumed or activated, if security configuration information is not changed or if a message that indicates resumption or activation of the cell group does not include security configuration information, or does not indicate security key change, the device may reconstruct the stored value of the transmission window variables, or configure, reconfigure, or initialize the values of the transmission window variables to the stored value of the transmission window variables, and use same.
- The reception PDCP layer device of the terminal may suspend or initialize a reordering timer (t-ordering) (a timer for arranging data in ascending order, based on PDCP sequence number or COUNT value) if the reordering timer is running. Alternatively, the device may perform a header decompression procedure for pieces of stored data (e.g., PDCP SDU) and transfer the pieces of data to a higher layer device in an ascending order of COUNT values. The reception PDCP layer device of the terminal may not initialize a reception window variable or not configure same to have an initial value, and may maintain a variable value without change. The reason why the device maintains the variable value (e.g., COUNT value) is to solve a security issue problem occurring by transmitting different data with the same security key (e.g., COUNT value) when a secondary cell group is activated or resumed. As another method, when a secondary cell group is activated or resumed, in order to prevent direct triggering of a reordering timer even if there is no COUNT value or PDCP sequence number gap when data is received, the terminal may configure or update an RX_NEXT window variable (a variable indicating the COUNT value of data expected to be subsequently received) to the value of a RX_DELIV window variable (a variable indicating a COUNT value corresponding to next data of data having been transferred to a higher layer device) or to the COUNT value of data firstly received by the terminal. As another method, when a reordering timer value is configured in the message or an indicator is received from a higher layer device, the terminal may configure or update an RX_REORD (a variable indicating the COUNT value of data subsequent to data having triggered the reordering timer) window variable to the variable value of an RX_NEXT window variable or may suspend or restart the reordering timer. As another method, the reception PDCP layer device may store the values of reception window variables, and initialize (e.g., configure same to be 0) the window variables. When a cell group is resumed or activated, if security configuration information is changed or if a message that indicates resumption or activation of the cell group includes security configuration information, or indicates security key change, the device may use the initialized window variables, or when a cell group is resumed or activated, if security configuration information is not changed or if a message that indicates resumption or activation of the cell group does not include security configuration information, or does not indicate security key change, the device may reconstruct the stored value of the reception window variables, or configure, reconfigure, or initialize the values of the reception window variables to the stored value of the reception window variables, and use same.

When the terminal receives configuration information or an indicator for releasing, deactivating, reconfiguring, or suspending DC, a cell group (e.g., secondary cell group), or a cell (e.g., through DCI of a PDCCH, MAC control information, or an RRC message) described above and performs the terminal operation proposed above, if data that the terminal is to transmit in uplink occurs or is generated, the terminal may transmit a scheduling request (SR) or MAC control information (or indicator or buffer amount or buffer status report) to a master base station or a secondary base station on a transmission resource of a PUCCH configured by an RRC message, so as to request an uplink transmission resource or request to configure, add, activate, resume, change, or reconfigure DC, the cell group (e.g., secondary cell group), or the cell. As another method, when the terminal receives configuration information or an indicator for releasing, deactivating, reconfiguring, or suspending DC, a cell group (e.g., secondary cell group), or a cell (e.g., through DCI of a PDCCH, MAC control information, or an RRC message) described above and performs the terminal operation proposed above, if data that the terminal is to transmit in uplink occurs or is generated, the terminal may generate an RRC message and transmit same to a master base station or a secondary base station, so as to request an uplink transmission resource or request to configure, add, activate, resume, change, or reconfigure DC, the cell group (e.g., secondary cell group), or the cell.

Procedures proposed above in the disclosure may be expanded to multi-access technology. For example, pieces of configuration information of multiple cell groups may be configured for a terminal by an RRC message, and one or multiple cell groups (or cells) among the configured multiple cell groups may be activated or resumed by an indicator of a PDCCH, MAC control information or an RRC message, or one or multiple cell groups may be suspended or deactivated.

The following description of the disclosure proposes a terminal operation wherein, when a secondary cell group or a PSCell of a secondary cell group is in a deactivated state or a suspended state according to the procedure of deactivating or suspending a cell group or cell proposed above in the disclosure, if uplink data is generated or occurs in the terminal for the secondary cell group (or in bearers belonging to the secondary cell group), the terminal operation is performed to activate or resume the cell group or cell again.

As proposed above in the disclosure, if a cell group or cell is deactivated or suspended, a terminal is unable to transmit or receive data. Therefore, if uplink data is generated in a secondary cell group (or in bearers belonging to a secondary cell group) of the terminal, the terminal is required to activate or resume the cell group or cell again. A procedure in which the terminal requests a base station (master base station or secondary base station) to activate or resume the cell group or cell again may be performed by the following one method or a method expanded to combination or application of the following methods.

First method: A terminal configures and transmits, to a master base station, a message (e.g., RRC message) that requests to activate or resume a secondary cell group or a cell again. If the message is received, as in the first signaling procedure of FIG. 1K proposed in the disclosure, the master base station may request a resumption procedure from a secondary base station, receive a response, and configure and transmit, to the terminal, a message (e.g., RRC message) that indicates to activate or resume the secondary cell group again. As another method, as in the second signaling procedure of FIG. 1I, the master base station may configure and transmit, to the terminal, a message (e.g., RRC message) that indicates to activate or resume the secondary cell group again, and then indicate activation or resumption to the secondary base station. As another method, as in the third signaling procedure of FIG. 1M, the terminal may configure and transmit, to the secondary base station through SRB3, a message (e.g., RRC message) that requests to activate or resume the secondary cell group or cell again, and the secondary base station may configure and transmit, to the terminal, a message (e.g., RRC message) that indicates to activate or resume the secondary cell group again, and then indicate activation or resumption to the master base station.

Second method: A terminal configures and transmits, to a master base station, a message (e.g., MAC control information) that requests to activate or resume a secondary cell group or a cell again. If the message is received, as in the first signaling procedure of FIG. 1K proposed in the disclosure, the master base station may request a resumption procedure from a secondary base station, receive a response, and configure and transmit, to the terminal, a message (e.g., RRC message or MAC control information) that indicates to activate or resume the secondary cell group again. As another method, as in the second signaling procedure of FIG. 1I, the master base station may configure and transmit, to the terminal, a message (e.g., RRC message or MAC control information) that indicates to activate or resume the secondary cell group again, and then indicate activation or resumption to the secondary base station. As another method, as in the third signaling procedure of FIG. 1M, the terminal may configure and transmit, to the secondary base station through SRB3, a message (e.g., MAC control information) that requests to activate or resume the secondary cell group or cell again, and the secondary base station may configure and transmit, to the terminal, a message (e.g., RRC message or MAC control information) that indicates to activate or resume the secondary cell group again, and then indicate activation or resumption to the master base station. When cell group activation or resumption is requested or indicated using MAC control information, the MAC control information may be newly defined and designed, and as another method, same may be indicated by defining a new field (or indicator) or defining a new value (field value or identifier value) by existing MAC control information (e.g., buffer status report).

Third method: A terminal configures and transmits, to a master base station, a message (e.g., a physical signal of a PHY layer device) that requests to activate or resume a secondary cell group or a cell again. If the message is received, as in the first signaling procedure of FIG. 1K proposed in the disclosure, the master base station may request a resumption procedure from a secondary base station, receive a response, and configure and transmit, to the terminal, a message (e.g., RRC message or a physical signal of a PHY layer device) that indicates to activate or resume the secondary cell group again. As another method, as in the second signaling procedure of FIG. 1I, the master base station may configure and transmit, to the terminal, a message (e.g., RRC message or a physical signal of a PHY layer device) that indicates to activate or resume the secondary cell group again, and then indicate activation or resumption to the secondary base station. As another method, as in the third signaling procedure of FIG. 1M, the terminal may configure and transmit, to the secondary base station through SRB3, a message (e.g., a physical signal of a PHY layer device) that requests to activate or resume the secondary cell group or cell again, and the secondary base station may configure and transmit, to the terminal, a message (e.g., RRC message or a physical signal of a PHY layer device) that indicates to activate or resume the secondary cell group again, and then indicate activation or resumption to the master base station. When cell group activation or resumption is requested or indicated using a physical signal of a PHY layer device, the physical signal of the PHY layer device may be defined and designed as a new transmission resource (e.g., a new scheduling request (SR) transmission resource (e.g., a PUCCH transmission resource of a PCell or PSCell) for a secondary cell group or a new field in DCI (a PDCCH transmission resource transmitted from a PSCell or a PCell) of a PDCCH). As another method, activation or resumption may be indicated by defining a new field (or indicator) or defining a new value (field value or identifier value) by existing physical signal (e.g., a scheduling request (SR) transmission resource (e.g., a PUCCH transmission resource of a PCell or PSCell) or a field (a PDCCH transmission resource transmitted from a PSCell or a PCell) of DCI of a PDCCH) of the PHY layer device. As another method, when the terminal applies second DRX configuration information to perform PDCCH monitoring for a PSCell of a secondary cell group according to a long period, or when a secondary cell group of the terminal is in a deactivated state or a suspended state, if a random access procedure is triggered for the terminal in the PSCell by using DCI of a PDCCH, the terminal may interpret the indication as activation or resumption of the secondary cell group. The physical transmission resource may indicate a transmission resource for random access, and the terminal may perform a random access procedure when uplink data for a secondary group occurs in a state where the secondary group is suspended or deactivated, as described above. As another method, when uplink data for a secondary group occurs in a state where the secondary group is suspended or deactivated, as described above, if an SR transmission resource is configured (or a TA timer is running), the terminal may transmit the SR transmission resource to a master cell group or a secondary cell group, and if SR transmission is not configured (or a TA timer has expired), the terminal may perform a random access procedure. The random access procedure may perform a contention-based random access (CBRA) procedure. As another method, if designated random access configuration information (dedicated RACH config or dedicated preamble) is configured (or included) in a message (or previously received message) indicating cell group suspension or deactivation, the terminal may perform a contention-free random access (CFRA) procedure, or if designated random access configuration information (dedicated RACH config or dedicated preamble) is not configured (or included) in a message (or previously received message) indicating cell group deactivation or suspension, the terminal may perform a contention-based random access (CBRA) procedure. The terminal may include and indicate, to the base station, an indicator (e.g., buffer status report (MAC control indicator (MAC control element))) indicating that uplink data has occurred, during the random access procedure or after completion of the random access procedure, and when the indicator is received or the random access procedure is completed, the base station (e.g., secondary base station or master base station) may transmit, to the terminal, a message indicating resumption or activation of the secondary cell group to resume or activate the secondary cell group and perform data transmission or reception again.

The following description of the disclosure proposes a specific operation of a terminal wherein, when a secondary cell group or a PSCell of a secondary cell group is in a deactivated state or a suspended state according to the procedure of deactivating or suspending a cell group or cell proposed above in the disclosure, if uplink data is generated or occurs in the terminal for the secondary cell group (or in bearers belonging to the secondary cell group), the specific operation is performed to activate or resume the cell group or cell again.

When uplink data for a secondary cell group (or suspended bearer belonging to the cell group) is generated or has occurred, the terminal may indicate a data volume of a PDCP layer device (or RLC layer device) for the uplink data to a lower layer device (MAC layer device) or a higher layer device (or RRC layer device), or may generate an RRC message for reporting that the uplink data has occurred, or generate (or trigger) a buffer status report (BSR or regular BSR) for reporting the volume of the uplink data to the base station, so as to indicate that the uplink data has occurred in the terminal.

1> If the occurrence of uplink data is indicated by the terminal as in the above method, 2> If a message including an indication that deactivates the cell or cell group does not configure (or does not include) a dedicated PUCCH transmission resource (PUCCH or scheduling request (SR) resource of MCG or SCG) for, when uplink data for the cell or cell group occurs, indicating the occurrence of the uplink data, 3> The terminal may perform a random access procedure in the cell or cell group, and when the random access procedure is performed, the terminal may perform the random access procedure (a normal random access procedure (4-step random access procedure) or a 2-step random access procedure (two-step RACH) considering the message or system information) in a bandwidth part determined in a procedure proposed above in the disclosure, a current bandwidth part (a previously activated bandwidth part or a lastly activated bandwidth part), a first active downlink (or uplink) bandwidth part (e.g., firstActiveDownlinkBWP, firstActiveUplinkBWP, or a newly defined bandwidth part) configured in the message (e.g., RRC message), an initial bandwidth part (or an initial BWP or an initial bandwidth part broadcast (or configured) by system information of the cell or cell group). During the random access procedure or after completion of the random access procedure, the terminal may transmit an RRC message (information indicating occurrence of uplink data) or MAC control information (buffer status report or new MAC control information) generated above, to indicate, to the base station, that uplink data has been generated for the cell or cell group. As another method, if a message including an indication that deactivates the cell or cell group configures a dedicated random access resource (RACH transmission resource, time resource or frequency resource, or preamble information) for, when uplink data for the cell or cell group occurs, indicating the occurrence of the uplink data, the terminal may use the dedicated random access resource to perform the random access procedure in the random access procedure to indicate, to the base station, that uplink data has been generated for the cell or cell group.

2> If a message including an indication that deactivates the cell or cell group configures (or includes) a dedicated PUCCH transmission resource (PUCCH or scheduling request (SR) resource of MCG or SCG) for, when uplink data for the cell or cell group occurs, indicating the occurrence of the uplink data, 3> If a new indicator (e.g., RACH-less indication or second reconfigurationWithcSync) is included in the message (or previous message) to indicate a random access procedure not to be performed (or reconfigurationWithSync or first reconfigurationWithSync is not configured), if a time alignment timer (TAT) driven in a MAC layer device (timer for determining the validity of a timing advance (TA) value for synchronization between a terminal and a base station) is running (or the timer has not expired or an indication indicating that the timer has expired is not received from a lower layer device), if an indication indicating that beam failure is detected is not received from a lower layer device (or if beam failure has not occurred), if a beam failure detection procedure or an RLM procedure for a deactivated cell group is configured, if a radio link failure procedure is not detected in an RLM procedure (or a second timer (T310) has not expired or a radio link with the SCG is valid), or if reconfigurationWithSync configuration information is not included in spCellConfig of the SCG in the message (or previous message), 4> The terminal may transmit a signal (or SR) by using the dedicated PUCCH transmission resource (PUCCH or scheduling request (SR) resource of MCG or SCG) configured for the cell or cell group. When the signal is transmitted on the dedicated PUCCH transmission resource (PUCCH or scheduling request (SR) resource of MCG or SCG), the terminal may indicate, to the base station, that uplink data has been generated for the cell or cell group, by transmitting the signal in a bandwidth part determined in a procedure proposed above in the disclosure, a current bandwidth part (a previously activated bandwidth part or a lastly activated bandwidth part), a first active downlink (or uplink) bandwidth part (e.g., firstActiveDownlinkBWP, firstActiveUplinkBWP, or a newly defined bandwidth part) configured in the message (e.g., RRC message), an initial bandwidth part (or an initial BWP or an initial bandwidth part broadcast (or configured) by system information of the cell or cell group). When the SR transmission resource is transmitted, SR transmission is possible by a count configured by the RRC message, or if the terminal performs SR transmission by the configured count but fails to receive a response therefor from the base station (e.g., the terminal performs SR transmission and then performs PDCCH monitoring but fails to be allocated an uplink transmission resource, or the terminal fails to be allocated same for a predetermined time (e.g., until a timer has expired)), the terminal may fall back and perform a random access procedure proposed above (e.g., may follow a random access procedure if the dedicated PUCCH transmission resource (PUCCH or scheduling request (SR) resource of MCG or SCG) is not configured). The SR transmission may be periodically performed based on a timer or a predetermined timer may be introduced to prevent SR transmission for a particular time interval (e.g., when the timer has expired (or the timer is not running), SR retransmission may be possible). In addition, the terminal may suspend the timer when a response from the base station is received.

When the terminal transmits, to the cell group (MCG or SCG), an indication indicating that uplink data has occurred for the deactivated cell or cell group as described above, the terminal may wait until receiving a response (e.g., MAC control information, RRC message, DCI of PDCCH, or transmission resource allocation) from the base station (MCG or SCG). As another method, if a response from the base station is not received for a predetermined time (e.g., while a timer may be introduced and operated, or the timer is running) or before passage of the predetermined time (or before the timer expires), the terminal may repeat a procedure of performing an indication indicating that uplink data has occurred for a deactivated cell or cell group, proposed above. When an indication indicating that uplink data has occurred for the deactivated cell or cell group is received, the base station may transmit a response therefor (e.g., MAC control information, RRC message, DCI of PDCCH, or transmission resource allocation) to the terminal.

As proposed above in the disclosure, when the terminal activates or resumes a cell group (e.g., secondary cell group) or cell (e.g., PSCell) through an indicator of a PDCCH, MAC control information, or an RRC message, the terminal may complete the activation or resumption of the cell group or cell at a first time point. The first time point may be configured by an RRC message as proposed above in the disclosure. For example, the RRC message may include time information indicating when to activate, resume, deactivate, or suspend DC, a cell group (e.g., secondary cell group), or a cell (PSCell or SCG SCell)) (e.g., information (e.g., X) indicating a timing, a time unit, a subframe, time slot, or symbol unit). For example, if a PDCCH, MAC control information, or an RRC message indicating activation, resumption, deactivation, or suspension of a cell group (e.g., secondary cell group) or cell (e.g., PSCell) is received in an n-th time unit, time information indicating that activation, resumption, deactivation, or suspension of the cell group or cell is required to be completed in an (n+X)th time unit may be configured. As another method, the time information (e.g., X) may be promised and defined in advance and used as a fixed value rather than being configured by the base station. As another example, if a PDCCH, MAC control information, or an RRC message indicating activation, resumption, deactivation, or suspension of a cell group (e.g., secondary cell group) or cell (e.g., PSCell) is received and then random access is started (a preamble is transmitted) or random access is successfully completed in an n-th time unit, time information indicating that activation, resumption, deactivation, or suspension of the cell group or cell is required to be completed in an (n+X)th time unit may be configured. As another method, the time information (e.g., X) may be promised and defined in advance and used as a fixed value rather than being configured by the base station. When activation, suspension, deactivation, or resumption of the cell group or cell is completed, the terminal may perform a proposed terminal operation according to a state (e.g., activated, dormant, or deactivated) of each cell or bandwidth part, proposed above in the disclosure. In addition, when activation or resumption of the cell group or cell is completed, a DRX operation of the terminal may be started or restarted, or when deactivation or suspension of the cell group or cell is completed, a DRX operation of the terminal may be suspended or deactivated.

In addition, as proposed above in the disclosure, when the terminal activates a cell (e.g., PSCell or SCell) of a cell group (e.g., master cell group or secondary cell group) through an indication of MAC control information, the terminal may complete the activation of the cell at a second time point. The second time point may be configured by an RRC message as proposed above in the disclosure. For example, the RRC message may include time information indicating when to activate or deactivate CA, DC, a cell group (e.g., master cell group or secondary cell group), or a cell (MCG SCell or SCG SCell)) (e.g., information (e.g., X) indicating a timing, a time unit, a subframe, time slot, or symbol unit). For example, if the terminal receives MAC control information indicating activation or deactivation of a cell (e.g., SCell) in an n-th time unit, time information indicating that activation or deactivation of the cell is required to be completed in an (n+X)th time unit may be configured. As another method, the time information (e.g., X) may be promised and defined in advance and used as a fixed value rather than being configured by the base station. As another example, if the terminal receives MAC control information indicating activation or deactivation of a cell (e.g., SCell or PSCell) and then starts random access (transmits a preamble) or successfully completes random access in an n-th time unit, time information indicating that activation or deactivation of the cell is required to be completed in an (n+X)th time unit may be configured. As another method, the time information (e.g., X) may be promised and defined in advance and used as a fixed value rather than being configured by the base station. When activation, suspension, deactivation, or resumption of the cell group or cell is completed, the terminal may perform a proposed terminal operation according to a state (e.g., activated, dormant, or deactivated) of each cell or bandwidth part, proposed above in the disclosure. In addition, when activation or resumption of the cell group or cell is completed, a DRX operation of the terminal may be started or restarted, or when deactivation or suspension of the cell group or cell is completed, a DRX operation of the terminal may be suspended or deactivated.

In addition, as proposed above in the disclosure, when the terminal activates a cell (e.g., PSCell or SCell) of a cell group (e.g., master cell group or secondary cell group) through an indication of an RRC message, the terminal may complete the activation of the cell at a third time point. The third time point may be configured by an RRC message as proposed above in the disclosure. For example, the RRC message may include time information indicating when to activate or deactivate CA, DC, a cell group (e.g., master cell group or secondary cell group), or a cell (MCG SCell, SCG SCell, or PSCell)) (e.g., information (e.g., X) indicating a timing, a time unit, a subframe, time slot, or symbol unit). For example, if the terminal receives an RRC message indicating activation or deactivation of a cell (e.g., SCell) in an n-th time unit, time information indicating that activation or deactivation of the cell is required to be completed in an (n+X)th time unit may be configured. As another method, the time information (e.g., X) may be promised and defined in advance and used as a fixed value rather than being configured by the base station. As another example, if the terminal receives an RRC message indicating activation or deactivation of a cell (e.g., SCell or PSCell) and then starts random access (transmits a preamble) or successfully completes random access in an n-th time unit, time information indicating that activation or deactivation of the cell is required to be completed in an (n+X)th time unit may be configured. As another method, the time information (e.g., X) may be promised and defined in advance and used as a fixed value rather than being configured by the base station. X may be configured or promised based on a slot number, or may be configured or promised based on the shortest slot length among configured PCells, PSCells, or SCells. When activation, suspension, deactivation, or resumption of the cell group or cell is completed, the terminal may perform a proposed terminal operation according to a state (e.g., activated, dormant, or deactivated) of each cell or bandwidth part, proposed above in the disclosure. In addition, when activation or resumption of the cell group or cell is completed, a DRX operation of the terminal may be started or restarted, or when deactivation or suspension of the cell group or cell is completed, a DRX operation of the terminal may be suspended or deactivated.

The concept of a cell group proposed above in the disclosure may be expanded to a sub-cell group. For example, in the disclosure, in order to configure DC for a terminal, a first cell group and a second cell group are configured, and are applied as a master cell group and a secondary cell group so as to configure DC for the terminal, and the terminal is able to perform data transmission or reception with two base stations. However, if the concept of the cell group is expanded to a sub-cell group, multiple sub-cell groups may be configured in the cell group for a terminal connected to one base station, or a sub-cell group identifier may be configured for each sub-cell group. Then, the terminal may perform data transmission or reception for the one base station, but may expand and apply a procedure of activating, suspending, resuming, or deactivating to different frequencies or cells for each sub-cell group, by using a PDCCH, MAC control information, or an RRC message proposed in the disclosure. For example, when a terminal communicates with one base station and multiple frequencies or cells, the base station may configure, for the terminal, multiple sub-cell groups for multiple frequencies or cells of the base station corresponding to the cell group (master cell group) so as to configure the terminal to apply carrier aggregation, and may define respective fields indicating the sub-cell groups in a PDCCH, MAC control information, or an RRC message so as to enable each field to indicate activation, deactivation, suspension, or resumption of a corresponding sub-cell group. Then, the terminal may apply a procedure of activating, suspending, resuming, or deactivating to different frequencies or cells for each sub-cell group, by using a PDCCH, MAC control information, or an RRC message proposed in the disclosure. As another method, a sub-cell group proposed above may be implemented by introduction of downlink or uplink logical channel restriction for each cell. For example, configuration information restricting logical channels belonging to one cell group to perform data transmission or reception only for a particular frequency or cell may be included in an RRC message and configured for a terminal. As described above, logical channels (e.g., logical channel identifiers) may be mapped to and configured for respective cells or frequencies so as to be grouped and considered as a sub-cell group proposed above, and respective fields indicating the cells may be defined in a PDCCH, MAC control information, or an RRC message so that each field indicates activation, deactivation, suspension, or resumption of a corresponding cell.

In addition, in the disclosure, when a terminal for which DC is configured transmits or receives data with a master cell group or secondary cell group, or when the secondary cell group is suspended or deactivated, if radio link failure is detected in the master cell group, the terminal may report the radio link failure to the secondary cell group or to the master cell group via the secondary cell group. For example, the terminal may configure an RRC message for radio link failure reporting and transmit the RRC message through split SRB1 or SRB3 to perform reporting. If split SRB1 is configured, the terminal may always report the radio link failure through split SRB1. As another method, when a terminal for which DC is configured transmits or receives data with a master cell group or secondary cell group, or when the secondary cell group is suspended or deactivated, if radio link failure is detected in the master cell group, the terminal may declare radio link failure and perform an RRC re-establishment (RRC connection re-establishment) procedure.

In addition, in the disclosure, when a terminal for which DC is configured transmits or receives data with a master cell group or secondary cell group, or when the secondary cell group is suspended or deactivated, if radio link failure is detected in the secondary cell group, the terminal may report the radio link failure to the master cell group or to the secondary cell group via the master cell group. For example, the terminal may configure an RRC message for radio link failure reporting and transmit the RRC message through SRB1, split SRB1, or SRB3 to perform reporting. If SRB1 or split SRB1 is configured, the terminal may always report the radio link failure through split SRB1.

In the disclosure, when DC is configured for a terminal, releasing a secondary cell group means releasing connection (data transmission or reception) with the secondary cell group or discarding or releasing configuration information (or bearer configuration information, or protocol layer device configuration information (PHY, MAC, RLC, PDCP, or SDAP layer device) of the secondary cell group. On the contrary, suspending or deactivating the secondary cell group means releasing or suspending connection (data transmission or reception) with the secondary cell group, but maintaining, suspending, or storing configuration information (or bearer configuration information or protocol layer device configuration information (PHY, MAC, RLC, PDCP, or SDAP layer device) of the secondary cell group or, in the future, quickly resuming or activating the connection with the secondary cell group, based on the stored configuration information of the secondary cell group.

The following description of the disclosure proposes that, if a frequency measurement procedure or a frequency measurement reporting procedure is configured for a terminal through the RRC message (e.g., RRCReconfiguration) of the disclosure, if DC is configured for the terminal, or if the frequency measurement procedure or the frequency measurement reporting procedure are configured for a cell group (or SCG), the terminal prioritize SRB3 and reports a frequency measurement result through SRB3, and only when SRB3 is not configured, the terminal reports a frequency measurement result through SRB 1 (or SRB of MCG). However, the following description proposes that the terminal does not perform measurement reporting through SRB3 when the cell group (SCG) is deactivated. For example, the following description proposes a procedure in which, only when the cell group is not deactivated, if SRB3 is configured, the terminal performs frequency measurement result reporting through SRB3, or proposes a procedure in which, when the cell group is deactivated, the terminal reports a frequency measurement result through SRB1 (or SRB of MCG). This is because, when a frequency measurement result is transmitted through SRB3 in a state where the cell group (SCG) is deactivated, the cell group is required to be unnecessarily activated. A specific procedure of a terminal is as follows.

1> If a frequency measurement procedure or a frequency measurement reporting procedure is configured for the terminal, 2> If the terminal is configured by (NG)EN-DC (or if the frequency measurement procedure or frequency measurement reporting procedure is configured for a cell group (or SCG)), 3> If SRB3 is configured for the terminal and the state of the cell group (SCG) is not configured as a deactivated state, 4> The terminal transfers a frequency measurement result reporting message to a lower layer device to transmit same through SRB3.

3> Otherwise,

4> The terminal transfers a frequency measurement result reporting message to a lower layer device to transmit same through SRB1 (or SRB of MCG (E-UTRA)).

2> If the terminal is configured by NR-DC or if the frequency measurement procedure or frequency measurement reporting procedure is configured for a cell group (or SCG), 3> If SRB3 is configured for the terminal and the state of the cell group (SCG) is not configured as a deactivated state, a 4> The terminal transfers a frequency measurement result reporting message to a lower layer device to transmit same through SRB3.

3> Otherwise,

4> The terminal transfers a frequency measurement result reporting message to a lower layer device to transmit same through SRB1 (or SRB of MCG (E-UTRA)).

Figure 1N:
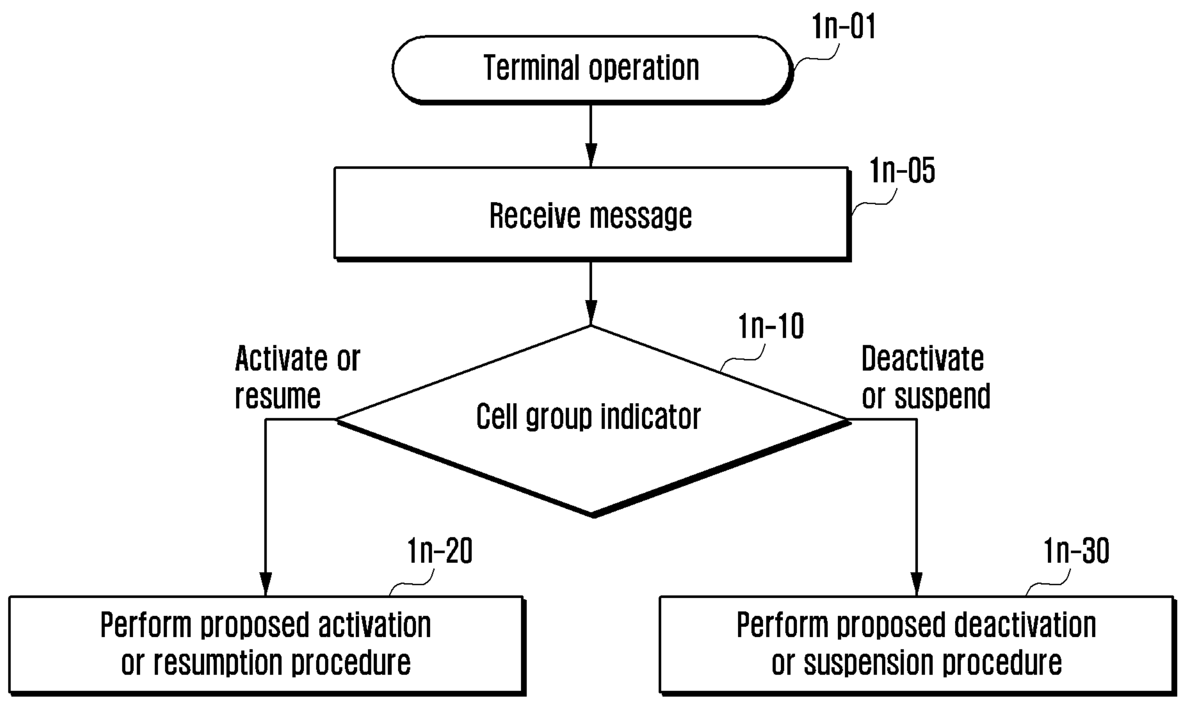
FIG. 1N is a diagram illustrating an operation of a terminal according to an embodiment of the disclosure.
Figure 10:
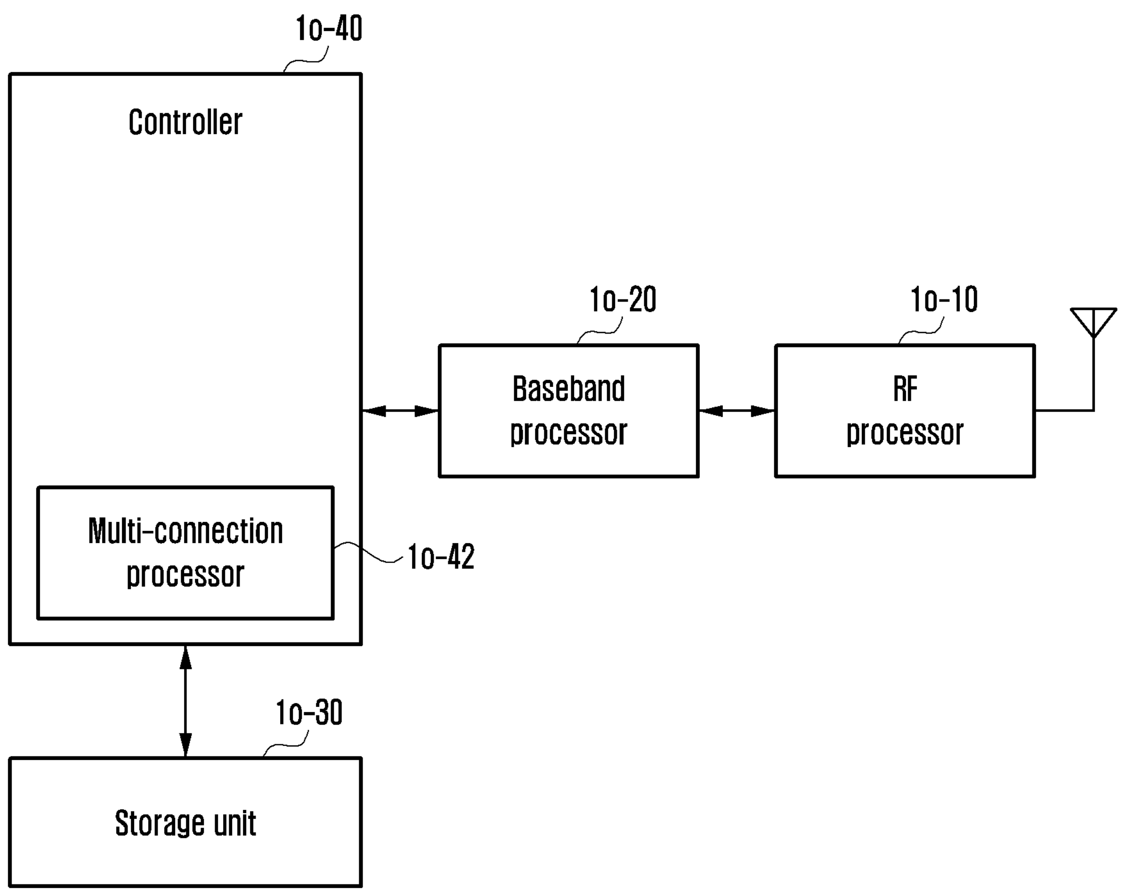

FIG. 1N is a diagram illustrating an operation of a terminal according to an embodiment of the disclosure.

In FIG. 1N, a terminal 1*n*-01 may receive a message (e.g., DCI of a PDCCH, MAC control information, or an RRC message) from a base station (1*n*-05). If the message includes cell group configuration information, a cell group state, or a cell group indicator, the terminal may identify whether the cell group is indicated to be configured, added, activated, or resumed or the cell group is indicated to be released, deactivated, or suspended (1*n*-10). If the cell group is indicated to be configured, added, activated, or resumed, the terminal may perform a procedure of configuring, adding, activating, or resuming the cell group, as proposed above in the disclosure (1*n*-20), and if the cell group is indicated to be released, deactivated, or suspended, the terminal may perform a procedure of releasing, deactivating, or suspending the cell group, as proposed above in the disclosure (1*n*-30).

FIG. 1O is a diagram illustrating a structure of a terminal according to an embodiment of the disclosure.

Referring to FIG. 1O, the terminal includes a radio frequency (RF) processor 1*o*-10, a baseband processor 1*o*-20, a storage unit 1*o*-30, and a controller 1*o*-40.

The RF processor 1*o*-10 performs a function, such as signal band change, amplification, etc., for transmitting or receiving a signal through a wireless channel. That is, the RF processor 1*o*-10 upconverts a baseband signal provided from the baseband processor 1*o*-20, into an RF band signal, and then transmits the RF band signal through an antenna, and downconverts an RF band signal received through the antenna, into a baseband signal. For example, the RF processor 1*o*-10 may include a transmission filter, a reception filter, an amplifier, a mixer, an oscillator, a digital-to-analog converter (DAC), an analog-to-digital converter (ADC), and the like. In FIG. 1O, only one antenna is illustrated, but the terminal may include a plurality of antennas. In addition, the RF processor 1*o*-10 may include a plurality of RF chains. Moreover, the RF processor 1*o*-10 may perform beamforming. To perform the beamforming, the RF processor 1*o*-10 may adjust the phase and size of each of signals transmitted or received through a plurality of antennas or antenna elements. In addition, the RF processor 1*o*-10 may perform MIMO, and may receive several layers when a MIMO operation is performed. The RF processor 1*o*-10 may properly configure a plurality of antennas or antenna elements according to a control of the controller 1*o*-40 to perform reception beam sweeping or adjust the direction and the beam width of a reception beam to be coordinate with a transmission beam.

The baseband processor 1*o*-20 performs a function of conversion between a baseband signal and a bitstream according to a physical layer specification of a system. For example, when data is transmitted, the baseband processor 1*o*-20 generates complex symbols by encoding and modulating a transmission bit stream. In addition, when data is received, the baseband processor 1*o*-20 reconstructs a reception bit stream by demodulating and decoding a baseband signal provided from the RF processor 1*o*-10. For example, in a case where an orthogonal frequency division multiplexing (OFDM) scheme is applied, when data is transmitted, the baseband processor 1*o*-20 generates complex symbols by encoding and modulating a transmission bit stream, maps the complex symbols to subcarriers, and then configures OFDM symbols through inverse fast Fourier transform (IFFT) calculation and cyclic prefix (CP) insertion. In addition, when data is received, the baseband processor 1*o*-20 divides a baseband signal provided from the RF processor 1*o*-10, by the units of OFDM symbols, reconstructs signals mapped to subcarriers, through fast Fourier transform (FFT)

calculation, and then reconstructs a reception bit stream through demodulation and decoding.

The baseband processor **1*o*-20 and the RF processor 1*o*-10 transmit and receive a signal as described above. Accordingly, the baseband processor 1*o*-20 and the RF processor 1*o*-10 may be called a transmitter, a receiver, a transceiver, or a communication unit. Furthermore, at least one of the baseband processor 1*o*-20 and the RF processor 1*o*-10 may include a plurality of communication modules to support a plurality of different wireless access technologies. In addition, at least one of the baseband processor 1*o*-20 and the RF processor 1*o*-10** may include different communication modules to process signals in different frequency bands. For example, different wireless access technologies may include LTE network, NR network, etc. In addition, the different frequency bands may include a super high frequency (SHF) (e.g., 2.5 GHz and 5 GHz) band, and a millimeter (mm) wave (e.g., 60 GHz) band.

The storage unit **1*o*-30 stores data such as a basic program, an application program, and configuration information for an operation of the terminal. The storage unit 1*o*-30 provides stored data in response to a request of the controller 1*o*-40**.

The controller **1*o*-40 controls overall operations of the terminal. For example, the controller 1*o*-40 transmits or receives a signal via the baseband processor 1*o*-20 and the RF processor 1*o*-10. In addition, the controller 1*o*-40 records and reads data in and from the storage unit 1*o*-40. To this end, the controller 1*o*-40 may include at least one processor. For example, the controller 1*o*-40** may include a communication processor (CP) performing a control for communication, and an application processor (AP) controlling a higher layer, such as an application program.

Figure 1P:
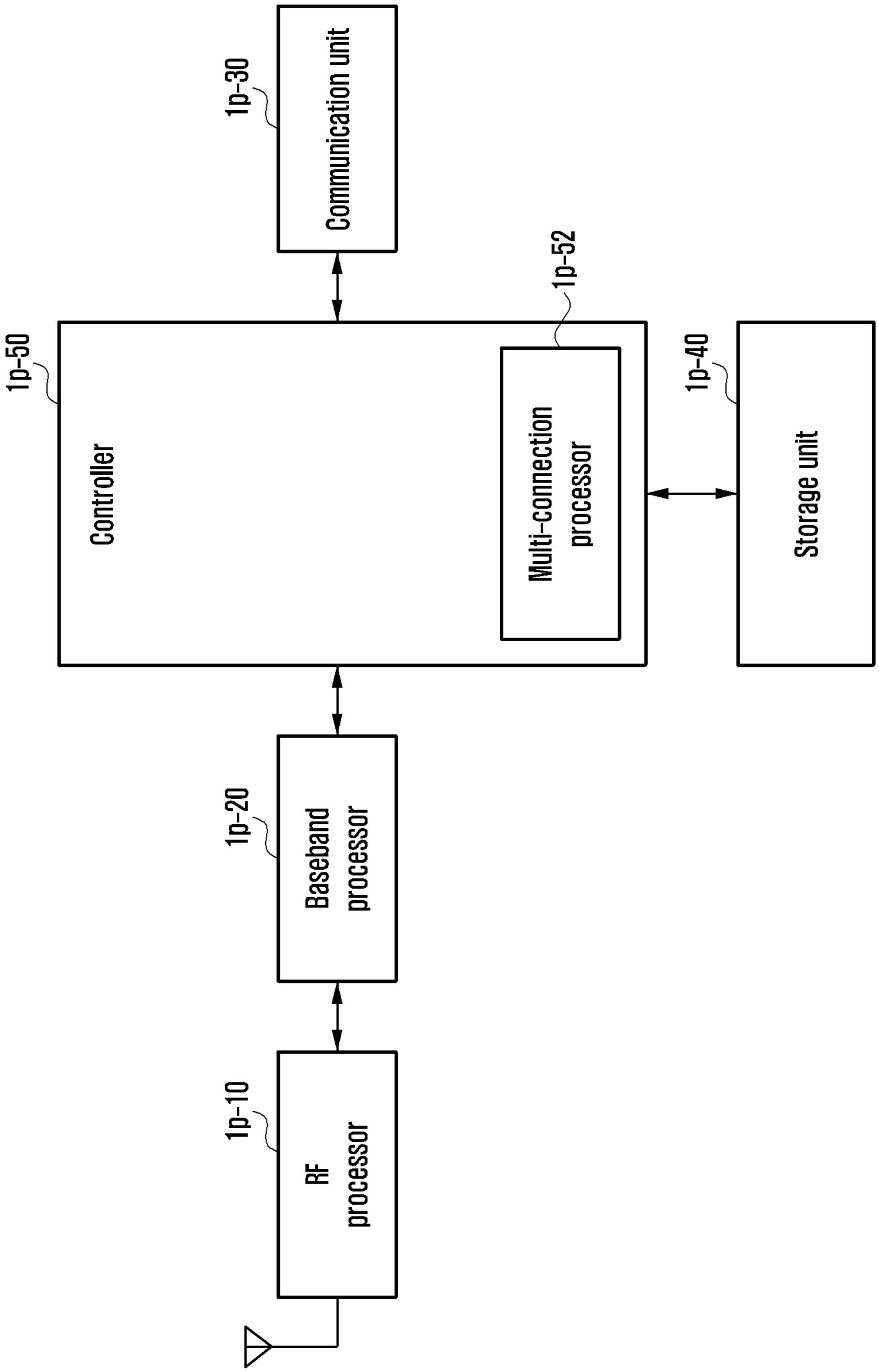
FIG. 1P illustrates a block configuration of a base station according to an embodiment of the disclosure.

FIG. 1P illustrates a block configuration of a base station according to an embodiment of the disclosure.

Referring to FIG. 1P, the base station includes an RF processor **1*p*-10, a baseband processor 1*p*-20, a backhaul communication unit 1*p*-30, a storage unit 1*p*-40, and a controller 1*p*-50**.

The RF processor **1*p*-10 performs a function, such as signal band change, amplification, etc., for transmitting or receiving a signal through a wireless channel. That is, the RF processor 1*p*-10 upconverts a baseband signal provided from the baseband processor 1*p*-20, into an RF band signal, and then transmits the RF band signal through an antenna, and downconverts an RF band signal received through the antenna, into a baseband signal. For example, the RF processor 1*p*-10 may include a transmission filter, a reception filter, an amplifier, a mixer, an oscillator, a digital-to-analog converter (DAC), an analog-to-digital converter (ADC), and the like. In FIG. 1P, only one antenna is illustrated, but the base station may include a plurality of antennas. In addition, the RF processor 1*p*-10 may include a plurality of RF chains. Moreover, the RF processor 1*p*-10 may perform beamforming. To perform the beamforming, the RF processor 1*p*-10 may adjust the phase and size of each of signals transmitted or received through a plurality of antennas or antenna elements. The RF processor 1*p*-10** may perform a downlink MIMO operation by transmitting at least one layer.

The baseband processor **1*p*-20 performs a function of conversion between a baseband signal and a bit stream according to a physical layer specification of a first wireless access technology. For example, when data is transmitted, the baseband processor 1*p*-20 generates complex symbols by encoding and modulating a transmission bit stream. In addition, when data is received, the baseband processor 1*p*-20 reconstructs a reception bit stream by demodulating and decoding a baseband signal provided from the RF processor 1*p*-10. For example, in a case where an OFDM scheme is applied, when data is transmitted, the baseband processor 1*p*-20 generates complex symbols by encoding and modulating a transmission bit stream, maps the complex symbols to subcarriers, and then configures OFDM symbols through IFFT calculation and CP insertion. In addition, when data is received, the baseband processor 1*p*-20 divides a baseband signal provided from the RF processor 1*p*-10, by the units of OFDM symbols, reconstructs signals mapped to subcarriers, through FFT calculation, and then reconstructs a reception bit stream through demodulation and decoding. The baseband processor 1*p*-20 and the RF processor 1*p*-10 transmit and receive a signal as described above. Accordingly, the baseband processor 1*p*-20 and the RF processor 1*p*-10** may be called a transmitter, a receiver, a transceiver, a communication unit, or a wireless communication unit.

The backhaul communication unit **1*p*-30** provides an interface for performing communication with other nodes within a network.

The storage unit **1*p*-40 stores data such as a basic program, an application program, and configuration information for an operation of the base station. Particularly, the storage unit 1*p*-40 may store information relating to a bearer assigned to a connected terminal, a measurement result reported from a connected terminal, etc. In addition, the storage unit 1*p*-40 may store information serving as a determination criterion of whether to provide or stop providing multi-connection to a terminal. Then, the storage unit 1*p*-40 provides stored data in response to a request of the controller 1*p*-50**.

The controller **1*p*-50 controls overall operations of the base station. For example, the controller 1*p*-50 transmits or receives a signal via the baseband processor 1*p*-20 and the RF processor 1*p*-10, or via the backhaul communication unit 1*p*-30. In addition, the controller 1*p*-50 records and reads data in and from the storage unit 1*p*-40. To this end, the controller 1*p*-50** may include at least one processor.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a terminal in a wireless communication system, the method comprising:

receiving, from a base station, a message including configuration information of a cell;

in case that the message includes information indicating deactivation of a cell group comprising the cell, identifying whether information on a bandwidth part (BWP) to be measured is included in the configuration information of the cell; and in case that the information on the BWP to be measured is included in the configuration information of the cell, performing measurement in the BWP.

2. The method of claim 1, further comprising:

in case that the information on the BWP to be measured is not included in the configuration information of the cell, performing measurement in a BWP previously activated before the cell is deactivated.

3. The method of claim 1, wherein the information on the BWP to be measured includes information indicating a first active downlink bandwidth part.

4. The method of claim 1, wherein the measurement comprises at least one of radio link monitoring (RLM) or beam failure detection (BFD).

5. The method of claim 1, further comprising:

in case that the message includes information indicating activation of the cell group comprising the cell and the information on the BWP to be measured is not included in the configuration information of the cell, performing measurement in a BWP previously activated before the cell is deactivated.

6. The method of claim 1, wherein the measurement is performed based on information indicating a transmission configuration indication (TCI) state, included in the configuration information of the cell.

7. The method of claim 1, wherein the cell comprises at least one of a special cell (SpCell) or a primary secondary cell group (SCG) cell (PSCell).

8. A terminal in a wireless communication system, the terminal comprising:

a transceiver; and a controller coupled with the transceiver and configured to:

receive, from a base station, a message including configuration information of a cell, in case that the message includes information indicating deactivation of a cell group comprising the cell, identify whether information on a bandwidth part (BWP) to be measured is included in the configuration information of the cell, and in case that the information on the BWP to be measured is included in the configuration information of the cell, perform measurement in the BWP.

9. The terminal of claim 8, wherein the controller is configured to:

in case that the information on the BWP to be measured is not included in the configuration information of the cell, perform measurement in a BWP previously activated before the cell is deactivated.

10. The terminal of claim 8, wherein the information on the BWP to be measured includes information indicating a first active downlink bandwidth part.

11. The terminal of claim 8, wherein the measurement comprises at least one of radio link monitoring (RLM) or beam failure detection (BFD).

12. The terminal of claim 8, wherein the controller is configured to in case that the message includes information indicating activation of the cell group comprising the cell and the information on the BWP to be measured is not included in the configuration information of the cell, perform measurement in a BWP previously activated before the cell is deactivated.

13. The terminal of claim 8, wherein the controller is configured to perform the measurement, based on information indicating a transmission configuration indication (TCI) state, included in the configuration information of the cell.

14. The terminal of claim 8, wherein the cell comprises at least one of a special cell (SpCell) or a primary secondary cell group (SCG) cell (PSCell).

* * * * *